US011137803B2

(12) United States Patent
Palmer et al.

(10) Patent No.: US 11,137,803 B2
(45) Date of Patent: Oct. 5, 2021

(54) SLIM ELECTRONIC DEVICES AND AUDIO TRANSDUCERS INCORPORATED THEREIN

(71) Applicant: Wing Acoustics Limited, Auckland (NZ)

(72) Inventors: David John Palmer, Auckland (NZ); Michael Ian Palmer, Auckland (NZ); Christopher Marck Hardy, Auckland (NZ)

(73) Assignee: WING ACOUSTICS LIMITED, Auckland (NZ)

( * ) Notice: Subject to any disclaimer, the term of this patent is extended or adjusted under 35 U.S.C. 154(b) by 0 days.

(21) Appl. No.: 16/495,728

(22) PCT Filed: Mar. 21, 2018

(86) PCT No.: PCT/IB2018/051881
§ 371 (c)(1),
(2) Date: Sep. 19, 2019

(87) PCT Pub. No.: WO2018/172944
PCT Pub. Date: Sep. 27, 2018

(65) Prior Publication Data
US 2020/0019219 A1 Jan. 16, 2020

(30) Foreign Application Priority Data

Mar. 22, 2017 (NZ) ........................................ 730410
Mar. 23, 2017 (NZ) ........................................ 730465
(Continued)

(51) Int. Cl.
*G06F 1/16* (2006.01)
*H04R 7/04* (2006.01)
(Continued)

(52) U.S. Cl.
CPC .............. *G06F 1/1681* (2013.01); *H04R 7/04* (2013.01); *H04R 7/24* (2013.01); *H04R 7/26* (2013.01);
(Continued)

(58) Field of Classification Search
CPC ........ H04R 1/025; H04R 1/026; H04R 1/028; H04R 5/023; H04R 2201/02;
(Continued)

(56) References Cited

U.S. PATENT DOCUMENTS 1,035,577 A 8/1912 Grace
1,536,116 A 5/1925 Martin
(Continued)

FOREIGN PATENT DOCUMENTS

CA 2 600 015 A1 9/2006
DE 3378456 D1 12/1988
(Continued)

OTHER PUBLICATIONS

International Search Report and Written Opinion for Application No. PCT/IB2018/051881 dated Jul. 3, 2018, 11 pages.
(Continued)

*Primary Examiner* — Walter F Briney, III
(74) *Attorney, Agent, or Firm* — Alston & Bird LLP

(57) ABSTRACT

A hinge system having at least three hinge joints, consisting each of a hinge element and an associated contact member. The contact surface of the hinge element of each hinge joint moves relative to the contact surface of the associated contact member to enable rotatable oscillation of the hinge joint about a common axis of rotation during operation. The contact surface of each contact member is convexly curved and the hinge joints comprise convex surfaces facing in different directions to enhance operation of the hinge system. Multiple convex surfaces are preferably formed on a
(Continued)

relatively rigid component to reduce manufacturing complexity and improve operation. The hinge system is particularly suited for audio transducer applications, but may also be used in other applications, such as in other electromechanical devices.

26 Claims, 52 Drawing Sheets

(30) Foreign Application Priority Data

| | | | |
|---|---|---|---|
| Mar. 31, 2017 | (NZ) | ................................... | 730631 |
| Jul. 17, 2017 | (NZ) | ................................... | 733866 |
| Jul. 18, 2017 | (NZ) | ................................... | 733867 |
| Nov. 16, 2017 | (NZ) | ................................... | 737401 |

(51) Int. Cl.
*H04R 7/26* (2006.01)
*H04R 7/24* (2006.01)

(52) U.S. Cl.
CPC ...... *H04R 2499/11* (2013.01); *H04R 2499/15* (2013.01)

(58) Field of Classification Search
CPC .......... H04R 2201/029; H04R 2499/11; H04R 2499/15; H04R 2209/027
See application file for complete search history.

(56) References Cited

U.S. PATENT DOCUMENTS

| | | |
|---|---|---|
| 1,562,165 A | 11/1925 | Harrison |
| 1,579,864 A | 4/1926 | Hobart, Jr. |
| 1,614,327 A | 1/1927 | Thomas |
| 1,633,170 A | 6/1927 | Fischer |
| 1,683,946 A | 9/1928 | Baldwin |
| 1,693,223 A | 11/1928 | Danziger et al. |
| 1,786,465 A | 12/1930 | Wagenen |
| 1,821,547 A | 9/1931 | Hartley |
| 2,035,104 A | 3/1936 | Thomas |
| 2,049,784 A | 8/1936 | Thomas |
| 2,075,774 A | 3/1937 | Allen |
| 2,077,170 A | 4/1937 | Harrison |
| 2,078,469 A | 4/1937 | Thomas |
| 2,085,198 A | 6/1937 | Lindsay |
| 2,239,837 A | 4/1941 | Bottorff |
| 2,278,966 A | 4/1942 | Williams |
| 2,304,022 A | 12/1942 | Sanders, Jr. |
| 3,578,921 A | 5/1971 | Knauer |
| 3,761,956 A | 9/1973 | Takahashi |
| 4,182,937 A | 1/1980 | Greenwood |
| 4,239,090 A | 12/1980 | Dahlquist |
| 4,313,040 A | 1/1982 | Tsukamoto |
| 4,385,210 A | 5/1983 | Marquiss |
| 4,430,529 A | 2/1984 | Nakagawa et al. |
| 4,593,160 A | 6/1986 | Nakamura |
| 4,628,907 A | 12/1986 | Epley |
| 4,763,358 A * | 8/1988 | Danley .................. H04R 23/00 310/80 |
| 5,140,641 A | 8/1992 | Danley et al. |
| 5,191,618 A | 3/1993 | Hisey |
| 5,255,328 A | 10/1993 | Akiniwa et al. |
| 5,313,127 A | 5/1994 | Danley et al. |
| 5,317,642 A * | 5/1994 | Danley .................. H04R 7/12 381/182 |
| 5,633,552 A | 5/1997 | Lee et al. |
| 5,660,397 A | 8/1997 | Holtkamp |
| 5,694,476 A | 12/1997 | Klippel |
| 5,704,613 A | 1/1998 | Holtkamp |
| 5,802,189 A | 9/1998 | Blodget |
| 5,825,901 A | 10/1998 | Hisey |
| 5,848,173 A | 12/1998 | Sato et al. |
| 5,872,853 A | 2/1999 | Marquiss |
| 6,097,829 A | 8/2000 | Guenther et al. |
| 6,151,402 A | 11/2000 | Azima et al. |
| 6,160,898 A | 12/2000 | Bachmann et al. |
| 6,192,136 B1 | 2/2001 | Azima et al. |
| 6,347,149 B1 | 2/2002 | Bachmann et al. |
| 6,384,550 B1 | 5/2002 | Mikyakawa et al. |
| 6,466,682 B2 | 10/2002 | An |
| 6,560,348 B1 | 5/2003 | Bachmann et al. |
| 6,567,525 B1 | 5/2003 | Sapiejewski |
| 6,748,090 B1 | 6/2004 | Bachmann et al. |
| 6,985,596 B2 | 1/2006 | Bank et al. |
| 7,088,839 B2 | 8/2006 | Geschiere et al. |
| 7,206,428 B2 | 4/2007 | Geschiere et al. |
| 7,302,068 B2 | 11/2007 | Longbottom et al. |
| 7,369,674 B2 | 5/2008 | Miura |
| 7,403,632 B2 | 7/2008 | Goldberg |
| 7,471,805 B2 | 12/2008 | Goldberg |
| 7,729,504 B2 | 6/2010 | Tsuda et al. |
| 7,747,035 B1 | 6/2010 | Heavner |
| 7,860,265 B2 | 12/2010 | Gaudreault |
| 8,014,556 B2 | 9/2011 | Goldberg |
| 8,023,668 B2 | 9/2011 | Pfaffinger |
| 8,064,630 B2 | 11/2011 | Goldberg |
| 8,073,181 B2 | 12/2011 | Bakalos et al. |
| 8,073,187 B2 | 12/2011 | Hashimoto et al. |
| 8,085,955 B2 | 12/2011 | Henry |
| 8,116,508 B2 | 2/2012 | Xu et al. |
| 8,131,005 B2 | 3/2012 | Lemarquand et al. |
| 8,139,813 B2 | 3/2012 | Kobayashi et al. |
| 8,144,380 B2 | 3/2012 | Takeuchi |
| 8,280,096 B2 | 10/2012 | Milot |
| 8,295,536 B2 | 10/2012 | Carlmark et al. |
| 8,295,537 B2 | 10/2012 | Carlmark et al. |
| 8,457,344 B2 | 6/2013 | Kobayashi et al. |
| 8,659,211 B1 | 2/2014 | Butler et al. |
| 8,705,774 B2 | 4/2014 | Jilani et al. |
| 8,965,024 B2 | 2/2015 | Graham |
| 9,247,365 B1 | 1/2016 | Ellis et al. |
| 10,244,325 B2 | 3/2019 | Palmer et al. |
| 2002/0122560 A1 | 9/2002 | An |
| 2002/0146141 A1 | 10/2002 | Geschiere et al. |
| 2004/0062404 A1 | 4/2004 | Negishi et al. |
| 2004/0202338 A1 | 10/2004 | Longbotttom et al. |
| 2005/0180592 A1 | 8/2005 | Miura |
| 2005/0269906 A1 | 12/2005 | Allan et al. |
| 2006/0028751 A1 | 2/2006 | Takeuchi |
| 2006/0198541 A1 | 9/2006 | Henry |
| 2006/0239488 A1 | 10/2006 | Geschiere et al. |
| 2007/0258617 A1 | 11/2007 | Henry |
| 2007/0263886 A1 | 11/2007 | Starnes et al. |
| 2008/0025533 A1 | 1/2008 | Livingstone et al. |
| 2008/0069385 A1* | 3/2008 | Revit ..................... H03G 7/002 381/321 |
| 2008/0232636 A1 | 9/2008 | Thurber et al. |
| 2008/0247595 A1 | 10/2008 | Henry |
| 2009/0028374 A1 | 1/2009 | Hashimoto et al. |
| 2009/0034780 A1 | 2/2009 | Gaudreault |
| 2009/0226028 A1 | 9/2009 | Suganuma |
| 2011/0069859 A1 | 3/2011 | Kobayashi et al. |
| 2011/0243365 A1 | 10/2011 | Carlmark et al. |
| 2011/0243366 A1 | 10/2011 | Carlmark et al. |
| 2011/0261979 A1 | 10/2011 | Yang et al. |
| 2011/0299716 A1 | 12/2011 | Reckert |
| 2012/0033818 A1 | 2/2012 | De Poortere |
| 2012/0045073 A1 | 2/2012 | Kobayashi et al. |
| 2012/0257778 A1 | 10/2012 | Hall et al. |
| 2014/0003624 A1 | 1/2014 | Stromback |
| 2014/0049983 A1 | 2/2014 | Nichol et al. |
| 2014/0140559 A1 | 5/2014 | Graham |
| 2014/0254805 A1 | 9/2014 | Su et al. |
| 2014/0321668 A1 | 10/2014 | Kimura et al. |
| 2014/0369519 A1 | 12/2014 | Leschka et al. |
| 2015/0281830 A1 | 10/2015 | Gauger, Jr. et al. |
| 2016/0337747 A1* | 11/2016 | Litovsky .............. H04R 1/2838 |
| 2016/0373858 A1 | 12/2016 | Lawrence et al. |

(56) References Cited

U.S. PATENT DOCUMENTS

| | | | |
|---|---|---|---|
| 2017/0078798 A1 | 3/2017 | Palmer et al. | |
| 2018/0014115 A1* | 1/2018 | Crosby | H04R 1/2819 |

FOREIGN PATENT DOCUMENTS

| | | |
|---|---|---|
| DE | 3908402 A1 | 9/1990 |
| EP | 0 114 910 A1 | 8/1984 |
| EP | 0 114 910 B1 | 11/1988 |
| EP | 0 609 873 A2 | 8/1994 |
| EP | 0 609 873 A3 | 8/1994 |
| EP | 0 701 386 A2 | 3/1996 |
| EP | 0 720 810 A1 | 7/1996 |
| EP | 0 735 795 A2 | 10/1996 |
| EP | 1 248 496 A2 | 10/2002 |
| EP | 0 735 795 A3 | 7/2003 |
| EP | 1 248 496 A3 | 11/2005 |
| EP | 1 752 016 A1 | 2/2007 |
| EP | 1 854 332 A2 | 11/2007 |
| EP | 1 940 199 A1 | 7/2008 |
| EP | 2 023 657 A2 | 2/2009 |
| EP | 1 752 016 B1 | 2/2010 |
| EP | 2 124 480 B1 | 3/2012 |
| EP | 2 023 657 A3 | 6/2013 |
| GB | 325543 A | 2/1930 |
| JP | S 54-103340 A | 8/1979 |
| JP | S54147028 A | 11/1979 |
| JP | S5553996 A | 4/1980 |
| JP | S5555696 A | 4/1980 |
| JP | S 56-131298 A | 10/1981 |
| JP | S 58-151200 A | 9/1983 |
| JP | S59161996 A | 9/1984 |
| JP | S59191998 A | 10/1984 |
| JP | S60259086 A | 12/1985 |
| JP | S60259087 A | 12/1985 |
| JP | S60259089 A | 12/1985 |
| JP | S60259090 A | 12/1985 |
| JP | S60259095 A | 12/1985 |
| JP | S619098 A | 1/1986 |
| JP | S61103393 A | 5/1986 |
| JP | S 61-157000 A | 7/1986 |
| JP | S61144200 A | 7/1986 |
| JP | S 61-214897 A | 9/1986 |
| JP | S6253099 A | 3/1987 |
| JP | 64-29098 A | 1/1989 |
| JP | H01264098 A | 10/1989 |
| JP | H04357799 A | 12/1992 |
| JP | H 05-236595 A | 9/1993 |
| JP | H06217390 A | 8/1994 |
| JP | 62-53099 A | 9/1994 |
| JP | H09084179 A | 3/1997 |
| JP | H09084181 A | 3/1997 |
| JP | H09084182 A | 3/1997 |
| JP | H09084186 A | 3/1997 |
| JP | H0998496 A | 4/1997 |
| JP | H09098497 A | 4/1997 |
| JP | H09233582 A | 9/1997 |
| JP | H09275289 A | 10/1997 |
| JP | H10066194 A | 3/1998 |
| JP | H 11-355876 A | 12/1999 |
| JP | H11355876 A | 12/1999 |
| JP | 2002-354853 A | 12/2002 |
| JP | 2004-200745 A | 7/2004 |
| JP | 2004-274206 A | 9/2004 |
| JP | 2005-260510 A | 9/2005 |
| JP | 2005-311951 A | 11/2005 |
| JP | 2005-328209 A | 11/2005 |
| JP | 2006-013671 A | 1/2006 |
| JP | 38-63884 B2 | 12/2006 |
| JP | 2008-532422 A | 8/2008 |
| JP | 2009-098496 A | 5/2009 |
| JP | 2009-219067 A | 9/2009 |
| JP | 2010-050764 A | 3/2010 |
| JP | 2010-263362 A | 11/2010 |
| JP | 2010-263363 A | 11/2010 |
| JP | 2011-228863 A | 11/2011 |
| JP | 2013-090309 A | 5/2013 |
| JP | 2013-232872 A | 11/2013 |
| WO | WO 1994/019914 A1 | 9/1994 |
| WO | WO 2003/001841 A2 | 1/2003 |
| WO | WO 2004/030407 A2 | 4/2004 |
| WO | WO 2005/104614 A1 | 11/2005 |
| WO | WO 2005/104617 A1 | 11/2005 |
| WO | WO 2006/069056 A2 | 6/2006 |
| WO | WO 2006/093876 A2 | 9/2006 |
| WO | WO 2007/034781 A1 | 3/2007 |
| WO | WO 2011/123265 A1 | 10/2011 |
| WO | WO 2011/123266 A1 | 10/2011 |
| WO | WO 2017/046716 A1 | 3/2017 |
| WO | WO 2018/167538 A1 | 9/2018 |

OTHER PUBLICATIONS

Extended European Search Report for European Application No. 16845811.5 dated Apr. 5, 2019.

Fern Acoustics [online] [retrieved Jan. 29, 2018]. Retrieved from the Internet: <URL: http://www.fertinacoustics.com/en_tecnology.html>. 3 pages.

International Search Report and Written Opinion for Application No. PCT/IB32016/055472 dated Jan. 3, 2017.

Georg Neumann GmbH, The Dummy Head-Theory and Practice, Brochure, Berlin, 28 pages (undated).

Hammershoi, D. et al., Determination of Noise Emission From Sound Sources Close to the Ears, Acta Acustica, vol. 94, No. 1 (Jan. 2008) 114-129.

Olive, S. E. et al., Factors That Influence Listeners' Preferred Base and Treble Balance in Headphones, AES Convention Paper 9382 Presented at the 139th Convention (Oct.-Nov. 2015) 12 pages.

International Search Report and Written Opinion for Application No. PCT/IB2017/051519 dated Jun. 21, 2017, 20 pages.

* cited by examiner

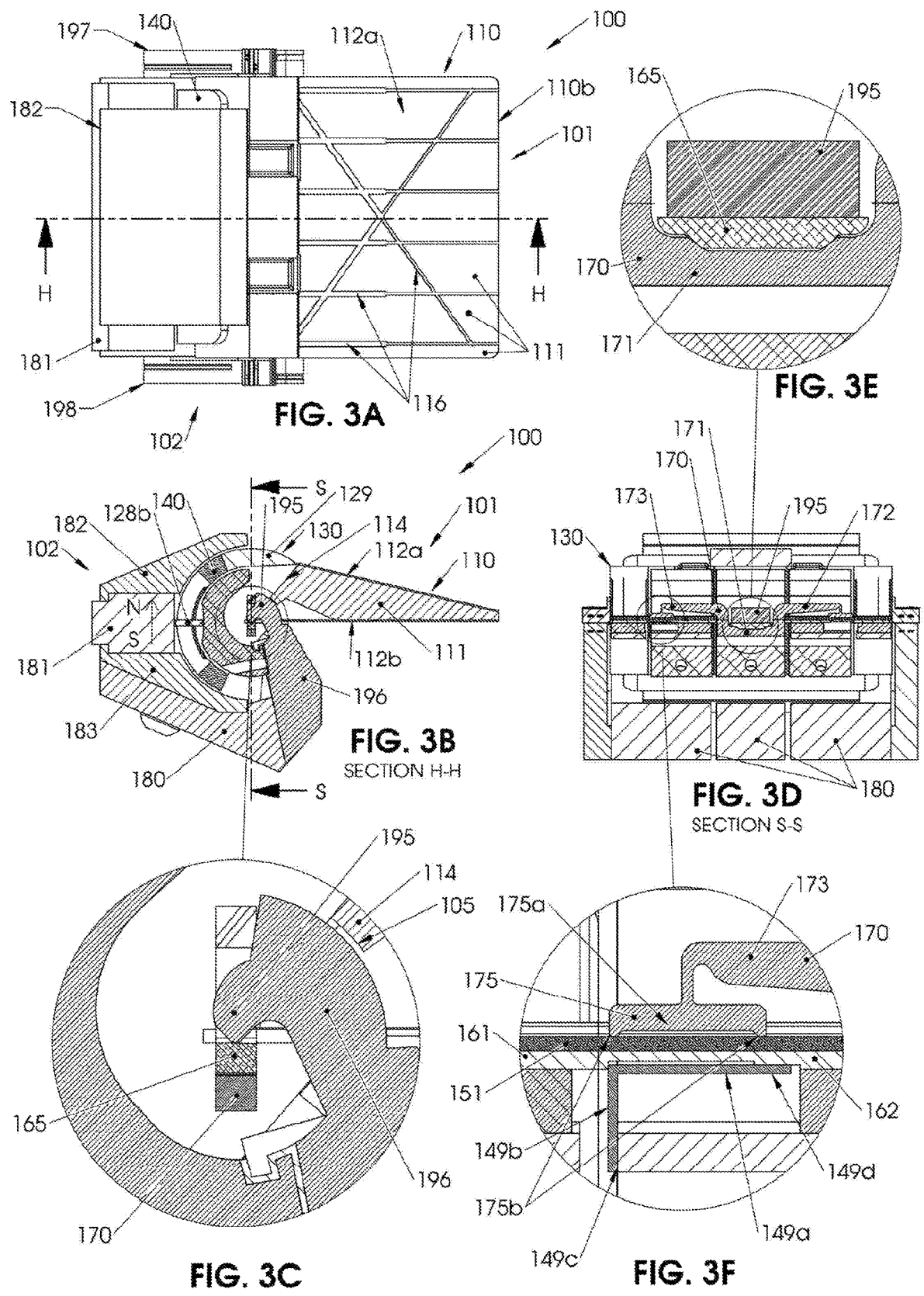

SECTION AV-AV

SECTION L-L

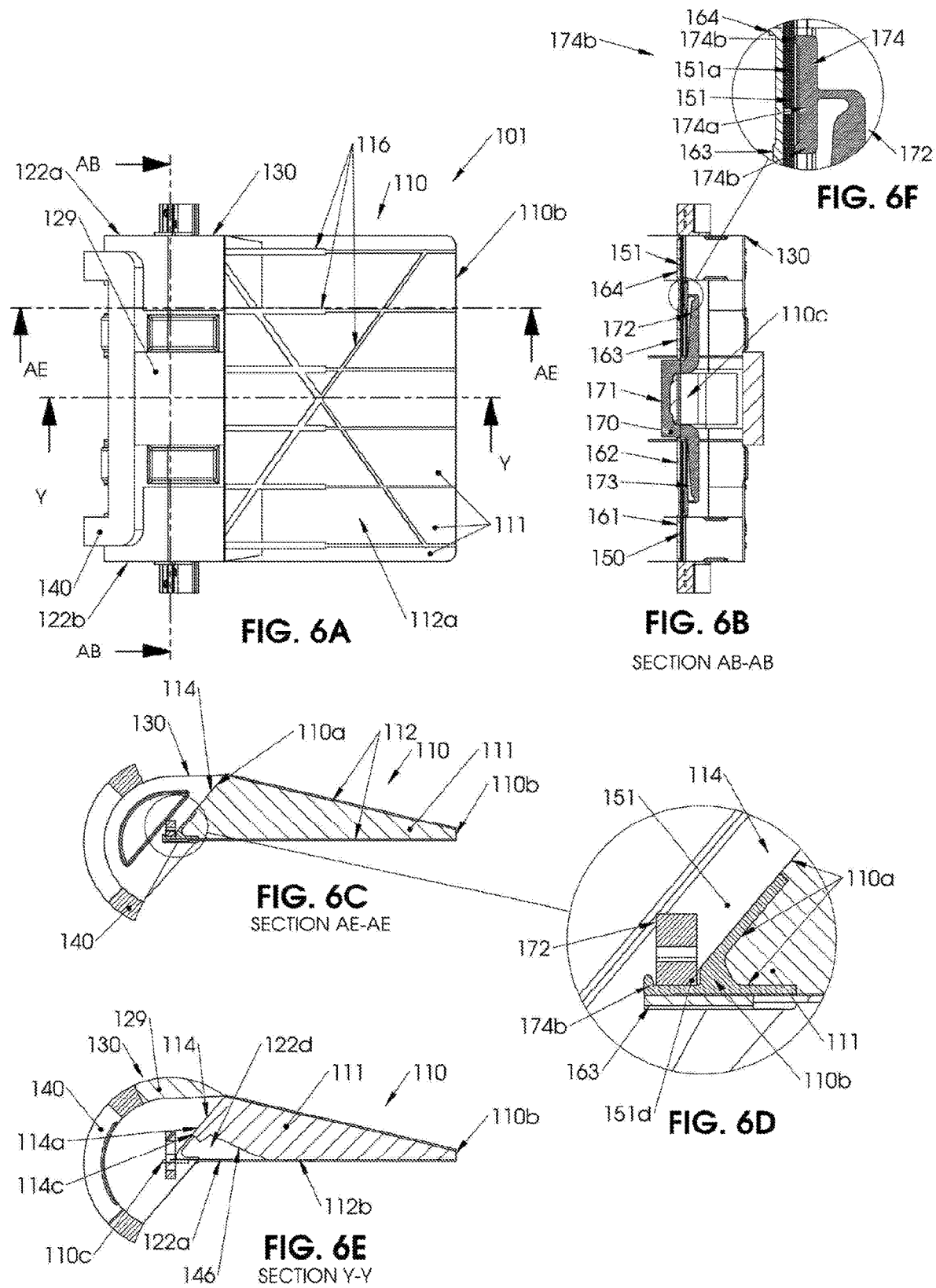

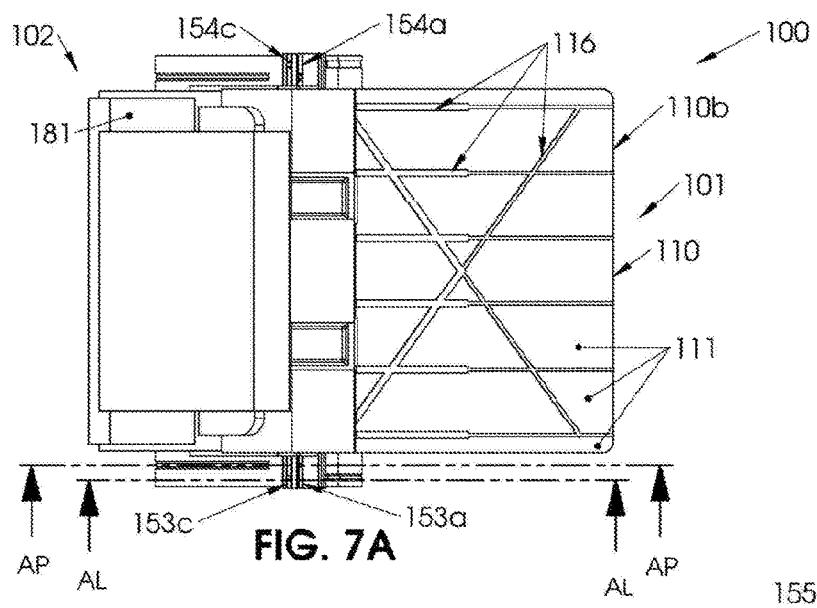
FIG. 7A
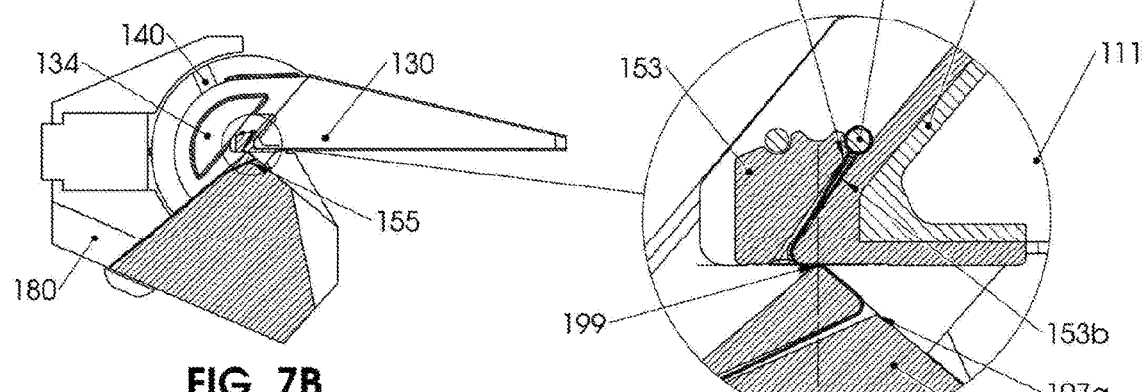
FIG. 7B
SECTION AP-AP
FIG. 7C
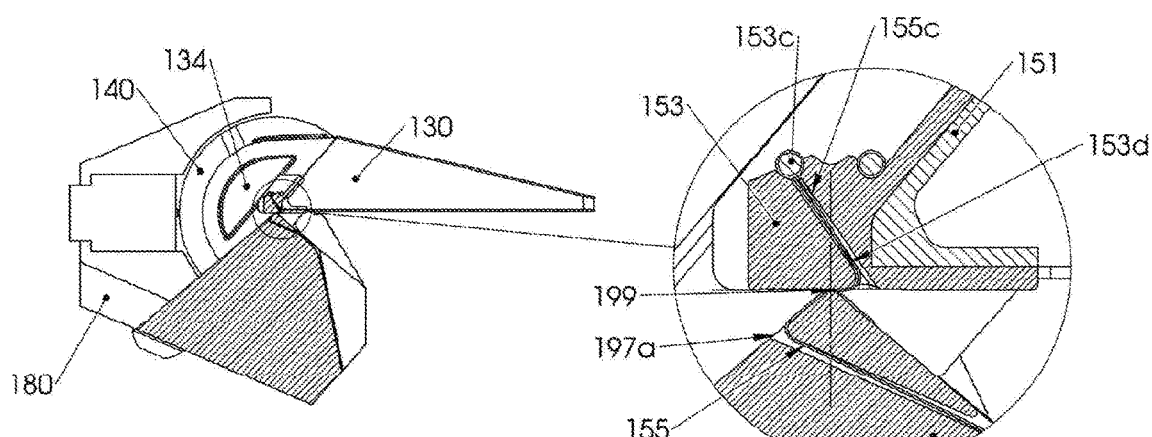
FIG. 7D
SECTION AL-AL
FIG. 7E
DETAIL AO

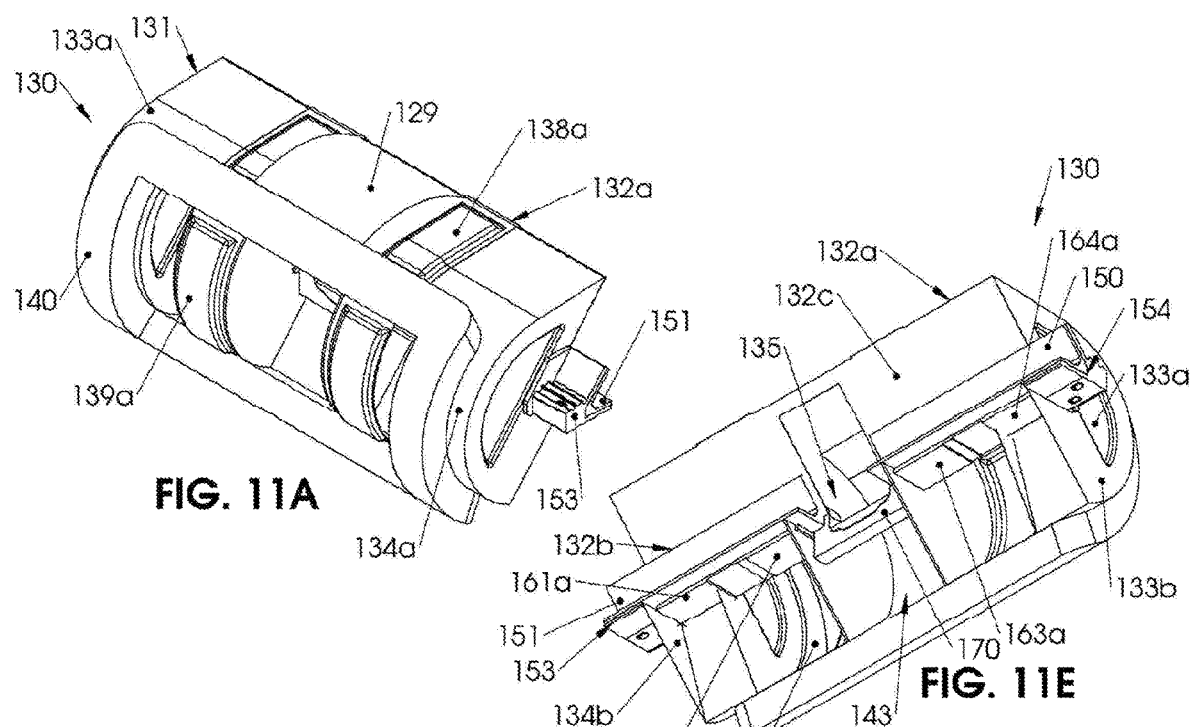
FIG. 11A
FIG. 11E
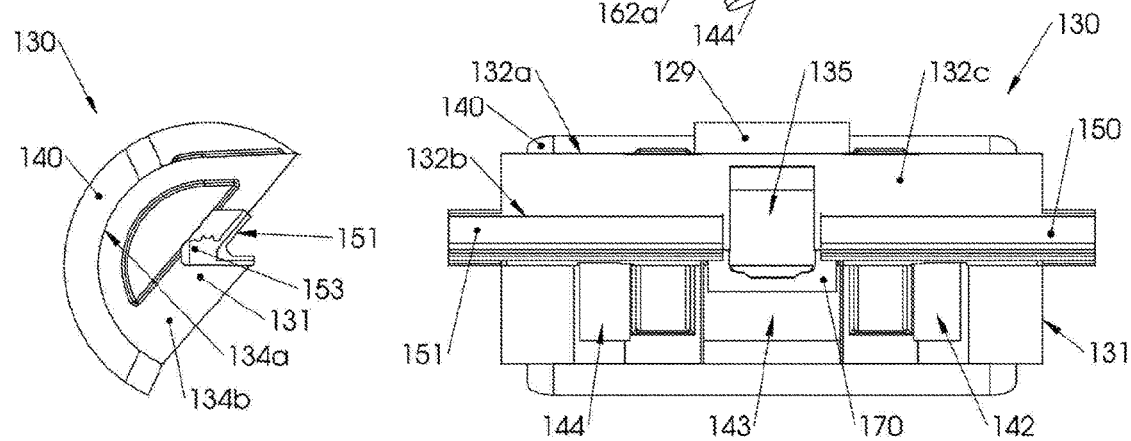
FIG. 11B
FIG. 11C
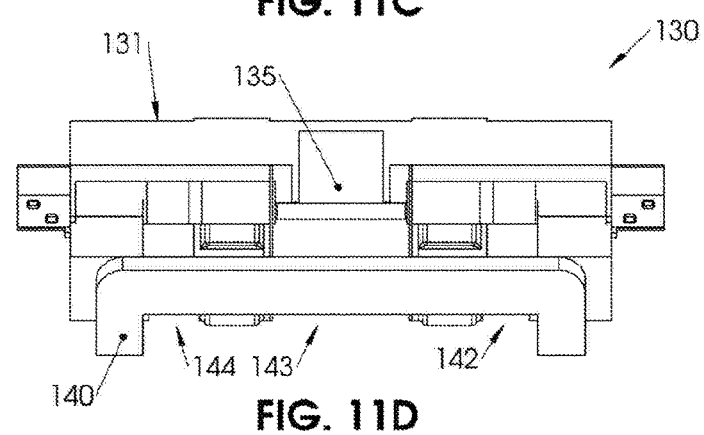
FIG. 11D

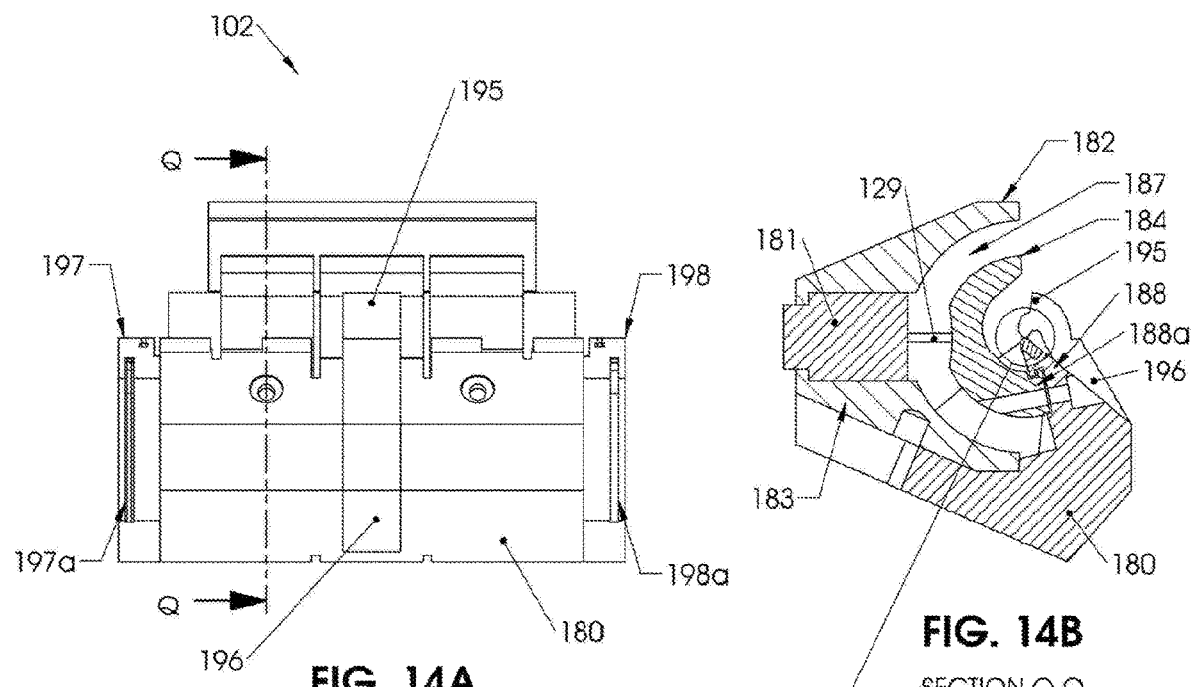
FIG. 14A
FIG. 14B
SECTION Q-Q
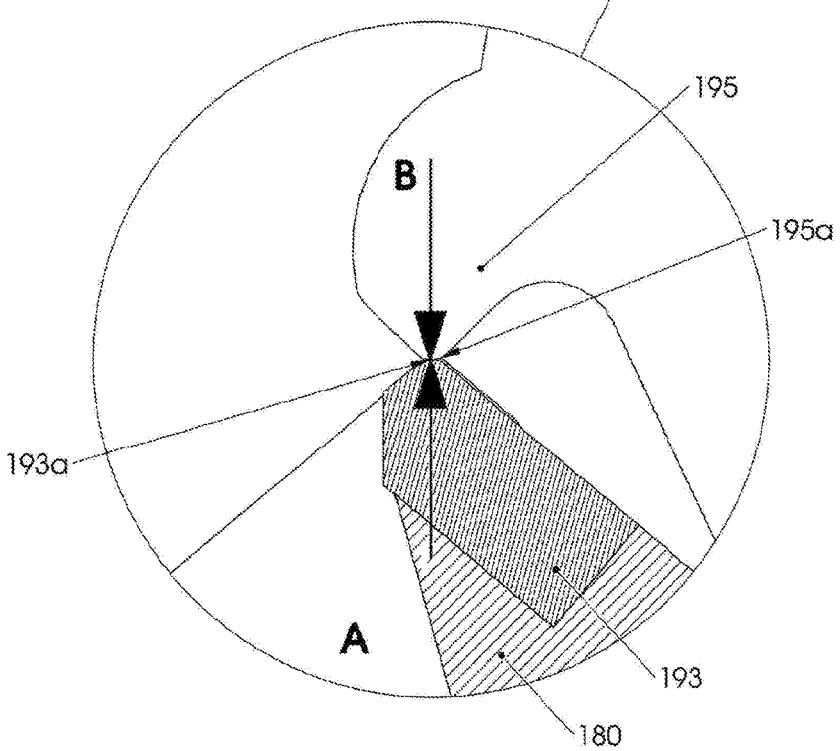
FIG. 14C

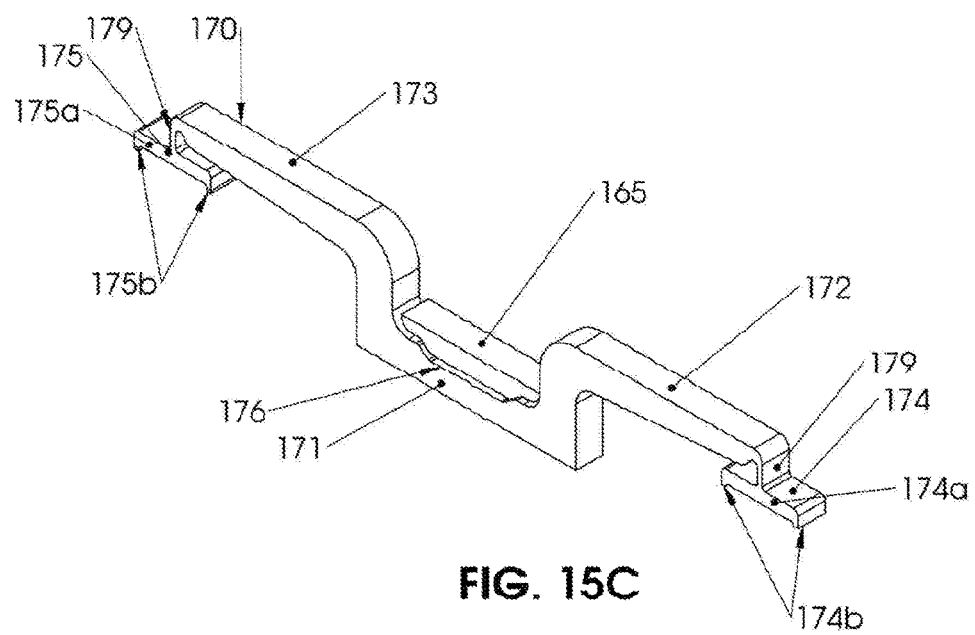
FIG. 15C
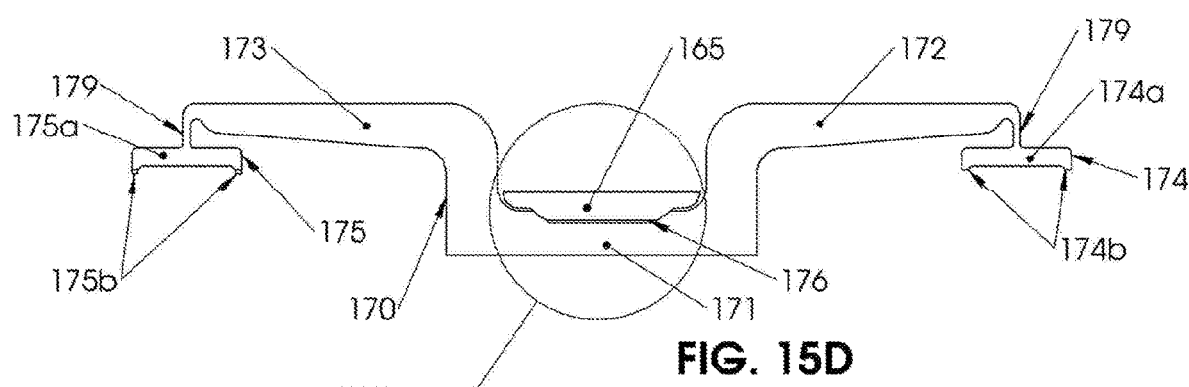
FIG. 15D
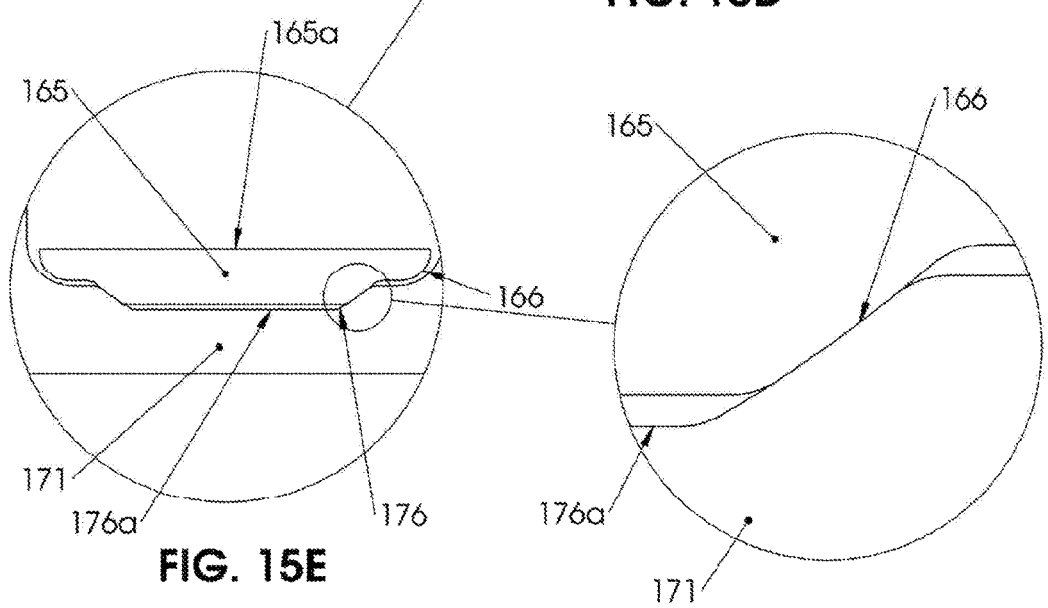
FIG. 15E
FIG. 15F

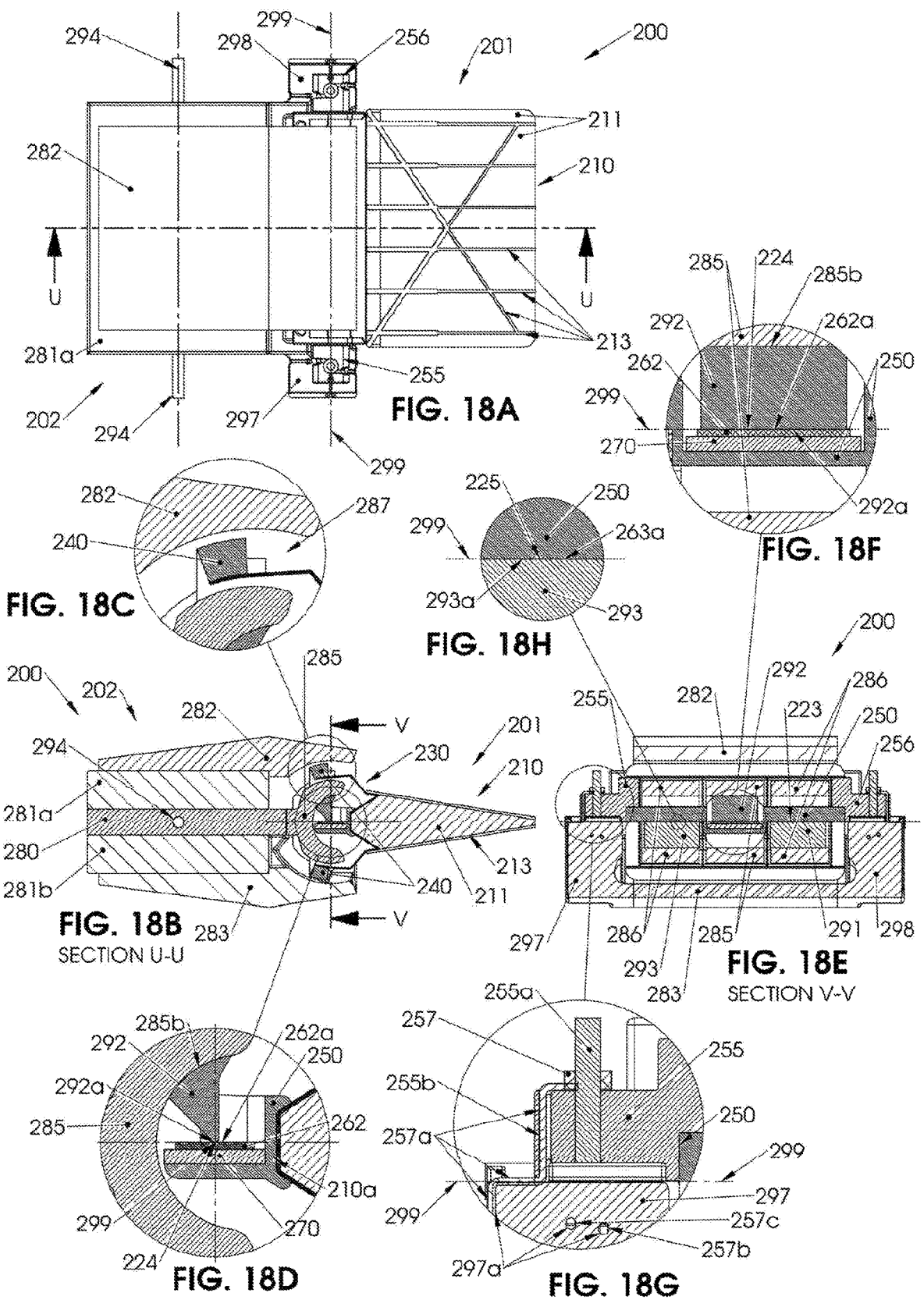

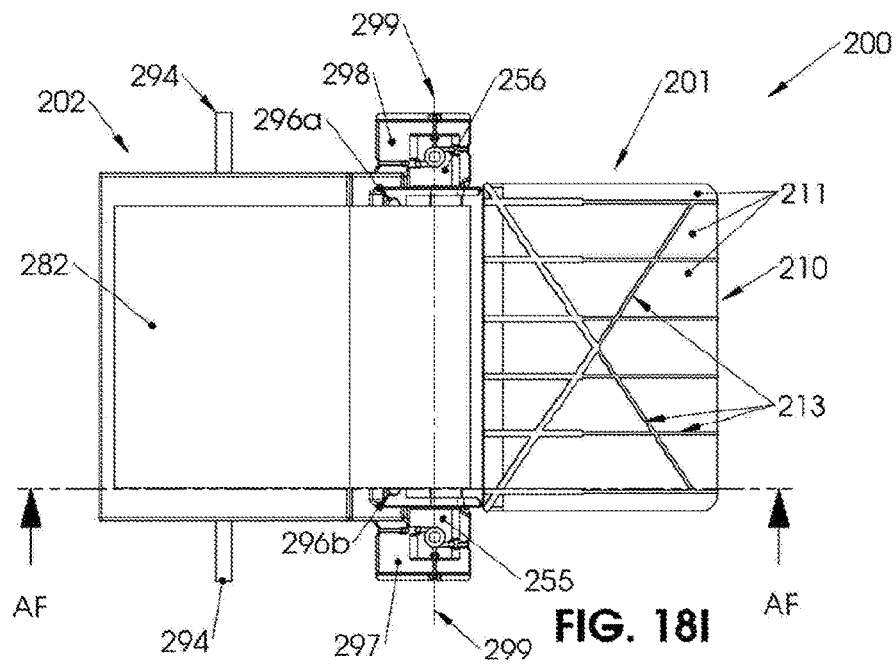
FIG. 18I
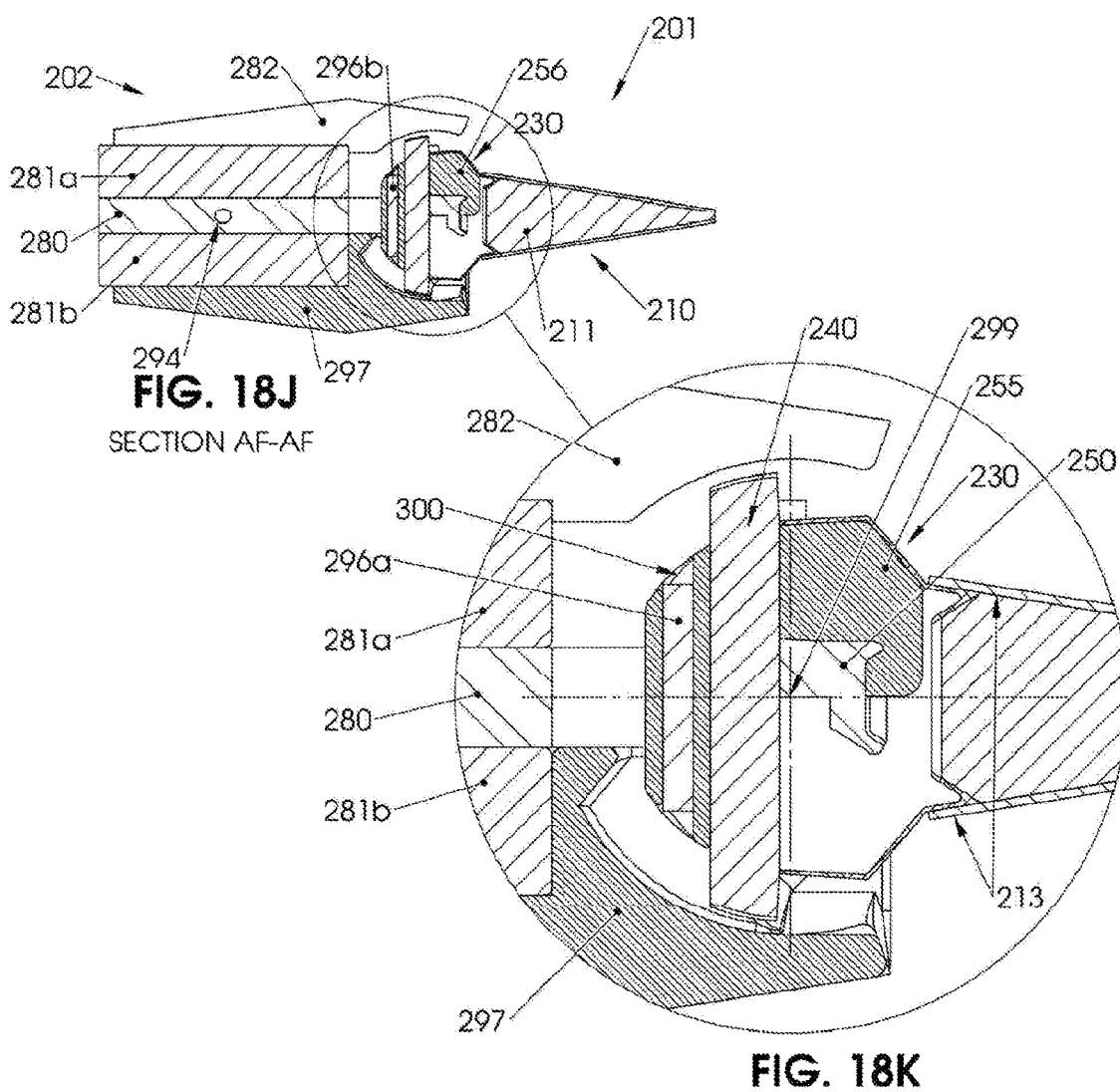
FIG. 18J
SECTION AF-AF
FIG. 18K

SECTION AS-AS

SECTION AP-AP

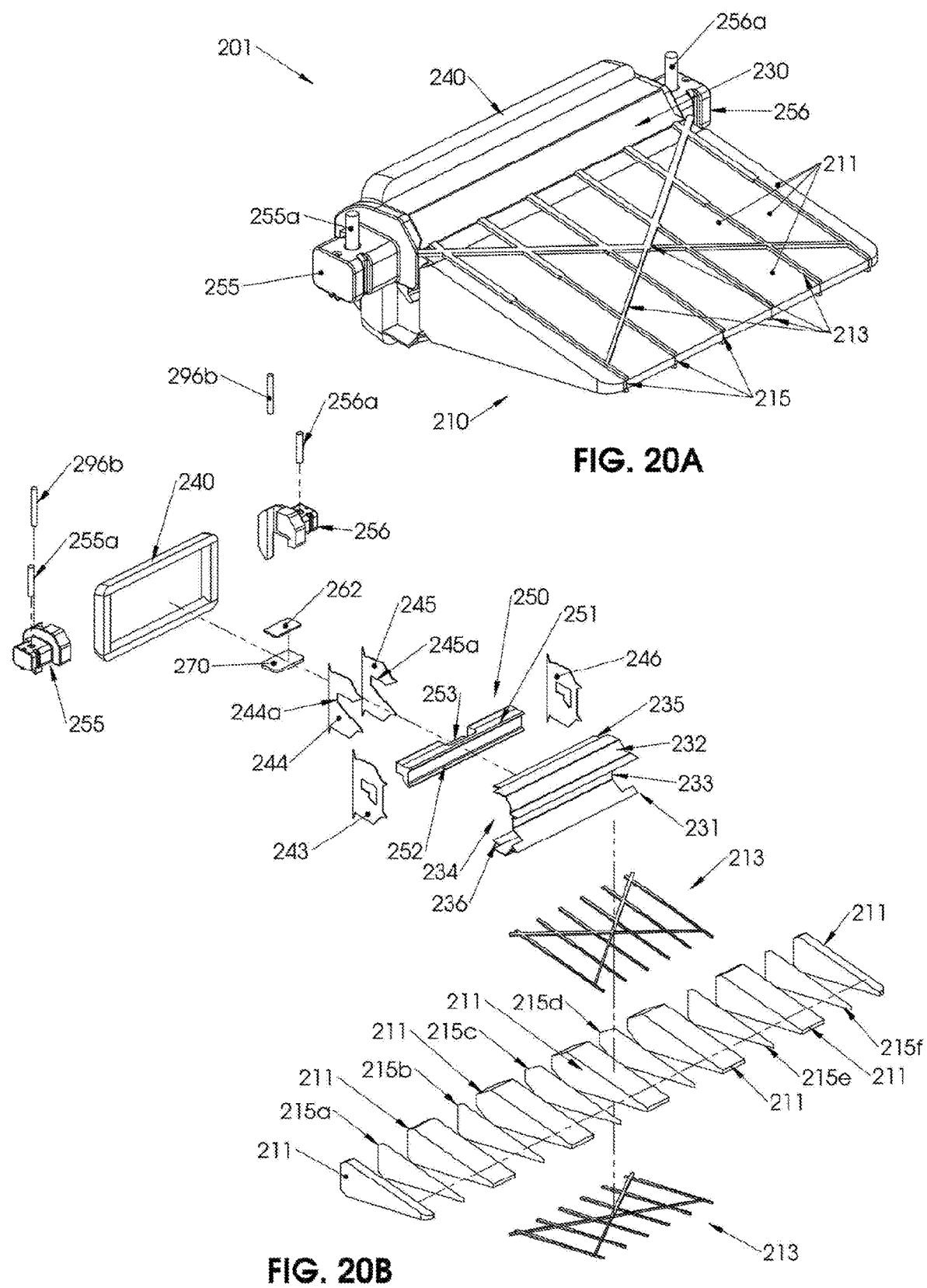

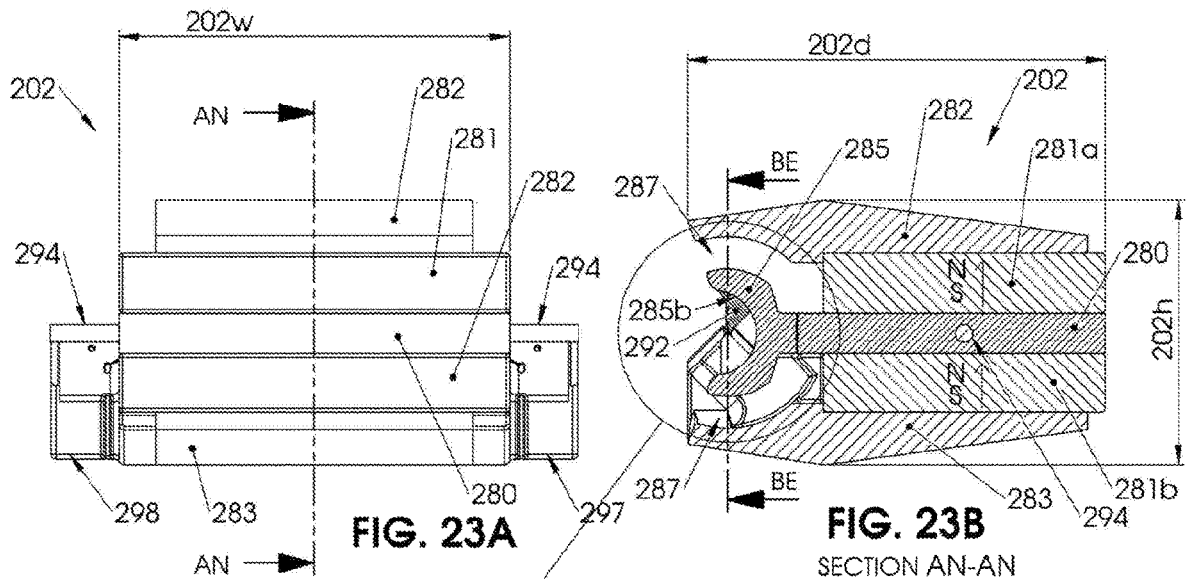
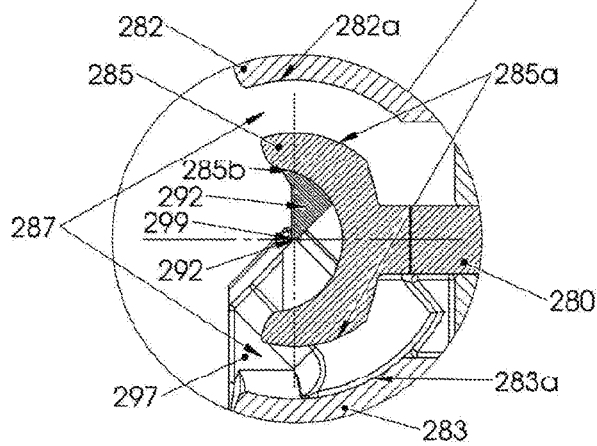
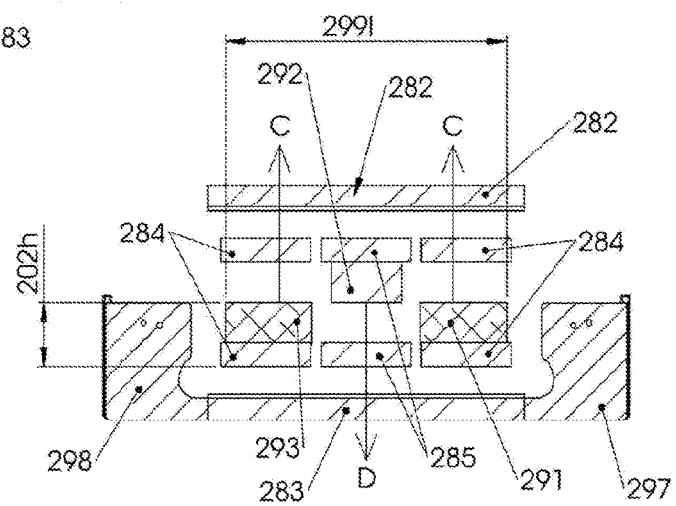

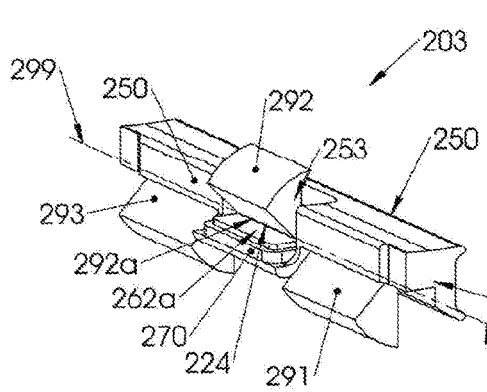
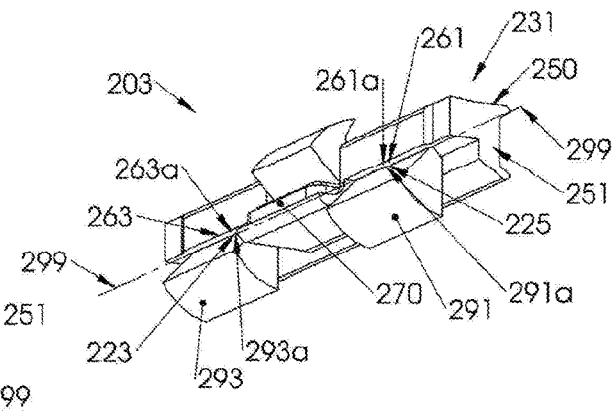
FIG. 24A  FIG. 24B
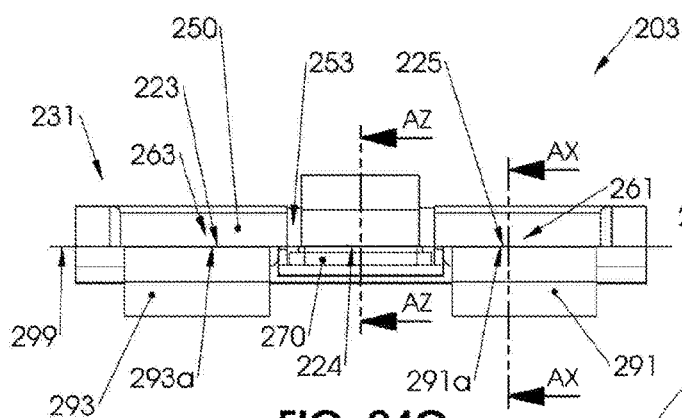
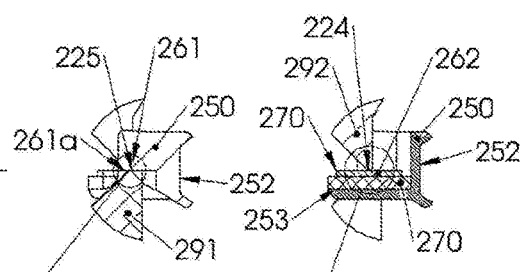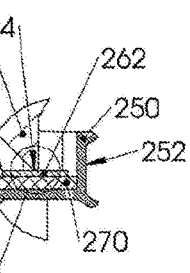
FIG. 24C  FIG. 24D SECTION AX-AX  FIG. 24F SECTION AZ-AZ
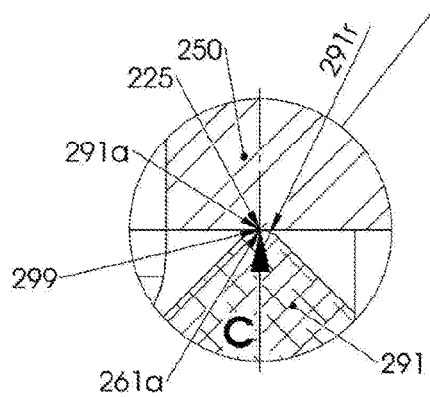
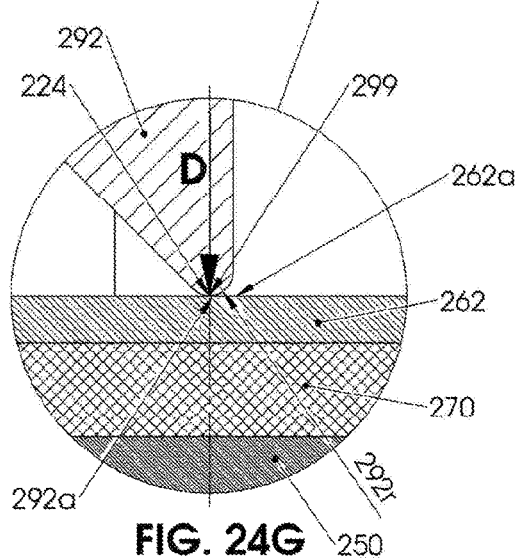
FIG. 24E  FIG. 24G

DETAIL AA

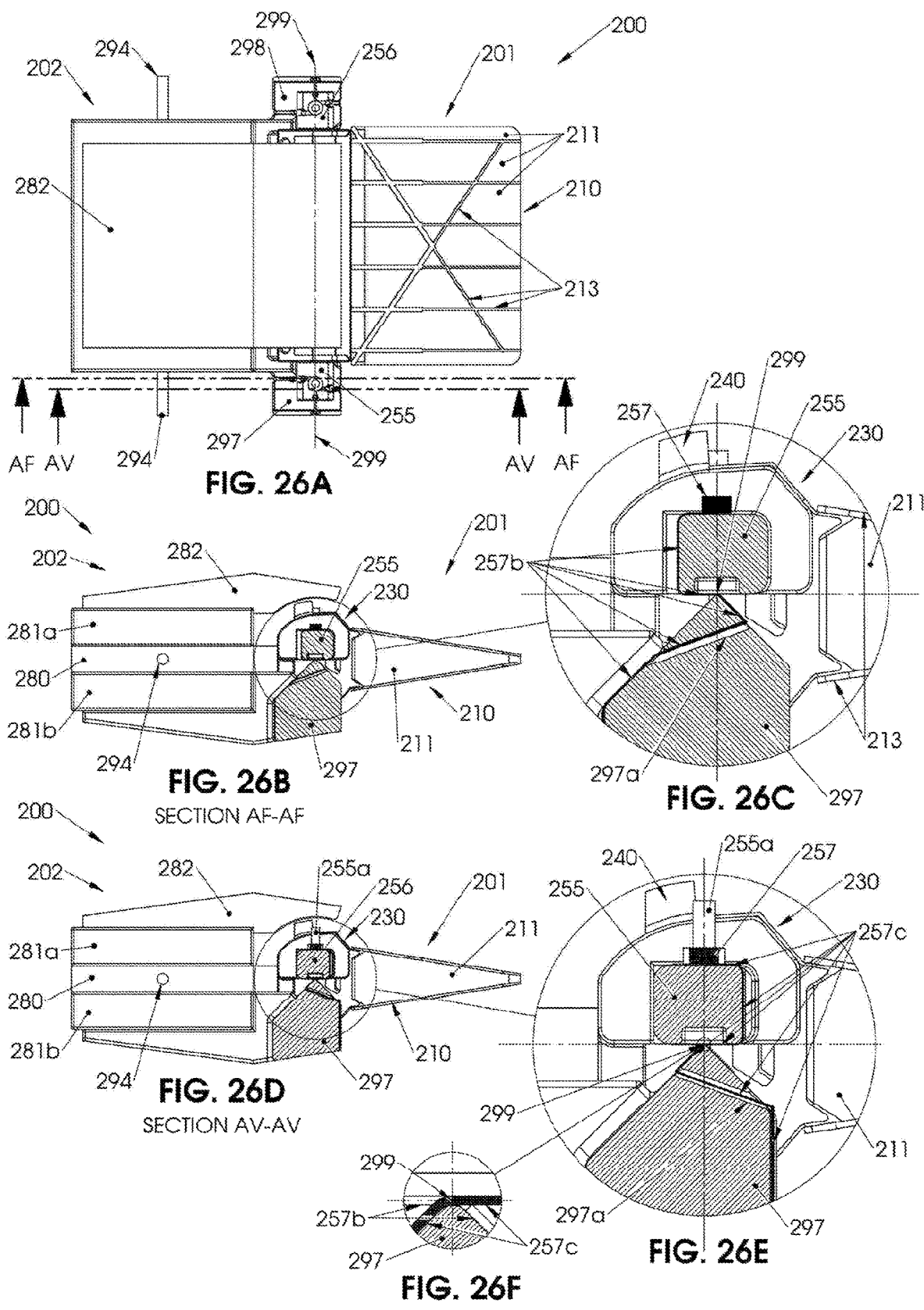

SECTION U-U

SECTION V-V

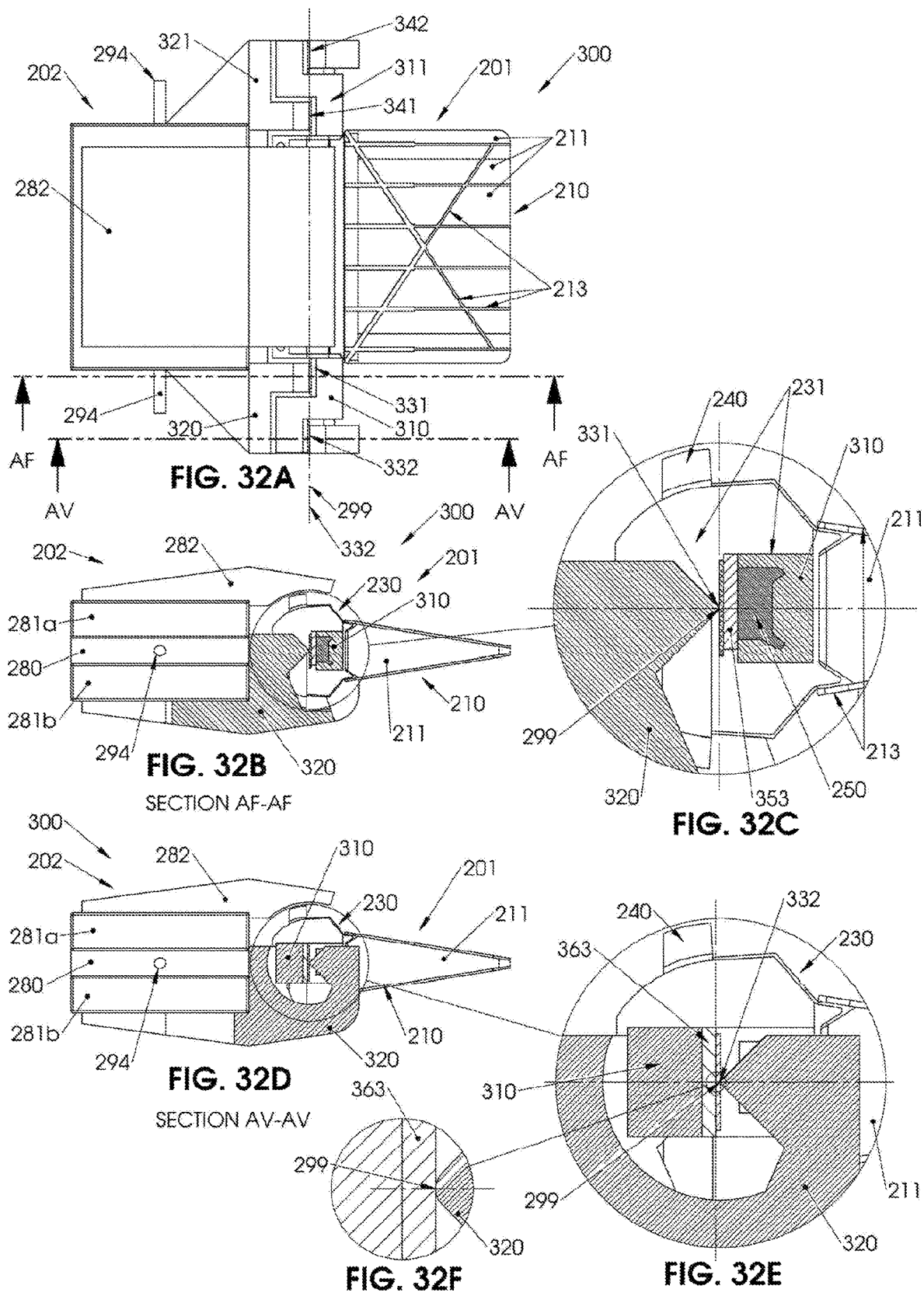

SECTION AF-AF

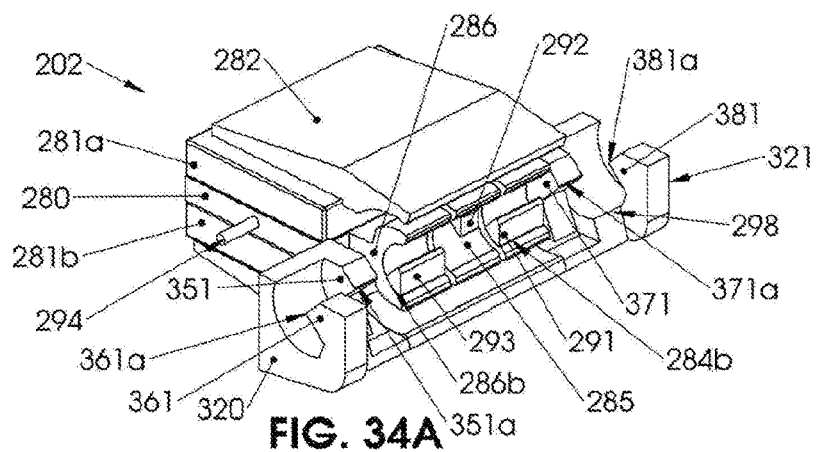
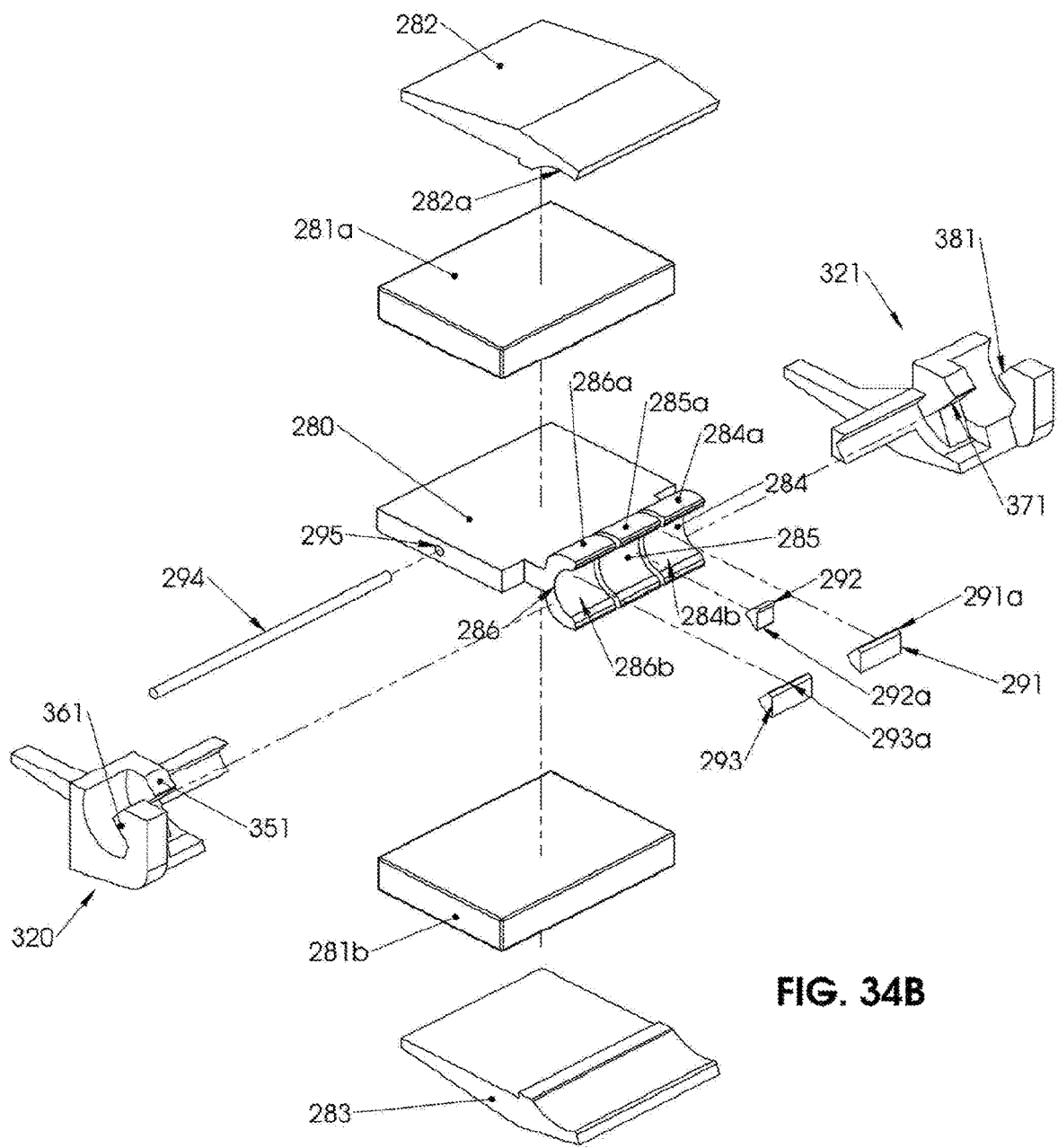
FIG. 34A
FIG. 34B

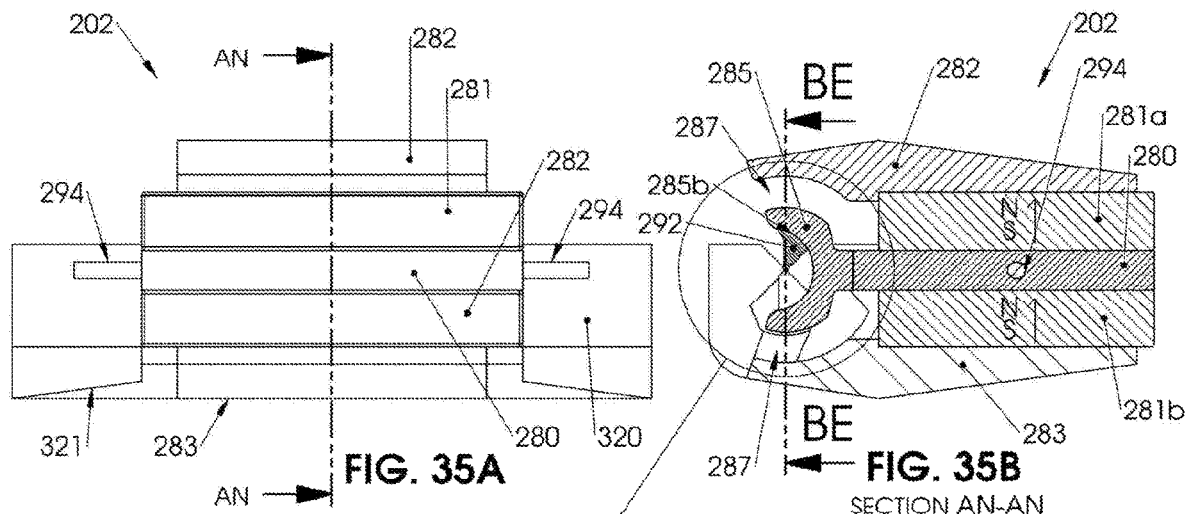
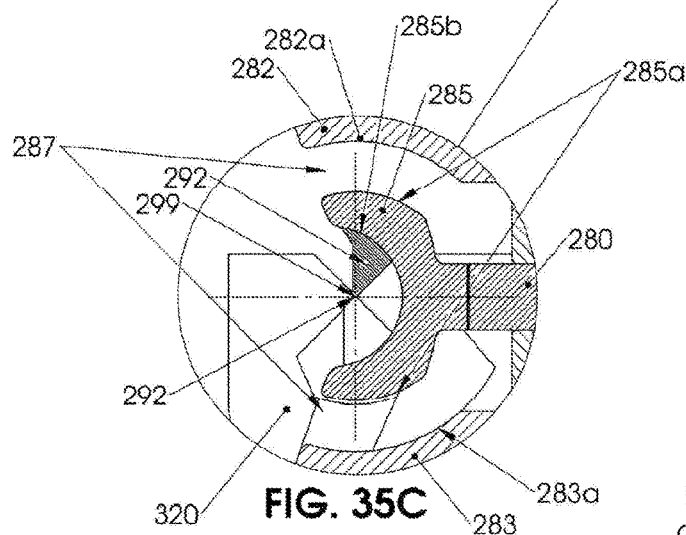
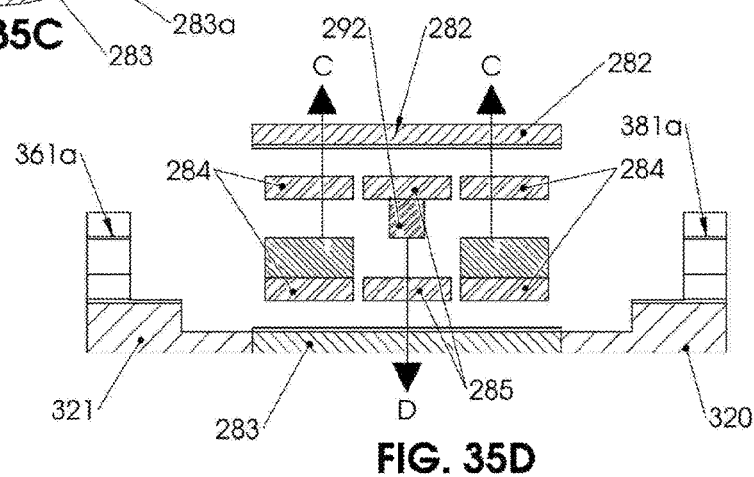

SECTION AS-AS

SECTION AP-AP

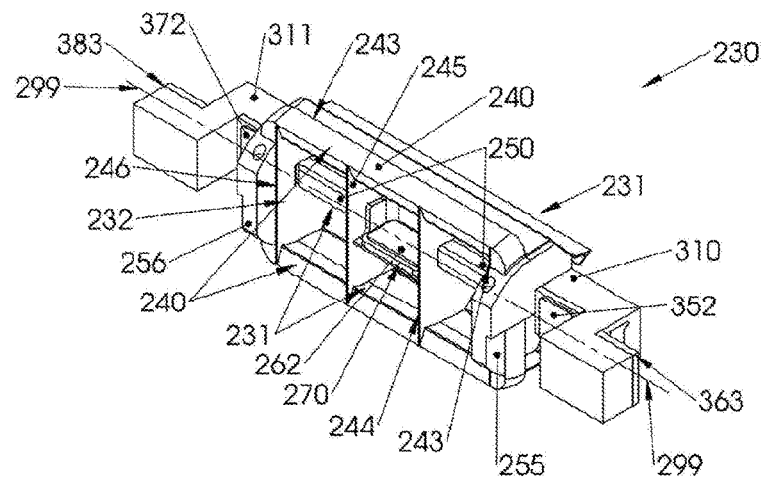
FIG. 38A
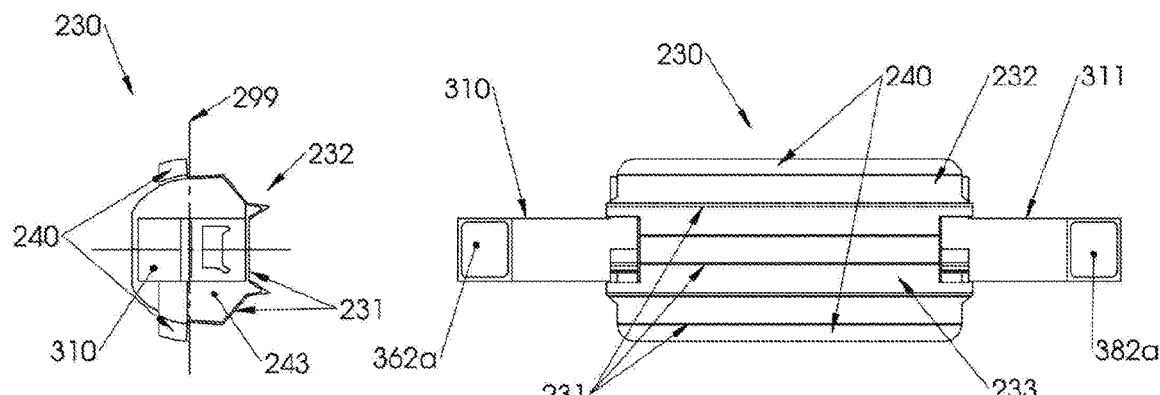
FIG. 38B
FIG. 38C
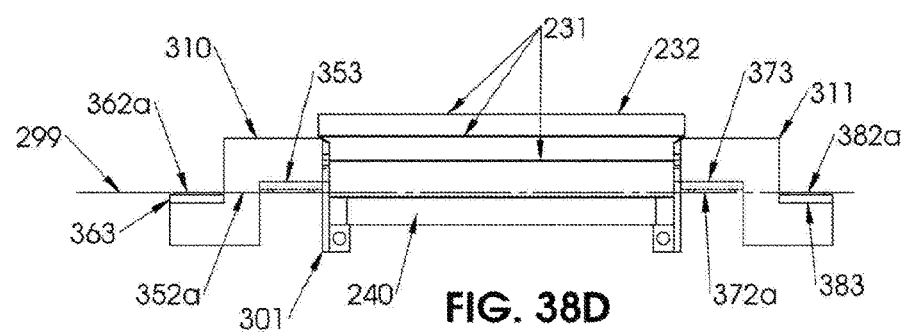
FIG. 38D

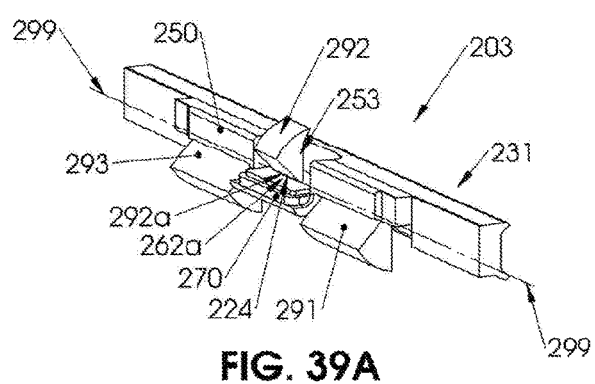
FIG. 39A
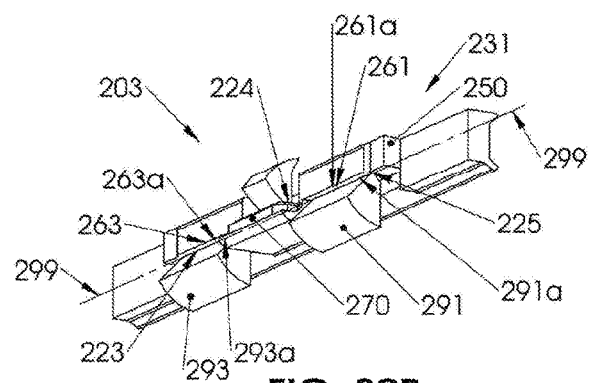
FIG. 39B
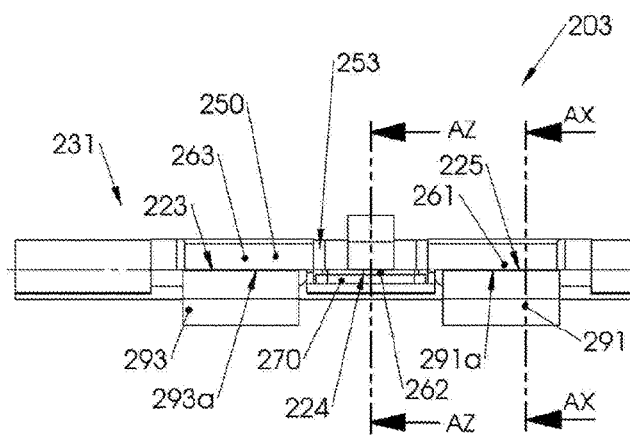
FIG. 39C
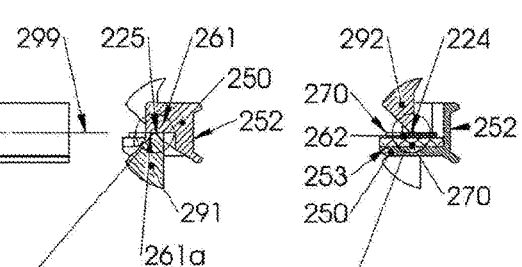
FIG. 39D
SECTION AX-AX
FIG. 39F
SECTION AZ-AZ
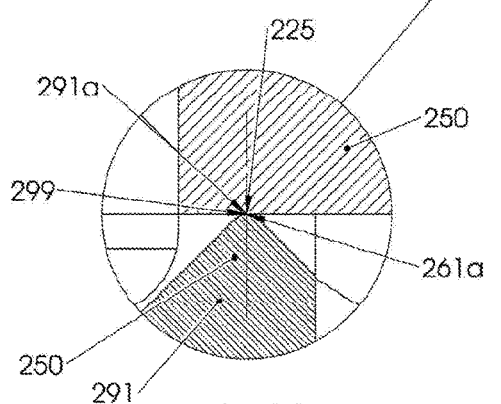
FIG. 39E
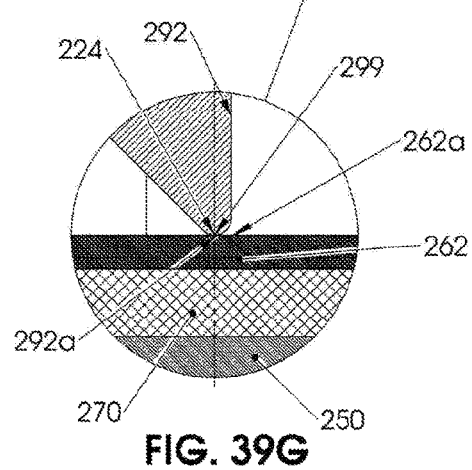
FIG. 39G

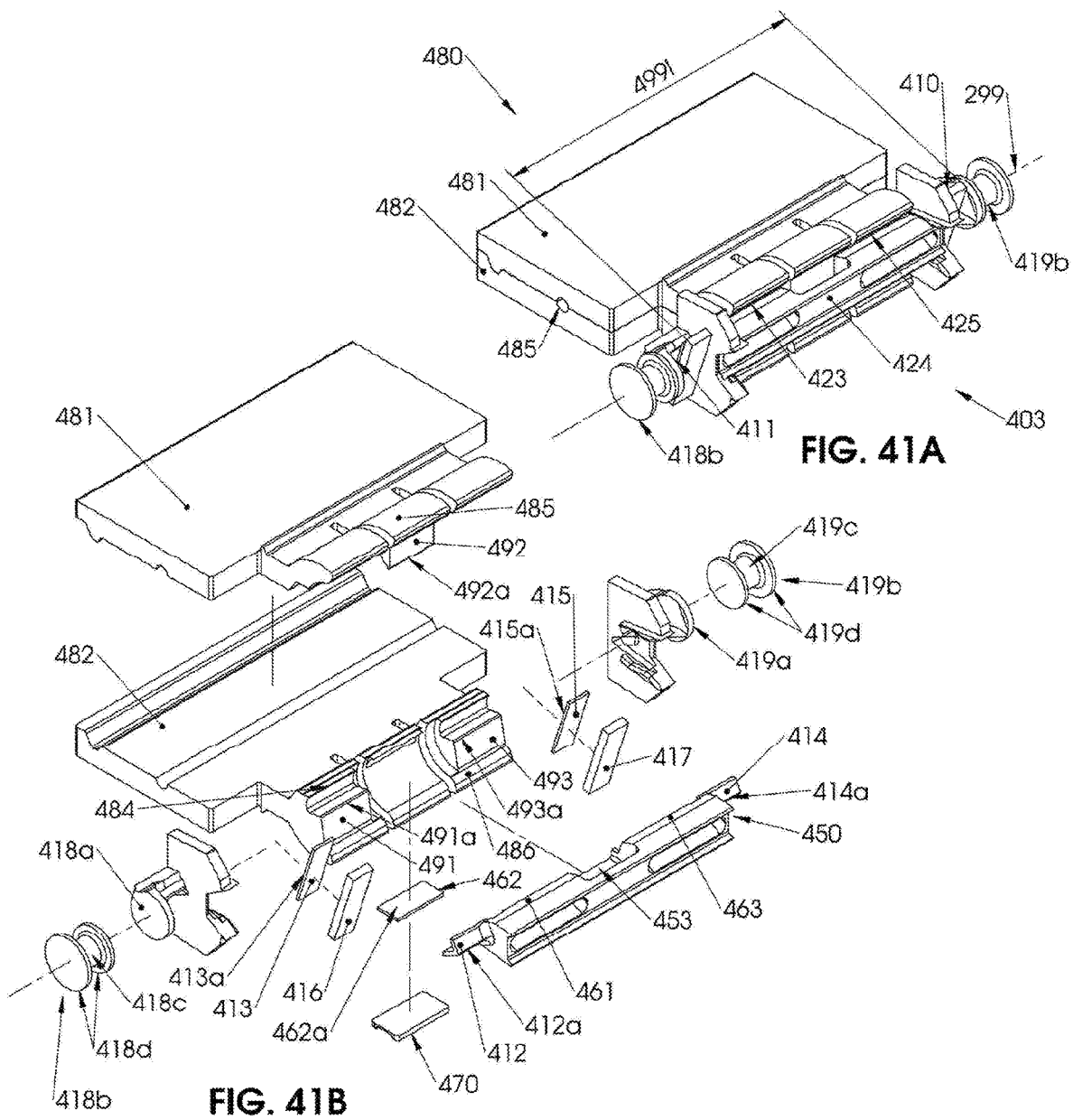
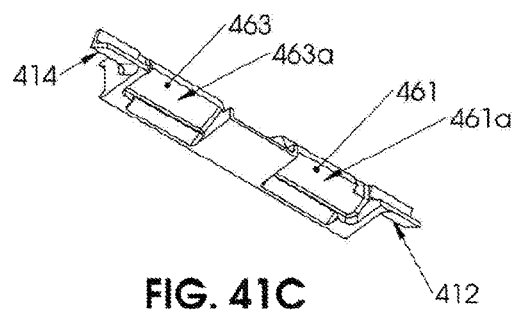
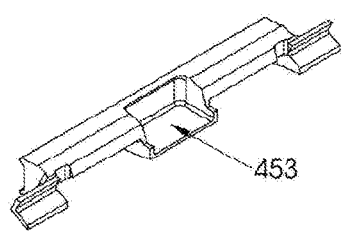

SECTION B-B

SECTION C-C

SECTION D-D

SECTION I-I

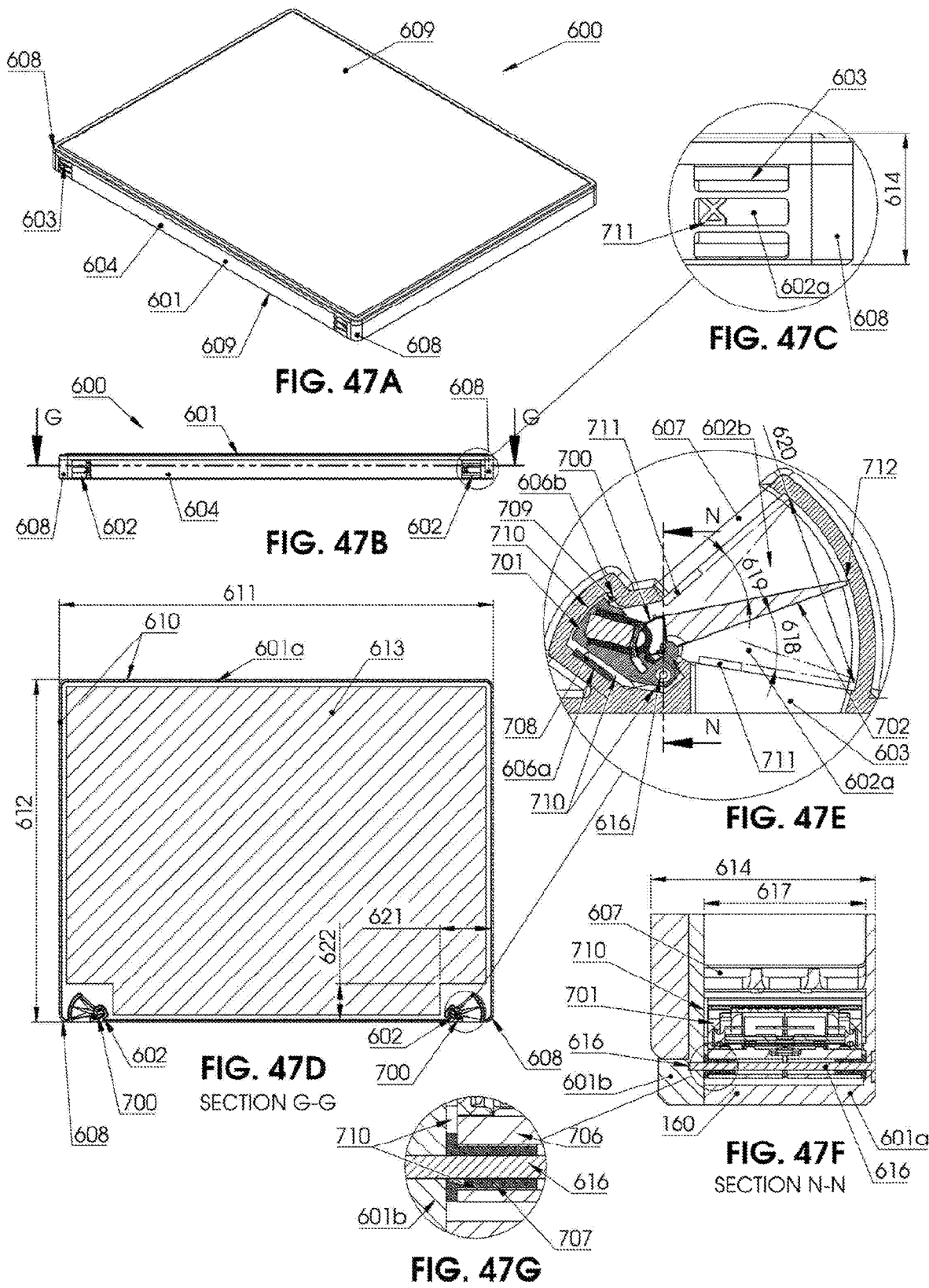

SECTION Z-Z

SLIM ELECTRONIC DEVICES AND AUDIO TRANSDUCERS INCORPORATED THEREIN

CROSS-REFERENCE TO RELATED APPLICATIONS

This application is a National Phase Entry of PCT Application No. PCT/IB2018/051881, filed on Mar. 21, 2018, which claims priority to New Zealand Patent Application Nos. NZ737401, filed on Nov. 16, 2017, NZ733867, filed on Jul. 18, 2017, NZ733866, filed on Jul. 17, 2017, NZ730631, filed on Mar. 31, 2017, NZ730465, filed on Mar. 23, 2017, and NZ730410, filed on Mar. 22, 2017, the contents of each of which are hereby incorporated by reference in their entirety.

FIELD OF THE INVENTION

The present invention relates to systems, methods and devices relating to audio transducer technologies, to electronic devices incorporating the same, and to hinge systems for use in audio devices and in other applications.

BACKGROUND TO THE INVENTION

Loudspeaker drivers generate sound by oscillating a diaphragm using an actuating mechanism that may be electromagnetic, electrostatic, piezoelectric or any other suitable moveable assembly known in the art. The driver is generally contained within a housing. In conventional drivers, the diaphragm is a flexible membrane component coupled to a rigid housing. Loudspeaker drivers therefore form resonant systems where the diaphragm is susceptible to unwanted mechanical resonance (also known as diaphragm breakup) at certain frequencies during operation. This affects the performance of the driver.

In a conventional driver, the flexible diaphragm is typically coupled to a rigid housing via suspension and/or mounting systems. This forms a resonant system, where the diaphragm becomes susceptible to unwanted resonances over the driver's frequency range of operation. Other parts of the driver including the diaphragm suspension, mounting systems and even the housing surrounding these components can suffer from mechanical resonances. This can detrimentally affect the sound quality of the driver. Prior art driver systems have attempted to minimize the effects of mechanical resonance by employing one or more damping techniques within the driver system. Such techniques comprise for example impedance matching of the diaphragm to a rubber diaphragm surround and/or modifying diaphragm design, including diaphragm shape, material and/or construction.

In addition, the diaphragm suspension system of a conventional loudspeaker consisting of both a standard flexible rubber type surround and a flexible spider suspension does not only introduce resonance, but also increases the diaphragm fundamental resonance frequency and limits diaphragm excursion. The soft materials used and the range of motion that they are used in is typically non-linear, with respect to Hooke's law, leading to inaccuracies in transducing an audio signal.

Many microphones have the same basic construction as conventional loudspeakers. They operate in reverse, transducing sound waves into an electrical signal. To do this, microphones use sound pressure in the air to move a diaphragm and convert that motion into an electrical audio signal. Microphones therefore suffer from some equivalent design issues to loudspeakers which can detrimentally affect the transducing quality of the microphone.

Passive radiators also have the same basic construction as loudspeakers, except they do not have a transducing mechanism. Passive radiators still suffer from some equivalent design issues to loudspeakers which can also detrimentally affect operation.

Rotational-action loudspeakers operate by rotating a diaphragm to generate sound. Rotational-action loudspeakers have not been notable for providing clean performance in terms of energy storage as measured by a waterfall/CSD plot, nor have they been notable for providing the type of sound quality required for high-fidelity speakers, particularly in the mid-range and treble frequency bands.

Over many decades a tremendous amount of research has been conducted to determine ways of minimising the effect of diaphragm and diaphragm suspension breakup resonance modes in conventional cone and dome-diaphragm loudspeaker drivers. Comparatively little equivalent research appears to have been conducted into improvement and optimisation of breakup performance, diaphragm excursion and fundamental diaphragm resonance frequency in rotational action loudspeaker diaphragms and diaphragm suspensions.

As described in PCT/IB2016/055472, a critical component of rotational action loudspeakers is the hinge system. A well-designed hinge system has the effect of minimising resonance modes and also increasing diaphragm excursion. There is therefore always a need to improve on hinge designs for audio transducer applications. The benefits offered by such improvements however are not limited to audio transducer applications. Hinge systems designed for audio transducer applications may alternatively be used in other specialised or general purpose applications including, for example, other electronic devices, sensors, motors, instrumentation, metres, thermometer, clocks and the like. In each of these applications a well-designed hinge may have the effect of improving the precision or performance of the device. As such, there is also a need to develop a hinge system that may be implemented in a variety of different applications.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

It is an object of the present invention to provide improvements in or relating to audio transducers or parts thereof which work in some way towards addressing some of the design issues mentioned above, or to provide improvement in or relating to hinge systems for various applications, or to at least provide the public with a useful choice.

SUMMARY OF THE INVENTION

In one aspect the invention my broadly be said to consist of an audio transducer comprising:
    a diaphragm;
    a transducer base structure; and
    a hinge system configured to rotatably couple the diaphragm to the transducer base structure and comprising
        a hinge assembly having at least four hinge joints, each hinge joint having a hinge element with a contact surface and an associated contact member with a contact surface;

wherein the contact surface of the hinge element of each hinge joint moves relative to the contact surface of the associated contact member during operation to rotate the supported diaphragm;

the contact surface of each contact member is convexly curved, in at least a cross-sectional profile along a plane perpendicular to the axis of rotation; and the at least three hinge joints comprises a first set of a plurality of hinge joints with substantially longitudinally aligned contact member contact surfaces facing a first common direction, a second set or one or more hinge joints with contact member contact surface(s) facing a second direction that is different to the first direction.

In another aspect the invention may broadly be said to consist of an audio transducer comprising:

a diaphragm;

a transducer base structure; and a hinge system configured to operatively support the diaphragm in use, and comprising a hinge assembly having at least three hinge joints with a substantially common axis of rotation, each hinge joint having a hinge element with a contact surface and an associated contact member with a contact surface that abuts the contact surface of the hinge element at a region of contact;

wherein the contact surface of the hinge element of each hinge joint moves relative to the contact surface of the associated contact member during operation to rotatably oscillate about the axis of rotation;

the contact surface of each contact member is convexly curved about an axis substantially parallel to the axis of rotation; and the at least three hinge joints comprises a first set of one or more hinge joint(s) with contact member contact surface(s) having normal vectors at their respective regions of contact extending in a first, substantially common direction, and a second set of one or more hinge joint(s) with contact member contact surface(s) having normal vectors extending in a second, substantially common direction that is different to the first direction.

In another aspect the invention may broadly be said to consist of an audio transducer comprising:

a diaphragm;

a transducer base structure; and a hinge system configured to operatively support the diaphragm in use and comprising a hinge assembly having at least three hinge joints having a substantially common axis of rotation, each hinge joint having a hinge element with a contact surface and an associated contact member with a contact surface that abuts the contact surface of the hinge element at a region of contact;

wherein the contact surface of the hinge element of each hinge joint moves relative to the contact surface of the associated contact member to rotatably oscillate about the axis of rotation during operation;

the contact surface of each contact member is convexly curved about an axis substantially parallel to the axis of rotation;

the at least three hinge joints comprises multiple sets of one or more hinge joint(s), each set of hinge joint(s) having one or more contact member contact surface(s) with normal vector(s) at respective region(s) of contact extending in a substantially common direction, and the common direction of the contact member contact surface(s) of at least one set of hinge joint(s) is different to a common direction of the contact member contact surface(s) of at least one other set of hinge joint(s).

Preferably the hinge system rotatably couples the diaphragm to the transducer base structure.

Preferably the transducer base structure is relatively heavier and/or firmly fixed, in situ, relative to the diaphragm, such that during normal operation the diaphragm rotatably oscillates against a relatively stable transducer base structure.

Preferably the transducer base structure comprises of a squat geometry relative to the diaphragm.

Preferably the transducer base structure is substantially thickset.

Preferably the apparatus further comprises a coupling or couplings for mounting the apparatus to another body, structure or device, and wherein the coupling or couplings are or on the transducer base structure.

In some embodiment the coupling or couplings comprise of a decoupling mounting system configured to flexibly mount the transducer base structure to the other body, structure or device to at least partially alleviating mechanical transmission of vibration between the diaphragm and the other body, structure or device.

Preferably the diaphragm is substantially rigid, in use. Preferably the transducer base structure is substantially rigid, in use.

Preferably the contact surface of the contact member of each hinge joint is substantially rigid. Preferably the contact member of each hinge joint is substantially rigid. Preferably the contact surface of the hinge element of each hinge joint is substantially rigid. Preferably the hinge element of each hinge joint is substantially rigid.

Preferably, for each hinge joint, the hinge element is coupled to either the diaphragm or the transducer base structure, and the associated contact member is coupled to the other of the diaphragm or the transducer base structure.

Preferably, for at least one hinge joint, the contact member is coupled to the transducer base structure and the hinge element is coupled to the diaphragm. Preferably the contact member of each hinge joint is rigidly coupled to the diaphragm or to the transducer base structure. The contact member may be rigidly fixed or integrally formed therewith.

Preferably, for at least one hinge joint, the hinge element is flexibly coupled to the diaphragm or to the transducer base structure. Each flexibly coupled hinge element may be coupled via a resilient and flexible member, such as an elastomer or spring. Preferably a central hinge joint comprises a hinge element that is flexibly coupled to the diaphragm.

Preferably, for at least one hinge joint, the hinge element is rigidly coupled to the diaphragm or the transducer base structure. Each rigidly coupled hinge element may be rigidly fixed or integrally formed with the associated diaphragm or transducer base structure.

In some embodiments, one or more hinge joints comprise a hinge element with a contact surface that is substantially concavely curved about an axis that is substantially parallel to the axis of rotation.

In some embodiments, one or more hinge joints comprise a hinge element with a contact surface that is substantially convexly curved about an axis that is substantially parallel to the axis of rotation, and wherein a radius of curvature of the hinge element contact surface is larger than a radius of curvature of the associated contact member contact surface.

In some embodiments, one or more hinge joints comprise a hinge element with a contact surface that is substantially planar.

Preferably the hinge element of each hinge joint comprises a substantially planar contact surface.

Preferably at least two hinge joints each comprise a hinge element rigidly coupled to the diaphragm and an associated contact member rigidly coupled to the transducer base structure. Preferably at least one hinge joint comprises a hinge element flexibly coupled to the diaphragm and an associated contact member rigidly coupled to the transducer base structure. Preferably the hinge joint(s) with a flexibly coupled hinge element is(are) centrally positioned relative to the at least two hinge joints with rigidly coupled hinge elements. Preferably two hinge joints, each comprising a hinge element rigidly coupled to the diaphragm, are located on either side of the centrally positioned hinge joint.

Preferably, the direction of normal vectors of all hinge joints is such that reaction forces exerted by the transducer base structure at the respective regions of contact, due to forces exerted by the biasing mechanism, are balanced.

Preferably the multiple sets of hinge joints comprise:
a first set of one or more hinge joint(s) with contact member contact surface(s) having normal vectors at their respective regions of contact extending in a first, substantially common direction, and
a second set of one or more hinge joint(s) with contact member contact surface(s) having normal vectors extending in a second, substantially common direction that is different to the first direction.

In some embodiments a relative angle between the first direction and the second direction is between approximately 135 degrees and 225 degrees.

In some embodiments the first direction substantially opposes the second direction such that the angle between the first direction and the second direction is approximately 180 degrees.

Preferably the first set of hinge joints comprises one central hinge joint and the second set of hinge joints comprises at least one outer hinge joint on either side of the central hinge joint.

Preferably for each hinge joint in the first and second sets, the contact member is coupled to the transducer base structure and the hinge element is coupled to the diaphragm. Preferably the contact members are substantially rigidly coupled to the transducer base structure. Preferably the hinge element of the central hinge joint is flexibly coupled to the diaphragm via a resilient member. Preferably the hinge elements of the second set of hinge joints are substantially rigidly coupled to the diaphragm.

Preferably the central hinge joint comprises a contact member that is rigidly coupled to an exterior surface of the transducer base structure. Preferably the second set of hinge joints comprises contact members that are coupled to an exterior surface of the transducer base structure.

Preferably the apparatus further comprises a transducing mechanism including a conductive coil. Preferably the conductive coil is coupled to the diaphragm over a pair of spaced and substantially parallel supports, extending laterally from the diaphragm.

In some preferred embodiments:
the first set of hinge joint(s) comprises one or more hinge joints, each having a contact member contact surface with a normal vector facing in the first direction;
the second set of hinge joints comprises two or more hinge joints each having a contact member contact surface with a normal vector facing in the second direction; and
the hinge assembly further comprises a third set of two or more hinge joints, each having a contact member contact surface with a normal vector extending in a third direction Preferably the first direction, second direction and third direction are angled relative to one another.

Preferably a relative angle between the first direction and the second direction is between approximately 95 and approximately 175 degrees, more preferably between approximately 100 degrees and approximately 170 degrees or most preferably between approximately 100 degrees and 160 degrees. Preferably a relative angle between the first direction and the third direction is between approximately 200 degrees and 300 degrees, more preferably between approximately 220 degrees and 280 degrees, and most preferably between approximately 240 degrees and 270 degrees.

Preferably the first set of hinge joint(s) comprises one or more central hinge joints. Preferably the second set of hinge joint(s) comprises one or more pairs of inner hinge joints on either side of the central hinge joint. Preferably the third set of hinge joints comprises one or more pairs of outer hinge joint on either side of the first and second set of hinge joints.

Preferably the inner hinge joints are located between opposing outer sides of the diaphragm. Preferably the outer hinge joints are located external to the outer sides of the diaphragm.

Preferably the contact members of the first and second set of hinge joints are coupled to the transducer base structure and the hinge elements of the first and second set of hinge joints are coupled to the diaphragm. Preferably the contact members of the first and second set of hinge joints are substantially rigidly coupled to the transducer base structure. Preferably the hinge element of the central hinge joint is flexibly coupled to the diaphragm via a resilient member. Preferably the hinge elements of the second set of hinge joints are substantially rigidly coupled to the diaphragm.

Preferably the contact members of the third set of hinge joints are coupled to the diaphragm and the hinge elements of the third set of hinge joints are coupled to the transducer base structure. Preferably the contact members of the third set of hinge joints are substantially rigidly coupled to the diaphragm. Preferably the hinge elements of the third set of hinge joints are each flexibly coupled to the transducer base structure via a resilient member. The resilient member may be an elastomer, such as Silicone.

Preferably the first set of hinge joint(s) comprises one central hinge joint. Preferably the second set of hinge joint(s) comprises one pair of inner hinge joints on either side of the central hinge joint. Preferably the third set of hinge joints comprises one pair of outer hinge joints on either side of the first and second set of hinge joints.

In some embodiments the hinge assembly comprises a fourth set of hinge joints comprising of an outermost hinge joint on an external side of each hinge joint of the third set of hinge joints. Preferably each contact member of the hinge joints of the fourth set is rigidly coupled to the transducer base structure. Preferably each outermost hinge joint has a contact member contact surface with a normal vector that substantially opposes a normal vector of the corresponding outer hinge joint of the third hinge joint set.

Preferably the hinge comprises a resilient member coupled between the diaphragm and the transducer base structure. Preferably the resilient member couples a central hinge joint of the hinge assembly. Preferably the resilient member couples the hinge element of the central hinge joint at a surface that opposes the contact surface of the hinge element.

Preferably the resilient member is configured to resiliently flex and/or deform in directions that are substantially orthogonal to the rotational axis of the hinge assembly. Preferably the resilient member is configured to resiliently flex and/or deform in directions that are substantially orthogonal to the rotational axis of the hinge assembly and that are angled relative to a longitudinal axis of the diaphragm.

In some embodiments the resilient member is a resilient pad configured to locate within a corresponding recess of the diaphragm. Preferably the resilient pad is a substantially soft member that is flexible and/or deformable in compression, tension and/or shear, most preferably all three. Preferably the resilient pad is an elastomer, such as a Silicone rubber.

Preferably the hinge element of the central hinge joint comprises a shim that is rigidly coupled to the resilient pad.

In some embodiments the resilient member is a metal spring.

Preferably, in situ and during operation of the movement of the diaphragm relative to the transducer base structure is substantially constrained by the hinge.

In some embodiments, for each hinge joint having a contact member coupled to the transducer base structure, the contact member is directly supported by one or more regions of the transducer base structure (hereinafter referred to as "contact member support region").

Preferably each contact member support comprises a substantially solid body.

Preferably a geometry of the transducer base structure in at least a region adjacent the contact member support region of each hinge joint, is squat and/or thickset relative to a radius of the convex contact surface of the associated contact member (herein referred to as "contact member radius"). In some embodiments each contact member support region is squat and/or thickset directly adjacent or in the immediate vicinity of the associated contact member. Preferably each contact member support region consists of a greater depth and/or height and/or width than the associated contact member radius. Preferably each contact member support region consists of a relatively greater depth and height than the associated contact member radius.

Preferably each contact member support region, or the transducer base structure, or both comprises of a significant depth extending from the contact member and away from the axis of rotation, in a direction that is angled relative to the axis of rotation, to enhance the rigidity and robustness of support to the contact member. Preferably each contact member support region, or the transducer base structure, or both, consists of a significant depth extending from the contact member and away from the axis of rotation, in a direction that is substantially orthogonal to the axis of rotation.

Preferably the significant depth is greater than approximately twice the associated contact member radius, more preferably the depth is greater than approximately four times the associated contact member radius, and most preferably the depth is greater than approximately six times the associated contact member radius.

Preferably the transducer base structure comprises of a significant depth at least in a region adjacent each contact member support region, and away from the axis of rotation and diaphragm, in a direction that is angled (preferably substantially orthogonally) relative to the axis of rotation, to enhance the rigidity and robustness of support to the contact member.

Preferably each contact member support region comprises of a Young's modulus of at least approximately 8 Gigapascals (GPa), or more preferably at least approximately 20 GPa. Preferably the transducer base structure comprises of a Young's modulus of at least approximately 8 Gigapascals (GPa), or more preferably at least approximately 20 GPa.

Preferably each contact member support region consists of a geometry that is substantially rigid and inflexible to maintain rigidity along an axis that is substantially parallel to the axis of rotation.

Preferably the transducer base structure consists of a geometry and structure that is substantially rigid to maintain rigidity along an axis that is substantially parallel to the axis of rotation, at least in regions at or proximal to the axis of rotation, but preferably also in regions distal from the axis of rotation.

Preferably an average cross-sectional area of the transducer base structure, in a plane substantially perpendicular to the axis of rotation and averaged along a total length along the axis of rotation between and including a pair of outermost hinge joints of the hinge (herein referred to as "total length of hinge"), is significantly greater than a radius of a convexly curved contact surface of at least one contact member supported by the transducer base structure, most preferably all contact members supported by the transducer base structure.

Preferably a square root value of an average cross-sectional area of the transducer base structure, in a plane substantially perpendicular to the axis of rotation and averaged along the total length of the hinge, is greater than approximately 20 times, or more preferably greater than approximately 30 times, and most preferably greater than approximately 40 times a radius of a convexly curved contact surface of at least one contact member supported by transducer base structure, most preferably all contact members supported by the transducer base structure.

Preferably an average cross-sectional area of all contact member support regions, in a plane substantially perpendicular to the axis of rotation and averaged along the total length of the hinge, is significantly greater than a radius of at a convexly curved contact surface of at least one contact member supported by the contact member support regions, most preferably all contact members supported by the contact member support regions.

In some embodiments a square root value of an average cross-sectional area of all contact member support regions, in a plane substantially perpendicular to the axis of rotation and averaged along the total length of the hinge, is greater than approximately 20 times, or more preferably greater than approximately 30 times, and most preferably greater than approximately 40 times a radius of at a convexly curved contact surface of at least one contact member supported by the transducer base structure, most preferably all contact members supported by the transducer base structure.

In some embodiments a mass of the transducer base structure in grams is greater than approximately 0.0003 times the cube of the total length of the hinge, in millimetres. More preferably the mass of the transducer base structure in grams is greater than approximately 0.0005 times the cube of the total length of the hinge in millimetres. Most preferably the mass of the transducer base structure in grams is greater than approximately 0.0008 times the cube of the total length of the hinge in millimetres.

In some embodiments a mass of the transducer base structure in grams is greater than approximately 25,000 times the cube of at least one contact member radius, in mm, more preferably more than approximately 40,000 times and most preferably more than approximately 60,000 times. Preferably the mass is greater than 25,000 times the cube of each contact member radius, more preferably more than 40,000 times and most preferably more than 60,000 times.

In some embodiments a density of the transducer base structure is greater than approximately 0.07 g/mm$^3$, more preferably greater than approximately 0.001 g/mm$^3$ and most preferably greater than approximately 0.0016 g/mm$^3$.

Preferably each contact member protrudes from the associated diaphragm or transducer base structure. Preferably each contact member protrudes from an external surface of the associated diaphragm or transducer base structure.

Preferably the contact member of at least one hinge joint cantilevers from the associated diaphragm or transducer base structure in the associated common direction. Preferably the contact member of each hinge joint cantilevers from the associated diaphragm or transducer base structure in the associated common direction.

Preferably at least one contact member that is coupled to the transducer base structure consists of a body that increases in thickness away from the associated contact surface. Preferably each contact member that is coupled to the transducer base structure consist of a body that increases in thickness away from the associated contact surface.

Preferably at least one contact member that is coupled to the transducer base structure consists of a substantially solid body. Preferably each contact member that is coupled to the transducer base structure consists of a substantially solid body.

Preferably at least two contact members that are coupled to the transducer base structure each consist of a body that increases in thickness away from the associated contact surface, and said thicker ends of said two members are connected to one-another via a thickset region of the transducer base structure. Preferably said thickset region of the transducer base structure is a substantially solid body.

Preferably at least one contact member is substantially wedge shaped or comprises a cross-sectional profile that is substantially triangular in a plane that is substantially orthogonal to the axis of rotation. Preferably each contact member is substantially wedge shaped or comprises a cross-sectional profile that is substantially triangular in a plane that is substantially orthogonal to the axis of rotation.

In some embodiments the hinge elements of one or more hinge joints are distributed along a longitudinal hinge beam of the diaphragm or two or more separate and longitudinally aligned hinge beams of the diaphragm. In some embodiments the longitudinal hinge beam(s) further comprise(s) the contact member(s) of one or more other hinge joints. In some embodiments the longitudinal hinge beam(s) comprise(s) a pair of contact members extending laterally from opposing ends of the hinge beam or from opposing outer ends of the two or more hinge beams.

In some embodiments the contact members of one or more hinge joints are distributed along an exterior surface of one side of the transducer base structure. Preferably the contact members of at least three hinge joints are distributed along an exterior surface of one side of the transducer base structure.

In some embodiments the hinge comprises one or more parts configured to facilitate movement of the diaphragm and which contribute significantly to resisting translational displacement of the diaphragm with respect to the transducer base structure, and which has a Young's modulus of greater than approximately 8 GPa, or more preferably higher than approximately 20 GPa.

Preferably all parts of the hinge, apart from biasing mechanism, that operatively support the diaphragm in use have a Young's modulus greater than approximately 8 GPa, or more preferably higher than approximately 20 GPa.

The hinge element and the contact member may be made from a material having a Young's modulus higher than 8 GPa, or even more preferably higher than 20 GPa for example but not limited to aluminum, steel, titanium, tungsten, ceramic and so on.

In some embodiments the hinge element and/or the contact member of each hinge joint comprises a thin corrosion-resistant coating, for example a ceramic coating or an anodized coating, at the respective contact surface.

In some embodiments one or more hinge joints is(are) rigidly coupled to the diaphragm or the transducer base structure, either directly or via at least one intermediary components.

The intermediary components may be made from a material with a Young's modulus greater than approximately 8 GPa, or more preferably higher than approximately 20 GPa.

Preferably the intermediary component(s) incorporate a substantially planar section oriented at an angle greater than approximately 30 degrees to a coronal plane of the diaphragm and substantially parallel to an axis of rotation of the hinge to transfer load with minimal compliance.

In preferred embodiments the diaphragm is closely associated with each hinge joint. For example, a distance from the diaphragm to each hinge joint, is less than half the maximum distance from the axis of rotation to a most distal periphery of the diaphragm, or more preferably less than ⅓ the maximum distance, or more preferably less than ¼ the maximum distance, or more preferably less than ⅛ the maximum distance, or most preferably less than 1/16 the maximum distance.

In some embodiments one of the diaphragm or the transducer base structure is effectively rigidly connected to at least a part of the hinge element of each hinge joint in the immediate vicinity of the contact region, and the other of the diaphragm or the transducer base structure is effectively rigidly connected to at least a part of the contact member of each hinge joint in the immediate vicinity of the contact region.

Preferably whichever of the contact member or hinge element of each hinge joint that comprises a smaller contact surface radius, about an axis substantially parallel to the axis of rotation, is less than 30%, more preferably less than 20%, and most preferably less than 10% of a greatest length from the contact region, in a direction perpendicular to the axis of rotation, across all components effectively rigidly connected to a localised part of the component which is immediately adjacent to the contact region.

Preferably whichever of the contact member or hinge element of each hinge joint that comprises a smaller contact surface radius, about an axis substantially parallel to the axis of rotation, is less than 30%, more preferably less than 20%, and most preferably less than 10% of a distance, in a direction perpendicular to the axis of rotation, across the smaller out of:

The maximum dimension across all components effectively rigidly connected to the part of the contact member immediately adjacent to the point of contact with the hinge, and:

The maximum dimension across all components effectively rigidly connected to the part of the hinge element immediately adjacent to the point of contact with the contact member.

Preferably the contact member of each hinge joint comprises a radius at the contact surface that is less than 30%, more preferably less than 20%, and most preferably less than 10% of: a length from the contact region, in a direction perpendicular to the axis of rotation to a terminal end of the transducer base structure, and/or a longitudinal length of the transducer base structure.

Preferably each hinge joint is configured to allow the contact member to move in a substantially rotational manner relative to the hinge element.

Preferably the contact member is configured to roll against the hinge element with insignificant sliding during operation.

Preferably the contact member is configured to roll against the hinge element with no sliding during operation.

Alternatively the contact member is configured to rub or twist on the hinge element during operation.

In some embodiments the hinge assembly further comprises a biasing mechanism configured to compliantly bias the contact surface of the hinge element of each hinge joint towards the contact surface of the associated contact member, to maintain substantially consistent physical contact between the contact surface of the hinge element and the contact surface of the associated contact member during operation.

Preferably the biasing mechanism is substantially compliant.

Preferably the biasing mechanism is substantially compliant in a direction substantially perpendicular to the contact surface at the region of contact between each hinge element and the associated contact member during operation.

Preferably the biasing mechanism comprises a resilient member coupled between the diaphragm and the transducer base structure. Preferably the resilient member couples a central hinge joint of the hinge assembly. Preferably the resilient member couples the hinge element of the central hinge joint at a surface that opposes the contact surface of the hinge element.

Alternatively, the resilient member comprises the hinge element.

Preferably the resilient member is configured to resiliently flex and/or deform in directions that are substantially orthogonal to the rotational axis of the hinge assembly. Preferably the resilient member is configured to resiliently flex and/or deform in directions that are substantially orthogonal to the rotational axis of the hinge assembly and that are angled relative to a longitudinal axis of the diaphragm.

In some embodiments the resilient member is a resilient pad configured to locate within a corresponding recess or cavity of the diaphragm. Preferably the resilient pad is a substantially soft member that is flexible and/or deformable in compression, tension and/or shear, most preferably all three. Preferably the resilient pad is an elastomer, such as a Silicone rubber, a thermoplastic elastomer, a natural rubber, a thermoset polyether-based polyurethane, or a polyurethane material.

Preferably the hinge element of the central hinge joint comprises a shim that is rigidly coupled to the resilient pad.

In some embodiments the resilient member is a metal spring.

In one form, the biasing mechanism applies a biasing force in a direction with an angle of less than 25 degrees, or less than 10 degrees, or less than 5 degrees to an axis perpendicular to the contact surface in the region of contact between each hinge element and the associated contact member during operation.

Preferably, the biasing mechanism applies a biasing force in a direction substantially perpendicular to the contact surface at the region of contact between each hinge element and the associated contact member during operation.

Preferably the biasing mechanism is substantially compliant in a direction substantially perpendicular to the contact surface at the region of contact between each hinge element and the associated contact member during operation.

Preferably the biasing mechanism is substantially compliant in terms of that it applies a biasing force as opposed to a biasing displacement, in a direction substantially perpendicular to the contact surface at the region of contact between each hinge element and the associated contact member during operation.

Preferably the biasing mechanism is substantially compliant in terms of that the biasing force does not change greatly if, in use, the hinge element shifts slightly in a direction substantially perpendicular to the contact surface at the region of contact between each hinge element and the associated contact member during operation.

Preferably the biasing structure compliance excludes compliance associated with and in the region of contact between non-joined components within the biasing mechanism, compared to the contact member of each hinge joint.

In some embodiments the audio transducer further comprises a centring mechanism configured to maintain a substantially constant relative translational positions between the diaphragm and the transducer base structure, at least along an axis substantially parallel to the axis of rotation, when an external force is exerted on the transducer. Preferably the centring mechanism also maintains substantially constant translational positions between the diaphragm and the transducer base structure, along an axis substantially parallel to a longitudinal axis of the diaphragm.

In some embodiments the centring mechanism comprises part of the hinge assembly.

In some embodiments the centring mechanism comprises one or more ligaments coupled at one end to the diaphragm assembly and at the other end to the transducer base structure. Preferably the centring mechanism comprises a pair of centring blocks rigidly coupled to the diaphragm and the transducer base structure respectively, on one or both sides of the transducer, each pair of guide blocks including a series of channels, and wherein the ligaments extend through and are rigidly coupled within the series of channels. Preferably the ligaments are coupled at one end to the diaphragm and at an opposing end to the transducer base structure. The ligaments may extend in varying directions to substantially restrict translational movement of the diaphragm relative to the transducer base structure along two or more orthogonal axes.

In some embodiments the centring mechanism comprises at least one compliant component positioned between the diaphragm and the transducer base structure and configured to mitigate or at least substantially alleviate displacement of the diaphragm relative to the transducer base structure, beyond a predetermined relative position, in a direction perpendicular to the axis of rotation.

Preferably the compliant component has Young's modulus of less than approximately 0.5 Gpa, or more preferably less than approximately 0.3 GPa or most preferably less than approximately 0.1 GPa.

Preferably the compliant component is resilient and flexible. Preferably the compliant component is an elastomer, such as Silicone rubber.

Preferably each compliant component is positioned to prevent the diaphragm from displacing beyond a predetermined relative position in a direction perpendicular to the axis of rotation and parallel to a plane of a surface of the contact member that is in contact with the hinge element when the diaphragm is at its equilibrium/rest position.

Preferably each compliant component contacts a surface of the diaphragm facing in a direction substantially parallel to the axis of rotation.

Preferably each compliant component is in a state of compression during normal operation of the audio transducer.

Preferably each compliant component compresses and/or stretches when the diaphragm displaces toward or beyond said predetermined relative position. Alternatively or in addition each compliant component deforms in shear when the diaphragm displaces toward or beyond said predetermined relative position.

Preferably each compliant component is located close to the axis of rotation of the hinge assembly. Preferably the compliant component is located on or adjacent an external side of the diaphragm. Preferably the centring mechanism comprises a pair of compliant centring components located on or adjacent a pair of opposing external sides of the diaphragm.

In preferred embodiments the diaphragm is substantially rigid.

Preferably the diaphragm comprises a diaphragm body of substantially rigid core material. Preferably the diaphragm body comprises a pair of opposing major faces.

Preferably the diaphragm further comprises outer normal stress reinforcement at or adjacent the pair of opposing major faces for substantially resisting compression-tension forces exhibited at the major faces during operation.

Preferably the diaphragm further comprises a diaphragm base structure rigidly coupled to a first end of the diaphragm body.

Preferably the hinge joints are rigidly connected to the diaphragm base structure.

Preferably the transducer further comprises a transducing mechanism. Preferably the transducing mechanism is an electromagnetic mechanism consisting of a magnetic assembly and one or more conductive coil(s). Preferably the magnetic assembly is rigidly connected to the transducer base structure and the conductive coil(s) is(are) rigidly connected to the diaphragm base structure.

In preferred embodiments the diaphragm comprises of a flexible and resilient region at the first end of the diaphragm body that is coupled to the diaphragm base structure, the flexible region enabling relative translational movement between opposing sides of the diaphragm at the first end.

Preferably the diaphragm body comprises of a recess or cavity at the first end between the opposing sides of the diaphragm.

In some embodiments the diaphragm base structure may comprise a recess, cavity or discontinuity in or adjacent the flexible and resilient region to contribute to the flexibility and resiliency of the diaphragm in said region.

Preferably the diaphragm base structure further comprises a resilient member at or adjacent the flexible and resilient region. Preferably the resilient member is part of the hinge assembly.

Preferably the normal stress reinforcement comprises of a higher flexibility in or adjacent the flexible and resilient region relative to other regions on the major faces.

Preferably the conductive coil(s) comprise of a longitudinal side or a pair of longitudinal sides that is or are substantially parallel to the axis of rotation.

In some embodiment the diaphragm is flexible and resilient in terms of bending along the axis of rotation in a central region to enable relative translation between opposing sides of the diaphragm on either side of the central region.

In some embodiments the apparatus further comprises a decoupling mounting system located between the diaphragm and at least one other part of the apparatus for at least partially alleviating mechanical transmission of vibration between the diaphragm and the at least one other part of the apparatus, the decoupling mounting system flexibly mounting a first component to a second component of the apparatus.

Preferably the at least one other part is a housing of the apparatus, the first component is a component of the transducer base structure and the second component is a component of the housing.

In another aspect the invention may broadly be said to an audio transducer comprising:
a diaphragm;
a transducer base structure; and
a hinge rotatably coupling the diaphragm to the transducer base structure and having:
at least three hinge joints having a substantially common axis of rotation, each hinge joint having a hinge element with a contact surface and an associated contact member with a contact surface that abuts the contact surface of the hinge element at a region of contact;
a biasing mechanism configured to compliantly bias the contact surface of the hinge element of each hinge joint towards the contact surface of the associated contact member, to maintain substantially consistent physical contact between the contact surface of the hinge element and the contact surface of the associated contact member during operation; and wherein the contact surface of the hinge element of each hinge joint is configured to move relative to the contact surface of the associated contact member during operation to rotatably oscillate about the axis of rotation, the contact surface of each contact member is convexly curved about an axis substantially parallel to the axis of rotation, the at least three hinge joints comprises multiple sets of one or more hinge joint(s), each set of hinge joint(s) having one or more contact member contact surface(s) with normal vector(s) at respective region(s) of contact extending in a substantially common direction, the common direction of the contact member contact surface(s) of at least one set of hinge joint(s) is angled relative to a common direction of the contact member contact surface(s) of at least one other set of hinge joint(s) between approximately 135 and 225 degrees, the biasing mechanism comprises at least one resilient pad coupled between the diaphragm and the transducer base structure.

Preferably the transducer base structure is heavier and/or firmly fixed in position in situ, relative to the diaphragm.

In some embodiments the common direction of the contact member contact surface(s) of at least one set of hinge joint(s) substantially opposes a common direction of the contact member contact surface(s) of at least one other set of hinge joint(s), such that the angle between the common directions is approximately 180 degrees.

Preferably at least one resilient pad couples a central hinge joint of the hinge assembly. Preferably the resilient pad couples the hinge element of the central hinge joint at a surface that opposes the contact surface of the hinge element.

Preferably a pair of resilient pads couple between the diaphragm and transducer base structure at opposing outer sides of the diaphragm or transducer base structure.

Preferably each resilient pad is a substantially soft member that is flexible and/or deformable in compression, tension and/or shear, most preferably all three. Preferably the resilient pad is an elastomer, such as a Silicone rubber.

In another aspect the invention may broadly be said to an audio transducer comprising:
- a diaphragm;
- a transducer base structure; and
- a hinge operatively coupling the diaphragm to the transducer base structure and having:
  - at least three hinge joints having a substantially common axis of rotation, each hinge joint having a hinge element with a contact surface and an associated contact member with a contact surface that abuts the contact surface of the hinge element at a region of contact;
  - a biasing mechanism configured to compliantly bias the contact surface of the hinge element of each hinge joint towards the contact surface of the associated contact member, to maintain substantially consistent physical contact between the contact surface of the hinge element and the contact surface of the associated contact member during operation; and
  - wherein the contact surface of the hinge element of each hinge joint is configured to move relative to the contact surface of the associated contact member during operation to rotatably oscillate about the axis of rotation,
  - the contact surface of each contact member is convexly curved about an axis substantially parallel to the axis of rotation,
  - the at least three hinge joints comprises multiple sets of one or more hinge joint(s), each set of hinge joint(s) having one or more contact member contact surface(s) with normal vector(s) at respective region(s) of contact extending in a substantially common direction,
  - the common direction of the contact member contact surface(s) of at least one set of hinge joint(s) is angled relative to a common direction of the contact member contact surface(s) of at least one other set of hinge joint(s) between approximately 135 and 225 degrees,
  - the biasing mechanism comprises at least one resilient pad couples between the diaphragm and the transducer base structure at one of said hinge joints and the hinge element of said hinge joint comprises a shim coupled to an external side of the resilient pad.

Preferably the transducer base structure is heavier and/or firmly fixed in position in situ, relative to the diaphragm.

In another aspect the invention may broadly be said to an audio transducer comprising:
- a diaphragm;
- a transducer base structure; and
- a hinge operatively coupling the diaphragm to the transducer base structure and having:
  - at least three hinge joints having a substantially common axis of rotation, each hinge joint having a hinge element with a contact surface and an associated contact member with a contact surface that abuts the contact surface of the hinge element at a region of contact; and
  - wherein the contact surface of the hinge element of each hinge joint is configured to move relative to the contact surface of the associated contact member during operation to rotatably oscillate about the axis of rotation,
  - the contact surface of each contact member is convexly curved about an axis substantially parallel to the axis of rotation,
  - the at least three hinge joints comprises a pair of hinge joints having contact members rigidly coupled to the transducer base structure and a third hinge joint having a contact member rigidly coupled to the transducer base structure;
  - the pair of hinge joints have contact member contact surfaces with normal vectors at respective regions of contact extending in a first, substantially common direction,
  - the third hinge joint has a contact member contact surface with a normal vector at the associated region of contact extending in a second direction, and
  - wherein the first direction is angled relative to the second direction.

Preferably the transducer base structure is heavier and/or firmly fixed in position in situ, relative to the diaphragm.

Preferably the contact members of the pair of hinge joints are rigidly coupled to an exterior surface of the transducer base structure. Preferably the contact member of the third hinge joint is rigidly coupled to an exterior surface of the transducer base structure.

Preferably the third hinge joint is located centrally between the pair of hinge joints.

Preferably the first direction is angled relative to the second direction between approximately 135 and 225 degrees.

In another aspect the invention may broadly be said to consist of an audio transducer comprising:
- a diaphragm;
- a transducer base structure; and
- a hinge system configured to operatively support the diaphragm in use, and comprising a hinge assembly having at least three hinge joints with a substantially common axis of rotation, each hinge joint having a hinge element with a contact surface and an associated contact member with a contact surface that abuts the contact surface of the hinge element at a region of contact;
  - wherein the contact surface of the hinge element of each hinge joint moves relative to the contact surface of the associated contact member during operation to rotatably oscillate about the axis of rotation;
  - the contact surface of each contact member is convexly curved about an axis substantially parallel to the axis of rotation; and
  - at least one hinge joint comprises a contact member rigidly coupled to the transducer base structure.

Preferably at least two hinge joints comprise contact members rigidly coupled to the transducer base structure. Preferably at least three hinge joints comprise contact members rigidly coupled to the transducer base structure.

Preferably the transducer base structure is squat relative to a radius of a convex contact surface of each contact member (herein referred to as "contact member radius") coupled to the transducer base structure. Preferably the transducer base structure is squat and/or thickset directly adjacent or in the immediate vicinity of the coupled contact member(s).

Preferably the transducer base structure comprises of a greater depth and/or height and/or width than the contact member radius of each coupled contact member. Preferably the transducer base structure comprises of a greater depth and width and length than the contact member radius of each coupled contact member.

Preferably the transducer base structure comprises of a significant depth extending from the region of connection and away from the axis of rotation, in a direction that is angled relative to the axis of rotation, to enhance the rigidity and robustness of support to the coupled contact member(s).

Preferably the transducer base structure consists of a significant depth extending from a support region of one or more coupled contact member(s) and away from the axis of rotation, in a direction that is substantially orthogonal to the axis of rotation.

Preferably the significant depth is greater than approximately twice the associated contact member radius, more preferably the depth is greater than approximately four times the associated contact member radius, and most preferably the depth is greater than approximately six times the associated contact member radius.

Preferably the transducer base structure comprises of a Young's modulus of at least approximately 8 GPa, or more preferably at least approximately 20 GPa.

Preferably the transducer base structure consists of a geometry and structure that is substantially rigid to maintain rigidity along an axis that is substantially parallel to the axis of rotation, at least in regions at or proximal to the axis of rotation, but preferably also in regions distal from the axis of rotation.

Preferably an average cross-sectional area of the transducer base structure, in a plane substantially perpendicular to the axis of rotation and averaged along a total length along the axis of rotation between and including a pair of outermost hinge joints of the hinge (herein referred to as "total length of hinge"), is significantly greater than a radius of at a convexly curved contact surface of at least one contact member supported by the transducer base structure, most preferably all contact members supported by the transducer base structure.

Preferably a square root value of an average cross-sectional area of the transducer base structure, in a plane substantially perpendicular to the axis of rotation and averaged along the total length of the hinge, is greater than approximately 20 times, or more preferably greater than approximately 30 times, and most preferably greater than approximately 40 times a radius of a convexly curved contact surface of at least one contact member supported by the transducer base structure, most preferably all contact members supported by the transducer base structure.

Preferably an average cross-sectional area of the transducer base structure, in a plane substantially perpendicular to the axis of rotation and averaged along the total length of the hinge, is significantly greater than a radius of at a convexly curved contact surface of at least one contact member supported by the transducer base structure, most preferably all contact members supported by the transducer base structure.

Preferably a square root value of an average cross-sectional area of the transducer base structure, in a plane substantially perpendicular to the axis of rotation and averaged along the total length of the hinge, is greater than approximately 20 times, or more preferably greater than approximately 30 times, and most preferably greater than approximately 40 times a radius of at a convexly curved contact surface of at least one contact member supported by the transducer base structure, most preferably all contact members supported by the transducer base structure.

In some embodiments a mass of the transducer base structure in grams is greater than approximately 0.0003 times the cube of the total length of the hinge, in millimetres. More preferably the mass of the transducer base structure in grams is greater than approximately 0.0005 times the cube of the total length of the hinge in millimetres. Most preferably the mass of the transducer base structure in grams is greater than approximately 0.0008 times the cube of the total length of the hinge in millimetres.

In some embodiments a mass of the transducer base structure in grams is greater than approximately 25,000 times the cube of at least one contact member radius, in mm, more preferably more than approximately 40,000 times and most preferably more than approximately 60,000 times. Preferably the mass is greater than 25,000 times the cube of each contact member radius, more preferably more than 40,000 times and most preferably more than 60,000 times.

In some embodiments a density of the transducer base structure is greater than approximately 0.07 g/mm$^3$, more preferably greater than approximately 0.001 g/mm$^3$ and most preferably greater than approximately 0.0016 g/mm$^3$.

Preferably the contact member of at least one hinge joint cantilevers from the transducer base structure. Preferably the contact member of each hinge joint cantilevers from the transducer base structure.

Preferably at least one contact member that is coupled to the transducer base structure consists of a body that increases in thickness away from the associated contact surface. Preferably each contact member that is coupled to the transducer base structure consist of a body that increases in thickness away from the associated contact surface.

Preferably at least one contact member that is coupled to the transducer base structure consists of a substantially solid body. Preferably each contact member that is coupled to the transducer base structure consists of a substantially solid body.

Preferably at least two contact members that are coupled to the transducer base structure each consist of a body that increases in thickness away from the associated contact surface, and said thicker regions of said two members are connected to one-another via a thick and robust section of the transducer base structure. Preferably said thick and robust section of the transducer base structure is a substantially solid body.

Preferably at least one contact member is substantially wedge shaped or comprises a cross-sectional profile that is substantially triangular in a plane that is substantially orthogonal to the axis of rotation. Preferably each contact member is substantially wedge shaped or comprises a cross-sectional profile that is substantially triangular in a plane that is substantially orthogonal to the axis of rotation.

In some embodiments the hinge elements of one or more hinge joints are distributed along a longitudinal hinge beam of the diaphragm or two or more separate and longitudinally aligned hinge beams of the diaphragm. In some embodiments the longitudinal hinge beam(s) further comprise(s) the contact member(s) of one or more other hinge joints. In some embodiments the longitudinal hinge beam(s) comprise(s) a pair of contact members extending laterally from opposing ends of the hinge beam or from opposing outer ends of the two or more hinge beams.

In some embodiments the contact members of one or more hinge joints are distributed along an exterior surface of one side of the transducer base structure. Preferably the contact members of at least three hinge joints are distributed along an exterior surface of one side of the transducer base structure.

In another aspect the invention may broadly be said to consist of an audio transducer comprising:
- a diaphragm;
- a transducer base structure; and
- a hinge system configured to operatively support the diaphragm and comprising:
  - a hinge assembly having at least three hinge joints, each hinge joint having a hinge element with a contact surface and an associated contact member with a contact surface that abuts the contact surface of the hinge element at a region of contact, and wherein the contact surface of the hinge element of each hinge joint is configured to move relative to the contact surface of the associated contact member to rotatably oscillate about the axis of rotation during operation, and
  - a biasing mechanism configured to compliantly bias the contact surface of the hinge element of each hinge joint towards the contact surface of the associated contact member, to maintain substantially consistent physical contact between the contact surface of the hinge element and the contact surface of the associated contact member during operation, and wherein the contact surface of each contact member is convexly curved about an axis substantially parallel to the axis of rotation, and
  - in an assembled form of the transducer, the hinge joints are oriented such that reaction forces exerted by the transducer base structure at the respective regions of contact, due to forces exerted by the biasing mechanism, are balanced.

Preferably, the hinge joints are oriented such that:
- reaction force(s) exerted by the transducer base structure and exhibited at a first set of one or more hinge joint(s) comprise vector(s) extending in a first, substantially common direction,
- reaction force(s) exerted by the transducer base structure and exhibited at a second set of one or more hinge joint(s) comprise vector(s) extending in a second, substantially common direction, and
- wherein the first direction is oriented at an angle relative to the second direction.

In another aspect the invention may broadly be said to consist of an audio transducer comprising:
- a diaphragm, having:
  - a substantially rigid diaphragm body; and
  - a relatively flexible and resilient region at the first end of the diaphragm body configured to enable relative translational movement between opposing sides of the diaphragm at the first end;
- a transducer base structure to which the diaphragm is moveably coupled; and
- a transducing mechanism operative to transduce sound in association with movement of the diaphragm relative to the transducer base structure.

In another aspect, the present invention may broadly be said to consist of an audio transducer comprising:
- a diaphragm;
- a transducer base structure; and
- a hinge system configured to operatively support the diaphragm to the transducer base structure and comprising a hinge assembly having at least one hinge joint, each hinge joint having a hinge element and a contact member, the contact member having a contact surface that is convexly curved, in at least a cross-sectional profile along a plane perpendicular to the axis of rotation, and during operation each hinge joint is configured to allow the hinge element to move relative to the associated contact member while maintaining a substantially consistent physical contact with the contact surface; and
- a transducer centring system comprising at least one compliant component positioned between the diaphragm and the transducer base structure positioned to mitigate or at least substantially alleviate displacement the diaphragm relative to the transducer base structure beyond a predetermined relative position in a direction perpendicular to the axis of rotation.

Preferably each compliant component is resilient and flexible, such as an elastomer.

Preferably each compliant component is positioned to prevent or at least substantially alleviate displacement of the diaphragm relative to the transducer base structure beyond a predetermined relative position in a direction perpendicular to the axis of rotation and parallel to a plane of a surface of the contact member that is in contact with the hinge element when the diaphragm is at its equilibrium/rest position.

Preferably each compliant component has Young's modulus is less than approximately 0.5 GPa, or more preferably less than approximately 0.3 GPa or most preferably less than approximately 0.1 GPa.

Preferably each compliant component contacts a surface of the diaphragm facing outward in a direction substantially parallel to the axis of rotation.

Preferably each compliant component is in a state of compression during normal operation of the audio transducer.

Preferably the centring system includes at least one centring hinge joint, each hinge joint having a centring hinge element and an associated centring contact member, each centring contact member having a contact surface that is convexly curved, about an axis substantially parallel to the axis of rotation, and during operation each centring hinge joint is configured to allow the centring hinge element to move relative to the associated centring contact member while maintaining a substantially consistent physical contact with the contact surface.

Preferably each contact member is rigidly attached to the diaphragm. Alternatively each contact member is rigidly attached to the transducer base structure.

Preferably each hinge element is rigidly attached to at least one of said compliant component(s).

Preferably each centring hinge element comprises a substantially rigid contact surface, and each centring contact member comprise substantially rigid contact surface.

Preferably each compliant component exerts increased force on the hinge element when the diaphragm displaces toward or beyond said predetermined relative position.

Preferably the compliant component compresses and/or stretches when the diaphragm displaces toward or beyond said predetermined relative position.

Alternatively or in addition each compliant component deforms in shear when the diaphragm displaces toward or beyond said predetermined relative position.

Preferably each compliant component is located close to the hinge axis of the diaphragm. Preferably each compliant component is located on or adjacent an external side of the diaphragm. Preferably the centring mechanism comprises a pair of compliant centring components located on or adjacent a pair of opposing external sides of the diaphragm. Preferably the centring mechanism comprises a pair of centring hinge joints on either side of the diaphragm, each centring hinge joint being located internally of the respective compliant component.

Any one of the abovementioned preferred or alternative features or embodiments may be combined with any one or more of the abovementioned audio transducer inventions.

In another aspect the invention may consist of an audio or electronic device comprising two or more electro-acoustic loudspeakers incorporating any one or more of the audio transducers of the above aspects and providing two or more different audio channels through capable of reproduction of independent audio signals. Preferably the audio device is personal audio device adapted for audio use within approximately 10 cm of the user's ear.

In another aspect the invention may be said to consist of a personal audio device, configured to locate within approximately 10 cm of a user's head in use, incorporating any combination of one or more of the audio transducers and its related features, configurations and embodiments of any one of the previous audio transducer aspects.

In another aspect the invention may be said to consist of a personal audio device comprising a pair of interface devices configured to be worn by a user at or proximal to each ear, wherein each interface device comprises any combination of one or more of the audio transducers and its related features, configurations and embodiments of any one of the previous audio transducer aspects.

In another aspect the invention may be said to consist of a headphone apparatus comprising a pair of headphone interface devices configured to be worn on or about each ear, wherein each interface device comprises any combination of one or more of the audio transducers and its related features, configurations and embodiments of any one of the previous audio transducer aspects.

In another aspect the invention may be said to consist of an earphone apparatus comprising a pair of earphone interfaces configured to be worn within an ear canal or concha of a user's ear, wherein each earphone interface comprises any combination of one or more of the audio transducers and its related features, configurations and embodiments of any one of the previous audio transducer aspects.

In another aspect the invention may be said to consist of an audio transducer of any one of the above aspects and related features, configurations and embodiments, wherein the audio transducer is an acoustoelectric transducer.

In another aspect the invention may broadly be said to consist of an audio transducer hinge comprising:
  at least three hinge joints having a substantially common axis of rotation, each hinge joint having a hinge element with a contact surface and an associated contact member with a contact surface that abuts the contact surface of the hinge element at a region of contact;
    wherein the contact surface of the hinge element of each hinge joint moves relative to the contact surface of the associated contact member to rotatably oscillate about the axis of rotation during operation;
    the contact surface of each contact member is convexly curved about an axis substantially parallel to the axis of rotation;
    the at least three hinge joints comprises multiple sets of one or more hinge joint(s), each set of hinge joint(s) having one or more contact member contact surface(s) with normal vector(s) at respective region(s) of contact extending in a substantially common direction, and
    the common direction of the contact member contact surface(s) of at least one set of hinge joint(s) is different to a common direction of the contact member contact surface(s) of at least one other set of hinge joint(s).

Preferably, for each hinge joint, the hinge element is coupled to or configured to couple either a moveable body or a relatively more stable body, in situ, and the associated contact member is coupled to the other of the moveable body or stable body; and wherein at least one contact member is coupled to the stable body.

Preferably the moveable body is a diaphragm.

Preferably the relatively more stable body is a transducer base structure.

The audio transducer hinge may comprise any one or more of the preferred or alternative features or embodiments described in relation to any one of the audio transducer inventions summarised herein.

In another aspect the invention may broadly be said to consist of a base structure for an audio transducer comprising:
  a substantially rigid transducer base structure body; and
  at least one contact member rigidly coupled to the transducer base structure that's configured to couple a hinge element of a hinge system in situ, wherein an exterior contact surface of each contact member is convexly curved about an axis.

Preferably at least two contact members rigidly coupled to the transducer base structure body.

Preferably the contact surfaces of the contact member(s) are aligned along an edge or face of the transducer base structure body to form an axis of rotation for the hinge system.

Preferably at least three contact members rigidly coupled to the transducer base structure body.

Preferably the transducer base structure body is squat relative to a radius of a convex contact surface of each contact member (herein referred to as "contact member radius") coupled to the transducer base structure body. Preferably the transducer base structure body is squat and/or thickset directly adjacent or in the immediate vicinity of the coupled contact member(s).

Preferably the transducer base structure body comprises of a greater depth and/or height and/or width than the contact member radius of each coupled contact member. Preferably the transducer base structure body comprises of a greater depth and width and length than the contact member radius of each coupled contact member.

Preferably the transducer base structure body comprises of a significant depth extending from the region of connection and away from the axis of rotation, in a direction that is angled relative to the axis of rotation, to enhance the rigidity and robustness of support to the coupled contact member(s).

Preferably the transducer base structure body consists of a significant depth extending from a support region of one or more coupled contact member(s) and away from the axis of rotation, in a direction that is substantially orthogonal to the axis of rotation.

Preferably the significant depth is greater than approximately twice the associated contact member radius, more preferably the depth is greater than approximately four times the associated contact member radius, and most preferably the depth is greater than approximately six times the associated contact member radius.

Preferably the transducer base structure body comprises of a Young's modulus of at least approximately 8 GPa, or more preferably at least approximately 20 GPa.

Preferably the transducer base structure body consists of a geometry and structure that is substantially rigid to maintain rigidity along an axis that is substantially parallel to the axis of rotation, at least in regions at or proximal to the axis of rotation, but preferably also in regions distal from the axis of rotation.

Preferably an average cross-sectional area of the transducer base structure body, in a plane substantially perpendicular to the axis of rotation and averaged along a total length along the axis of rotation between and including a pair of outermost contact members (herein referred to as "total length of hinge"), is significantly greater than a radius of at a convexly curved contact surface of at least one contact member supported by the transducer base structure body, most preferably all contact members supported by the transducer base structure body.

Preferably a square root value of an average cross-sectional area of the transducer base structure body, in a plane substantially perpendicular to the axis of rotation and averaged along the total length of the hinge, is greater than approximately 20 times, or more preferably greater than approximately 30 times, and most preferably greater than approximately 40 times a radius of a convexly curved contact surface of at least one contact member supported by the transducer base structure body, most preferably all contact members supported by the transducer base structure body.

Preferably an average cross-sectional area of all contact member support regions, in a plane substantially perpendicular to the axis of rotation and averaged along the total length of the hinge, is significantly greater than a radius of at a convexly curved contact surface of at least one contact member supported by the transducer base structure body, most preferably all contact members supported by the transducer base structure body.

Preferably a square root value of an average cross-sectional area of all contact member supports, in a plane substantially perpendicular to the axis of rotation and averaged along the total length of the hinge, is greater than approximately 20 times, or more preferably greater than approximately 30 times, and most preferably greater than approximately 40 times a radius of at a convexly curved contact surface of at least one contact member supported by the transducer base structure body, most preferably all contact members supported by the transducer base structure body.

In some embodiments a mass of the transducer base structure body in grams is greater than approximately 0.0003 times the cube of the total length of the hinge, in millimetres. More preferably the mass of the transducer base structure body in grams is greater than approximately 0.0005 times the cube of the total length of the hinge in millimetres. Most preferably the mass of the transducer base structure body in grams is greater than approximately 0.0008 times the cube of the total length of the hinge in millimetres.

In some embodiments a mass of the transducer base structure body in grams is greater than approximately 25,000 times the cube of at least one contact member radius, in mm, more preferably more than approximately 40,000 times and most preferably more than approximately 60,000 times. Preferably the mass is greater than 25,000 times the cube of each contact member radius, more preferably more than 40,000 times and most preferably more than 60,000 times.

In some embodiments a density of the transducer base structure body is greater than approximately 0.07 g/mm$^3$, more preferably greater than approximately 0.001 g/mm$^3$ and most preferably greater than approximately 0.0016 g/mm$^3$.

Preferably at least one contact member cantilevers from the transducer base structure body. Preferably all contact members cantilever from the transducer base structure body.

Preferably at least one contact member that is coupled to the transducer base structure body consists of a body that increases in thickness away from the associated contact surface. Preferably each contact member that is coupled to the transducer base structure body consist of a body that increases in thickness away from the associated contact surface.

Preferably at least one contact member that is coupled to the transducer base structure body consists of a substantially solid body. Preferably each contact member that is coupled to the transducer base structure body consists of a substantially solid body.

Preferably at least two contact members that are coupled to the transducer base structure body each consist of a body that increases in thickness away from the associated contact surface, and said thicker regions of said two members are connected to one-another via a thick and robust section of the transducer base structure body. Preferably said thick and robust section of the transducer base structure body is a substantially solid body.

Preferably at least one contact member is substantially wedge shaped or comprises a cross-sectional profile that is substantially triangular in a plane that is substantially orthogonal to the axis of rotation. Preferably each contact member is substantially wedge shaped or comprises a cross-sectional profile that is substantially triangular in a plane that is substantially orthogonal to the axis of rotation.

In some embodiments the hinge elements of one or more hinge joints are distributed along a longitudinal hinge beam of the diaphragm or two or more separate and longitudinally aligned hinge beams of the diaphragm. In some embodiments the longitudinal hinge beam(s) further comprise(s) the contact member(s) of one or more other hinge joints. In some embodiments the longitudinal hinge beam(s) comprise(s) a pair of contact members extending laterally from opposing ends of the hinge beam or from opposing outer ends of the two or more hinge beams.

In some embodiments one or more contact members are distributed along an exterior surface of one side of the transducer base structure body. Preferably all contact members are distributed along an exterior surface of one side of the transducer base structure body.

In another aspect the invention may broadly be said to consist of an audio transducer diaphragm comprising:

a substantially rigid diaphragm body; and a relatively flexible and resilient region at the first end of the diaphragm body configured to enable relative translational movement between opposing sides of the diaphragm at the first end.

Preferably the diaphragm comprises a diaphragm body of substantially rigid core material. Preferably the diaphragm body comprises of a recess or cavity at the first end between the opposing sides of the diaphragm to contribute to the flexibility and resiliency of the diaphragm in said region.

Preferably the diaphragm body comprises a pair of opposing major faces.

Preferably the diaphragm further comprises outer normal stress reinforcement at or adjacent the pair of opposing major faces for substantially resisting compression-tension forces exhibited at the major faces during operation. Preferably the normal stress reinforcement comprises of a higher flexibility in or adjacent the flexible and resilient region relative to other regions on the major faces.

Preferably the diaphragm further comprises a diaphragm base structure rigidly coupled to a first end of the diaphragm body.

Preferably the diaphragm base structure may comprise a recess, cavity or discontinuity in or adjacent the flexible and resilient region to contribute to the flexibility and resiliency of the diaphragm in said region.

Preferably the diaphragm base structure further comprises a resilient member at or adjacent the flexible and resilient region. Preferably the resilient member is part of the hinge assembly.

Preferably the diaphragm further comprises one or more conductive coil(s) rigidly connected to the diaphragm base structure.

Preferably the conductive coil(s) comprise of a longitudinal side or a pair of longitudinal sides that is or are substantially parallel to an end face of the diaphragm at the first end.

In another aspect the invention may broadly be said to an apparatus comprising:
  a first body or structure (hereinafter referred to as "the first body");
  a second body or structure (hereinafter referred to as "the second body"); and
  a hinge configured to operatively couple the first body to the second body and having:
    at least three hinge joints having a substantially common axis of rotation, each hinge joint having a hinge element with a contact surface and an associated contact member with a contact surface that abuts the contact surface of the hinge element at a region of contact; and
    wherein the contact surface of the hinge element of each hinge joint is configured to move relative to the contact surface of the associated contact member during operation to rotatably oscillate about the axis of rotation,
    the contact surface of each contact member is convexly curved about an axis substantially parallel to the axis of rotation, and
    the at least three hinge joints comprise multiple sets of one or more hinge joint(s), each set of hinge joint(s) having one or more contact member contact surface(s) with normal vector(s) at respective region(s) of contact extending in a substantially common direction, and
    the common direction of the contact member contact surface(s) of at least one set of hinge joint(s) is different to a common direction of the contact member contact surface(s) of at least one other set of hinge joint(s).

Preferably the hinge rotatably couples the first body to the second body.

Preferably the second body is heavier than the first body, in situ.

Preferably the second body is firmly fixed in position in situ, relative to the first body.

Preferably the second body comprises of a squat geometry relative to the first body.

Preferably the second body is substantially thickset.

Preferably the apparatus further comprises a coupling or couplings for mounting the apparatus to another body, structure or device, and wherein the coupling or couplings are or on the second body.

In some embodiment the coupling or couplings comprise of a decoupling mounting system configured to flexibly mount the second body to the other body, structure or device to at least partially alleviating mechanical transmission of vibration between the first body and the other body, structure or device.

Preferably the first body is substantially rigid, in use. Preferably the second body is substantially rigid, in use.

Preferably the contact surface of the contact member of each hinge joint is substantially rigid. Preferably the contact member of each hinge joint is substantially rigid. Preferably the contact surface of the hinge element of each hinge joint is substantially rigid. Preferably the hinge element of each hinge joint is substantially rigid.

Preferably, for each hinge joint, the hinge element is coupled to either the first body or the second body, and the associated contact member is coupled to the other of the first body or the second body.

Preferably, for at least one hinge joint, the contact member is coupled to the second body and the hinge element is coupled to the first body.

Preferably the contact member of each hinge joint is rigidly coupled to the first body or to the second body. The contact member may be rigidly fixed or integrally formed therewith.

Preferably, for at least one hinge joint, the hinge element is flexibly coupled to the first body or to the second body. Each flexibly coupled hinge element may be coupled via a resilient and flexible member, such as an elastomer or spring. Preferably a central hinge joint comprises a hinge element that is flexibly coupled to the first body.

Preferably, for at least one hinge joint, the hinge element is rigidly coupled to the first body or the second body. Each rigidly coupled hinge element may be rigidly fixed or integrally formed with the associated first body or second body.

In some embodiments, one or more hinge joints comprise a hinge element with a contact surface that is substantially concavely curved about an axis that is substantially parallel to the axis of rotation.

In some embodiments, one or more hinge joints comprise a hinge element with a contact surface that is substantially convexly curved about an axis that is substantially parallel to the axis of rotation, and wherein a radius of curvature of the hinge element contact surface is larger than a radius of curvature of the associated contact member contact surface.

In some embodiments, one or more hinge joints comprise a hinge element with a contact surface that is substantially planar.

Preferably the hinge element of each hinge joint comprises a substantially planar contact surface.

Preferably at least two hinge joints each comprise a hinge element rigidly coupled to the first body and an associated contact member rigidly coupled to the second body. Preferably at least one hinge joint comprises a hinge element flexibly coupled to the first body and an associated contact member rigidly coupled to the second body. Preferably the hinge joint(s) with a flexibly coupled hinge element is(are) centrally positioned relative to the at least two hinge joints with rigidly coupled hinge elements. Preferably two hinge joints, each comprising a hinge element rigidly coupled to the first body, are located on either side of the centrally positioned hinge joint.

Preferably, the direction of normal vectors of all hinge joints is such that reaction forces exerted by the transducer base structure at the respective regions of contact, due to forces exerted by the biasing mechanism, are balanced.

Preferably the multiple sets of hinge joints comprise:
- a first set of one or more hinge joint(s) with contact member contact surface(s) having normal vectors at their respective regions of contact extending in a first, substantially common direction, and
- a second set of one or more hinge joint(s) with contact member contact surface(s) having normal vectors extending in a second, substantially common direction that is different to the first direction.

In some embodiments a relative angle between the first direction and the second direction is between approximately 135 degrees and 225 degrees.

In some embodiments the first direction substantially opposes the second direction such that the angle between the first direction and the second direction is approximately 180 degrees.

Preferably the first set of hinge joints comprises one central hinge joint and the second set of hinge joints comprises at least one outer hinge joint on either side of the central hinge joint.

Preferably for each hinge joint in the first and second sets, the contact member is coupled to the second body and the hinge element is coupled to the first body. Preferably the contact members are substantially rigidly coupled to the second body. Preferably the hinge element of the central hinge joint is flexibly coupled to the first body via a resilient member. Preferably the hinge elements of the second set of hinge joints are substantially rigidly coupled to the first body.

Preferably the central hinge joint comprises a contact member that is rigidly coupled to an exterior surface of the second body. Preferably the second set of hinge joints comprises contact members that are coupled to an exterior surface of the second body.

Preferably the apparatus further comprises a transducing mechanism including a conductive coil. Preferably the conductive coil is coupled to the first body over a pair of spaced and substantially parallel supports, extending laterally from the first body.

In some preferred embodiments:
- the first set of hinge joint(s) comprises one or more hinge joints, each having a contact member contact surface with a normal vector facing in the first direction;
- the second set of hinge joints comprises two or more hinge joints each having a contact member contact surface with a normal vector facing in the second direction; and
- the hinge assembly further comprises a third set of two or more hinge joints, each having a contact member contact surface with a normal vector extending in a third direction.

Preferably the first direction, second direction and third direction are angled relative to one another.

Preferably a relative angle between the first direction and the second direction is between approximately 95 and approximately 175 degrees, more preferably between approximately 100 degrees and approximately 170 degrees or most preferably between approximately 100 degrees and 160 degrees. Preferably a relative angle between the first direction and the third direction is between approximately 200 degrees and 300 degrees, more preferably between approximately 220 degrees and 280 degrees, and most preferably between approximately 240 degrees and 270 degrees.

Preferably the first set of hinge joint(s) comprises one or more central hinge joints. Preferably the second set of hinge joint(s) comprises one or more pairs of inner hinge joints on either side of the central hinge joint. Preferably the third set of hinge joints comprises one or more pairs of outer hinge joint on either side of the first and second set of hinge joints.

Preferably the inner hinge joints are located between opposing outer sides of the first body. Preferably the outer hinge joints are located external to the outer sides of the first body.

Preferably the contact members of the first and second set of hinge joints are coupled to the second body and the hinge elements of the first and second set of hinge joints are coupled to the first body. Preferably the contact members of the first and second set of hinge joints are substantially rigidly coupled to the second body. Preferably the hinge element of the central hinge joint is flexibly coupled to the first body via a resilient member. Preferably the hinge elements of the second set of hinge joints are substantially rigidly coupled to the first body.

Preferably the contact members of the third set of hinge joints are coupled to the first body and the hinge elements of the third set of hinge joints are coupled to the second body. Preferably the contact members of the third set of hinge joints are substantially rigidly coupled to the first body. Preferably the hinge elements of the third set of hinge joints are each flexibly coupled to the second body via a resilient member. The resilient member may be an elastomer, such as Silicone.

Preferably the first set of hinge joint(s) comprises one central hinge joint. Preferably the second set of hinge joint(s) comprises one pair of inner hinge joints on either side of the central hinge joint. Preferably the third set of hinge joints comprises one pair of outer hinge joints on either side of the first and second set of hinge joints.

In some embodiments the hinge assembly comprises a fourth set of hinge joints comprising of an outermost hinge joint on an external side of each hinge joint of the third set of hinge joints. Preferably each contact member of the hinge joints of the fourth set is rigidly coupled to the second body. Preferably each outermost hinge joint has a contact member contact surface with a normal vector that substantially opposes a normal vector of the corresponding outer hinge joint of the third hinge joint set.

Preferably the hinge comprises a resilient member coupled between the first body and the second body. Preferably the resilient member couples a central hinge joint of the hinge assembly. Preferably the resilient member couples the hinge element of the central hinge joint at a surface that opposes the contact surface of the hinge element.

Preferably the resilient member is configured to resiliently flex and/or deform in directions that are substantially orthogonal to the rotational axis of the hinge assembly. Preferably the resilient member is configured to resiliently flex and/or deform in directions that are substantially orthogonal to the rotational axis of the hinge assembly and that are angled relative to a longitudinal axis of the diaphragm.

In some embodiments the resilient member is a resilient pad configured to locate within a corresponding recess of the first body. Preferably the resilient pad is a substantially soft member that is flexible and/or deformable in compression, tension and/or shear, most preferably all three. Preferably the resilient pad is an elastomer, such as a Silicone rubber.

Preferably the hinge element of the central hinge joint comprises a shim that is rigidly coupled to the resilient pad.

In some embodiments the resilient member is a metal spring.

In some embodiments the hinge assembly further comprises a biasing mechanism configured to compliantly bias the contact surface of the hinge element of each hinge joint towards the contact surface of the associated contact member, to maintain substantially consistent physical contact between the contact surface of the hinge element and the contact surface of the associated contact member during operation.

Preferably the biasing mechanism is substantially compliant.

Preferably the biasing mechanism is substantially compliant in a direction substantially perpendicular to the contact surface at the region of contact between each hinge element and the associated contact member during operation.

Preferably the biasing mechanism comprises a resilient member coupled between the first body and the second body. Preferably the resilient member couples a central hinge joint of the hinge assembly. Preferably the resilient member couples the hinge element of the central hinge joint at a surface that opposes the contact surface of the hinge element.

Alternatively, the resilient member comprises the hinge element.

Preferably the resilient member is configured to resiliently flex and/or deform in directions that are substantially orthogonal to the rotational axis of the hinge assembly. Preferably the resilient member is configured to resiliently flex and/or deform in directions that are substantially orthogonal to the rotational axis of the hinge assembly and that are angled relative to a longitudinal axis of the diaphragm.

In some embodiments the resilient member is a resilient pad configured to locate within a corresponding recess or cavity of the first body. Preferably the resilient pad is a substantially soft member that is flexible and/or deformable in compression, tension and/or shear, most preferably all three. Preferably the resilient pad is an elastomer, such as a Silicone rubber, a thermoplastic elastomer, a natural rubber, a thermoset polyether-based polyurethane, or a polyurethane material.

Preferably the hinge element of the central hinge joint comprises a shim that is rigidly coupled to the resilient pad.

In some embodiments the resilient member is a metal spring.

In one form, the biasing mechanism applies a biasing force in a direction with an angle of less than 25 degrees, or less than 10 degrees, or less than 5 degrees to an axis perpendicular to the contact surface in the region of contact between each hinge element and the associated contact member during operation.

Preferably, the biasing mechanism applies a biasing force in a direction substantially perpendicular to the contact surface at the region of contact between each hinge element and the associated contact member during operation.

Preferably the biasing mechanism is substantially compliant in a direction substantially perpendicular to the contact surface at the region of contact between each hinge element and the associated contact member during operation.

Preferably the biasing mechanism is substantially compliant in terms of that it applies a biasing force as opposed to a biasing displacement, in a direction substantially perpendicular to the contact surface at the region of contact between each hinge element and the associated contact member during operation.

Preferably the biasing mechanism is substantially compliant in terms of that the biasing force does not change greatly if, in use, the hinge element shifts slightly in a direction substantially perpendicular to the contact surface at the region of contact between each hinge element and the associated contact member during operation.

Preferably the biasing structure compliance excludes compliance associated with and in the region of contact between non-joined components within the biasing mechanism, compared to the contact member of each hinge joint.

In some embodiments the hinge system further comprises a centring system configured to maintain a relative translational position between the contact member and hinge element of each hinge joint, at least along an axis substantially parallel to the axis of rotation, and preferably also along at least one other axis substantially perpendicular to the axis of rotation, and most preferably along three substantially orthogonal axes.

Preferably the centring mechanism comprises at least one compliant component coupled between the first body and the second body positioned.

Alternatively the centring mechanism comprises one or more ligaments coupled at one end to the first body and at the other end to the second body. Preferably the centring mechanism comprises a pair of centring blocks rigidly coupled to the first body and the second body respectively, on one or both sides of the apparatus, each pair of centring blocks including a series of channels, and wherein the ligaments extend through and are rigidly coupled within the series of channels. Preferably a pair of ligaments extends through each pair of centring blocks. The ligaments may extend in varying directions to substantially restrict translational movement of the first body relative to the second body, along at least an axis substantially parallel to the axis of rotation, and more preferably at least two or more orthogonal axes.

In yet another alternative the centring mechanism is magnetic.

Preferably, in situ and during operation of the movement of the first body relative to the second body is substantially constrained by the hinge.

In some embodiments, for each hinge joint having a contact member coupled to the second body, the contact member is directly supported by a region of the second body (hereinafter referred to as "contact member support region").

Preferably each contact member support is a substantially solid body.

Preferably a geometry of each contact member support region is squat and/or thickset relative to a radius of the convex contact surface of the associated contact member (herein referred to as "contact member radius"). Preferably each contact member support region is squat and/or thickset directly adjacent or in the immediate vicinity of the associated contact member. Preferably each contact member support region consists of a greater depth and/or height and/or width than the associated contact member radius. Preferably each contact member support region consists of a relatively greater depth and height than the associated contact member radius.

Preferably each contact member support region comprises of a significant depth extending from the region of connection and away from the axis of rotation, in a direction that is angled relative to the axis of rotation, to enhance the rigidity and robustness of support to the contact member.

Preferably each contact member support region comprises of a significant depth extending from the region of connection, and away from the axis of rotation and the diaphragm, in a direction that is angled relative to the axis of rotation, to enhance the rigidity and robustness of support to the contact member.

Preferably each contact member support consists of a significant depth extending from the support region and away from the axis of rotation, in a direction that is substantially orthogonal to the axis of rotation.

Preferably each contact member support consists of a significant depth extending from the support region, and away from the axis of rotation and the diaphragm, in a direction that is substantially orthogonal to the axis of rotation.

Preferably the significant depth is greater than approximately twice the associated contact member radius, more preferably the depth is greater than approximately four times the associated contact member radius, and most preferably the depth is greater than approximately six times the associated contact member radius.

Preferably each contact member support comprises of a Young's modulus of at least approximately 8 GPa, or more preferably at least approximately 20 GPa. Preferably the second body comprises of a Young's modulus of at least approximately 8 GPa, or more preferably at least approximately 20 GPa.

Preferably each contact member support region consists of a geometry that is substantially rigid and inflexible to maintain rigidity along an axis that is substantially parallel to the axis of rotation.

Preferably the second body consists of a geometry and structure that is substantially rigid to maintain rigidity along an axis that is substantially parallel to the axis of rotation, at least in regions at or proximal to the axis of rotation, but preferably also in regions distal from the axis of rotation.

Preferably an average cross-sectional area of the second body, in a plane substantially perpendicular to the axis of rotation and averaged along a total length along the axis of rotation between and including a pair of outermost hinge joints of the hinge (herein referred to as "total length of hinge"), is significantly greater than a radius of at a convexly curved contact surface of at least one contact member supported by the second body, most preferably all contact members supported by the second body.

Preferably a square root value of an average cross-sectional area of the second body, in a plane substantially perpendicular to the axis of rotation and averaged along the total length of the hinge, is greater than approximately 20 times, or more preferably greater than approximately 30 times, and most preferably greater than approximately 40 times a radius of a convexly curved contact surface of at least one contact member supported by the second body, most preferably all contact members supported by the second body.

Preferably an average cross-sectional area of all contact member support regions, in a plane substantially perpendicular to the axis of rotation and averaged along the total length of the hinge, is significantly greater than a radius of at a convexly curved contact surface of at least one contact member supported by the contact member support regions, most preferably all contact members supported by the contact member support regions.

In some embodiments a square root value of an average cross-sectional area of all contact member support regions, in a plane substantially perpendicular to the axis of rotation and averaged along the total length of the hinge, is greater than approximately 20 times, or more preferably greater than approximately 30 times, and most preferably greater than approximately 40 times a radius of at a convexly curved contact surface of at least one contact member supported by the contact member supports, most preferably all contact members supported by the contact member supports.

In some embodiments a mass of the second body in grams is greater than approximately 0.0003 times the cube of the total length of the hinge, in millimetres. More preferably the mass of the second body in grams is greater than approximately 0.0005 times the cube of the total length of the hinge in millimetres. Most preferably the mass of the second body in grams is greater than approximately 0.0008 times the cube of the total length of the hinge in millimetres.

In some embodiments a mass of the second body in grams is greater than approximately 25,000 times the cube of at least one contact member radius, in mm, more preferably more than approximately 40,000 times and most preferably more than approximately 60,000 times. Preferably the mass is greater than 25,000 times the cube of each contact member radius, more preferably more than 40,000 times and most preferably more than 60,000 times.

In some embodiments a density of the second body is greater than approximately 0.07 $g/mm^3$, more preferably greater than approximately 0.001 $g/mm^3$ and most preferably greater than approximately 0.0016 $g/mm^3$.

Preferably each contact member protrudes from the associated first body or second body. Preferably each contact member protrudes from an external surface of the associated first body or second body.

Preferably the contact member of at least one hinge joint cantilevers from the associated first or second body in the associated common direction. Preferably the contact member of each hinge joint cantilevers from the associated first or second body in the associated common direction.

Preferably at least one contact member that is coupled to the second body consists of a body that increases in thickness away from the associated contact surface. Preferably each contact member that is coupled to the second body consist of a body that increases in thickness away from the associated contact surface.

Preferably at least one contact member that is coupled to the second body consists of a substantially solid body. Preferably each contact member that is coupled to the second body consists of a substantially solid body.

Preferably at least two contact members that are coupled to the second body each consist of a body that increases in thickness away from the associated contact surface, and said thicker regions of said two members are connected to one-another via a thick and robust section of the second body. Preferably said thick and robust section of the second body is a substantially solid body.

Preferably at least one contact member is substantially wedge shaped or comprises a cross-sectional profile that is substantially triangular in a plane that is substantially orthogonal to the axis of rotation. Preferably each contact member is substantially wedge shaped or comprises a cross-sectional profile that is substantially triangular in a plane that is substantially orthogonal to the axis of rotation.

In some embodiments the hinge elements of one or more hinge joints are distributed along a longitudinal hinge beam of the first body or two or more separate and longitudinally aligned hinge beams of the first body. In some embodiments the longitudinal hinge beam(s) further comprise(s) the contact member(s) of one or more other hinge joints. In some embodiments the longitudinal hinge beam(s) comprise(s) a pair of contact members extending laterally from opposing ends of the hinge beam or from opposing outer ends of the two or more hinge beams.

In some embodiments the contact members of one or more hinge joints are distributed along an exterior surface of one side of the second body.

In some embodiments the hinge comprises one or more parts configured to facilitate movement of the first body and which contribute significantly to resisting translational displacement of the first body with respect to the second body, and which has a Young's modulus of greater than approximately 8 GPa, or more preferably higher than approximately 20 GPa.

Preferably all parts of the hinge, apart from biasing mechanism, that operatively support the first body in use have a Young's modulus greater than approximately 8 GPa, or more preferably higher than approximately 20 GPa.

The hinge element and the contact member may be made from a material having a Young's modulus higher than 8 GPa, or even more preferably higher than 20 GPa for example but not limited to aluminum, steel, titanium, tungsten, ceramic and so on.

In some embodiments the hinge element and/or the contact member of each hinge joint comprises a thin corrosion-resistant coating, for example a ceramic coating or an anodized coating, at the respective contact surface.

In some embodiments one or more hinge joints is(are) rigidly coupled to the first body or the second body, either directly or via at least one intermediary components.

The intermediary components may be made from a material with a Young's modulus greater than approximately 8 GPa, or more preferably higher than approximately 20 GPa.

Preferably the intermediary component(s) incorporate a substantially planar section oriented at an angle greater than approximately 30 degrees to a coronal plane of the first body and substantially parallel to an axis of rotation of the hinge to transfer load with minimal compliance.

In preferred embodiments the first body is closely associated with each hinge joint. For example, a distance from the first body to each hinge joint, is less than half the maximum distance from the axis of rotation to a most distal periphery of the first body, or more preferably less than ⅓ the maximum distance, or more preferably less than ¼ the maximum distance, or more preferably less than ⅛ the maximum distance, or most preferably less than 1/16 the maximum distance.

In some embodiments one of the first body or the second body is effectively rigidly connected to at least a part of the hinge element of each hinge joint in the immediate vicinity of the contact region, and the other of the first body or the second body is effectively rigidly connected to at least a part of the contact member of each hinge joint in the immediate vicinity of the contact region.

Preferably whichever of the contact member or hinge element of each hinge joint that comprises a smaller contact surface radius, about an axis substantially parallel to the axis of rotation, is less than 30%, more preferably less than 20%, and most preferably less than 10% of a greatest length from the contact region, in a direction perpendicular to the axis of rotation, across all components effectively rigidly connected to a localised part of the component which is immediately adjacent to the contact region.

Preferably whichever of the contact member or hinge element of each hinge joint that comprises a smaller contact surface radius, about an axis substantially parallel to the axis of rotation, is less than 30%, more preferably less than 20%, and most preferably less than 10% of a distance, in a direction perpendicular to the axis of rotation, across the smaller out of:

The maximum dimension across all components effectively rigidly connected to the part of the contact member immediately adjacent to the point of contact with the hinge, and:

The maximum dimension across all components effectively rigidly connected to the part of the hinge element immediately adjacent to the point of contact with the contact member.

Preferably the contact member of each hinge joint comprises a radius at the contact surface that is less than 30%, more preferably less than 20%, and most preferably less than 10% of: a length from the contact region, in a direction perpendicular to the axis of rotation to a terminal end of the second body, and/or a longitudinal length of the second body.

Preferably each hinge joint is configured to allow the contact member to move in a substantially rotational manner relative to the hinge element.

Preferably the contact member is configured to roll against the hinge element with insignificant sliding during operation.

Preferably the contact member is configured to roll against the hinge element with no sliding during operation.

Alternatively the contact member is configured to rub or twist on the hinge element during operation.

In some embodiments the apparatus further comprises a decoupling mounting system located between the first body and at least one other part of the apparatus for at least partially alleviating mechanical transmission of vibration between the first body and the at least one other part of the apparatus, the decoupling mounting system flexibly mounting a first component to a second component of the apparatus.

Preferably the at least one other part is a housing of the apparatus, the first component is a component of the second body and the second component is a component of the housing.

In some embodiments the apparatus is a transducer, the first body is a moveable transducing element and the second body is a transducer base structure or surround.

In some embodiments the apparatus is an audio transducer, the first body is a diaphragm and the second body is a transducer base structure or surround.

In some embodiments the apparatus is an electromechanical device.

In some embodiments the apparatus is an electronic sensor, the first body is a moveable sensing element and the second body is a relatively fixed or stable base structure or surround.

In some embodiments, the apparatus is an accelerometer, the first body is a moveable mass and the second body is a relatively fixed or stable base structure or surround.

In another aspect the invention may broadly be said to an apparatus comprising:
  a first body;
  a second body; and
  a hinge rotatably coupling the first body to the second body and having:
    at least three hinge joints having a substantially common axis of rotation, each hinge joint having a hinge element with a contact surface and an associated contact member with a contact surface that abuts the contact surface of the hinge element at a region of contact;

a biasing mechanism configured to compliantly bias the contact surface of the hinge element of each hinge joint towards the contact surface of the associated contact member, to maintain substantially consistent physical contact between the contact surface of the hinge element and the contact surface of the associated contact member during operation; and wherein the contact surface of the hinge element of each hinge joint is configured to move relative to the contact surface of the associated contact member during operation to rotatably oscillate about the axis of rotation, the contact surface of each contact member is convexly curved about an axis substantially parallel to the axis of rotation, the at least three hinge joints comprises multiple sets of one or more hinge joint(s), each set of hinge joint(s) having one or more contact member contact surface(s) with normal vector(s) at respective region(s) of contact extending in a substantially common direction, the common direction of the contact member contact surface(s) of at least one set of hinge joint(s) is angled relative to a common direction of the contact member contact surface(s) of at least one other set of hinge joint(s) between approximately 135 and 225 degrees, the biasing mechanism comprises at least one resilient pad coupled between the first body and the second body.

Preferably the second body is heavier and/or firmly fixed in position in situ, relative to the first body.

In some embodiments the common direction of the contact member contact surface(s) of at least one set of hinge joint(s) substantially opposes a common direction of the contact member contact surface(s) of at least one other set of hinge joint(s), such that the angle between the common directions is approximately 180 degrees.

Preferably at least one resilient pad couples a central hinge joint of the hinge assembly. Preferably the resilient pad couples the hinge element of the central hinge joint at a surface that opposes the contact surface of the hinge element.

Preferably a pair of resilient pads couple between the first body and second body at opposing outer sides of the first body or second body.

Preferably each resilient pad is a substantially soft member that is flexible and/or deformable in compression, tension and/or shear, most preferably all three. Preferably the resilient pad is an elastomer, such as a Silicone rubber.

In another aspect the invention may broadly be said to an apparatus comprising:
a first body;
a second body; and
a hinge operatively coupling the first body to the second body and having:
at least three hinge joints having a substantially common axis of rotation, each hinge joint having a hinge element with a contact surface and an associated contact member with a contact surface that abuts the contact surface of the hinge element at a region of contact;
a biasing mechanism configured to compliantly bias the contact surface of the hinge element of each hinge joint towards the contact surface of the associated contact member, to maintain substantially consistent physical contact between the contact surface of the hinge element and the contact surface of the associated contact member during operation; and wherein the contact surface of the hinge element of each hinge joint is configured to move relative to the contact surface of the associated contact member during operation to rotatably oscillate about the axis of rotation, the contact surface of each contact member is convexly curved about an axis substantially parallel to the axis of rotation, the at least three hinge joints comprises multiple sets of one or more hinge joint(s), each set of hinge joint(s) having one or more contact member contact surface(s) with normal vector(s) at respective region(s) of contact extending in a substantially common direction, the common direction of the contact member contact surface(s) of at least one set of hinge joint(s) is angled relative to a common direction of the contact member contact surface(s) of at least one other set of hinge joint(s) between approximately 135 and 225 degrees, the biasing mechanism comprises at least one resilient pad couples between the first body and the second body at one of said hinge joints and the hinge element of said hinge joint comprises a shim coupled to an external side of the resilient pad.

Preferably the second body is heavier and/or firmly fixed in position in situ, relative to the first body.

In another aspect the invention may broadly be said to an apparatus comprising:
a first body;
a second body; and
a hinge operatively coupling the first body to the second body and having:
at least three hinge joints having a substantially common axis of rotation, each hinge joint having a hinge element with a contact surface and an associated contact member with a contact surface that abuts the contact surface of the hinge element at a region of contact; and
wherein the contact surface of the hinge element of each hinge joint is configured to move relative to the contact surface of the associated contact member during operation to rotatably oscillate about the axis of rotation, the contact surface of each contact member is convexly curved about an axis substantially parallel to the axis of rotation, the at least three hinge joints comprises a pair of hinge joints having contact members rigidly coupled to the second body and a third hinge joint having a contact member rigidly coupled to the second body;

the pair of hinge joints have contact member contact surfaces with normal vectors at respective regions of contact extending in a first, substantially common direction, the third hinge joint has a contact member contact surface with a normal vector at the associated region of contact extending in a second direction, and wherein the first direction is angled relative to the second direction.

Preferably the second body is heavier and/or firmly fixed in position in situ, relative to the first body.

Preferably the contact members of the pair of hinge joints are rigidly coupled to an exterior surface of the second body.

Preferably the contact member of the third hinge joint is rigidly coupled to an exterior surface of the second body.

Preferably the third hinge joint is located centrally between the pair of hinge joints.

Preferably the first direction is angled relative to the second direction between approximately 135 and 225 degrees.

Any one or more of the above embodiments or preferred features can be combined with any one or more of the above aspects.

In another aspect the invention may broadly be said to consist of a hinge configured to operatively couple a first moveable body to a second, relatively stable body, the hinge comprising:
- at least three hinge joints distributed therealong and having a substantially common axis of rotation, each hinge joint having a hinge element with a contact surface and an associated contact member with a contact surface that abuts the contact surface of the hinge element at a region of contact; and
- wherein the contact surface of the hinge element of each hinge joint is configured to move relative to the contact surface of the associated contact member during operation to rotatably oscillate about the axis of rotation,
- the contact surface of each contact member is convexly curved about an axis substantially parallel to the axis of rotation, and
- the at least three hinge joints comprise multiple sets of one or more hinge joint(s), each set of hinge joint(s) having one or more contact member contact surface(s) with normal vector(s) at respective region(s) of contact extending in a substantially common direction, and
- the common direction of the contact member contact surface(s) of at least one set of hinge joint(s) is different to a common direction of the contact member contact surface(s) of at least one other set of hinge joint(s).

The hinge may be employed in any device or machine having a rotatable element operatively supported by the hinge including, for example, but without limitation, an electronic measurement device, a sensor, a motor, a transducer, an electromechanical device, a microphone, an actuator, a servo, a positioner, a four bar linkage mechanism, a pinion, scales/balances, general instrumentation, a gauge, a meter, an indicator, a pointer, a watch, a clock, a timer, a potentiometer, a gyroscope, aircraft instrumentation, an ohmmeter, a voltmeter, a compass, a control unit, a relay, a flow-meter, a water jet controller, an inkjet printing nozzle positioner, a laser or light positioner, a mirror positioner, a sensor positioner, a recording head positioner, an audio stylus, a seismic sensor, a strain meter, a creep meter, a tilt meter, a geophone, a thermometer and the like. In some embodiments, the device is an electromechanical device, such as an accelerometer.

The hinge may comprise any one or more of the preferred or alternative features or embodiments of any one or more of the abovementioned apparatus inventions.

In another aspect the invention may broadly be said to an electromechanical device comprising:
- a first body or structure (hereinafter referred to as "the first body");
- a second body or structure (hereinafter referred to as "the second body"); and
- a hinge configured to operatively couple the first body to the second body and having:
  - at least three hinge joints having a substantially common axis of rotation, each hinge joint having a hinge element with a contact surface and an associated contact member with a contact surface that abuts the contact surface of the hinge element at a region of contact; and
  - wherein the contact surface of the hinge element of each hinge joint is configured to move relative to the contact surface of the associated contact member during operation to rotatably oscillate about the axis of rotation,
  - the contact surface of each contact member is convexly curved about an axis substantially parallel to the axis of rotation, and
  - the at least three hinge joints comprise multiple sets of one or more hinge joint(s), each set of hinge joint(s) having one or more contact member contact surface(s) with normal vector(s) at respective region(s) of contact extending in a substantially common direction, and
  - the common direction of the contact member contact surface(s) of at least one set of hinge joint(s) is different to a common direction of the contact member contact surface(s) of at least one other set of hinge joint(s).

In another aspect the invention may broadly be said to an accelerometer comprising:
- a first body or structure (hereinafter referred to as "the first body");
- a second body or structure (hereinafter referred to as "the second body"); and
- a hinge configured to operatively couple the first body to the second body and having:
  - at least three hinge joints having a substantially common axis of rotation, each hinge joint having a hinge element with a contact surface and an associated contact member with a contact surface that abuts the contact surface of the hinge element at a region of contact; and
  - wherein the contact surface of the hinge element of each hinge joint is configured to move relative to the contact surface of the associated contact member during operation to rotatably oscillate about the axis of rotation,
  - the contact surface of each contact member is convexly curved about an axis substantially parallel to the axis of rotation, and
  - the at least three hinge joints comprise multiple sets of one or more hinge joint(s), each set of hinge joint(s) having one or more contact member contact surface(s) with normal vector(s) at respective region(s) of contact extending in a substantially common direction, and
  - the common direction of the contact member contact surface(s) of at least one set of hinge joint(s) is different to a common direction of the contact member contact surface(s) of at least one other set of hinge joint(s).

In another aspect the invention may broadly be said to consist of a method of manufacturing a transducer base structure of an audio transducer comprising the steps of:
A. forming or rigidly coupling a first set of one or more contact members of a hinge on a first base structure component, each contact member of the first set having a contact surface that is convexly curved about a first common axis, and wherein the step of forming or rigidly coupling the first set of contact member(s) includes orienting the contact member surface(s) such that normal vector(s) of the contact surface(s) face in a first common direction;

B. forming or rigidly coupling a second set of one or more contact member contact surfaces on a second base structure component, each contact member of the second set having a contact surface that is convexly curved about a second common axis that is substantially parallel or collinear to the first common axis, and wherein the step of forming or rigidly coupling the second set of contact member(s) includes orienting the contact member surface(s) such that normal vector(s) of the contact surface(s) face in a second common direction that is angled relative to the first common direction;

C. axially aligning the first set of contact members with the second set of contact members such that the contact surface(s) of the first set of contact member(s) and the contact surface(s) of the second set of contact members share a substantially common tangential plane.

Preferably the method further comprises the step:

D. fixing the position of the second component relative to the first component when axial alignment is achieved.

In some embodiments step C. comprises:
(i) Measuring axial alignment;
(ii) adjusting a position of the second component relative to the first component of the transducer base structure; and
(iii) repeating steps (i) and (ii), if necessary, until the contact surface(s) of the first and second set of contact members share a substantially common tangential plane.

In some embodiments step C(ii) comprises the use of a system of motors or manual winders that translates the second component relative to the first component.

In some embodiments step C(ii) comprises bending or deforming the second component to adjust the position relative to the first component.

In some embodiments step C. comprises the steps of:
(i) positioning the first component and the second component in a jig having an adjustment mechanism for adjusting the position of the second component relative to the first component;
(ii) adjusting a position of the second component relative to the first component of the transducer base structure using the adjustment mechanism of the jig;
(iii) repeating steps (i) and (ii), if necessary, until the contact surface(s) of the second set of contact members share a substantially common tangential plane; and
(iv) fixing the position of the second component relative to the first component when axial alignment is achieved.

In some embodiments step C. comprises:
(i) installing a prefabricated transducer diaphragm or a prefabricated complementary transducer hinge part in the appropriate position to the contact member(s) of the first set;
(ii) adjusting the position of the contact member(s) of the second set relative to the contact member(s) of the first set until correct alignment is achieved.

In some embodiments, step C(ii) includes determining if correct alignment is achieved by:
measuring the relative position of the diaphragm hinge part and comparing the measurement to a desired neutral position; and/or
measuring the fundamental resonance frequency of the diaphragm when operated and determining if the resonance frequency is at a predetermined frequency.

Preferably the pseudo-diaphragm comprises a plate shaped at one edge to form pseudo-hinge-elements of a hinge.

Preferably the first set of contact member(s) comprises a pair of outer contact members and the second set of contact member(s) comprises a single central contact member located between the pair of outer contact members.

In some embodiments step A. comprises cutting a free end of each contact member of the first set to form the contact surface thereon. Preferably the step of cutting is performed collectively on all contact members of the first set of contact members. For example wire electrical discharge machining may be used, followed by lapping in a channel shaped to match the convex profile of the contact member contact surfaces.

In some embodiments step B. comprises cutting a free end of each contact member of the second set to form the contact surface thereon. Preferably the step of cutting is performed collectively on all contact members of the second set of contact members. For example wire electrical discharge machining may be used, followed by lapping in a channel shaped to match the convex profile of the contact member contact surfaces.

In another aspect the invention may broadly be said to consist of a method of manufacturing an audio transducer diaphragm comprising the steps of:

A. forming or coupling a first set of one or more hinge elements of a hinge on diaphragm base frame, each hinge element having a contact surface, and wherein the step of forming or rigidly coupling the first set of hinge element(s) includes orienting the hinge element contact surface(s) such that normal vector(s) of the contact surface(s) face in a first common direction;

B. forming or coupling a second set of one or more hinge elements of a hinge on the diaphragm base frame, each hinge element having a contact surface, and wherein the step of forming or rigidly coupling the first set of hinge element(s) includes orienting the hinge element contact surface(s) such that normal vector(s) of the contact surface(s) face in a second common direction that is angled relative to the first common direction;

C. axially aligning the first set of hinge element(s) with the second set of hinge element(s) such that the contact surface(s) of the first set of hinge element(s) and the contact surface(s) of the second set of hinge element(s) share a substantially common tangential plane.

Preferably the method further comprises the step:

D. coupling a base region of a diaphragm body to the diaphragm base frame.

Preferably the contact surface(s) of the hinge element(s) of the first set are substantially planar.

Preferably the contact surface(s) of the hinge element(s) of the second set are substantially planar.

Preferably step C. comprises axially aligning the first set of hinge element(s) with the second set of hinge element(s) such that the contact surface(s) of the first set of hinge element(s) and the contact surface(s) of the second set of hinge element(s) share a substantially coplanar.

In some embodiments, step C. comprises:
(i) positioning the diaphragm base frame in a jig having an adjustment mechanism for adjusting the position of the first set of hinge element(s) relative to the second set of hinge element(s);
(ii) adjusting the position of the first set of hinge element(s) relative to the second set of hinge element(s) using the adjustment mechanism of the jig;
(iii) repeating steps (i) and (ii), if necessary, until the contact surface(s) of the first and second set of hinge elements share a substantially common tangential plane; and (iv) fixing the position of the first set of hinge element(s) relative to the second set of hinge element(s) when axial alignment is achieved.

In some embodiments step C(iii) comprises adjusting the position of the first set of hinge element relative to the second set of hinge elements until all contact surface(s) of the first and second set of hinge element(s) engage corresponding contact surface(s) of a first and second set of contact members of a pseudo-hinge part or pseudo-transducer base structure of the jig.

In some embodiments step C(ii) comprises flexing the diaphragm base frame to adjust the position of the first set of hinge element(s) relative to the second set of hinge element(s).

In some embodiments step C(iv) comprises the step of coupling one or more substantially rigid components to the diaphragm base frame after axial alignment of the first and second set of hinge element(s) is achieved to fix the relative positions. The substantially rigid component(s) may be one or more conductive coil(s).

In some embodiments step C(iii) comprises:
installing a diaphragm body to the diaphragm base frame;
coupling a first set of contact member(s) and a second set of contact member(s) of a transducer base structure to the first and second sets of hinge element(s) respectively to form a hinge; and
determining if correct alignment is achieved by: operating the hinge to observe a resonant frequency of the coupled diaphragm body until a predetermined fundamental frequency is achieved; and/or measuring an angle of the hinge element(s) of the second set relative to the diaphragm body in a neutral state until a desired angle is achieved.

Preferably the first set of hinge element(s) comprises a pair of outer hinge elements and the second set of hinge element(s) comprises a single central hinge element located between the outer hinge elements.

In another aspect the invention may broadly be said to consist of a method of manufacturing an audio transducer comprising the steps of:
A. constructing a diaphragm having plurality of hinge elements of a hinge;
B. constructing a transducer base structure having a plurality of contact members corresponding of a hinge corresponding to the hinge elements of the diaphragm;
C. coupling the diaphragm to the transducer base structure by engaging the hinge elements with the contact members.

Preferably step A. comprises:
(i) forming or rigidly coupling a first set of one or more hinge elements of a hinge on diaphragm base frame, each hinge element having a contact surface, and wherein the step of forming or rigidly coupling the first set of hinge element(s) includes orienting the hinge element contact surface(s) such that normal vector(s) of the contact surface(s) face in a first common direction;
(ii) forming or rigidly coupling a second set of one or more hinge elements of a hinge on the diaphragm base frame, each hinge element having a contact surface, and wherein the step of forming or rigidly coupling the first set of hinge element(s) includes orienting the hinge element contact surface(s) such that normal vector(s) of the contact surface(s) face in a second common direction that is angled relative to the first common direction;
(iii) axially aligning the first set of hinge element(s) with the second set of hinge element(s) such that the contact surface(s) of the first set of hinge element(s) and the contact surface(s) of the second set of hinge element(s) share a substantially common tangential plane.

Any one or more of the preferred features or embodiments of the diaphragm manufacture method may be combined with this aspect.

Preferably step B. comprises:
(i) forming or rigidly coupling a first set of one or more contact members of a hinge on a first base structure component, each contact member of the first set having a contact surface that is convexly curved about a first common axis, and wherein the step of forming or rigidly coupling the first set of contact member(s) includes orienting the contact member surface(s) such that normal vector(s) of the contact surface(s) face in a first common direction;
(ii) forming or rigidly coupling a second set of one or more contact member contact surfaces on a second base structure component, each contact member of the second set having a contact surface that is convexly curved about a second common axis that is substantially parallel or collinear to the first common axis, and wherein the step of forming or rigidly coupling the second set of contact member(s) includes orienting the contact member surface(s) such that normal vector(s) of the contact surface(s) face in a second common direction that is angled relative to the first common direction;
(iii) axially aligning the first set of contact members with the second set of contact members such that the contact surface(s) of the first set of contact member(s) and the contact surface(s) of the second set of contact members share a substantially common tangential plane.

Any one or more of the preferred features or embodiments of the transducer base structure manufacture method may be combined with this aspect.

In another aspect the present invention broadly consists of an electronic device comprising:
a housing having cavity for an electroacoustic transducer, the cavity having a substantially shallow depth dimension; and
an electroacoustic transducer located within the cavity and having a diaphragm that is configured to rotatably oscillate about an axis of rotation between a first terminal position and second terminal position during operation; wherein the electroacoustic transducer is oriented within the cavity such that the diaphragm axis of rotation is substantially parallel to the depth dimension of the cavity, and wherein a total linear displacement of a terminal end of the diaphragm most distal from the axis of rotation along a plane that is substantially orthogonal to the depth dimension is substantially the same or greater than the depth dimension of the cavity.

Preferably the total displacement of the terminal end is greater than the depth dimension.

In some embodiments the depth dimension is smaller than a width dimension and a length dimension of the cavity. For example the depth dimension may be less than approximately 0.9 times the width and/or length dimensions, or less than approximately 0.8 times the width and/or length dimensions, or less than approximately 0.7 times the width and/or length dimensions.

In some embodiments the cavity depth dimension is greater than approximately 0.5 times a depth of the housing, or greater than approximately 0.6 times a depth of the housing or greater than approximately 0.7 times a depth of the housing.

In some embodiments the cavity depth dimension at the location of the transducer is greater than approximately 0.5 times a depth of the housing, or greater than approximately 0.6 times a depth of the housing or greater than approximately 0.7 times a depth of the housing.

In some embodiments a maximum diaphragm dimension along an axis substantially parallel to the axis of rotation in situ, is greater than approximately 0.5 times a depth dimension of the housing, or greater than approximately 0.6 times a depth dimension of the housing, or greater than approximately 0.7 times a depth dimension of the housing.

In some embodiments a maximum diaphragm dimension along an axis substantially parallel to the axis of rotation in situ, is greater than approximately 0.5 times a depth dimension of the housing at the location of the transducer, or greater than approximately 0.6 times a depth dimension of the housing at the location of the transducer, or greater than approximately 0.7 times a depth dimension of the housing at the location of the transducer.

In some embodiments a depth of the cavity is significantly smaller than a width dimension and/or length dimension of the housing. Preferably the depth of the cavity is significantly smaller than the width and the length dimensions of the housing. For example the cavity depth dimension may be less than approximately 0.2 times the width and/or length dimensions of the housing, or less than approximately 0.15 times the width and/or length dimensions of the housing, or less than approximately 0.1 times the width and/or length dimensions of the housing.

In some embodiments the electroacoustic transducer further comprises a transducing mechanism cooperatively operative with the diaphragm in use. Preferably the transducing mechanism comprises an electrically conductive coil or coils that is(are) rigidly attached to the diaphragm and a magnetic element or structure that generates a magnetic field, and wherein the electrically conductive coil(s) is(are) located in the magnetic field in situ to move within the magnetic field during operation.

In some embodiments the diaphragm comprises one or more peripheral regions that are free from physical connection with a peripheral wall of the cavity. Preferably the one or more peripheral regions that are free from physical connection with the cavity wall constitute at least 20% of a length or perimeter of an outer periphery of the diaphragm, more preferably at least 50% of the length or perimeter of the outer periphery and most preferably at least 80% of the length or perimeter of the outer periphery.

In some embodiments the one or more peripheral regions constitute approximately an entire length or perimeter of an outer periphery of the diaphragm.

In some embodiments the one or more peripheral regions of the diaphragm that are free from physical connection with an interior of the housing are supported by a fluid. Preferably the fluid is a ferromagnetic fluid.

In some embodiments the one or more peripheral regions of the diaphragm are separated from the cavity wall by a relatively small air gap.

In some embodiments the diaphragm comprises a body that is substantially thick. For example, the diaphragm body may comprise a maximum thickness that is at least about 11% of a maximum length dimension of the body. More preferably the maximum thickness is at least about 14% of the maximum length dimension of the body. Alternatively or in addition the diaphragm body may comprise a maximum thickness that is at least about 15% of a length of the body, or more preferably at least about 20% of the length of the body. Alternatively or in addition the diaphragm body may comprise a thickness greater than approximately 8% of a shortest length along a major face of the diaphragm body, or greater than approximately 12%, or greater than approximately 18% of the shortest length.

In some embodiments the electroacoustic transducer comprises a hinge system for rotatably coupling a diaphragm of the transducer to a transducer base structure of the transducer. Preferably the transducer base structure forms part of the excitation mechanism. Preferably the transducer base structure comprises a magnetic structure.

In some embodiments the hinge system comprises a bearing. Preferably the bearing comprises a bearing race. Preferably the bearing comprises a ball bearing.

In some embodiment, the hinge system comprises a hinge assembly having one or more hinge joints, wherein each hinge joint comprises a hinge element and a contact member, the contact member having a contact surface; and wherein, during operation each hinge joint is configured to allow the hinge element to move relative to the associated contact member while maintaining a substantially consistent physical contact with the contact surface, and the hinge assembly biases the hinge element towards the contact surface. Preferably, hinge assembly further comprises a biasing mechanism and wherein the hinge element is biased towards the contact surface by the biasing mechanism. Preferably the biasing mechanism is substantially compliant. Preferably the biasing mechanism is substantially compliant in a direction substantially perpendicular to the contact surface at the region of contact between each hinge element and the associated contact member during operation.

In some embodiments the transducer is coupled to the housing via a transducer suspension system configured to at least partially alleviate mechanical transmission of vibration between the diaphragm and the housing. Preferably the transducer suspension system flexibly mounts the transducer to the housing to at least partially alleviate mechanical transmission of vibration between the diaphragm and the housing. Preferably the suspension system substantially eliminates or at least reduces mechanical transmission of vibration between the diaphragm and the grille.

In some embodiments the transducer suspension system comprises at least one node axis mount that is configured to locate at or proximal to a node axis location associated with the electroacoustic transducer.

In some embodiments the suspension system comprises at least one distal mount configured to locate distal from a node axis location associated with the electroacoustic transducer.

Preferably the at least one node axis mount is relatively less compliant and/or relatively less flexible than the at least one distal mount.

In some embodiments, the transducer suspension system comprises a pair of node axis mounts located on either side of a transducer base structure of the electroacoustic transducer. Preferably each node axis mount comprises a bush located in an aperture on either side of the transducer base structure that is aligned with the node axis location. Preferably each node axis mount further comprises a pin located through the bush on either side of the transducer base structure. Preferably the pin is rigidly coupled at either end to the housing of the device. The pin may be threadably engaged at either end to the housing.

In some configurations of this embodiment the first component may be a transducer base structure. Alternatively the first component may be a sub-housing extending about the audio transducer. The second component may be a housing or surround for accommodating the audio transducer or the audio transducer sub-housing.

In some embodiment the suspension system comprises a flexible and/or resilient element coupled between the transducer base structure and the housing. The element may be made from silicone rubber or natural rubber. Alternatively the element may be formed from metal springs.

In some embodiments the device further comprises an audio tuning system having an equaliser that is operable to adjust a frequency response of an output audio channel associated with the electroacoustic transducer, and wherein the equaliser is configured to operate in a first mode of operation where the device is intended for near-field use in close proximity to a user's head and a second mode of operation where the device is intended for far-field use distal to a user's head, and wherein the in the first mode of operation the equaliser is configured to adjust the frequency response of the output audio channel based on a diffuse field frequency response.

In some embodiments the equaliser comprises a first equalisation frequency response associated with the first mode of operation. Preferably the first equalisation frequency response comprises an increasing magnitude from approximately 400 Hz to approximately 2000 Hz. Preferably the first equalisation frequency response comprises a higher average magnitude across a treble frequency range relative to mid-level and/or bass frequency ranges.

Preferably the diffuse field frequency response comprises:
a substantially continuously increasing magnitude from approximately 0 dB at approximately 100 Hz to approximately 15 dB at approximately 2500 Hz; and
a substantially uniform magnitude from approximately 2500 Hz to approximately 3200 Hz; and
a substantially decreasing magnitude from approximately 15 db at approximately 3200 Hz to approximately 7 dB at approximately 10 kHz.

In some embodiments the equaliser further comprises a base boost component associated with the first equalisation frequency response.

Preferably the bass boost component results in an increased magnitude, of the frequency response of the audio system, over a bass frequency band of approximately 20 Hz to 200 Hz relative to a diffuse field frequency response magnitude over the bass frequency band.

In some embodiments the audio tuning system further comprises a bass optimisation module.

Preferably the bass optimisation module is configured to receive an input audio signal and adjust a lower cut-off frequency of a frequency response of the device based on one or more predetermined characteristics of the output audio channel of the device.

In some embodiments the operating characteristics alternatively or additional comprise maximum operational thresholds for the one or more output audio channels, including maximum operational voltage or current threshold of the electroacoustic transducer of the output channel, or maximum diaphragm displacement threshold of the electroacoustic transducer of the output channel, or maximum amplifier output for the output channel, or any combination thereof.

Preferably the bass optimisation module is configured to compare a value or values of one or more operating parameters of the associated output audio channel with the corresponding operating parameter threshold or thresholds and adjust a lower cut-off frequency of the audio system frequency response accordingly.

In some embodiments the diaphragm comprises multiple diaphragm bodies. The diaphragm bodies may be radially spaced and configured to rotate about the axis of rotation.

In some embodiments the audio transducer comprises a single diaphragm body configured to rotate about the axis of rotation.

In some embodiments the electronic device comprises multiple electroacoustic transducers. In some embodiments the electronic device comprises multiple electroacoustic transducer cavities within the housing. The cavities may be distributed about the periphery of the housing. The cavities may be on one side of the housing. The cavities may consist of the same or differing depth dimensions. There may be a pair of cavities at either end of one side of the housing. Each cavity may comprises one or more electroacoustic transducers. Each transducer may be oriented within the respective cavity such that the diaphragm axis of rotation is substantially parallel to the depth dimension of the cavity. Preferably a total displacement of the diaphragm of each transducer is substantially the same or greater than the depth dimension of the respective cavity.

In some embodiments the electronic device comprises an electronic display unit.

In some embodiments the electronic device comprises a user interface. The user interface may be a keyboard or a touchscreen display for example.

In some embodiments the electronic device is a smart phone or a mobile phone.

In some embodiments the electronic device is a table computer.

In some embodiments the electronic device is a laptop computer.

In some embodiments the electronic device is a computer monitor.

In some embodiments the electronic device is a television.

In another aspect the present invention broadly consists of an electronic device comprising:
  a housing having cavity for an electroacoustic transducer, the cavity having a substantially shallow depth dimension; and
  an audio transducer located within the cavity and having a diaphragm that is configured to rotatably oscillate about an axis of rotation between a first terminal position and second terminal position during operation; wherein the electroacoustic transducer is oriented within the cavity such that the diaphragm axis of rotation is substantially parallel to the depth dimension of the cavity, and wherein a total linear displacement of a terminal end of the diaphragm most distal from the axis of rotation along a plane that is substantially orthogonal to the depth dimension is substantially the same or greater than the depth dimension of the cavity.

The audio transducer may be an electroacoustic transducer or an acoustoelectric transducer.

In another aspect the present invention broadly consists of an electronic device comprising:
  a housing having cavity for an electroacoustic transducer, the cavity having a depth dimension that is smaller than a substantially orthogonal length dimension and/or smaller than a substantially orthogonal width dimension of the cavity; and
  an electroacoustic transducer located within the cavity and having a diaphragm that is configured to rotate about an axis of rotation during operation; wherein the electroacoustic transducer is oriented within the cavity such that the diaphragm axis of rotation is substantially parallel to the depth dimension of the cavity; and
  wherein the housing has a depth dimension that is substantially smaller than a width dimension and a length dimension of the housing.

Preferably the housing depth dimension is significantly smaller than the housing width and the length dimensions. For example the housing depth dimension may be less than approximately 0.2 times the width and/or length dimensions of the housing, or less than approximately 0.15 times the width and/or length dimensions of the housing, or less than approximately 0.1 times the width and/or length dimensions of the housing.

In another aspect the present invention broadly consists of an electronic device comprising:
- a housing having cavity for an electroacoustic transducer, the cavity having a depth dimension that is smaller than a substantially orthogonal length dimension and/or smaller than a substantially orthogonal width dimension of the cavity; and
- an audio transducer located within the cavity and having a diaphragm that is configured to rotate about an axis of rotation during operation; wherein the electroacoustic transducer is oriented within the cavity such that the diaphragm axis of rotation is substantially parallel to the depth dimension of the cavity; and
- wherein the housing has a depth dimension that is substantially smaller than a width dimension and a length dimension of the housing.

The audio transducer may be an electroacoustic transducer or an acoustoelectric transducer.

In another aspect the present invention broadly consists of an electronic device comprising:
- a housing having:
  - a pair of opposing major faces that are connected by one or more side faces, the major faces having a relatively larger surface area than each of the side faces; and
  - a cavity for an electroacoustic transducer, the cavity having a shallow depth dimension that is substantially orthogonal to the major faces; and
- an electroacoustic transducer located within the cavity and having a diaphragm that is configured to rotatably oscillate about an axis of rotation between a first terminal position and second terminal position during operation; wherein the electroacoustic transducer is oriented within the cavity such that the diaphragm axis of rotation is substantially parallel to the depth dimension of the cavity.

In another aspect the present invention broadly consists of an electronic device comprising:
- a housing having:
  - a pair of opposing major faces that are connected by one or more side faces, the major faces having a relatively larger surface area than each of the side faces; and
  - a cavity for an electroacoustic transducer, the cavity having a shallow depth dimension that is substantially orthogonal to the major faces; and
- an audio transducer located within the cavity and having a diaphragm that is configured to rotatably oscillate about an axis of rotation between a first terminal position and second terminal position during operation; wherein the electroacoustic transducer is oriented within the cavity such that the diaphragm axis of rotation is substantially parallel to the depth dimension of the cavity.

In another aspect the present invention broadly consists of an electronic device comprising:
- a housing having cavity for an audio transducer, the cavity having a smaller depth dimension relative to a substantially orthogonal length dimension and a substantially orthogonal width dimension of the cavity; and
- an audio transducer located within the cavity and having a diaphragm that is configured to rotate about an axis of rotation during operation; wherein the audio transducer is oriented within the cavity such that the diaphragm axis of rotation is substantially parallel to the depth dimension of the cavity.

In some embodiments the diaphragm comprises multiple diaphragm bodies that are radially spaced and configured to rotate about the axis of rotation.

In some embodiments the audio transducer comprises a single diaphragm body configured to rotate about the axis of rotation.

In another aspect the present invention broadly consists of an electronic device comprising:
- a housing having cavity for an electroacoustic transducer, the cavity having a substantially shallow depth dimension; and
- an electroacoustic transducer located within the cavity and having a diaphragm that is configured to rotatably oscillate about an axis of rotation between a first terminal position and second terminal position during operation; wherein the electroacoustic transducer is oriented within the cavity such that the diaphragm axis of rotation is substantially parallel to the depth dimension of the cavity, and wherein at least a component of a total linear displacement of a terminal end of the diaphragm along a plane that is substantially orthogonal to the depth dimension is substantially the same or greater than the depth dimension of the cavity, the component of the total linear displacement being substantially orthogonal to the depth dimension and the terminal end of the diaphragm being at an end of the diaphragm most distal from the axis of rotation.

In another aspect the present invention broadly consists of an electronic device comprising:
- a housing having cavity for an electroacoustic transducer, the cavity having a substantially shallow depth dimension; and
- an audio transducer located within the cavity and having a diaphragm that is configured to rotatably oscillate about an axis of rotation between a first terminal position and second terminal position during operation; wherein the electroacoustic transducer is oriented within the cavity such that the diaphragm axis of rotation is substantially parallel to the depth dimension of the cavity, and wherein at least a component of a total linear displacement of a terminal end of the diaphragm along a plane that is substantially orthogonal to the depth dimension is substantially the same or greater than the depth dimension of the cavity, the component of the total linear displacement being substantially orthogonal to the depth dimension and the terminal end of the diaphragm being at an end of the diaphragm most distal from the axis of rotation.

Any one or more of the above embodiments or preferred features can be combined with any one or more of the above aspects.

Other aspects, embodiments, features and advantages of this invention will become apparent from the detailed description and from the accompanying drawings, which illustrate by way of example, principles of this invention.

Definitions

The phrase "audio transducer" as used in this specification is intended to encompass an electroacoustic transducer, such as a loudspeaker, or an acoustoelectric transducer such as a microphone. Although a passive radiator is not technically a transducer, for the purposes of this specification the term "audio transducer" is also intended to include within its definition passive radiators.

The phrase "force transferring component" as used in this specification means a member of an associated transducing mechanism within which:
a) a force is generated which drives a diaphragm of the transducing mechanism, when the transducing mechanism is configured to convert electrical energy to sound energy; or
b) physical movement of the member results in a change in force applied by the force transferring component to the diaphragm, in the case that the transducing mechanism is configured to convert sound energy to electrical energy.

The phrase "personal audio" as used in this specification and claims in relation to a transducer or a device means a loudspeaker transducer or device operable for audio reproduction and intended and/or dedicated for utilisation within close proximity to a user's ear or head during audio reproduction, such as within approximately 10 cm the user's ear or head. Examples of personal audio transducers or devices include headphones, earphones, hearing aids, mobile phones and the like.

The term "comprising" as used in this specification and claims means "consisting at least in part of". When interpreting each statement in this specification and claims that includes the term "comprising", features other than that or those prefaced by the term may also be present. Related terms such as "comprise" and "comprises" are to be interpreted in the same manner.

As used herein the term "and/or" means "and" or "or", or both.

As used herein "(s)" following a noun means the plural and/or singular forms of the noun.

Number Ranges

It is intended that reference to a range of numbers disclosed herein (for example, 1 to 10) also incorporates reference to all rational or irrational numbers within that range (for example, 1, 1.1, 2, 3, 3.9, 4, 5, 6, 6.5, 7, 8, 9 and 10) and also any range of rational or irrational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

The invention consists in the foregoing and also envisages constructions of which the following gives examples only. Further aspects and advantages of the present invention will become apparent from the ensuing description.

BRIEF DESCRIPTION OF THE DRAWINGS

Preferred embodiments of the invention will be described by way of example only and with reference to the drawings, in which:

FIGS. 2A-B shows the audio transducer of FIG. 1, with:
FIG. 2A being side elevation view,
FIG. 2B being a bottom view;
FIGS. 3A-F shows the audio transducer of FIG. 1, with:
FIG. 3A being a plan view,
FIG. 3B being a cross-sectional side view (section H-H),
FIG. 3C being a cross-sectional side view detail of the hinging axis from FIG. 3B,
FIG. 3D being a cross-sectional front view (section S-S),
FIG. 3E being a cross-sectional front view detail of the middle of the contact force spring from FIG. 3D,
FIG. 3F being a cross-sectional front view detail of an end of the contact force spring from FIG. 3D and of a torsional, restoring mechanism;
FIGS. 4A-E shows the audio transducer of FIG. 1, with:
FIG. 4A being a front view,
FIG. 4B being a cross-sectional side view (section AV-AV),
FIG. 4C being a cross-sectional side view detail of the hinge axis from FIG. 4B,
FIG. 4D being a 3d view,
FIG. 4E being a 3d view detail of the middle of a hinge element from FIG. 4D;
FIGS. 5A-D shows the audio transducer of FIG. 1, with:
FIG. 5A being a plan view,
FIG. 5B being a cross-sectional side view (section L-L),
FIG. 5C being a cross-sectional side view detail of coil windings from FIG. 5B,
FIG. 5D being a cross-sectional side view detail of the hinging axis from FIG. 5B;
FIGS. 6A-F shows the diaphragm of the audio transducer of FIG. 1, with:
FIG. 6A being a plan view,
FIG. 6B being a cross-sectional front view (section AB-AB),
FIG. 6C being a cross-sectional side view (section AE-AE),
FIG. 6D being a cross-sectional side view detail of the hinging axis from FIG. 6C,
FIG. 6E being a cross-sectional side view (section Y-Y),
FIG. 6F being a cross-sectional front view detail of an end of the contact force spring from FIG. 6B;
FIGS. 7A-E shows the audio transducer of FIG. 1, with:
FIG. 7A being a plan view,
FIG. 7B being a cross-sectional side view (section AP-AP),
FIG. 7C being a cross-sectional side view detail of a ligament from FIG. 7B,
FIG. 7D being a cross-sectional side view (section AL-AL),
FIG. 7E being a cross-sectional side view detail of a ligament from FIG. 7D;
FIGS. 9A-D shows the diaphragm of the audio transducer of FIG. 1, with:
FIG. 9A being a side elevation,
FIG. 9B front view,
FIG. 9C being a plan view,
FIG. 9D being a perspective view from underneath;
FIGS. 11A-E shows the diaphragm base frame and conductive coil(s) of the audio transducer of FIG. 1, with:
FIG. 11A being a three dimensional isometric view,
FIG. 11B being a side view,
FIG. 11C being a bottom view,
FIG. 11D being a top view,
FIG. 11E being a three dimensional isometric view;

FIGS. 14A-C shows the driver base structure of the audio transducer of FIG. 1, with:

FIG. 14A being a front view,

FIG. 14B being a cross sectional side view (section Q-Q),

FIG. 14C being a cross-sectional side view detail of the hinging axis from FIG. 14B;

FIGS. 15A-F shows the hinge system of the audio transducer of FIG. 1, with:

FIG. 15A being a three dimensional isometric view,

FIG. 15B being a another three dimensional isometric view;

FIG. 15C being a three dimensional isometric view of a resilient member and hinge element of the hinge system;

FIG. 15D being a front view of the resilient member and hinge element of FIG. 15C;

FIG. 15E being a close up view of a cavity section of the resilient member; and

FIG. 15F being a close up view of a contact between the hinge element and resilient member within the cavity of FIG. 15E.

FIGS. 17A-B shows the audio transducer of FIG. 16, with:

FIG. 17A being side elevation view,

FIG. 17B being a bottom view;

FIGS. 18A-K shows the audio transducer of FIG. 16, with:

FIG. 18A being a plan view,

FIG. 18B being a cross-sectional side view (section U-U),

FIG. 18C being a cross-sectional side view detail of coil windings from FIG. 18B, FIG. 18D being a cross-sectional side view detail of the hinging axis from FIG. 18B, FIG. 18E being a cross-sectional front view (section V-V), FIG. 18F being a cross-sectional front view detail of the middle of the hinging axis from FIG. 18D, FIG. 18G being a cross-sectional front view detail of a diaphragm centring system from FIG. 18D, FIG. 18H being a cross-sectional front view detail of a hinge joint from FIG. 18D, FIG. 18I being a another plan view, FIG. 18J being a cross-sectional side view (section AF-AF), FIG. 18K being a cross-sectional side view detail of the diaphragm base frame from FIG. 18J;

FIGS. 19A-E shows the diaphragm of the audio transducer of FIG. 16, with:

FIG. 19A being a plan view,

FIG. 19B being a cross-sectional side view (section AP-AP),

FIG. 19C being a cross-sectional side view detail of the hinging axis from FIG. 19B, FIG. 19D being a cross-sectional front view (section AS-AS), FIG. 19E being a cross-sectional front view detail of the middle of the hinging axis from FIG. 19D;

FIGS. 20A-B shows the diaphragm of the audio transducer of FIG. 16, with:

FIG. 20A being a three dimensional isometric view,

FIG. 20B being an expanded view;

FIGS. 21A-D shows the diaphragm base frame and conductive coil(s) of the audio transducer of FIG. 16, with:

FIG. 21A being a three dimensional isometric view,

FIG. 21B being a side view,

FIG. 21C being a front view,

FIG. 21D being a plan view;

FIG. 22A-B shows the driver base structure of the audio transducer of FIG. 16, with:

FIG. 22A being a three dimensional isometric view,

FIG. 22B being an expanded view;

FIGS. 23A-D shows the driver base structure of the audio transducer of FIG. 16, with:

FIG. 23A being a front view,

FIG. 23B being a cross sectional side view (section AN-AN),

FIG. 23C being a cross sectional side view detail of the hinging axis from FIG. 23B, FIG. 23D being a cross sectional front view (section BE-BE);

FIGS. 24A-G shows the hinge system of the audio transducer of FIG. 16, with:

FIG. 24A being a three dimensional isometric view,

FIG. 24B being another three dimensional isometric view,

FIG. 24C being a front view,

FIG. 24D being a cross sectional side view (section AX-AX),

FIG. 24E being a cross sectional side view detail from FIG. 24D,

FIG. 24F being a cross sectional side view (section AZ-AZ),

FIG. 24G being a cross sectional side view detail from FIG. 24F;

FIGS. 25A-D shows the audio transducer of FIG. 16, with:

FIG. 25A being a three dimensional isometric view,

FIG. 25B being a three dimensional isometric view detail of the diaphragm centring system from FIG. 25A, FIG. 25C being a front view, FIG. 25D being a front view detail of the diaphragm centring system from FIG. 25C;

FIGS. 26A-F shows the audio transducer of FIG. 16, with:

FIG. 26A being a plan view,

FIG. 26B being a cross sectional side view (section AF-AF),

FIG. 26C being a cross sectional side view detail of the diaphragm centring system from FIG. 26B, FIG. 26D being a cross sectional side view (section AV-AV), FIG. 26E being a cross sectional side view detail of the diaphragm centring system from FIG. 26D, FIG. 26F being a cross sectional side view detail of the diaphragm centring system from FIG. 26E;

FIGS. 28A-B shows the audio transducer of FIG. 27 with:

FIG. 28A being side elevation view,

FIG. 28B being a bottom view;

FIGS. 29A-F shows the audio transducer of FIG. 27, with:

FIG. 29A being a plan view,

FIG. 29B being a cross-sectional side view (section U-U),

FIG. 29C being a cross-sectional side view detail of coil windings from FIG. 29B, FIG. 29D being a cross-sectional side view detail of the hinging axis from FIG. 29B, FIG. 29E being a cross-sectional front view (section V-V), FIG. 29F being a cross-sectional front view detail of the middle of the hinging axis from FIG. 29E;

FIGS. 30A-B shows the audio transducer of FIG. 27, with:

FIG. 30A being a three dimensional isometric view,

FIG. 30B being a three dimensional isometric view detail of the diaphragm centring system from FIG. 30A;

FIGS. 31A-B shows the audio transducer of FIG. 27, with:

FIG. 31A being a front view,

FIG. 31B being a front view detail of the diaphragm centring system from FIG. 31A;

FIGS. 32A-F shows the audio transducer of FIG. 27, with:

FIG. 32A being a plan view,

FIG. 32B being a cross sectional side view (section AF-AF),

FIG. 32C being a cross sectional side view detail of the diaphragm centring system from FIG. 32B, FIG. 32D being a cross sectional side view (section AV-AV), FIG. 32E being a cross sectional side view detail of the diaphragm centring system from FIG. 32D, FIG. 32F being a cross sectional side view detail of the diaphragm centring system from FIG. 32E;

FIGS. 33A-C shows the audio transducer of FIG. 27, with:

FIG. 33A being a plan view,

FIG. 33B being a cross sectional side view (section AF-AF),

FIG. 33C being a cross sectional side view detail of the hinging axis from FIG. 33B;

FIG. 34A-B shows the driver base structure of the audio transducer of FIG. 27, with:

FIG. 34A being a three dimensional isometric view,

FIG. 34B being an expanded view;

FIGS. 35A-D shows the driver base structure of the audio transducer of FIG. 27, with:

FIG. 35A being a front view,

FIG. 35B being a cross sectional side view (section AN-AN),

FIG. 35C being a cross sectional side view detail of the hinging axis from FIG. 23B, FIG. 35D being a cross sectional front view (section BE-BE);

FIGS. 36A-B shows the diaphragm of the audio transducer of FIG. 27, with:

FIG. 36A being a three dimensional isometric view,

FIG. 36B being an expanded view;

FIGS. 37A-E shows the diaphragm of the audio transducer of FIG. 27, with:

FIG. 37A being a plan view,

FIG. 37B being a cross-sectional front view (section AS-AS),

FIG. 37C being a cross-sectional front view detail of the hinging axis from FIG. 37B, FIG. 37D being a cross-sectional side view (section AS-AS), FIG. 37E being a cross-sectional side view detail of the hinging axis from FIG. 37D;

FIGS. 38A-D shows the driver base structure of the audio transducer of FIG. 27, with:

FIG. 38A being a three dimensional isometric view,

FIG. 38B being a side view,

FIG. 38C being a front view,

FIG. 38D being a plan view;

FIGS. 39A-G shows the hinge system of the audio transducer of FIG. 27, with:

FIG. 39A being a three dimensional isometric view,

FIG. 39B being another three dimensional isometric view,

FIG. 39C being a front view,

FIG. 39D being a cross sectional side view (section AX-AX),

FIG. 39E being a cross sectional side view detail from FIG. 39D,

FIG. 39F being a cross sectional side view (section AZ-AZ),

FIG. 39G being a cross sectional side view detail from FIG. 39F;

FIGS. 41A-D show the hinge system of the audio transducer of FIG. 40, with:

FIG. 41A is the hinge system in an assembled state,

FIG. 41B is the hinge system in a disassembled state;

FIG. 41C is an underside perspective view of a hinge beam of the hinge system of FIG. 41A; and FIG. 41D is a topside perspective view of the hinge beam of FIG. 41C;

FIGS. 42A-J show various view of parts of the hinge system and centring mechanism of the audio transducer of FIG. 40, with:

FIG. 42A is a front view of the transducer,

FIG. 42B is a cross-section side view (section B-B),

FIG. 42C is a cross-section side view detail of a part of FIG. 42B,

FIG. 42D is a cross-section side view detail of a part of FIG. 42C,

FIG. 42E is a cross-section side view (section C-C),

FIG. 42F is a cross-section side view detail of a part of FIG. 42E,

FIG. 42G is a cross-section side view detail of a part of FIG. 42F,

FIG. 42H is a cross-section side view (section D-D),

FIG. 42I is a cross-section side view detail of a part of FIG. 42H,

FIG. 42J is a cross-section side view detail of a part of FIG. 42I;

Figure 40:
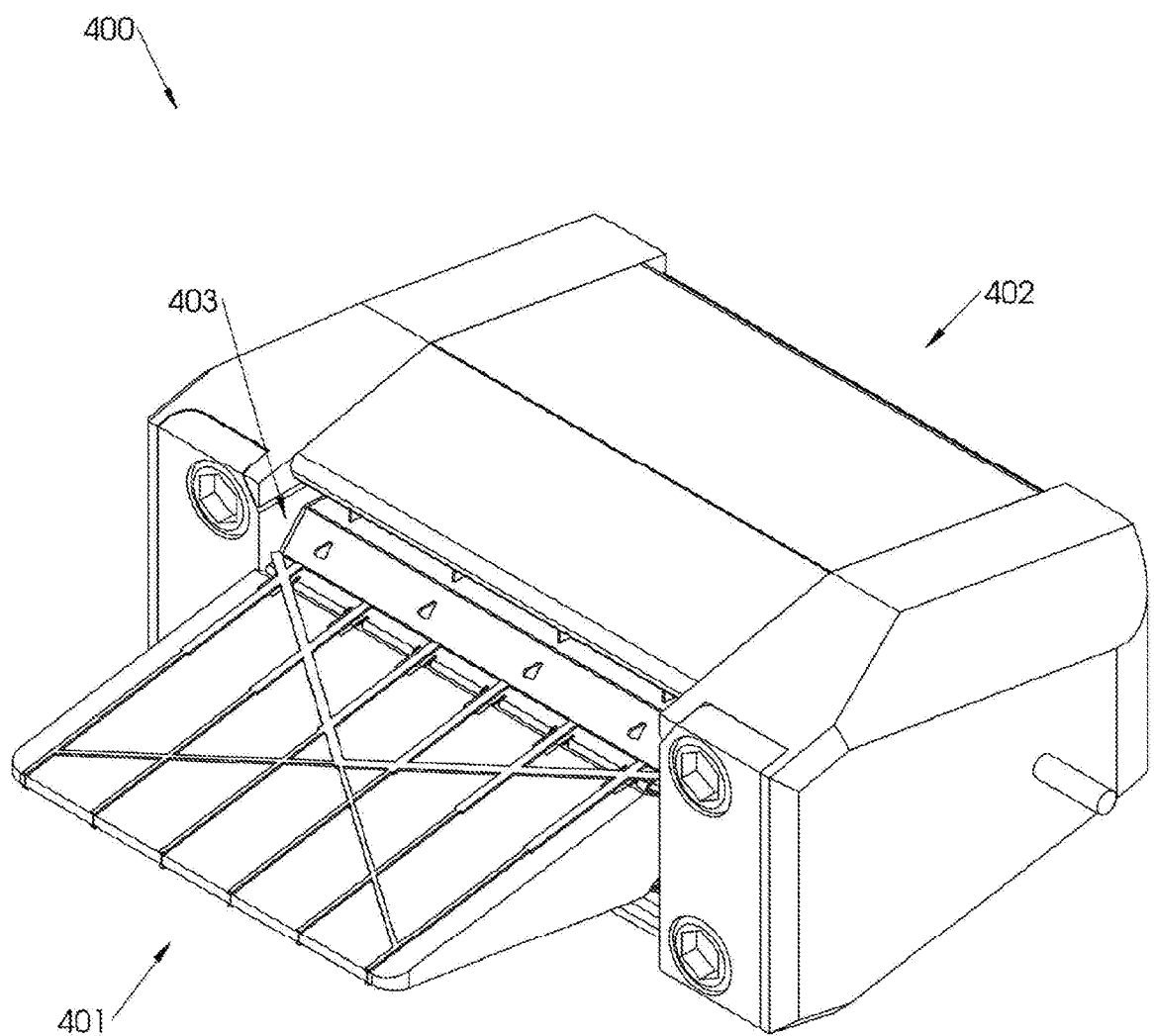
FIG. 40 shows a perspective view of a fourth preferred embodiment audio transducer of the invention.
Figure 43A:
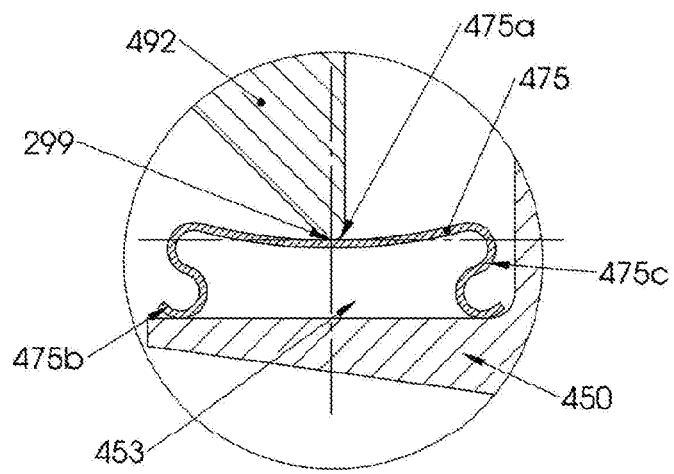
Figure 43B:
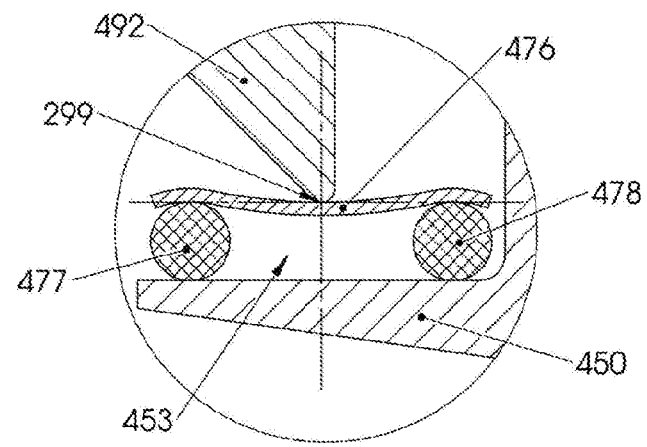
Figure 44A:
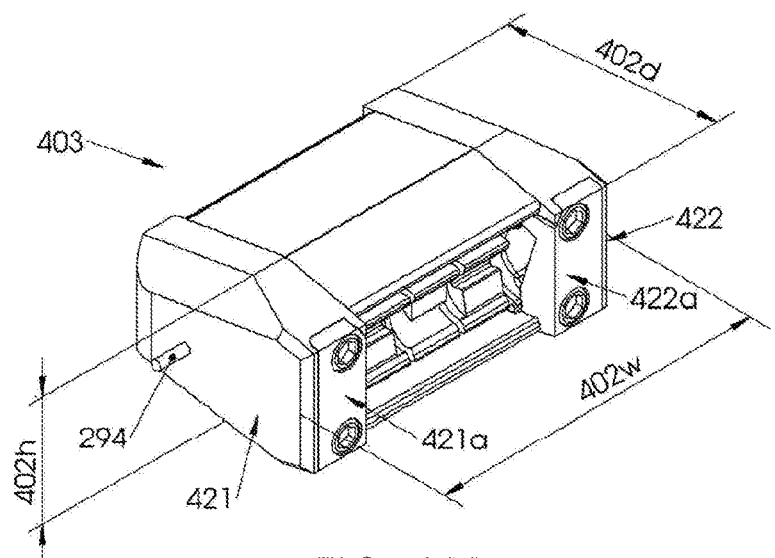
Figure 44B:
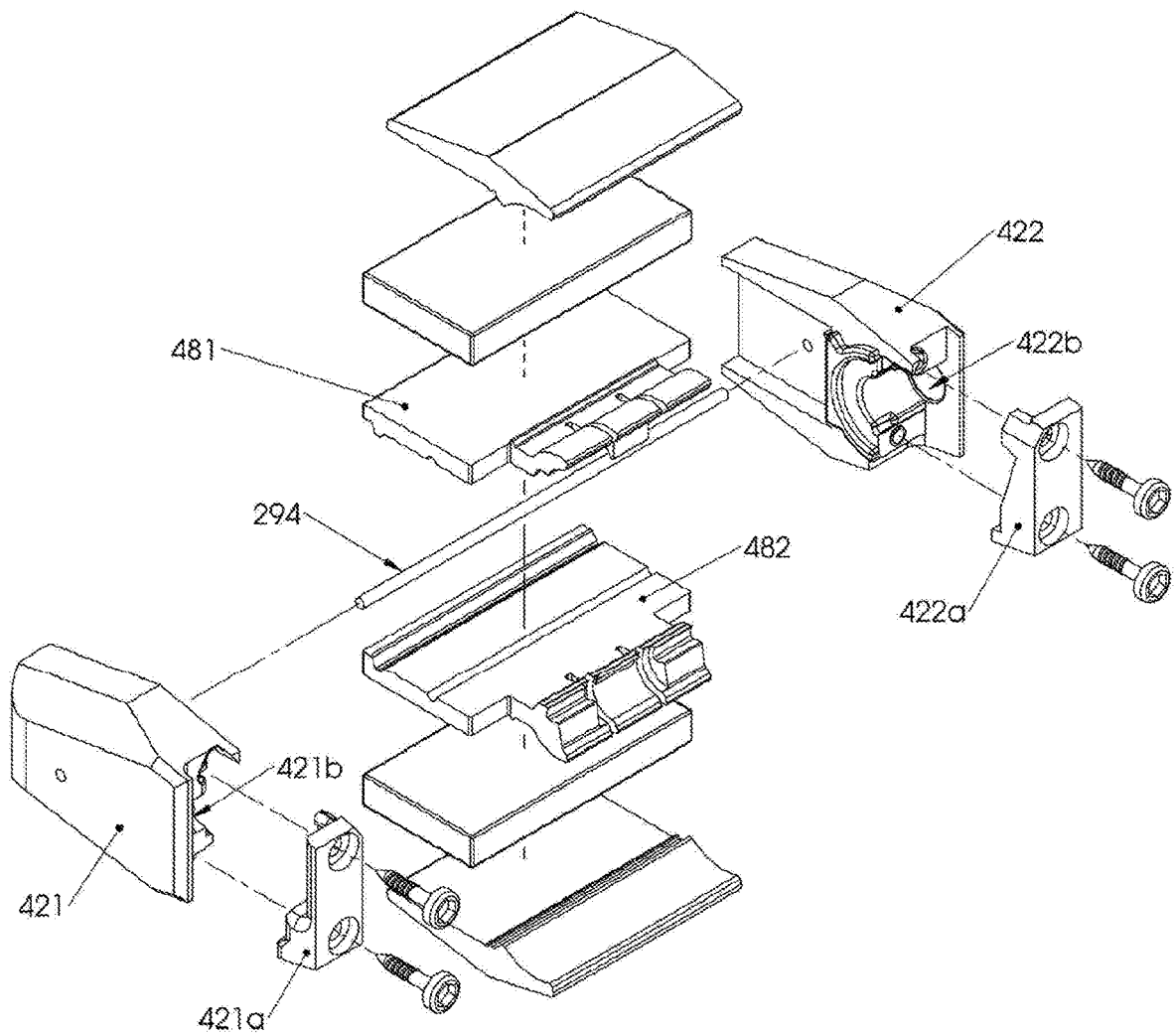
Figure 45:
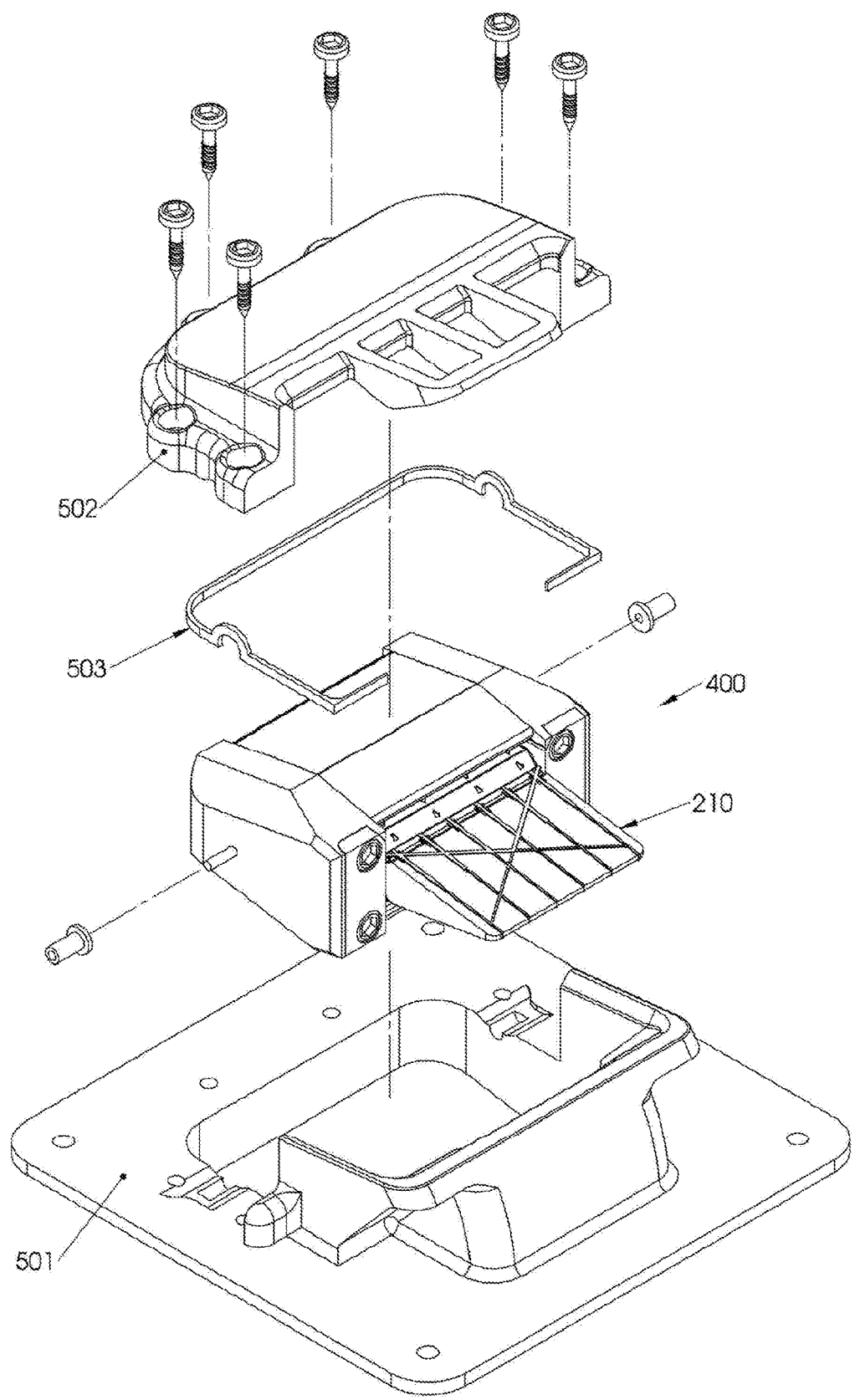
Figure 46A:
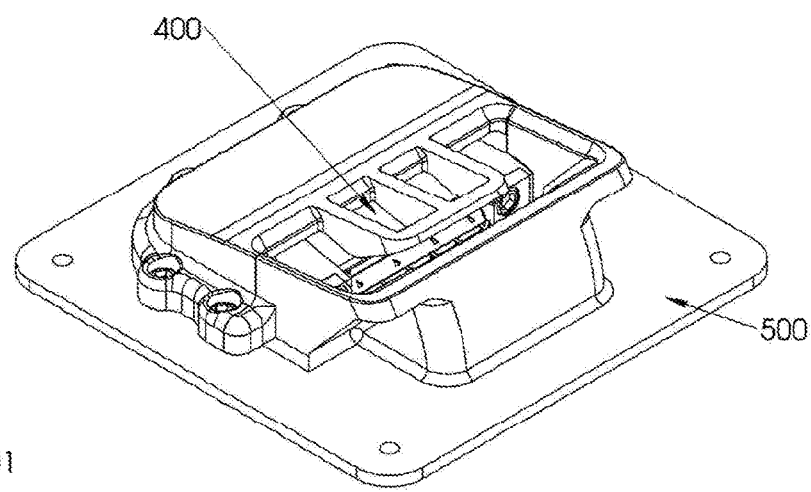
Figure 46B:
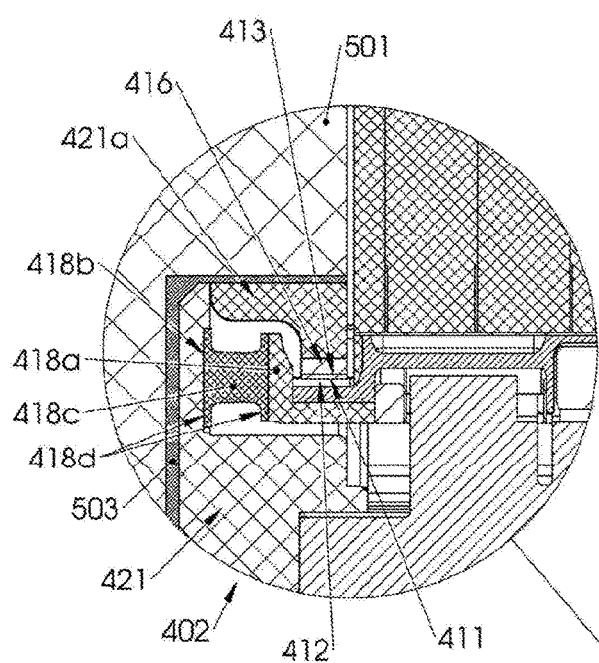
Figure 46C:
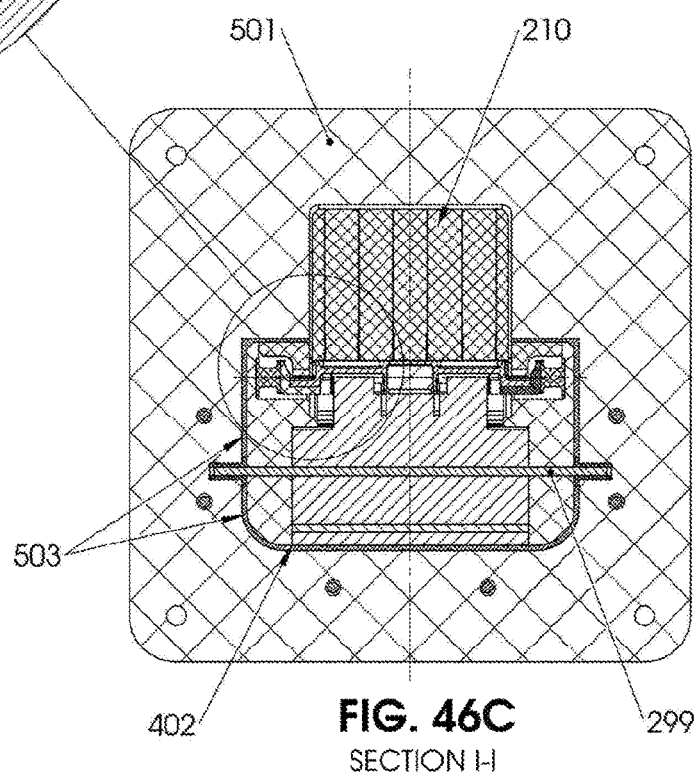
Figure 48A:
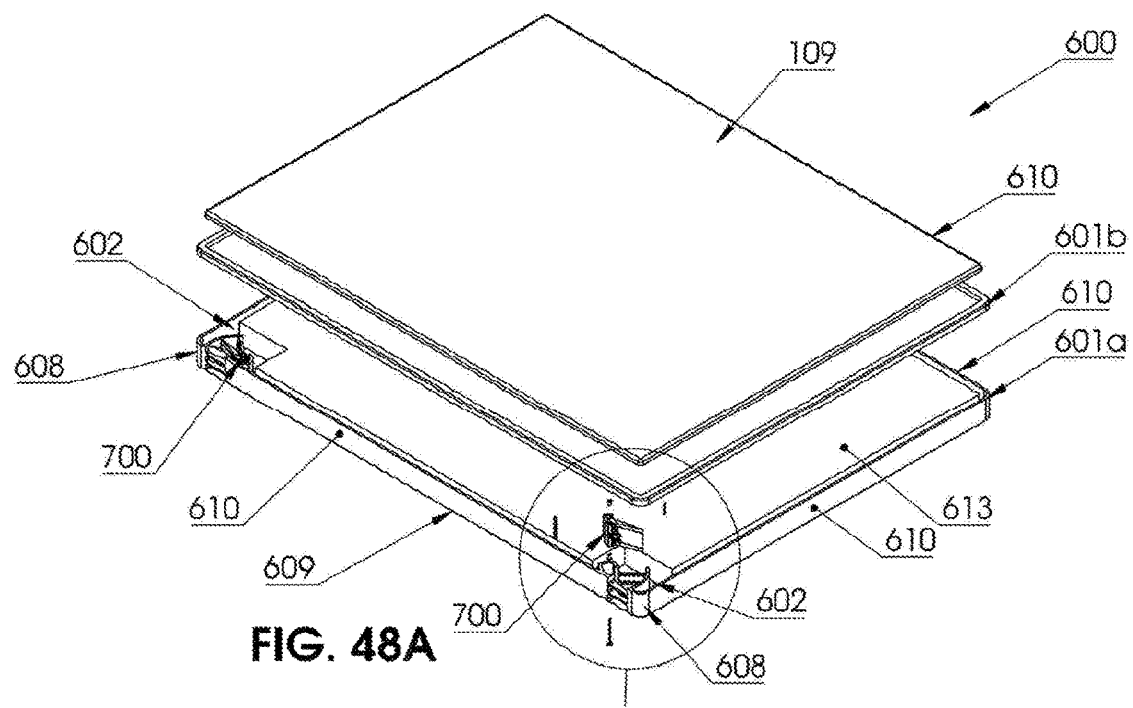

FIGS. 43A-B show two variations of a centre hinge element of the hinge system of the transducer of FIG. 40;

FIGS. 44A-B respectively show a perspective assembled view of the transducer base structure of the transducer of FIG. 40 and a perspective exploded view of the transducer base structure;

FIG. 45 is a perspective view of the transducer of FIG. 40 and a housing of an audio device in a disassembled state;

FIGS. 46A-C show various views of the transducer of FIG. 40 mounted in a housing of an audio device, where:

FIG. 46A is a perspective view of the assembled transducer and housing,

FIG. 46B is a cross-section view of the assembly of FIG. 46A,

FIG. 46C is a cross-section view detail of a part of FIG. 46B;

FIGS. 47A-G and 48A-B show various views of a preferred form audio device of the invention, in which:

FIG. 47A is an isometric view of a preferred form audio device of the invention;

FIG. 47B is a side view of the audio device of FIG. 47A;

FIG. 47C is a detail view from FIG. 47B of an electroacoustic transducer cavity of the device;

FIG. 47D is a top sectional view of the audio device;

FIG. 47E is a detail side view from FIG. 47D of an electroacoustic transducer cavity having a preferred form electroacoustic transducer of the invention accommodated therein;

FIG. 47F is a close up side sectional view of the electroacoustic transducer cavity and electroacoustic transducer of FIG. 47d;

FIG. 47G is a detail view from FIG. 47F of a section of a mounting assembly of the transducer;

FIG. 48A is an isometric exploded view of the audio device of FIG. 47A; and

Figure 48B:
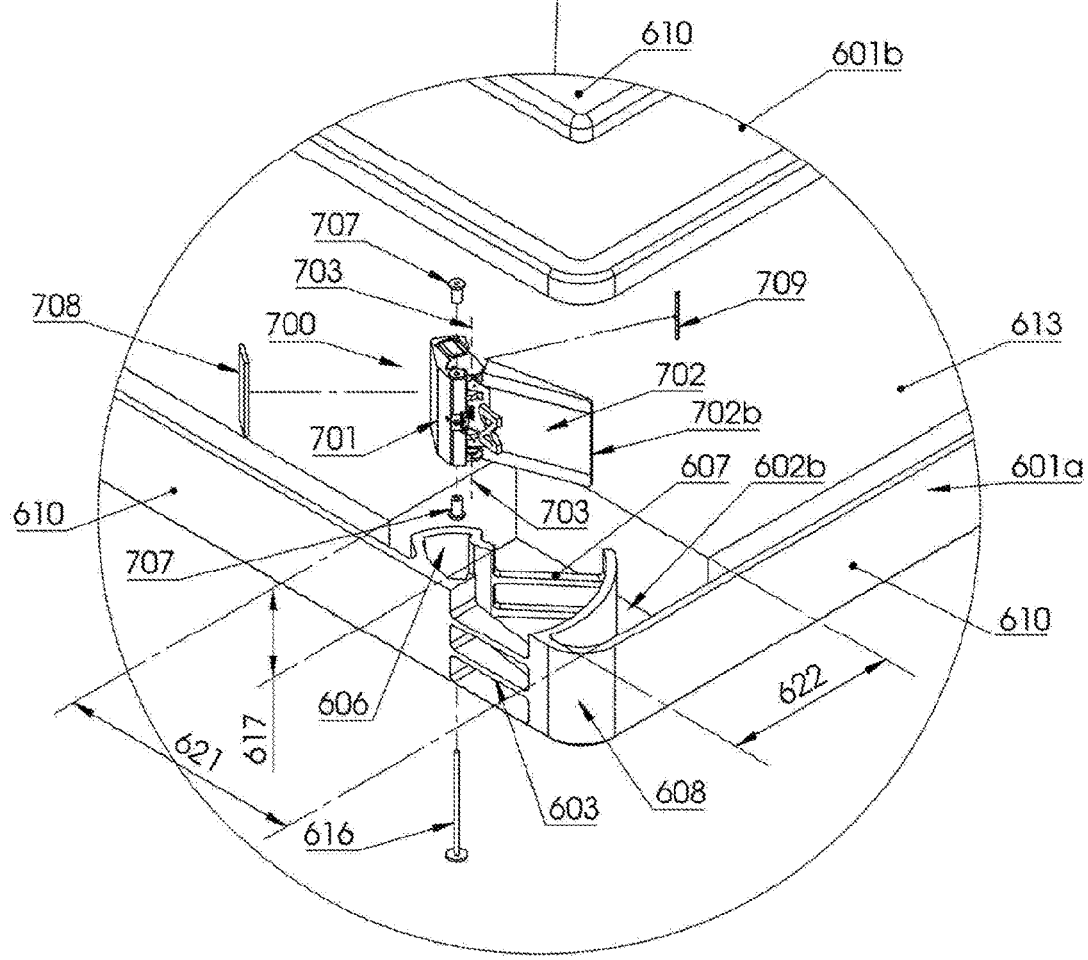
Figure 49A:
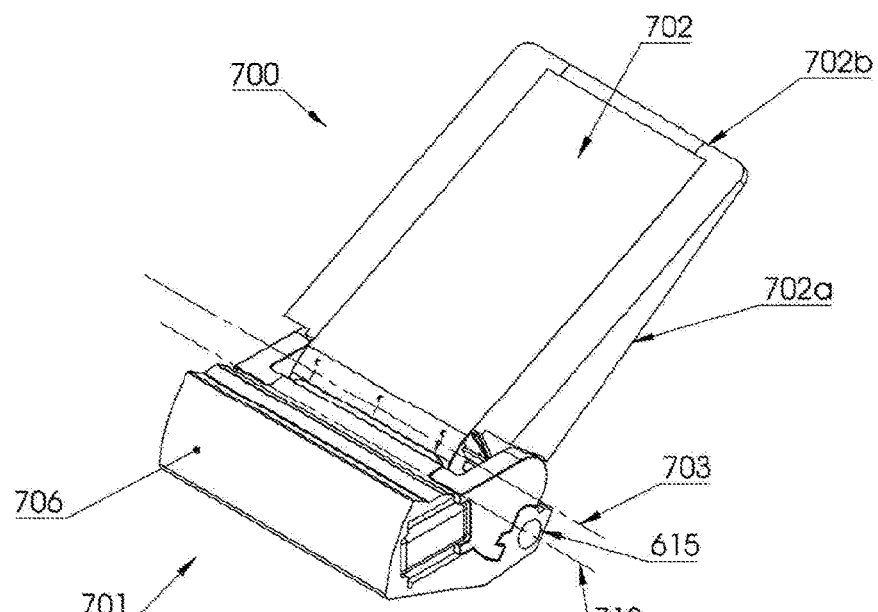
Figure 49B:
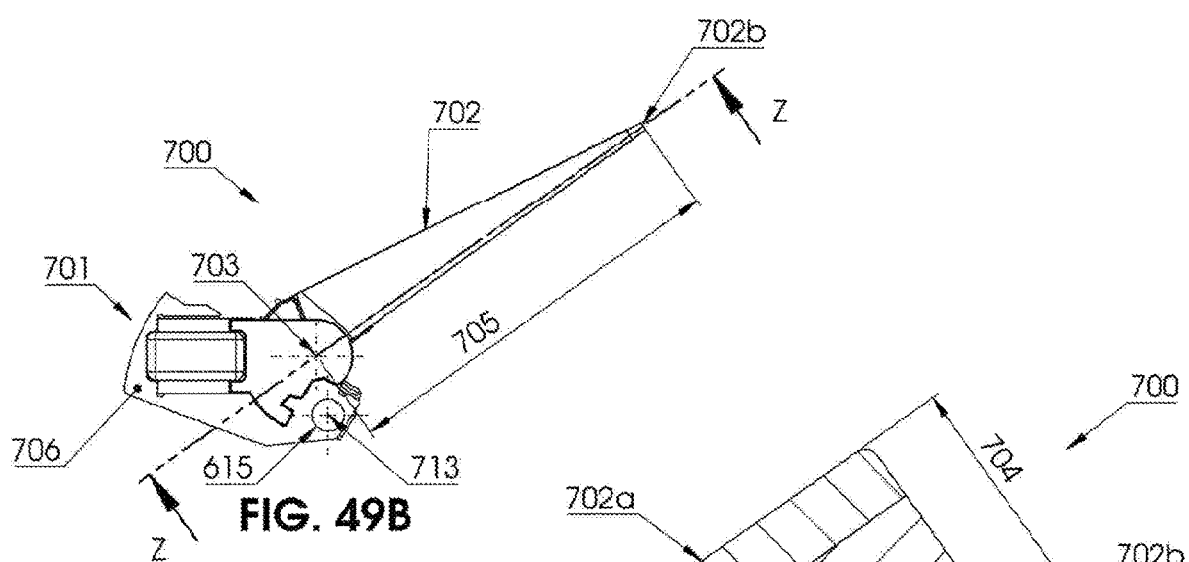
Figure 49C:
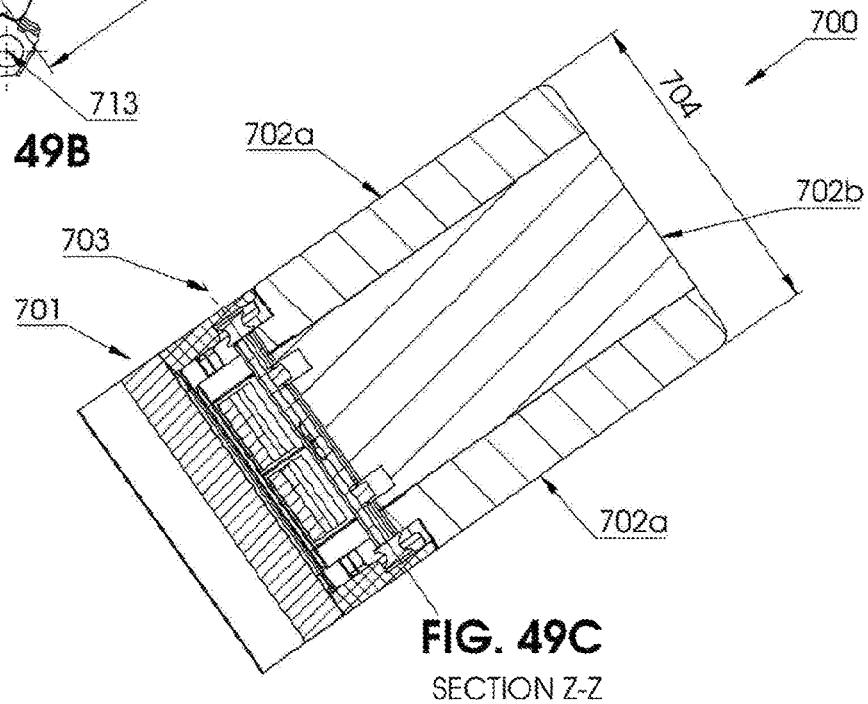

FIG. 48B is a detail view from FIG. 48A of one of the electroacoustic transducers and corresponding cavity;

FIGS. 49A-C show various views of a preferred form electroacoustic transducer located within the audio device of FIG. 47A, with:

FIG. 49A being a 3D isometric view of the transducer,

FIG. 49B being a side cross-sectional view of the transducer, and

Figure 50A:
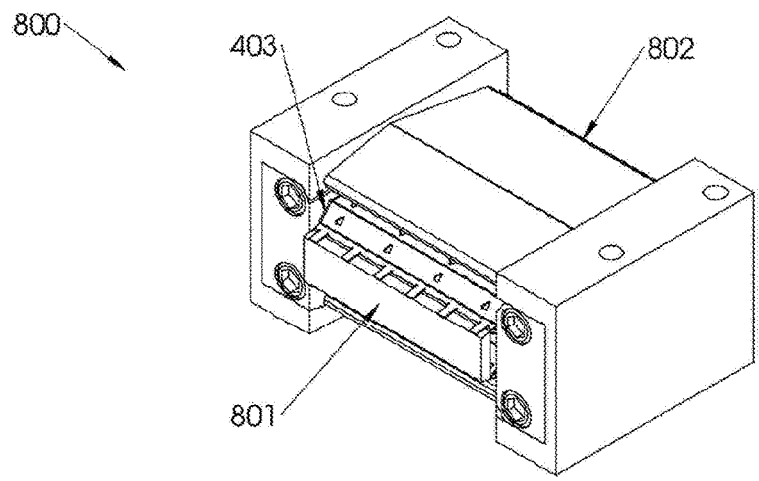
Figure 50B:
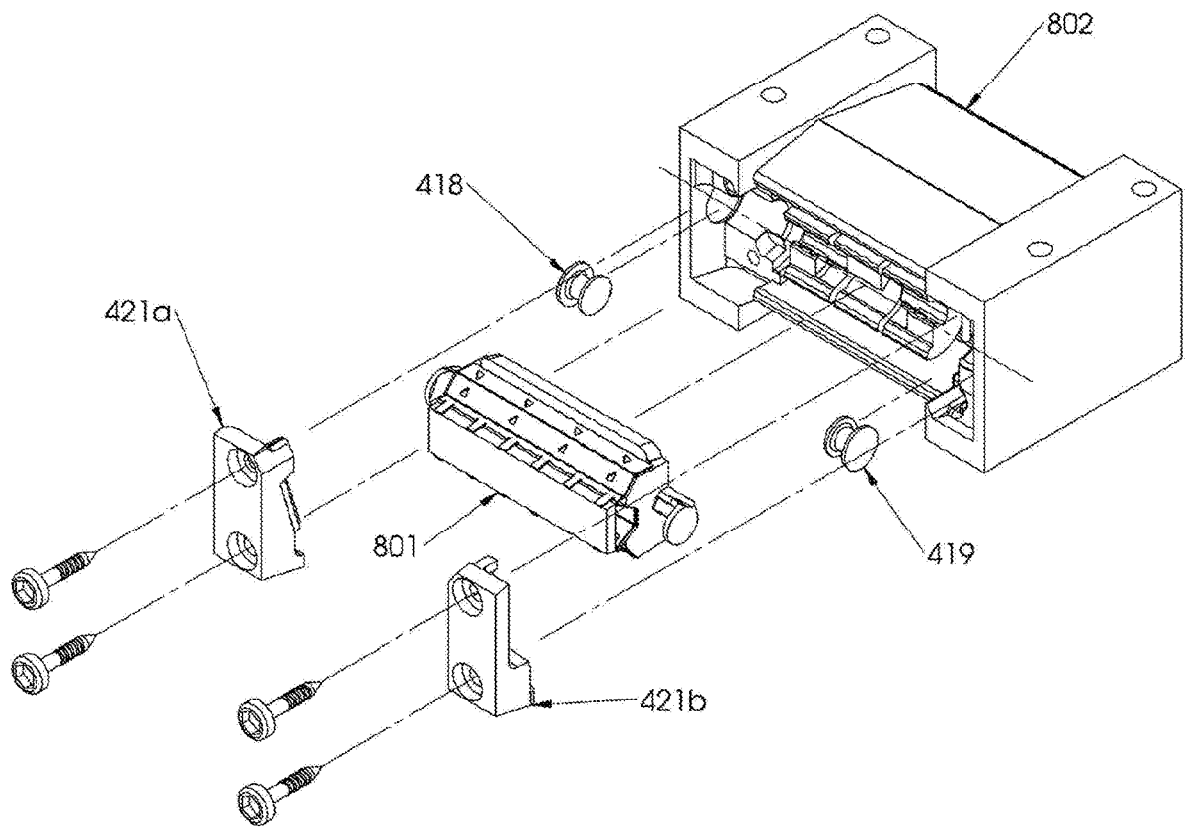

FIG. 49C being a plan cross-sectional view of the transducer;

FIGS. 50A-B show an electromechanical device incorporating the hinge system of the transducer of FIG. 40, in which:

FIG. 50A is a 3D isometric view of the device, and

FIG. 50B is an isometric exploded view the device; and

Figure 51A:
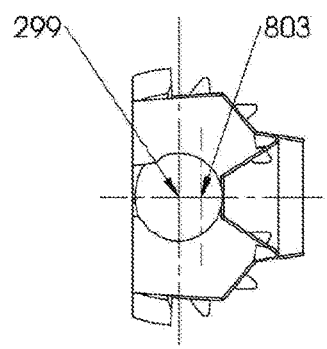
Figure 51B:
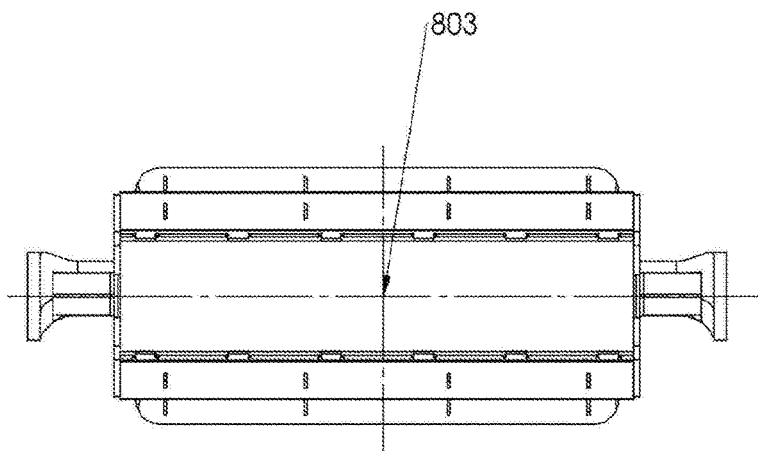
Figure 51C:
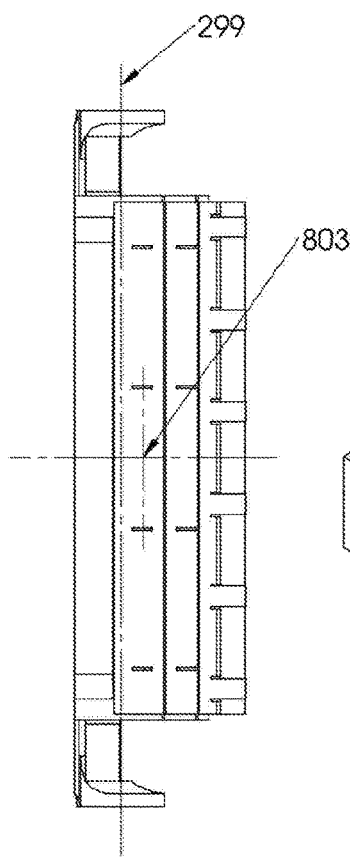
Figure 51D:
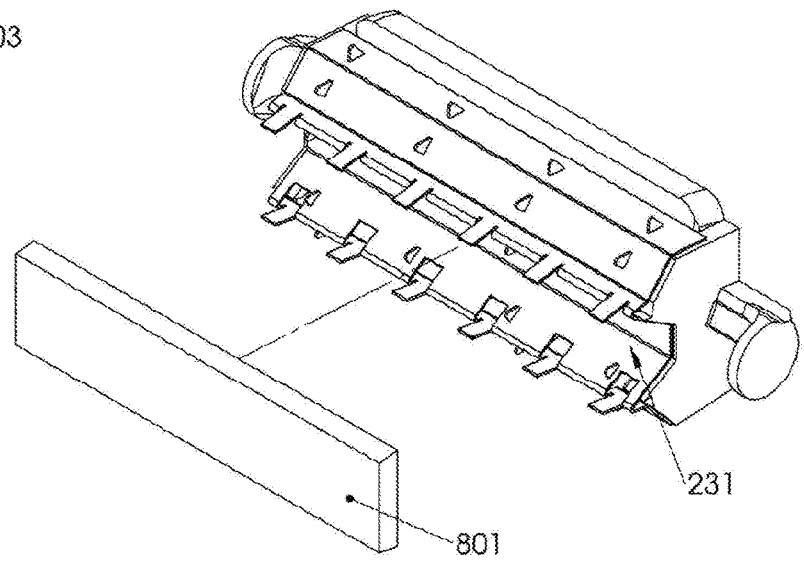
Figure 52A:
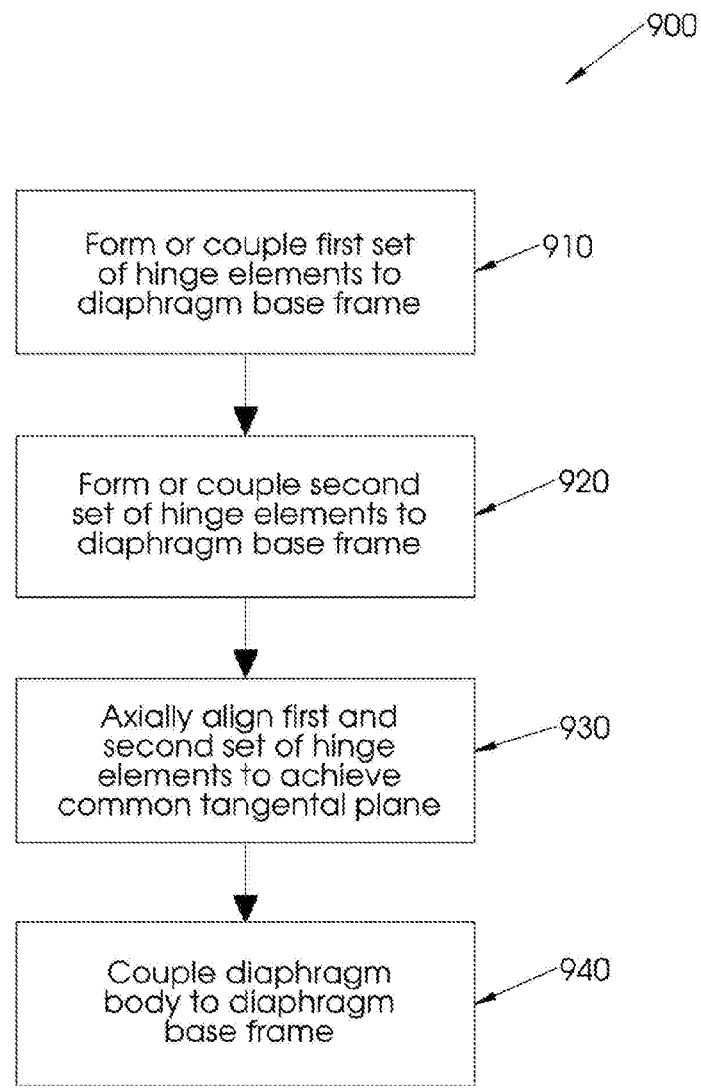
Figure 52B:
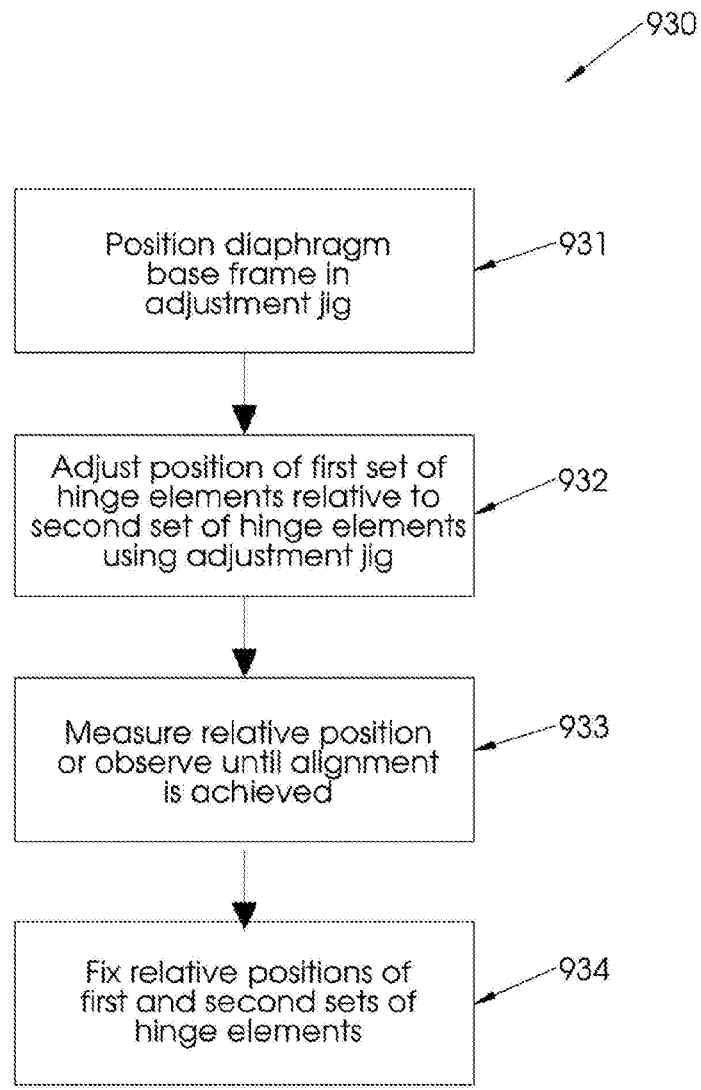
Figure 53A:
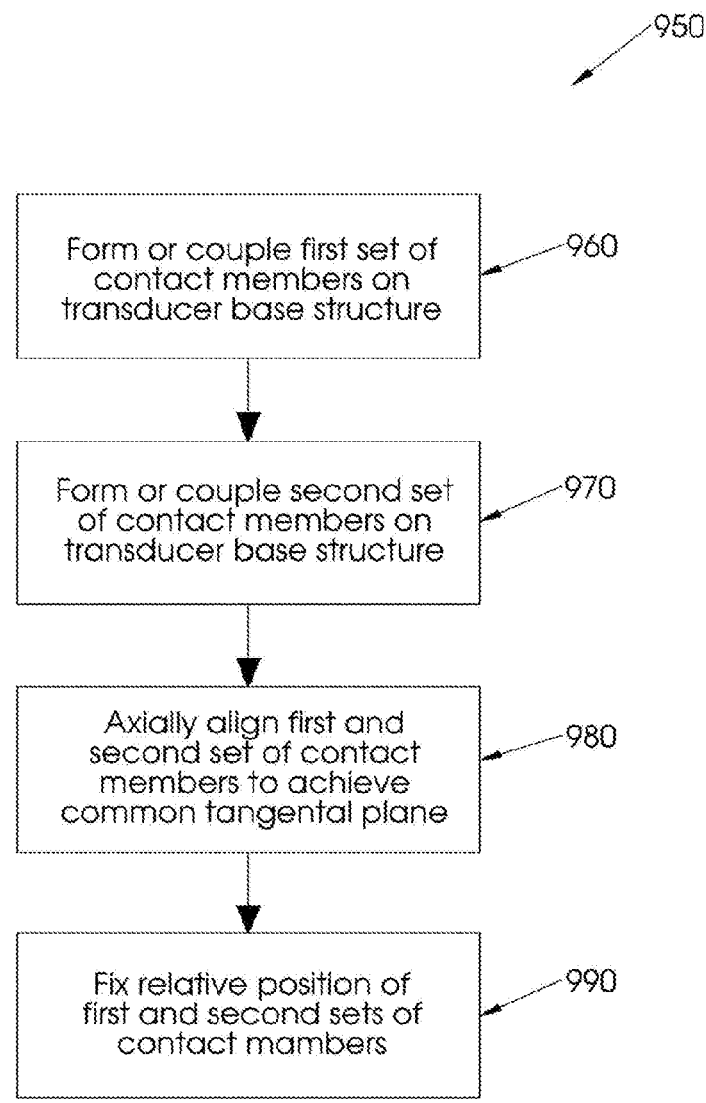
Figure 53B:
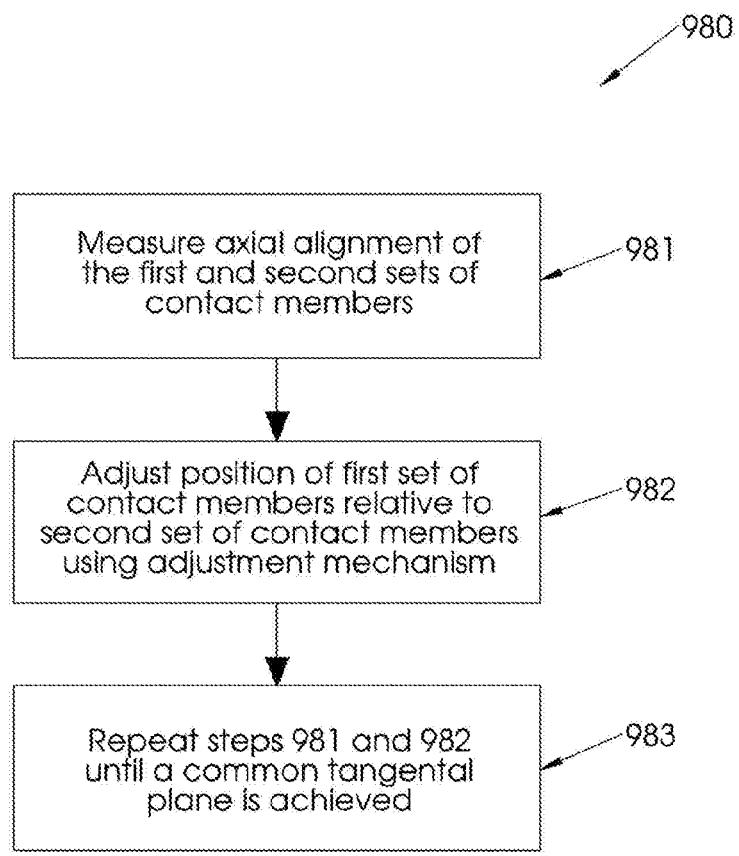
Figure 54:
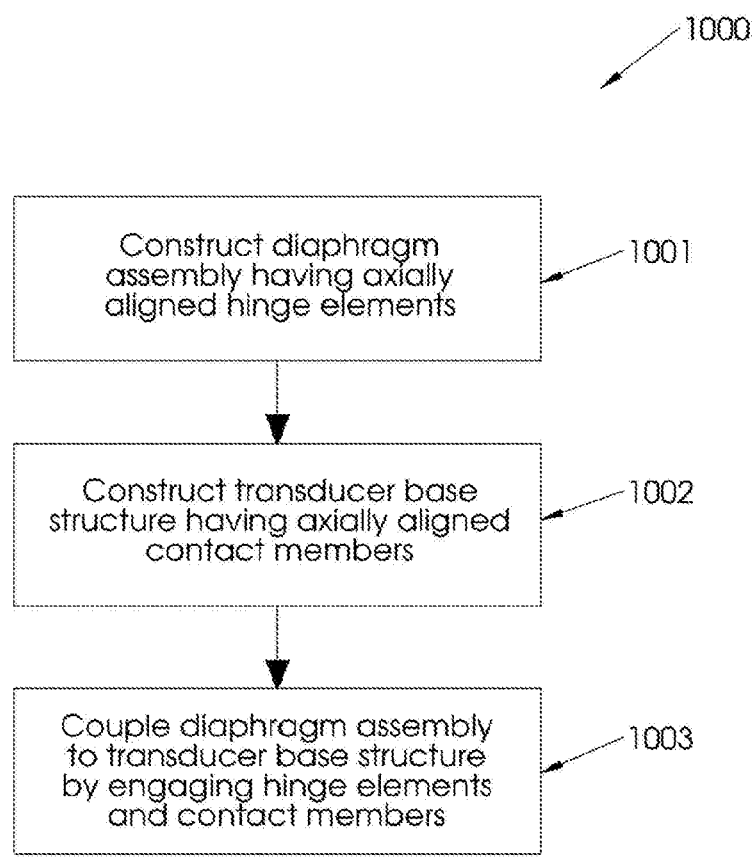

FIGS. 51A-D show various views of the hinge system used in the device of FIGS. 50A-B, in which:

FIG. 51A is a side view of the hinge system with a panel coupled showing the axis of rotation and centre of mass of the moving assembly, FIG. 51B is a front view of the hinge system with a panel coupled also showing the centre of mass location;

FIG. 51C is a top view of the hinge system with the panel coupled showing the axis of rotation and centre of mass locations; and FIG. 51D is an isometric view showing the hinge system and the panel decoupled therefrom;

FIGS. 52A-B show a preferred method for assembling or manufacturing a diaphragm of the invention;

FIGS. 53A-B show a preferred method for assembling or manufacturing a transducer base structure of the invention; and FIG. 54 shows a preferred method of assembling or manufacturing an audio transducer of the invention.

DETAILED DESCRIPTION OF PREFERRED EMBODIMENTS

Various audio transducer embodiments of the invention will now be described with reference to the figures. The embodiments or configurations of audio transducers or related structures, mechanisms, devices, assemblies or systems described herein are designed to address one or more types of unwanted resonances associated with audio transducer systems. In addition various hinge system embodiments will be described with reference to audio transducer applications. These hinge systems may be implemented in a variety of other applications as will be described in detail in section 8.

In each of the audio transducer embodiments herein described the audio transducer comprises a diaphragm assembly that is movably coupled relative to a base, such as a transducer base structure and/or part of a housing, support or baffle. The base has a relatively higher mass than the diaphragm assembly. A transducing mechanism associated with the diaphragm assembly moves the diaphragm assembly in response to electrical energy, in the case of an electroacoustic transducer. It will be appreciated that an alternative transducing mechanism may be implemented that otherwise transduces movement of the diaphragm assembly into electrical energy. In this specification, a transducing mechanism may also be referred to as an excitation mechanism.

In the embodiments of this invention, an electromagnetic transducing mechanism is used. An electromagnetic transducing mechanism typically comprises a magnetic structure configured to generate a magnetic field, and at least one conductive coil configured to locate within the magnetic field and move in response to received electrical signals. As the electromagnetic transducing mechanism does not require coupling between the magnetic structure and the conductive coil(s), generally one part of the mechanism will be coupled to the transducer base structure, and the other part of the mechanism will be coupled to the diaphragm assembly. In the preferred configurations described herein, the heavier magnetic structure forms part of the transducer base structure and the relatively lighter coil or coils form part of the diaphragm assembly. It will be appreciated that alternative transducing mechanisms, including for example piezoelectric, electrostatic or any other suitable mechanism known in the art, may otherwise be incorporated in each of the described embodiments without departing from the scope of the invention.

The diaphragm assembly is moveably coupled relative to the base via a diaphragm suspension mounting system. In particular, rotational action audio transducers in which the diaphragm rotatably oscillates relative to the base are described herein. In rotational action audio transducers, the suspension mounting system comprises a hinge system configured to rotatably couple the diaphragm assembly to the base.

The audio transducer may be accommodated with a housing or surround to form an audio transducer assembly, which may also form an audio device or part of an audio device, such as part of an earphone or headphone device which may comprise multiple audio transducer assemblies for example. In some embodiments, the transducer base structure may form part of the housing or surround of an audio transducer assembly. The audio transducer, or at least the diaphragm assembly, is mounted to the housing or surround via a mounting system. A type of mounting system that is configured to decouple the audio transducer from the housing or surround to at least mitigate transmission of mechanical vibrations from the audio transducer to the housing (and vice versa) due to unwanted resonances during operation, as described in PCT/IB2016/055472, may be utilised in any one of the embodiments of this invention.

Although various structures, assemblies, mechanisms, devices or systems described under these sections are described in association with some of the audio transducer embodiments of this invention, it will be appreciated that these structures, assemblies, mechanisms, devices or systems may alternatively be incorporated in any other suitable audio transducer assembly without departing from the scope of the invention. Furthermore, the audio transducer embodiments of the invention incorporate certain combinations of one or more of various structures, assemblies, mechanisms, devices or systems as will be described. But, it will be appreciated that a person skilled in the art may alternatively construct an audio transducer incorporating any other combination of one or more of the various structures, assemblies, mechanisms, devices or systems described herein without departing from the scope of the invention.

Methods of construction of audio transducers, audio devices or any of the various structures, assemblies, mechanisms, devices or systems have been described for some but not all embodiments for the sake of conciseness. The application of such methods to other embodiments, and alternative methods of construction that are readily apparent to those skilled in the art are not intended to be excluded from the scope of this invention. The invention is also intended to cover methods of transducing audio signals using the principles of operation and/or audio transducer features herein described.

Embodiments or configurations of audio transducers or related structures, mechanisms, devices, assemblies or systems of the invention are described in this specification with reference to electroacoustic transducers, such as loudspeaker drivers. Unless otherwise stated, the audio transducers or related structures, mechanisms, devices, assemblies or systems herein described may otherwise be implemented as or in an acoustoelectric transducer, such as a microphone. As such, the term audio transducer as used in this specification, and unless otherwise stated, is intended to include both electroacoustic (e.g. loudspeaker) and acoustoelectric (e.g. microphone) implementations.

1. First Audio Transducer Embodiment

Referring to FIGS. 1, 2A-2B, 3A-3F, 4A-4E, 5A-5D, 6A-6F and 7A-7E, a first preferred embodiment of a rotational action audio transducer 100 of the invention is shown in the assembled state.

1.1 Brief Overview

Figure 15A:
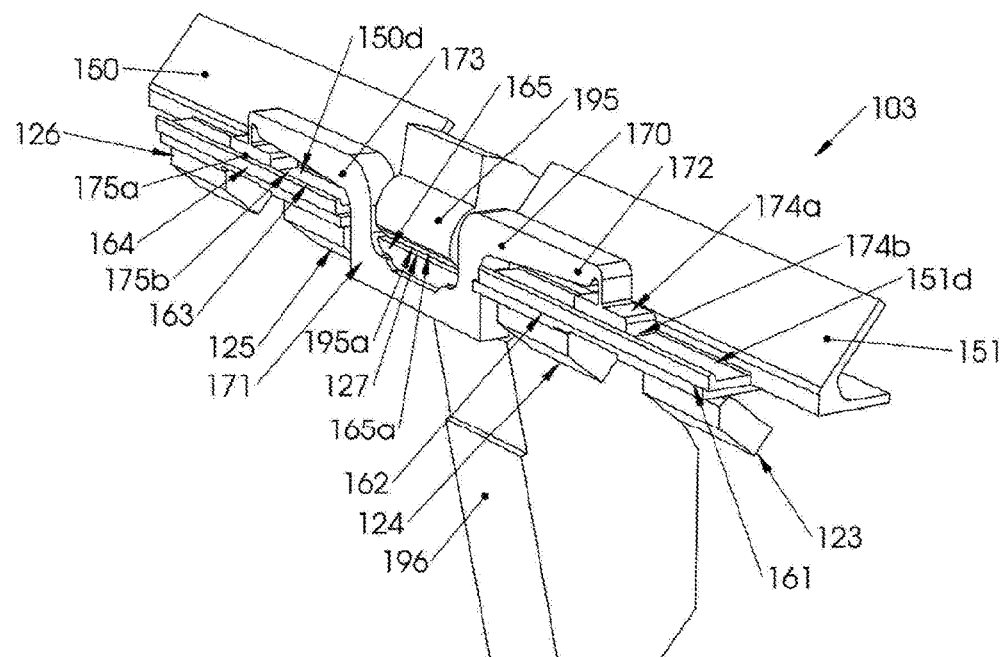
Figure 15B:
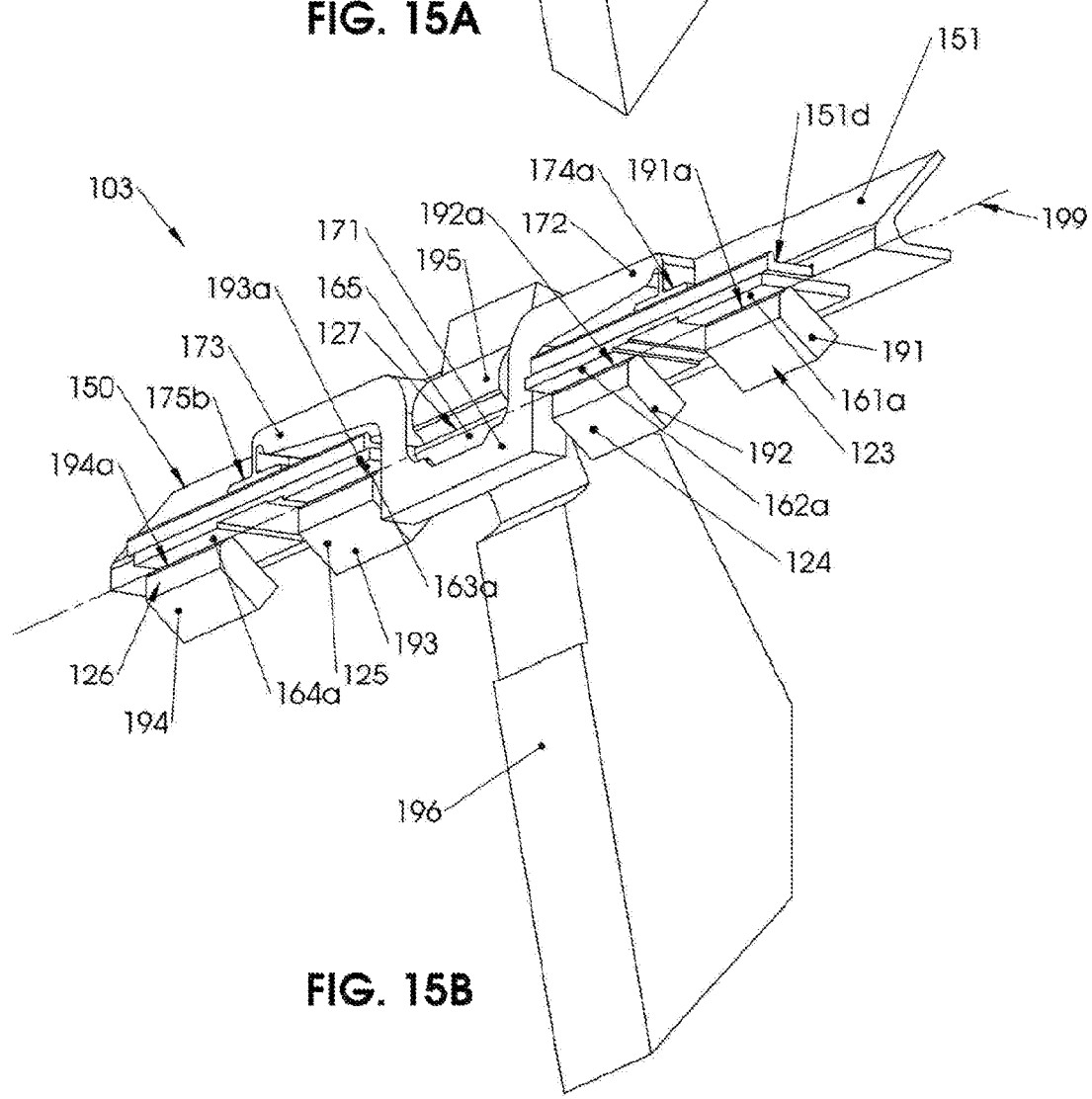
Figure 16:
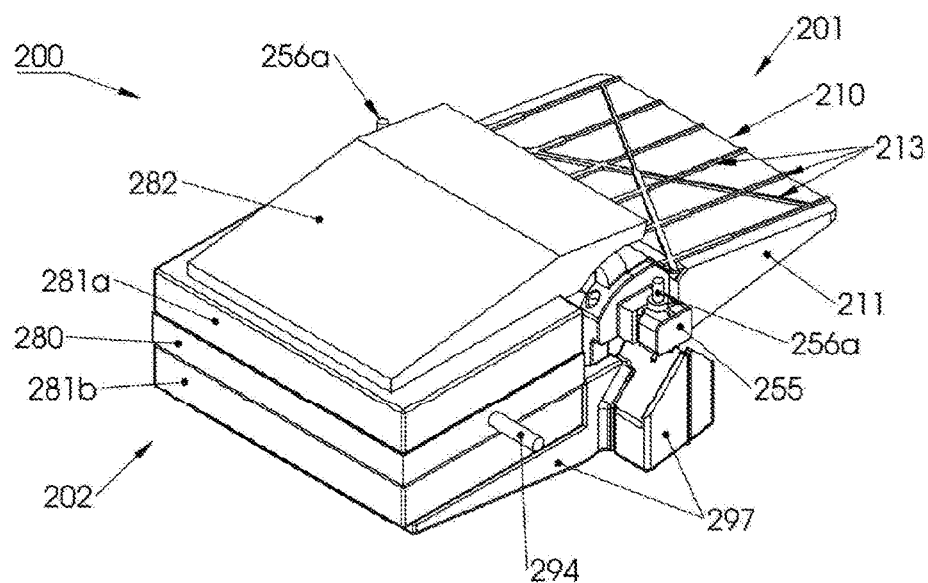
FIG. 16 shows a 3D isometric view of a second preferred embodiment of an audio transducer of the invention.
Figure 17A:
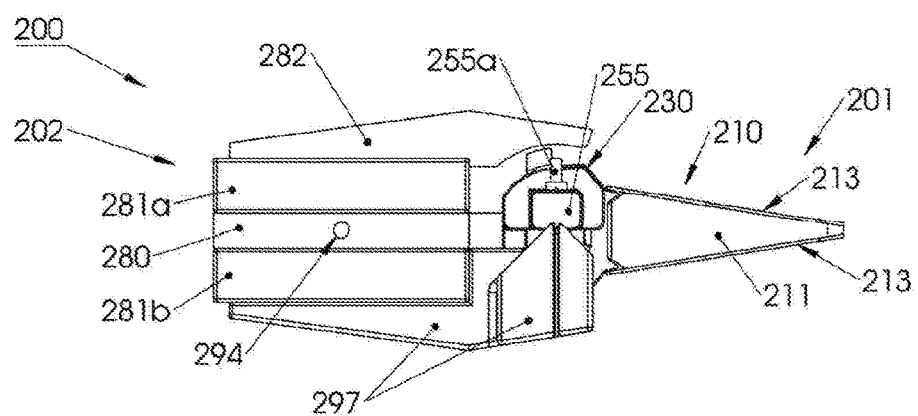
Figure 17B:
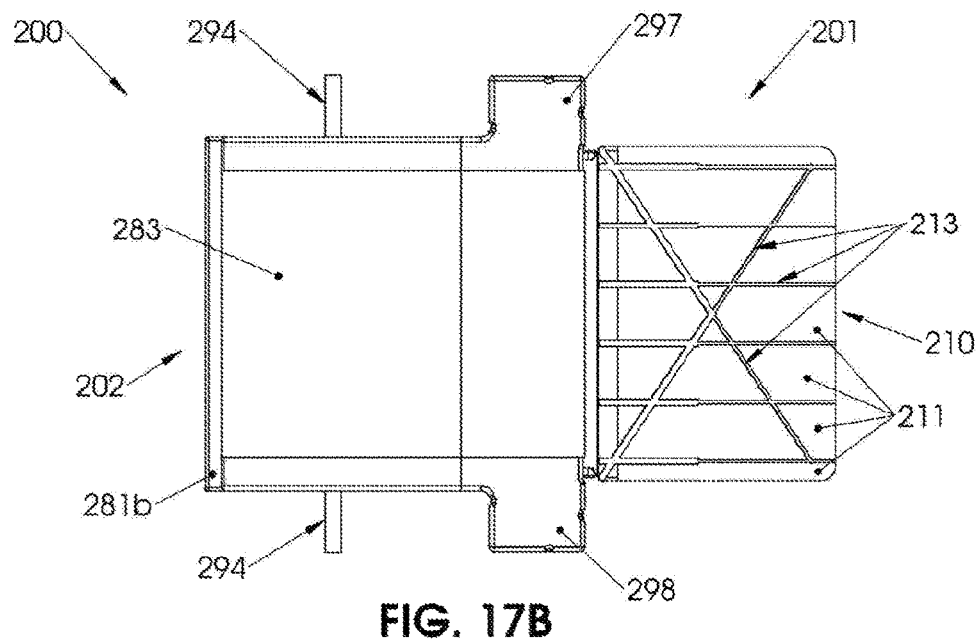

The audio transducer 100 comprises a diaphragm assembly 101 having a diaphragm 110 that is rotatably coupled to a transducer base structure 102 via a diaphragm suspension system (shown in further details in FIGS. 15A and 15B). The diaphragm assembly 101 comprises a substantially rigid diaphragm 110, the features of which are described in further detail in section 1.2 of this specification. The transducer base structure 102 comprises a substantially rigid and squat geometry and the features of which are described in further detail in section 1.3 of this specification. The diaphragm suspension system consists of a contact hinge system 103 (shown in detail in FIGS. 15A and 15B) designed partially in accordance with the principles outlined in section 3.2 of PCT patent application PCT/IB2016/055472 which are hereby incorporated by reference. The features of the contact hinge system 103 relating to this embodiment are described in detail in section 1.4 of this specification. This hinge system may be used in other devices or applications as described in section 8. A centring mechanism is used to maintain appropriate alignment between the diaphragm assembly 101 and the transducer base structure 102, which is described in further detail in section 1.5. Preferred methods of aligning the contact hinge system components are describe in section 1.6.

Although not shown in the figures, the audio transducer 100 is preferably housed within a housing of an audio device configured to accommodate the transducer. The housing may be of any type necessary to construct a particular audio device depending on the application. Applications include: stand-alone speakers, home theatre systems, mobile phones, tablets, laptops and other personal computing devices, display monitors, car audio systems, headphones, earphones, hearing aids, headsets, microphones and the like. For example, the transducer 100 may be implemented within any one of the various applications and/or housing types described in PCT patent application PCT/IB2016/055472. The audio transducer 100 may be suspended within a housing or surround using a transducer suspension system, for example via a decoupling mounting system as described in section 4 of PCT patent application PCT/IB2016/055472, which is hereby incorporated by reference. An exemplary housing and mounting system is also described in section 7 of this specification.

The audio transducer of this embodiment comprises an electromagnetic excitation/transducing mechanism comprising a permanent magnet with inner and outer pole pieces that generate a magnetic field, and one or more force transferring or generation components in the form of one or more coils that are operatively connected with the magnetic field. This is described in detail under section 1.3 of this specification. In alternative configurations of this embodiment, the transducing mechanism may be substituted by any other suitable mechanism known in the art, including for example a piezoelectric, electrostatic, or magnetostrictive transducing mechanism as outlined under section 1.3 of this specification.

The audio transducer 100 is described in relation to an electroacoustic transducer, such as a speaker. Some possible applications of the audio transducer are outlined in section 4 of this specification. In some embodiments the audio transducer 100 may be implemented as an acoustoelectric transducer, such as a microphone.

1.2 Diaphragm Assembly

Referring to FIGS. 6A-6D, 7A-7E, 8, 9A-9B, 10 and 11A-11D, the diaphragm assembly 101 of the audio transducer 100 comprises a main diaphragm body structure 110 (hereinafter referred to as "diaphragm 110") and a diaphragm base structure 130 that is rigidly coupled to a base region 110a of the diaphragm 110. The base region 110a is preferably a thicker end of the diaphragm 110, in this embodiment. But, in some configurations the base region 110a may be located elsewhere. For instance the base region 110a may be central to the diaphragm 110 in some configurations. In general, the base region 110a is typically located at or near the intended axis of rotation of the diaphragm 110 and exhibits the centre of mass in the assembled form of the diaphragm assembly 101. In this embodiment, the base region 111A is also the region that is configured to couple part of an excitation mechanism (e.g. the diaphragm base structure 130). The diaphragm base structure 130 comprises of parts of the hinge system 103 and also parts of the excitation mechanism for enabling rotation of the diaphragm 110 relative to the transducer base structure 102 in situ and during operation.

In some embodiments the audio transducer 100 may comprise of a diaphragm assembly 101 having multiple radially spaced diaphragm bodies that are rotatable about a common axis of rotation of the diaphragm assembly. Such a multiple body diaphragm construction is described in relation to embodiment D of PCT patent application PCT/IB2016/055472 for example, which is hereby incorporated by reference and which may be utilised for transducer 100 or any other transducer embodiment herein described.

1.2.1 Diaphragm

The diaphragm 110 consists of a structure that is substantially rigid during operation to resist deformation, leading to unwanted resonances. In particular, the diaphragm 110 is constructed in a manner that addresses unwanted shear and/or normal stress deformations during operation as will described in further detail below. Various design principles and examples of such a diaphragm structure are given under the "RIGID DIAPHRAGM" section of PCT/IB2016/055472 which is hereby incorporated by reference. The diaphragm 110 of this embodiment may therefore be replaced by any one of the rigid diaphragm embodiments described in PCT/IB2016/055472 or any other diaphragm designed in accordance with the same or similar principles, without departing from the scope of the invention. For instance, variations on the shape or form, material, density, mass and/or other properties, of the diaphragm body 111 and/or of the reinforcements 116, 117, 115 are possible as would be readily apparent from this reference.

The diaphragm 110 comprises a sandwich diaphragm construction including a substantially lightweight core diaphragm body part or parts 111 (hereinafter referred to as "diaphragm body 111") and normal stress reinforcement 116, 117 coupled to the diaphragm body 111 on or adjacent the major face(s) 112 of the diaphragm body 111, for resisting compression-tension stresses experienced at or adjacent the respective face 112 of the body during operation. The normal stress reinforcement 116, 117 may be coupled external to the diaphragm body 111 and on at least one major face 112, and preferably on both faces 112 (as in the illustrated example). In some embodiments one or each normal stress reinforcement 116, 117 may be coupled within the body, directly adjacent and substantially proximal to the respective major face 112 so to sufficiently, and preferably significantly, resist compression-tension stresses during operation. Preferably one or each normal stress reinforcement 116, 117 is oriented approximately parallel relative the respective major face 112 and extends within a substantial portion of the area of the face 112. In this embodiment normal stress reinforcement 116, 117 is provided on opposing, major top and bottom faces 112a, 112b of the diaphragm body 111 for evenly resisting compression-tension stresses experienced by the body 111, during operation.

Unless otherwise stated, reference to a major face or major surface of a diaphragm body is intended to mean an outer face or surface of the body that contributes significantly to the generation of sound pressure (in the case of an electroacoustic transducer) or that contributes significantly to movement of the diaphragm body in response to sound pressure (in the case of an acoustoelectric transducer) during operation, when incorporated in an audio transducer. A major face or surface is not necessarily the largest face or surface of the diaphragm body.

Figure 10:
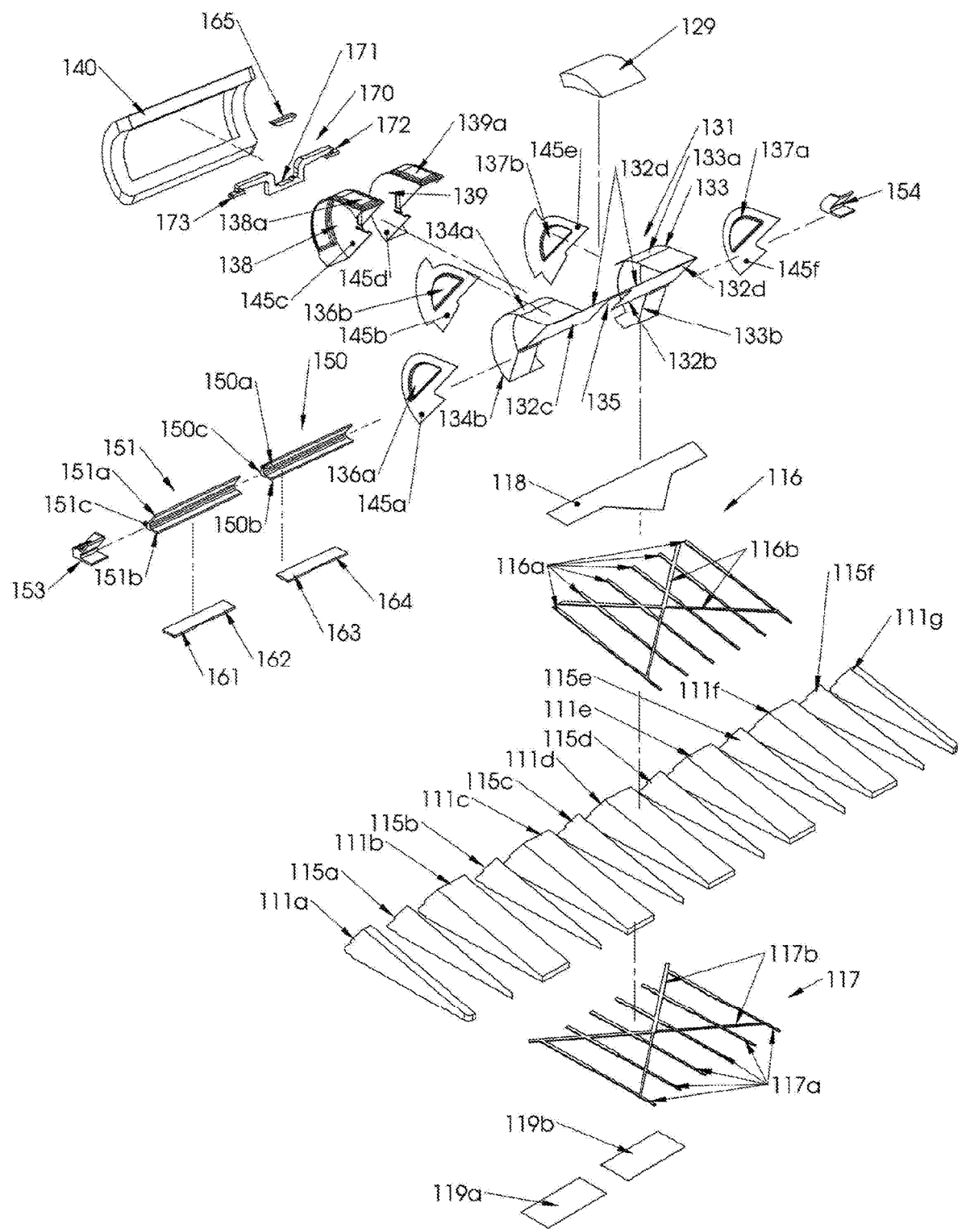
FIG. 10 shows an expanded view of the diaphragm of the audio transducer of FIG. 1.

As shown in FIG. 10, the diaphragm 110 further comprises inner shear reinforcement 115a-f embedded within the body 111 (e.g. between body parts 111a-g), and oriented at an angle relative to at least one of the major faces 112 for resisting and/or substantially mitigating shear deformation experienced by the diaphragm body 111 during operation. In this embodiment, the inner shear stress reinforcement 115a-f is(are) oriented substantially parallel to a sagittal plane of the diaphragm body 111. In this specification, reference to a sagittal plane with respect to a body, structure or assembly is intended to mean the plane which divides the body, structure or assembly into left or right parts—an example of such a plane is the cross-sectional plane of FIG. 6E. The inner shear stress reinforcement(s) 115a-f may also be substantially perpendicular relative to a peripheral edge 110b of the diaphragm that is distal and/or most distant from the base region 110a of the diaphragm 110. The inner shear stress reinforcement(s) 115a-f is(are) preferably attached to the outer normal stress reinforcement 116, 117 at one or both major faces 112 (preferably on both). In this embodiment, the inner shear stress reinforcement comprise a plurality of inner shear stress reinforcement members 115a-f distributed within the core of the diaphragm body 111 (e.g. between the body parts 111a-g).

The diaphragm body 111 is formed from a core material or materials that comprise(s) an interconnected structure that varies in three dimensions. The core material is preferably a foam or an ordered three-dimensional lattice structured material. The core material may comprise a composite material. Preferably the core material is expanded polystyrene foam. Alternative materials include polymethyl methacrylamide foam, 35 polyvinylchloride foam, polyurethane foam, polyethylene foam, Aerogel foam, corrugated cardboard, balsa wood, syntactic foams, metal micro lattices and honeycombs. In this example the diaphragm body 111 comprises a plurality of core body parts 111a-g connected to one another and having one or more (preferably a plurality of) inner shear reinforcement members 115a-f located therebetween when the diaphragm 110 is assembled. In alternative embodiments, the diaphragm body 111 comprises a single part having inner shear stress reinforcement embedded therein via an alternative method.

The inner shear stress reinforcement members 115a-f are embedded within the core of the diaphragm body 111. In this embodiment, the inner shear stress reinforcement members 115a-f are separate from the core material of the diaphragm body 110 and so creates a discontinuity in the diaphragm body core. In the preferred configuration each inner shear stress reinforcement member 115a-f is angled relative to the major face(s) 112 such that collectively all members 115a-f can sufficiently resist shear deformation in use. Preferably the angle is between 40 degrees and 140 degrees, or more preferably between 60 and 120 degrees, or even more preferably between 80 and 100 degrees, or most preferably approximately 90 degrees relative to the major faces 112. Preferably, each inner shear stress reinforcement member 115a-f is approximately orthogonal to the coronal plane of the diaphragm body 111. In this specification, reference to a coronal plane of a body, structure or assembly is intended to mean a longitudinal plane dividing the body, structure or assembly into a front major part and back major part—an example of such a plane is a longitudinal plane that divides major faces 112a and 112b of the diaphragm body 111 and a plane that is parallel to the plane of view of FIG. 6A. The inner shear stress reinforcement members, 115a-f, are preferably approximately parallel to the sagittal plane of the diaphragm body 111.

Normal Stress Reinforcement

As shown in FIG. 10, in this embodiment, the normal stress reinforcement comprises a pair of external normal stress reinforcement plates 116, 117 rigidly coupled to the top and bottom major faces 112a, 112b of the diaphragm body 111 respectively. In alternative configurations the normal stress reinforcement plates 116, 117 may be rigidly coupled underneath but still sufficiently close to the respective top and bottom major faces 112a, 112b to maintain sufficient separation to resist tension-compression deformation in use.

In this embodiment, each normal stress reinforcement plate 116, 117 extends along a substantial or entire portion of the area of the corresponding major face 112a, 112b, or in other words the reinforcement member extends along a substantial or entire portion of each dimension of the corresponding major face. In alternative embodiments one or both normal stress reinforcement plates 116, 117 may extend only partially along one or more dimensions of the corresponding major face 112a, 112b.

In this embodiment additional normal stress reinforcement plate 118 is coupled at or adjacent the major face 112a and extends proximal to the base region 110a of the diaphragm 110. The normal stress reinforcement plate 118 is substantially solid. It extends across a substantial portion of the width of the respective major face 112a and longitudinally toward the peripheral edge 110b, terminating at a central region of the face 112a. The substantially solid plate is rigidly coupled to the normal stress reinforcement plate 116 to provide additional support at the thicker base region of the diaphragm where higher normal stress forces are to be mitigated. The plate 118 is a single piece but may comprise multiple parts in some configurations. Similarly, additional normal reinforcement 119*a-b* is provided to the opposing major face 112*b* also at a region of the face at or proximal the base region 110*a* of the diaphragm. The additional normal reinforcement plates 119*a-b* are rigidly coupled to the normal stress reinforcement plate 117 providing additional support at the thicker base region 110*a* of the diaphragm 110.

Normal Stress Reinforcement Form

Each smooth major faces 112 of the diaphragm body 111 may be planar or alternatively a curved smooth face (extending in three dimensions). Each normal stress reinforcement plate 116, 117 consists of a profile complementary to the associated major face 112 such that it may couple over or directly adjacent the associated major face 112 of the diaphragm body 111. Each reinforcement plate 116, 117 may comprise any profile or shape necessary for achieving sufficient resistance to compression-tension stresses experienced at or adjacent the corresponding major face 112 of the body 111 during operation. The invention is not intended to be limited to any particular profile. For instance, the reinforcement plates 116, 117 may be solid, recessed, perforated or notched, or they may be formed from a series or network of struts. The plates 116, 117 may have a substantially uniform or varying width, thickness and/or mass. Extensive examples and variations of rigid diaphragm constructions having suitable forms of normal stress reinforcement are given in PCT/IB2016/055472 which are all hereby incorporated by reference.

In this embodiment, each normal stress reinforcement plate 116, 117 comprises a series of struts 116*a,b* and 117*a,b* respectively. Referring to plate 116 only, the plate 116 comprises a plurality of substantially uniformly spaced and substantially parallel struts 116*a* extending longitudinally along the respective major face 112*a* of the diaphragm body 111 between the end of the diaphragm adjacent the base region 110*a* and the peripheral edge 110*b*. In this embodiment there are six parallel struts per plate but there may be any number of two or more struts necessary for achieving the desired level of normal stress reinforcement. In addition, the plate 116 comprises a pair of cross-struts or diagonal struts 116*b* extending diagonally across the series of parallel struts 116*a*. The diagonal struts are preferably orthogonal to one another and extend in an opposing manner diagonally across the respective major face 112*a* of the diaphragm body 111. The plate 117 comprises of a similar arrangement of struts 117*a,b* which will not be described in detail for conciseness.

In this embodiment, each normal stress reinforcement plate 116, 117 comprises a reduced mass region, in one or more areas that extend away and/or are most distal from the base region 110*a* of the diaphragm 110. For example, each normal stress reinforcement plate 116, 117 may comprise apertures, recesses or regions of reduced thickness and/or width distal from the base region 110*a* of the diaphragm 110. In this embodiment, each parallel strut 116*a* of the normal stress reinforcement plate 116 consists of a length of increased mass (via increased width and thickness) and a length of reduced mass (via decreased width and thickness). The length of increased mass is adjacent/proximal to the base region 110*a* of the diaphragm and the reduced mass length is adjacent/proximal to the peripheral edge 110*b* of the diaphragm 110. The reduction in thickness and/or width may be stepped or tapered/gradual. The plate 117 consists of a similar construction of struts with varying masses. This will not be described in detail for conciseness. It will be appreciated that plates with uniform thickness, width and/or mass along their length are also possible. In this embodiment, the upper plate 116 is coupled to an additional plate 118 as described above to increase the thickness of the reinforcement adjacent the base region 110*a* and reduce the relative thickness in the distal region. Additional plates 119*a-b* are also rigidly coupled to the bottom plate 117 to increase relative thickness adjacent the base region 110*a* for the respective bottom major face 112*b*. These additional plates 118, 119*a-b* may be separate or integral to the respective plates 116, 117.

Normal Stress Reinforcement Connection

Each normal stress reinforcement plate 116, 117 may be rigidly coupled/fixed to the corresponding major face 112*a*, 112*b* of the diaphragm body 111 via any suitable method known in the art of mechanical engineering. In this example, each normal stress reinforcement plate 116, 117 is bonded to the corresponding major face of the diaphragm body via relatively thin layers of adhesive, such as epoxy adhesive for example. This would have the effect of significantly reducing the overall weight of the diaphragm 110. In this example, each plate 116, 117 connect directly to the inner shear stress reinforcement 115 so that both tension/compression and shear deformations, respectively, are resisted with no significant source of intermediate compliance. The plates 116, 117 also connect securely to the diaphragm base structure 130. These diaphragm parts are adhered to each other via an adhesive such as epoxy resin, however other fixing methods (e.g. fasteners, welding etc.) well known in the art may also or alternatively be used. Care should be taken to avoid loose attachments, loose parts of the diaphragm body, etc., since these can rattle in use thereby generating unwanted noise and harmonics.

Normal Stress Reinforcement Material

Each normal stress reinforcement plate 116, 117, 118 and 119*a,b* is preferably formed from a material having a relatively high specific modulus compared to a non-composite plastics material. Examples of suitable materials include a metal such as aluminium, a ceramic such as aluminium oxide, a high modulus fibre such as in carbon fibre reinforced plastic, or graphene. Other materials may be incorporated in alternative embodiments. In this example, the normal stress reinforcement plates 116, 117, 118 and 119*a,b* are made from an anisotropic, high modulus carbon fibre reinforced plastic, having a Young's modulus of approximately 450 GPa, a density of about 2000 kg/m^3 and a specific modulus of about 225 MPa/(kg/m^3) (all figures including the matrix binder). An alternative material could also be used, however to be sufficiently effective at resisting deformation the specific modulus is preferably at least 8 MPa/(kg/m^3), or more preferably at least 20 MPa/(kg/m^3), or most preferably at least 100 MPa/(kg/m^3).

It is also preferable that the reinforcing material has a higher density than the diaphragm body core material, for example at least 5 times higher. More preferably normal stress reinforcement material is at least 50 times the density of the core material. Even more preferably normal stress reinforcement material is at least 100 times the density of the diaphragm body core material. This means there is a concentration of mass towards the major faces, which improves resistance to major diaphragm bending resonance modes in the same way that the moment of inertia of a beam is improved by use of an 'I' profile as opposed to a solid rectangle. It will be appreciated in alternative forms the normal stress reinforcement has a density value that is outside of these ranges.

In this example, suitable materials for use in the normal stress reinforcement 116, 117, 118, 119a,b could include Aluminium, Beryllium and Boron fibre reinforced plastic. Many metals, and ceramics are suitable. The Young's modulus of the fibres without the matrix binder is 900 GPa. Preferably the struts 116a,b and 117a,b are made from an anisotropic material such as fibre reinforced plastic, and preferably the Young's modulus of the fibres that make up the composite is higher than 100 GPa, and more preferably higher than 200 GPa and most preferably higher than 400 GPa. Preferably the fibres are laid in a substantially unidirectional orientation through each strut and laid in substantially the same orientation as a longitudinal axis of the associated strut to maximise the stiffness that the strut provides in the direction of orientation.

In this embodiment, the normal reinforcement plates 116, 117 may be formed from carbon fibre and the additional plates 118, 119a-b may be formed from aluminium.

Inner Shear Stress Reinforcement

As mentioned above, the diaphragm 110 includes at least one inner shear reinforcement member 115a-f embedded/retained within the diaphragm body 111 between the pair of opposing major faces 112a, 112b of the diaphragm body 111. In this example a plurality of longitudinally aligned and transversely spaced inner shear stress reinforcement members 115a-f are retained within the diaphragm body 111. It will be appreciated any number of members 115a-f may be used to achieve the necessary level of shear stress resistance. In alternative embodiments only a single member may be retained within the body 111.

In this example each of the at least one inner shear stress reinforcement members 115a-f is separate to and coupled to the diaphragm body 111 to provide resistance to shear deformation in the plane of the stress reinforcement separate from any resistance to shear provided by the body itself. Also, each inner shear stress reinforcement member 115a-f extends within the body 111 at an angle relative to at least one of said major faces 112a, 112b sufficient to resist shear deformation during operation as previously described.

Shear Stress Reinforcement Form

In this embodiment, each inner shear stress reinforcement member 115a-f is a plate. The plate may comprise any profile or shape necessary for achieving the desired level of resistance to shear stresses on the diaphragm body 111 during operation. For example, each inner shear stress reinforcement member may be a solid plate, or it may be perforated, or it may be formed from a series or network of interconnected struts. Various forms of inner shear stress reinforcement members are described extensively in PCT/IB2016/055472 which are all hereby incorporated by reference. The periphery of each member 115a-f may be smooth or it may be notched.

In this embodiment, each inner stress reinforcement member 115a-f comprises a plate 115a-f that is substantially solid. The plates 115a-f extend in a substantially spaced (preferably, but not necessarily, evenly spaced) and parallel manner relative to one another within the diaphragm body 111 in the assembled form of the diaphragm 110. Each plate 115a-f has a similar profile or shape to a cross-sectional shape of the diaphragm body 111, and in particular to a shape across a sagittal cross-section of the diaphragm body 111. Alternatively each inner reinforcement plate 115a-f comprises a network of coplanar struts. Furthermore, in alternative embodiments the plates and/or struts may extend across three-dimensions within the core material.

Each inner reinforcement member 115a-f extends substantially towards the peripheral edge 110b of the diaphragm 110 and is inwardly tapered in this direction to match the profile of the diaphragm body 111.

Shear Stress Reinforcement Material

Each inner shear stress reinforcement member 115a-f is formed from a material having a relatively high maximum specific modulus compared to a non-composite plastics material. Examples of suitable materials include a metal such as aluminium, a ceramic such as aluminium oxide, or a high modulus fibre such as in carbon fibre reinforced composite plastic.

Preferably each inner shear stress reinforcement member 115a-f is formed from a material having a relatively high maximum specific modulus, for example, preferably at least 8 MPa/(kg/m^3), or most preferably at least 20 MPa/(kg/m^3). Many metals, ceramics or a high modulus fibre-reinforced plastics are suitable. For example the inner shear stress reinforcement member(s) 115a-f may be formed from aluminium, beryllium or carbon fibre reinforced plastic. In some embodiment graphene may be used.

Preferably the inner shear stress reinforcement member(s) 115a-f each have a high modulus in directions approximately +45 degrees and −45 degrees relative to a coronal plane of the diaphragm body 111. If the inner shear stress reinforcement member 115a-f is anisotropic then preferably tension compression is resisted at approximately +−45 degrees to the coronal plane, e.g. if carbon fibre then preferably at least some of the fibres are oriented at a +−45 degree angle to the coronal plane. Note that in some diaphragm designs there may be regions of the inner shear stress reinforcement that require stiffness in other directions, for example in the proximity of points of application of loads to the diaphragm such as close to a hinge assembly.

In this example, the inner shear stress reinforcement members 115a-f may be made from aluminium foil of 0.03 mm thickness, having a Young's modulus of about 69 GPa and a specific modulus of about 28 MPa/(kg/m^3). It will be appreciated this is only exemplary and not intended to be limiting.

Shear Stress Reinforcement Thickness

Each inner shear stress reinforcement member 115a-f is preferably relatively thin to thereby reduce the overall weight of the diaphragm 110, but sufficiently thick to provide sufficient resistance against shear stresses. Thus, the thickness of the inner reinforcement members is dependent (although not exclusively) on the size of the diaphragm body 111, the shape and/or performance of the diaphragm body 111 and/or the number of inner reinforcement members 115a-f used. In a preferred embodiment, the inner shear stress reinforcement members 115a-f are substantially thin and correspond to the area of the diaphragm body 111 that it is reinforcing, so as to provide significant rigidity against breakup modes of resonance. It is preferable that each inner shear stress reinforcement member 115a-f comprises of an average thickness of less than a value x (measured in mm), as determined by the formula:

$$x = \frac{\sqrt{a}}{c}$$

Where, a, is an area of air (measured in mm^2) capable of being pushed by the diaphragm body in use, and where, c, is a constant that preferably equals 100. More preferably c=200, or even more preferably c=400 or most preferably c=800. Preferably each inner shear stress reinforcement member 115a-f is made from a material less than 0.4 mm, or more preferably less than 0.2 mm, or more preferably less than 0.1 mm, or more preferably less than 0.05 mm thick.

In this embodiment, each inner reinforcement 115a-f is made from a material that is approximately 0.03 mm thick.

Shear Stress Reinforcement Connection Type

During assembly of the diaphragm 110 and the inner shear stress reinforcement members 115a-f are preferably rigidly fixed/coupled at either side to either one of the opposing normal stress reinforcement members 116, 117 (on the opposing major faces of the diaphragm body 111). Alternatively each inner shear stress reinforcement member 115a-f extends adjacent to, but separate from, the opposing normal stress reinforcement members 116, 117. During assembly, each inner shear stress reinforcement member 115a-f is rigidly coupled/fixed to the core of the diaphragm body 111 via any suitable method known in the art of mechanical engineering. In this example, the members 115a-f are bonded to and between the core parts 111a-g and preferably to corresponding normal stress reinforcement member(s) 116, 117 via relatively thin layers of epoxy adhesive. Preferably the adhesive is less than approximately 70% of a weight of the corresponding inner reinforcement member. More preferably it is less than 60%, or less than 50% or less than 40%, or less than 30%, or most preferably less than 25% of a weight of the corresponding inner reinforcement member 115a-f.

Diaphragm Body

Diaphragm Body Form

The major faces 112a, 112b of the diaphragm body 111 are substantially smooth so as to allow a suitable profile to which the normal stress reinforcement 116, 117 can be adhered. If the diaphragm body 111 has a particularly inconsistent or irregular form, for example a honeycomb core having irregular walls and/or cavities, then the overall outer peripheral profile or envelope of the major faces 112a,b of the diaphragm body 111 are most preferably substantially smooth for the reason that reinforcement is able to be adhered to each wall that it passes so that the wall may provide transverse support to the reinforcement to help minimise localised resonance, and so that the reinforcement is able to provide rigidity to the core to provide overall diaphragm stiffness.

In this embodiment, the diaphragm 110 when assembled comprises a substantially wedge shaped body 111 and/or a body with a tapered thickness from one end 110a to the other 110b such that it is substantially triangular in cross-section. Although the general cross-sectional shape of the diaphragm body 111 of rotational transducers (parallel to the sagittal plane of the diaphragm body 111) is preferably substantially triangular or wedge shaped, other geometries, such as rectangular, kite shaped or bowed profiles are also possible in alternative variations and the invention is not intended to be limited to the shape of this particular embodiment.

A diamond cross-sectional profile works well with linear action transducers, however other profiles are also possible in alternative variations, for example trapezoidal, rectangular, or bowed profiles.

In this embodiment, the diaphragm body 111 is formed from a plurality of body parts 111a-g that are rigidly coupled to one another with intermediate inner shear stress reinforcement members 115a-d embedded therebetween. In alternative embodiments the diaphragm body 111 may be a single piece.

Diaphragm Body Core Material

The diaphragm 110 comprises a tapered wedge shaped diaphragm body 111 (but could consist of many other geometries) formed from a material that is a foam, such as expanded polystyrene of density 16 kg/m^3 and specific modulus 0.53 MPa/(kg/m^3) or other core material, having properties of low density (preferably less than 100 kg/m^3) and high specific modulus.

The diaphragm body 111 preferably comprises a lightweight and fairly rigid material that comprises an interconnected structure that varies in three dimensions, such as a foam or an ordered three-dimensional lattice structured material. The diaphragm body material may comprise a composite material. Although expanded polystyrene foam is the preferred material, alternative materials that are suitable could include polymethyl methacrylamide foam, Aerogel foam, corrugated cardboard, metal micro lattices aluminium honeycomb, aramid honeycomb and balsa wood. Other materials that would be apparent to those skilled in the art are also envisaged and not intended to be excluded from the scope of this invention.

The diaphragm body core material, in isolation of the remaining components of the diaphragm 110 (e.g. in isolation of the outer and inner reinforcements 116, 117, 118, 119a,b and 115a-f respectively), has a relatively low density. In this example the core material has a density that is less than approximately 100 kg/m³, more preferably less than approximately 50 kg/m³, even more preferably less than approximately 35 kg/m³, and most preferably less than approximately 20 kg/m³. It will be appreciated in alternative forms the diaphragm body core material may have a density value that is outside of these ranges. This means that the diaphragm can be made relatively thick without adding undue mass, which increases rigidity and decreases mass thereby improving resistance to breakup resonances.

Although the diaphragm 110 comprises a highly rigid skeleton of inner shear stress reinforcement 115a-f and outer normal stress reinforcement 116, 117, 118, 119a-b, in some cases the core body material is still called upon to support the skeleton components against localised transverse resonance, and to support itself against localised 'blobbing' resonances in regions between the skeleton components. The diaphragm body 111 in isolation of the remaining components of the diaphragm 110 (e.g. in isolation of the outer and inner reinforcements 116, 117, 118, 119a,b and 115a-f respectively) preferably has a relatively high specific modulus. In this example, the diaphragm body in isolation of the remaining components of the structure has a specific modulus higher than approximately 0.2 MPa/(kg/m^3), and most preferably higher than approximately 0.4 MPa/(kg/m^3). It will be appreciated in alternative forms the diaphragm body 111 may have a specific modulus value that is outside of these ranges. The high specific modulus means that the diaphragm body can support the skeleton, and especially also its own weight, against the localised 'transverse' and 'blobbing' resonance modes respectively.

During manufacture the polystyrene diaphragm body 111 may be heat blasted with hot air to destroy external hairs and create a substantially smooth outer surface.

Diaphragm Body Thickness

The diaphragm body 111 is substantially thick (at its thickest region). In this specification, and unless otherwise specified, reference to a substantially thick diaphragm body 111 is intended mean a diaphragm body that comprises at least a maximum thickness 121 (shown in FIG. 9A) that is relatively thick compared to at least a greatest dimension of the body such as the maximum diagonal length 120 (shown in FIG. 8) across the body (hereinafter also referred to as the maximum diaphragm body length or maximum length of the diaphragm body). In the case of a three-dimensional body (as is the case for most embodiments), the diagonal length dimension may extend across the thickness/depth and width of the body in three-dimensions. The diaphragm body 111 may not necessarily comprise a uniform thickness that is substantially thick along one or more dimensions. The phrase relatively thick in relation to the greatest dimension may mean, for example, at least about 11% of the greatest dimension (such as the maximum body length 120). More preferably the maximum thickness 121 is at least about 14% of the greatest dimension of the body 120.

Preferably the region of maximum thickness is at or proximal to the base region 110a110a of the diaphragm 110.

Diaphragm Body Flexible Section

Figure 9A:
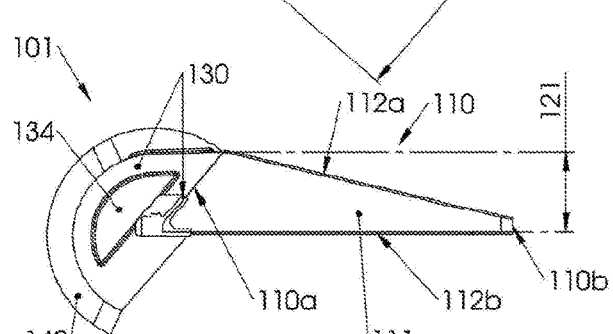
Figure 9B:
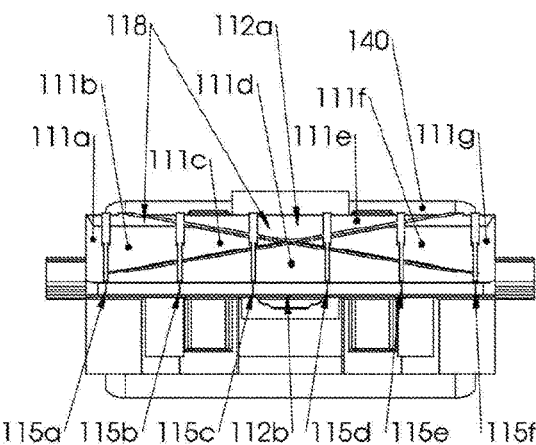
Figure 9C:
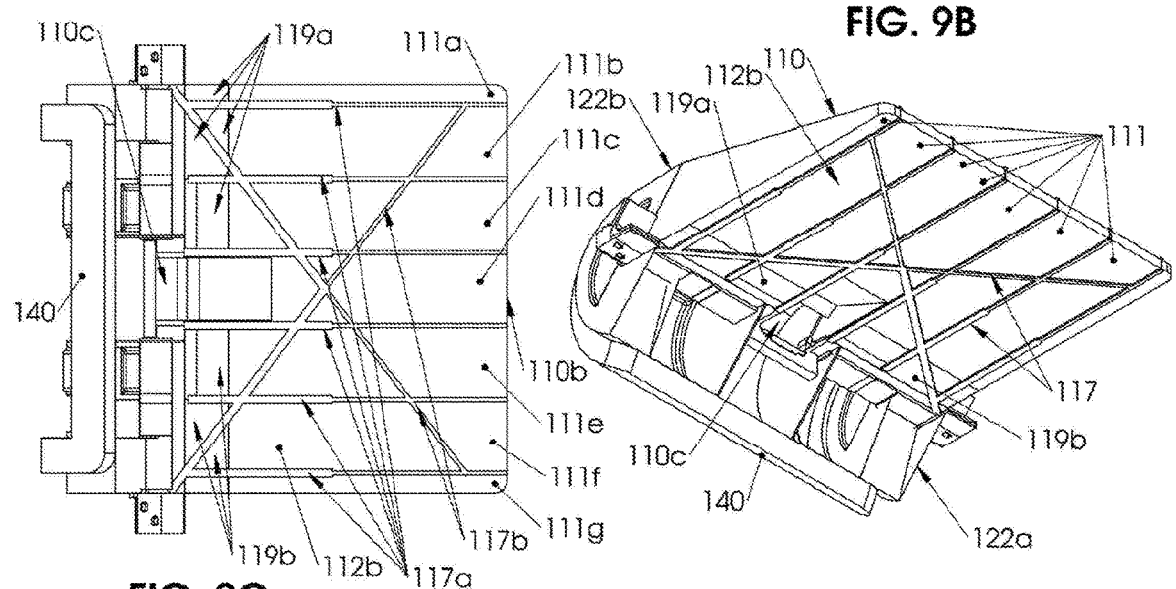
Figure 9D:
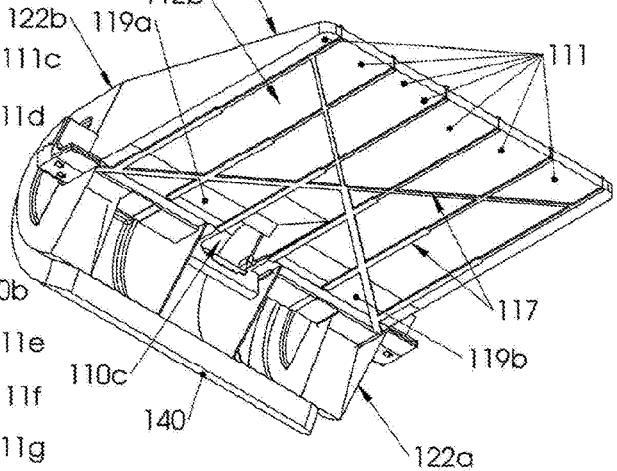

Referring to FIGS. 6C-6E and 9D in particular, in this embodiment, a central section 110c of the base region 110a110a of the diaphragm 110 is shaped or comprises of a geometry that provides relatively higher flexibility between the left 122a and right 122b sides of the diaphragm assembly 101 with respect to a sagittal plane of the assembly 101. For example, the central section 110c may have a cut-out, cavity or recess as shown in FIGS. 6E and 9D. This diaphragm body 110 is also resilient in the region 110a.

This arrangement provides the diaphragm assembly 101 with additional flexibility in the central section 110c of the base region 110a, thereby increasing compliance between the left and right sides of the diaphragm 110 and/or of the diaphragm assembly 101 (with respect to the sagittal plane of the assembly 101). This allows for relatively small/minimal relative displacements or movements between the left 122a and right 122b sides of the diaphragm assembly 101. This helps to alleviate the following issues. If the contact members 191-195 of the hinge system 203 (described in further detail in section 1.4) are inaccurately shaped and/or misaligned then some relative translation of the associated hinge elements 161-165 that are coupled to either side of the diaphragm 110 may occur as the diaphragm 110 moves during operation. Some degree of diaphragm flex may be required to allow for this relative translation. Furthermore, if the diaphragm assembly 101 is inaccurately made, for example if the associated hinge elements 161-165 do not all lie in a common plane as desired (described in further detail in section 1.4), then it may be difficult to achieve sufficient, and sufficiently constant, contact force between the contact surfaces 161a-165a of the hinge elements 161-165 and the associated contact surfaces 191a-195a of the contact members 191-195. This could result in inadequate or suboptimal rigidity/support at one or more of the hinge joints 123-127 which could result in unwanted resonance and/or a risk of slippage or rattling.

Having a relatively flexible central section 110c of the diaphragm assembly 101 at the base region 110a of the diaphragm 110 helps to solve these potential issues by:
  permitting the contact member contact surface to be made or aligned less accurately, as the diaphragm is capable of flexing to accommodate differing translation rates at different hinge elements. This in turn may prevent slippage between a hinge element and contact member at a hinge joint; and
  permitting the diaphragm assembly 101 or hinge elements 161-165 to be made or aligned less accurately, as the diaphragm body 111 resilience in the flexible section 110c biases the hinge elements 161-165 against the respective contact members 191-195 to create a secure and substantially constant contact between the contact surfaces of the hinge elements and the contact surfaces of the associated contact members at all hinge joints.

Enabling the hinge elements 161-165 to become accurately aligned with the associated contact members 191-195 during assembly facilitates accurate rotation of the diaphragm 110 during operation. This helps to avoid compliance and/or rattling that may otherwise occur. By allowing higher compliance between the left and right sides of the diaphragm assembly 101 (with respect to the sagittal plane of the assembly 101) relative to each other, the right side pair of contact members 161-162 of the hinge system are able to flex to touch the respective right side contact members 191-192 during assembly, and the left side contact elements 163-164 are also able to flex to touch the contact members 193-194 during assembly. In this manner, when a resilient member 170 is appropriately positioned, the contact force applied by the member 170 helps to secure four rigid regions of contact corresponding to the other hinge joints.

In this embodiment, the added flexibility and/or resilience (for achieving relatively small/minimal displacements) at section 110c may also be achieved by a combination of one or more of the following diaphragm assembly 101 features:
  The diaphragm base structure 130 comprises a pair of elongate hinge bars 150, 151 as described under section 1.2.2. The separated hinge bars 150, 151 may move independently, and the absence of rigid hinge bar connecting across the middle section adds to the flexibility of the assembly 101 in this region (relative to a single connected hinge bar, for example);
  The diaphragm body 111 comprises a core material that is able to flex and that is resilient in at least region 110a, without breaking;
  The diaphragm base structure 130 includes a resilient member 170 (shown in FIG. 15C) of the hinge system that is substantially flexible in directions that are parallel to the major plane of the member 170, as described further in section 1.4;
  The diaphragm base frame 131 comprises a back plate 132 with a recess 135 at the central section 110c of the plate 132 (shown in FIG. 10) which allows the left and right sides of the diaphragm base frame to flex independently;
  Two normal reinforcement plates 119a-b of the diaphragm assembly 101 are not connected at their adjacent ends, so as to allow the two sides to flex independently;
  The upper normal stress reinforcement plate 118 of the diaphragm assembly, connecting the left and right sides of the diaphragm base structure 130, has a flat and thin geometry and an orientation that is approximately parallel to the plane of the contact surfaces of the hinge elements 161-164, allowing higher compliance between the left and right sides of the diaphragm assembly 101 (with respect to the sagittal plane of the assembly 101);
  The normal stress reinforcements 116, 117 comprise of substantially slender cross-struts 116b, 117b that allow the left and right sides of the structure to flex without fracturing;
  The geometry of the conductive coil(s) 140 near cavity 143 (as shown in FIG. 11E) is substantially thin in between arcuate sections 133a and 134a of the diaphragm base structure 130, and is oriented significantly parallel to the plane of the contact surfaces of the hinge elements 161-164, thereby allowing higher compliance between the left and right sides of the diaphragm assembly 101 (with respect to the sagittal plane of the assembly 101) relative to each other;

The air blocking member 129 that links the left and right sides of the diaphragm base frame 131, is preferably made from a material that is sufficiently compliant and comprises of a geometry that is sufficiently thin in a plane parallel to a tangential plane of the contact surfaces of the hinge elements 161-164, so as to allow higher compliance between the left and right sides of the diaphragm assembly 101 (with respect to the sagittal plane of the assembly 101) relative to each other.

In alternative embodiments, other mechanisms/methods for achieving flexibility of the diaphragm 110 in terms of bending along the hinge axis may be utilised. Preferably at the location of flexibility the diaphragm 110 is devoid of rigid materials up to approximately 30%, 40% 50% of the radius from the hinging axis 199 (shown in FIG. 5A) to the terminal edge 110*b* of the diaphragm 110. Preferably at this location all materials present within this radius have a Young's modulus of less than approximately 30 GPa, or less than approximately 20 GPa, or less than approximately 10 GPa. Preferably at this location all relatively rigid materials of the diaphragm assembly 101 (e.g. normal stress reinforcement 116, 117, 118, 119*a-b*, diaphragm base frame 131 or other members attached to the diaphragm body 111 having a Young's modulus of more than approximately 10 GPa, or more than approximately 20 GPa, or more than approximately 30 GPa, and have substantially flexible geometry in terms of permitting bending about the hinging axis 199. A flexible geometry may also allow for shear deformation of the rigid materials such that hinge elements 161-165 may make a secure and substantially constant physical connection with the corresponding contact members 191-195. Flexible geometry may mean that these higher rigidity materials have a thickness that is less than approximately 20%, or less than approximately 10%, or less than approximately 5% of the abovementioned radius.

1.2.2 Diaphragm Base Structure

Referring to FIGS. 6A-E, 7A-D, 8, 9A-C, 10 and 11A-E, the diaphragm assembly 101 further comprises a diaphragm base structure 130 having a diaphragm base frame 131 rigidly coupled to the diaphragm 110 at the base region 110*a*. The diaphragm base structure 130 also comprises part of the hinge assembly 103 and part of the excitation mechanism for facilitating movement of the diaphragm 110 in use. These parts are also rigidly connected to the diaphragm base frame 131. In this manner, the diaphragm 110 is effectively rigidly connected to the hinge assembly 103 and the excitation mechanism in the assembled state of the diaphragm assembly 101.

Figure 8:
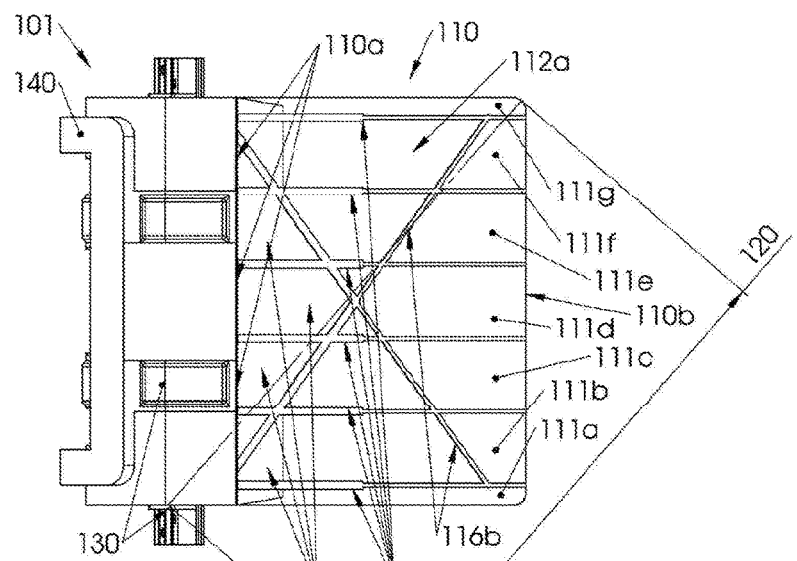
FIG. 8 shows a plan view of the diaphragm of the audio transducer of FIG. 1.

The diaphragm base frame 131 is substantially elongate and configured to extend across at least a substantial portion of the width of the diaphragm 110 at the base region 110*a*. It is preferred that the base frame 131 is substantially similar in width to the diaphragm 110 such that the outer sides of the base frame are approximately flush with the respective outer sides of the diaphragm 110 as shown in FIG. 8, for example. The diaphragm base frame 131 is configured to rigidly couple to the diaphragm 110 on one side of the base structure 130 and to conductive coil(s) 140 of the excitation mechanism on an opposing side of the base structure 130. The side of the base frame 131 that couples the diaphragm 110 is preferably substantially planar to correspond to the shape of the diaphragm face 114 at base region 110*a*. The side of the base frame 131 that couples the conductive coil(s) is preferably substantially curved or arcuate to correspond to the preferred curved shape of the conductive coil(s) 140. Preferably the diaphragm 110 is rigidly and non-compliantly connected, and closely associated with the conductive coil(s) 140. This is to help mitigate adverse resonance modes associated with the coupling between the diaphragm 110 and moving conductive coil(s) 140. Preferably the distance between the conductive coil(s) 140 and the diaphragm 110 is less than 75% of the maximum dimension of a major face (such as the length, but could alternatively be the width) of the diaphragm 110. More preferably the distance is less than 50%, even more preferably less than 35% or yet more preferably less than 25% of the maximum dimension of the diaphragm 110.

As shown in FIGS. 6B and 10, the diaphragm base structure 130 further comprises a resilient member 170 that is rigidly connected to the diaphragm base frame 131 in situ. The resilient member 170 forms part of the hinge assembly 103 and comprises a central section 171 that is configured to couple a hinge element 165 of the hinge assembly and two end sections 172, 173 that are configured to connect to the diaphragm 110 in situ, as will be described in further detail in section 1.4.

The diaphragm base structure 130 further comprise a pair of elongate hinge bars 150 and 151 that are configured to rigidly couple the diaphragm base frame 131 along the length of the base frame 131. The hinge bars 150 and 151 form hinge elements 161-164 of the hinge assembly 103, against which contact members 191-194 of the hinge assembly 103 can rotate, as will be described in further detail in section 1.4.

Figure 5A:
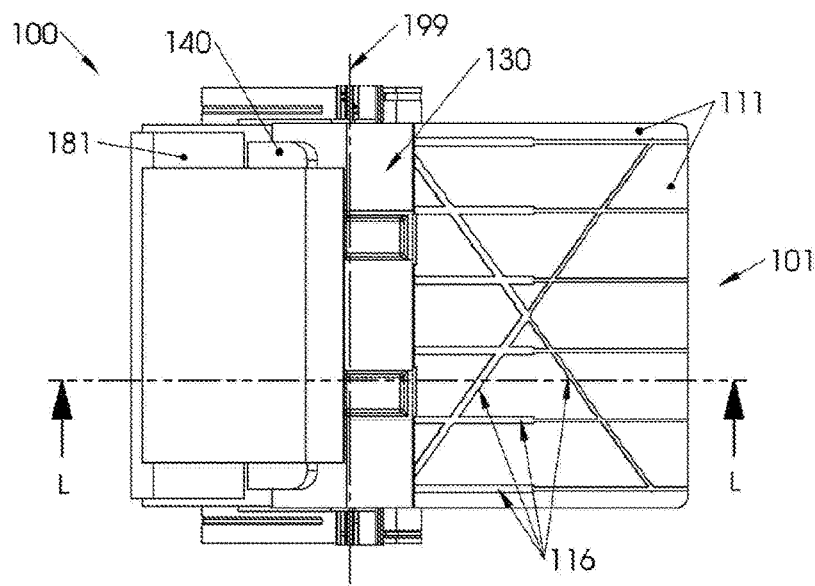
Figure 5C:
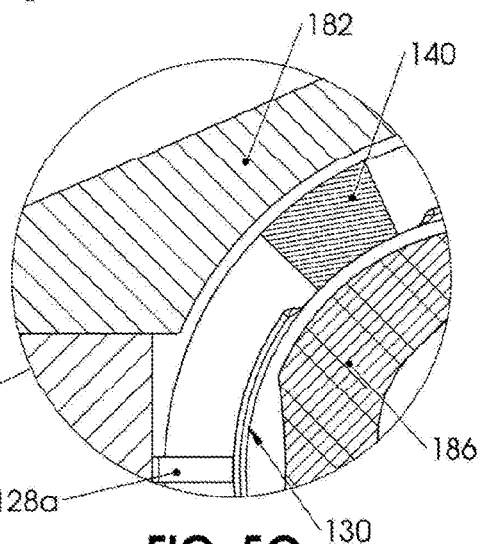
Figure 5B:
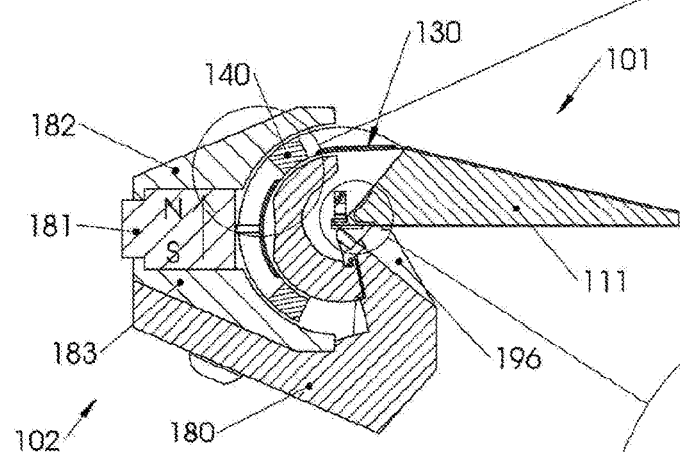
Figure 5D:
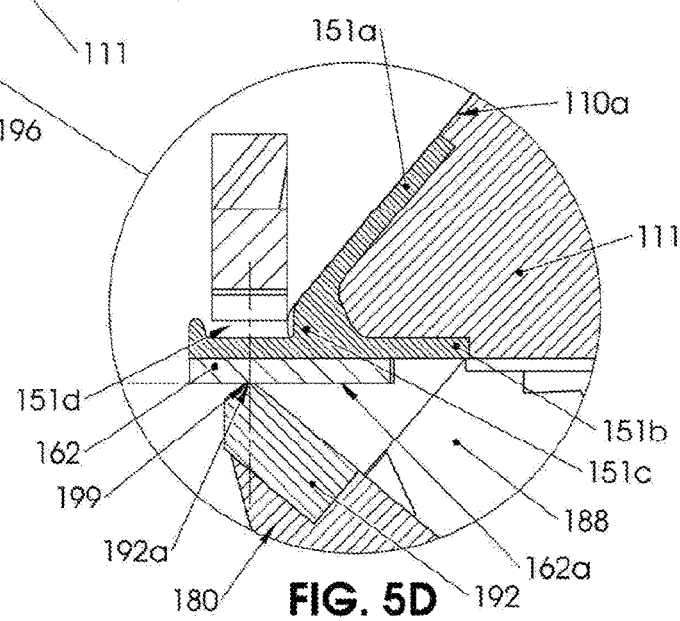

There may be any number of one or more hinge bars necessary to form the desired number of hinge elements and the invention is not intended to be limited to the two bars 150, 151 of this example. In this embodiment, each hinge bar 150, 151 comprises a pair of substantially planar plates 150*a,b* and 151*a,b* that are connected along a common edge (as shown in FIG. 5D for hinge bar 151, for example).

The plates 150*a,b* and 151*a,b* of each hinge bar 150, 151 are preferably acutely angled relative to one another and share a common edge 150*c*, 151*c* respectively. Extending laterally from the common edge 150*c*, 151*c* in a direction opposing the plates of each bar 150, 151 is a channel 150*d*, 151*d* (shown for 151*d* in FIG. 6D, for example). The channel 150*d*, 151*d* of each bar 150, 151 is configured to couple a respective end 173, 172 of the resilient member 170 as described in further detail in section 1.4. Also, an exterior surface of the second plate 150*b*, 151*b* is configured to form or rigidly couple the respective hinge elements 161-164 of the hinge assembly as will be described in further detail in section 1.4.

A preferred design of the diaphragm base frame 131 is described in detail below. However, the invention is not intended to be limited to this particular example and other designs may be envisaged as would be readily apparent to the skilled artisan.

As shown in FIG. 10, the diaphragm base frame 131 comprises a back plate 132 and two spaced and aligned side plates 133, 134 extending laterally in the same direction from either side of the back plate 132. The back plate is preferably substantially planar or otherwise has a profile at the face 132*c* corresponding to the end face 114 of the diaphragm 110, so that it may lay substantially flush against and rigidly couple the end face 114 of the diaphragm 110. Each side plate 133, 134 extends over the opposing face 132*d* of the back plate 132 from one edge 132*a* of the back plate to the opposing edge 132*b*. Each side plate 133, 134 comprises of a substantially arcuate section 133*a*, 134*a* that extends over the face 132*d* of the back plate, and optionally a substantially planar section 133*b*, 134*b* that connects an end of the arcuate section 133*a*, 134*a* with the edge 132*b* of the back plate 132.

The back plate 132 comprises a recess 135 in a central section of the plate 132 for receiving a central contact member 195 of the hinge assembly in an assembled state of the audio transducer 100, as will be described in further detail in section 1.4.

A pair of substantially arcuate brace plates 136*a,b* and 137*a,b* couple over either open side of each side plate 133 and 134 respectively to enhance the rigidity of the arcuate face of each side plate 133, 134 in the assembled state. In addition, a pair of inserts 138, 139 couple on to the back plate 133 on either side of the recess 135 and between the side plates 133, 134 in situ. The inserts each have an external arcuate face 138*a*, 139*a* that substantially corresponds to the external arcuate faces of the sections 133*a*, 134*a* of side plates 133, 134.

The arcuate brace plates 136*a*, 136*b*, 137*a*, 137*b* and the inserts 138, 139 each comprise a respective connection tab 145*a-f* which extends laterally from the main body of the plate or insert toward the diaphragm body, in situ. These connection tabs 145*a-f* are configured to rigidly couple the inner shear stress reinforcement members 115*a-f* of the diaphragm 110 to thereby rigidly connect the diaphragm base structure 130 to the diaphragm 110. The rigid connection may be via adhesive, welding, fastening or any other suitable method.

The arcuate faces of the inserts 138, 139 and of the side plates 133, 134 are all aligned to form an arcuate face over which the curved conductive coil(s) 140 rigidly couples in situ. The arc of the face is configured to correspond with the arc of the conductive coil(s) 140 and the arc of the magnetic field gap of the transducer base structure 103 as will be described in further detail in section 1.3 below. These inserts comprise indents, protrusions, ribs, rigidizers or other reinforcements 138*a*, 139*a* to strengthen and/or stiffen the arcuate faces against which the conductive coil(s) 140 couples thereby reducing resonances that may otherwise be exhibited at these locations during operation.

Figure 1:
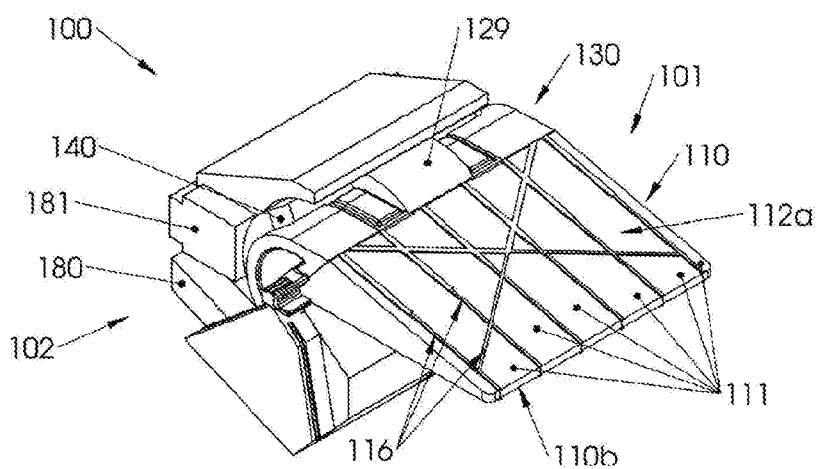
FIG. 1 shows a 3D isometric view of a first preferred embodiment rotational action audio transducer of the invention.
Figure 2A:
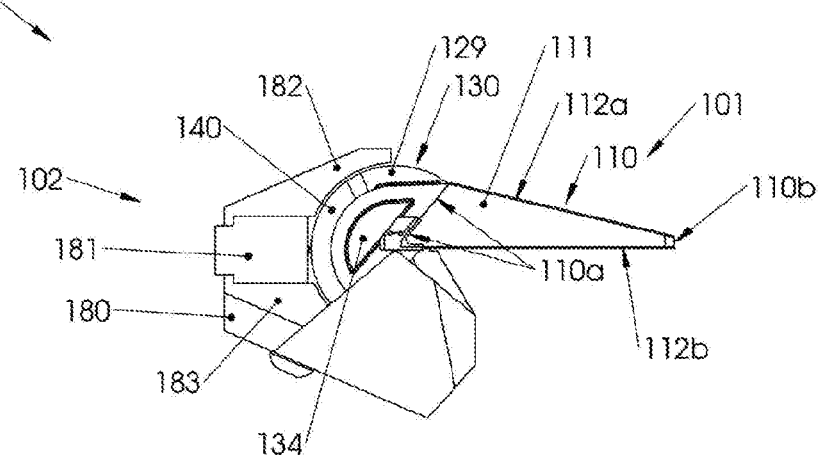
Figure 2B:
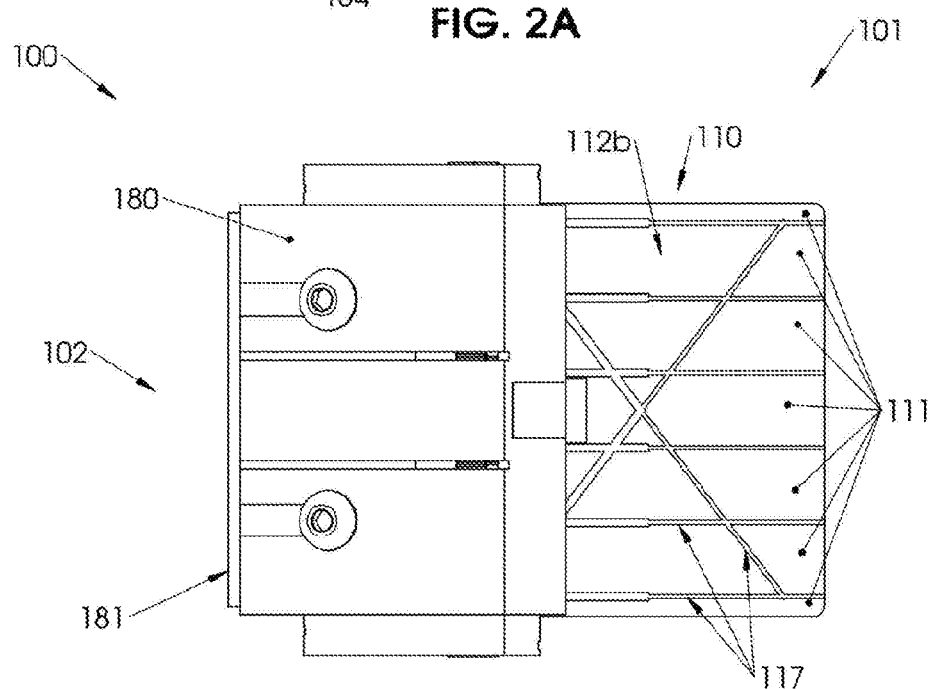
Figure 4A:
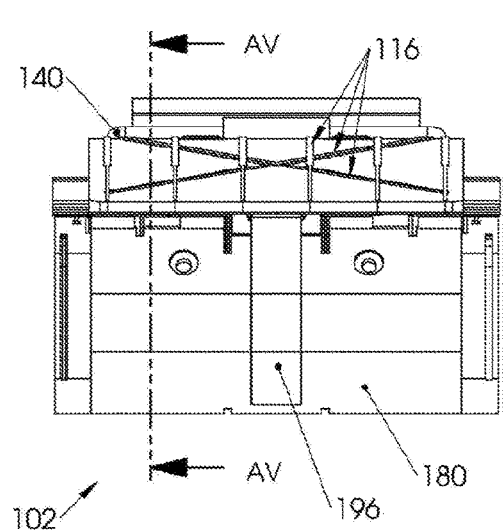
Figure 4B:
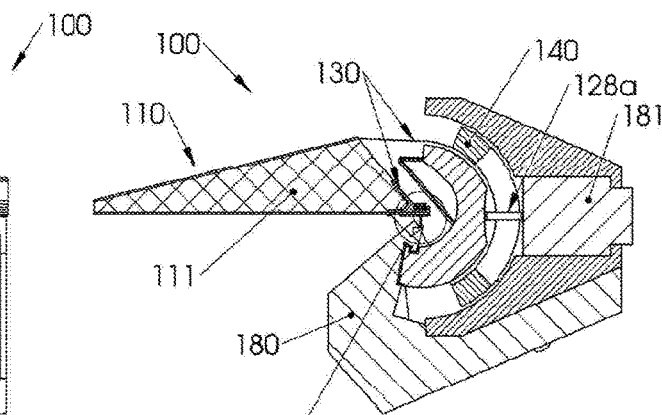
Figure 4C:
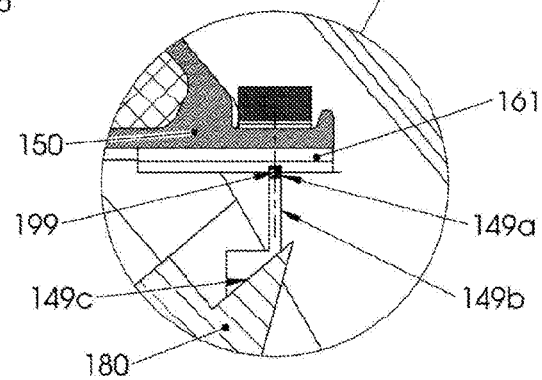
Figure 4D:
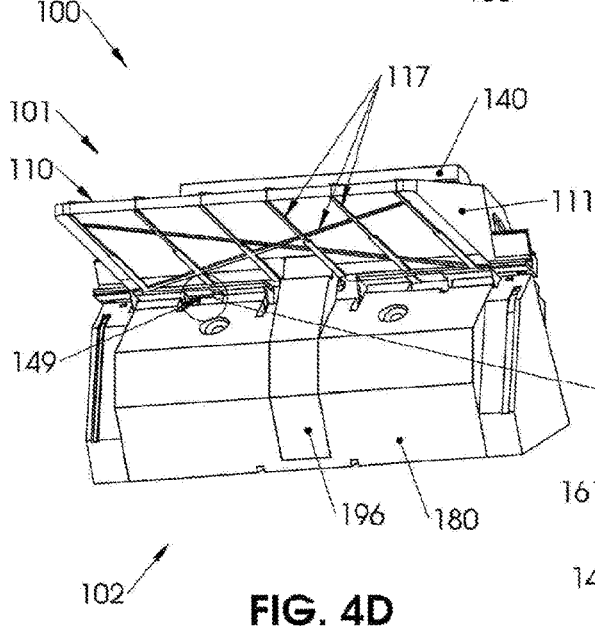
Figure 4E:
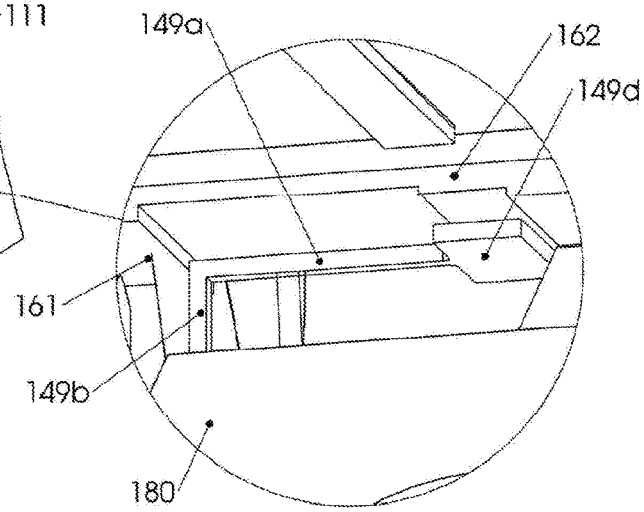

As shown in FIGS. 11A-D, in an assembled state, the diaphragm base structure 130 comprises a plurality of cavities 142, 143, 144 longitudinally spaced along the diaphragm base frame 131 between the side pates 133, 134. The cavities 142, 143, 144 are configured to receive corresponding inner pole pieces 184, 185, 186 of the transducing mechanism when the diaphragm assembly 101 is coupled to the transducer base structure assembly 102, as shown in FIG. 1. In this example there are three cavities to correspond with three internal pole pieces but there could be any number of one or more cavities and pole pieces as required by the particular application.

The diaphragm base frame 131, the plates 136*a*, 136*b*, 137*a*, 137*b*, and the inserts 138, 139 are preferably all formed from a substantially rigid material, for example a metal material. The components are preferably non-magnetic. In one embodiment, one or more of these components may be formed from non-magnetic stainless steel. In another embodiment, one or more of these components may be formed from alumina. Other materials may be used in alternative embodiments. Preferably these components have a Young's modulus of greater than 8 GPa, or more preferably higher than approximately 20 GPa, again, to help ensure rigidity of the entire diaphragm assembly 101. The hinge bars 150, 151 are preferably also formed from a substantially rigid, non-magnetic material such as a non-magnetic stainless steel.

The resilient member 170 is preferably formed from a substantially rigid material but with geometry that provides resilience. It is preferred that the resilient member is formed from a metal material, although other suitable materials are also envisaged. The resilient member 170 is preferably formed from titanium and may be waterjet cut into shape for example. The hinge elements 161-165 are preferably formed from a substantially rigid material having a rigid contact surface 161-165. The material is preferably also non-magnetic. In a preferred embodiment the hinge elements 161-165 are formed from tungsten carbide. Alternatively, these could be formed from a non-magnetic stainless steel, for example.

Referring also to FIG. 10, the diaphragm base structure 130 further comprises a pair of centring blocks 153, 154 configured to couple the exterior of the diaphragm base frame 131 at either side of the diaphragm base frame 131. In this embodiment, the centring blocks 153, 154 are rigidly coupled over corresponding bars 150, 151 of the hinge mechanism. The pair of centring blocks 153, 154 act to ensure that that the diaphragm 110 is appropriately positioned and centred relative to the transducer base structure in situ, and to maintain this position in the event that an unexpected external force is experienced by the transducer 100, such as in an impact event. This is described in further detail in section 1.5.

The diaphragm base frame 131 may comprise one or more indents or ribs to increase the rigidity of the frame 131 and help mitigate localised panel resonances in areas that include a relatively large unsupported surface.

A preferred method of manufacturing the diaphragm base structure 130 is as follows. First the sheet metal parts 131, 136*a*, 136*b*, 137*a*, 137*b*, 138, 138*a*, 139 and 139*a* may be stamped out or otherwise formed. Parts that have indentations and or folds, such as 138*a*, 139*a* may have these pressed into them during the stamping process, or during a later process. Indentations and folds can be added to provide increased rigidity to thin sheet metal parts, allowing a greater frequency bandwidth of resonance free operation. The hinge bars 150 and 151 may be formed separately via CNC machining, WEDM machining, sintering, forging, extrusion or any other process well known in the art. These parts are all assembled and held alignment together by a jig. The parts are then rigidly joined, for example by a robotic laser welding machine, by brazing or by soldering. Adhering using an adhesive, for example epoxy resin, is also possible, but care must be taken to ensure large surface areas are connected and the thickness of epoxy is minimised, to improve rigidity.

If a soldering process is used, it is preferable to minimise the solder mass, and minimise the solder adhering in areas where solder is not required. One method of doing this is to copper coat only areas of the diaphragm base frame parts that are to be adhered. For example, a mask may be applied to areas that are not to be adhered and then areas to be adhered can be copper coated (or other such coating that is suitable for adhesion) by a suitable process, such as electrolysis. The parts may then be assembled and a joining process may be implemented. For example, the assembly may be passed through a soldering wave bath, in a similar way to methods used in PCB component manufacture.

If a welding process is used to join the sheet metal parts to the hinge bars 150 and 151, the first and second hinge bar plates 150*a*, 151*a* may then be brazed to their corresponding hinge bar.

It is preferable that the diaphragm base frame assembly 131 including the hinge bars 150, 151, and hinge bar plates 150a, 151a are assembled onto the complete transducer base assembly (or alternatively a jig) using a biasing force, for example by assembling a biasing force mechanism of the hinge assembly (e.g. resilient member 170) before the conductive coil(s) 140 is(are) adhered to the diaphragm base frame 131. This permits the diaphragm base frame 131 to flex and align the hinge elements 161-164 to their respective contact members 191-194 prior to stiffening of the assembly by the conductive coil(s).

Another preferred method of manufacturing the sheet metal parts 131, 136a, 136b, 137a, 137b, 138, 138a 139 and 139a is by acid etching. During this process, a mask is used to cover areas of the material required to remain intact. During an acid bath process, the exposed sheet metal is then etched away, leaving the required parts remaining. This process can be modified to leave the required parts attached by breakaway tabs, then the sheet can be re-masked, to cover areas where solder is not required. The unmasked areas my then be copper plated by electrolysis, allowing easy soldering and assembly, for example by using a solder bath method.

An alternative preferable process for forming the diaphragm base frame, including thin parts 131, 136a, 136b, 137a, 137b, 138, 138a, 139 and 139a and also hinge bars 150 and 151, is the use of metal injection moulding or sintering in one or few steps. Areas of that replace sheet metal parts may need to be made thicker to facilitate the manufacturing method. Areas that need additional accuracy can be post-machined for example by CNC machining, grinding or EDM.

Other methods well known in the art and that would be readily apparent to the skilled artisan may be used for forming the diaphragm base structure parts and the invention is not intended to be limited to any of the abovementioned examples.

1.3 Transducer Base Structure and Transducing Mechanism

Referring to FIGS. 12, 13 and 14A-C, the transducer base structure assembly 102 of the transducer 100 comprises of the bulk of the audio transducer 100 in terms of mass and consists of parts of the electromagnetic excitation mechanism and parts of the hinge assembly 103. The transducer base structure 102 is configured to cooperatively couple the diaphragm base structure 130 of the diaphragm assembly 101 to complete the excitation mechanism and the hinge system 103.

The transducer base structure 102 is relatively heavier than the diaphragm assembly 101. It is also has a generally squat geometry meaning that it is substantially thickset, particularly relative to the diaphragm assembly. Preferably the transducer base structure 102 is greater in dimension relative to the diaphragm assembly 102 along at least two orthogonal dimensions, or along all three orthogonal dimensions (width, height, depth). It is also substantially more robust relative to the diaphragm 110. In situ, it is more stable and/or firmly fixed relative to the rotatable diaphragm assembly 101. The diaphragm 110 is preferably mounted within a housing or surround or to another structure via the transducer base structure 103 as described in the section 7 example, for instance. In this manner, the transducer base structure 103 may comprise a coupling or couplings for mounting the transducer to another body, structure or device. The coupling or couplings may comprise of a decoupling mounting system configured to flexibly mount the transducer base structure to the other body, structure or device to at least partially alleviating mechanical transmission of vibration between the diaphragm 110 and the other body, structure or device as described with reference to an example in section 1.7.

As previously described, the preferred form excitation mechanism is an electromagnetic mechanism in the preferred configurations. An electromagnetic mechanism is preferred due its highly linear behaviour over a wide range of diaphragm excursions. The excitation mechanism comprises conductive coil(s) 140 and a magnetic structure configured to generate a magnetic field that interacts with the conductive coil(s) 140. The magnetic field is preferably provided by a permanent magnet arrangement of the transducer base structure 102.

As mentioned, the transducer base structure 102 comprises a substantially thick and squat geometry and comprises: a main base component 180, a permanent magnet 181, upper and lower outer pole pieces 182 and 183, and inner pole piece(s) 184, 185, 186. In the assembled state, the upper and lower outer pole pieces 182 and 183 are rigidly coupled to either side of the permanent magnet 181, and the inner pole pieces are rigidly coupled to the main base component 180 and spaced from the magnet 181 and outer pole pieces 182, 183. In this manner, the opposing outer and inner pole pieces create a substantially curved or arcuate channel 187 therebetween. The arcuate channel 187 receives the conductive coil(s) 140 of the diaphragm base structure 130 when the transducer is assembled. The shape of the conductive coil(s) 140 correspond to shape of the arcuate magnetic field channel 187 so that the conductive coil(s) is(are) exposed to an even magnetic field as it reciprocates within the channel during operation. Preferably, at least in a neutral position, the conductive coil(s) 140 is(are) fully contained within the magnetic field channel 187 to enhance operation. During operation, the hinge system 103 facilitates rotatable oscillation of the conductive coil(s) 140 within the channel 187.

In this embodiment, the outer pole pieces rigidly couple either side of the permanent magnet block 181 and extends laterally past the magnet in the same direction in situ. The outer pole pieces and magnet may be rigidly coupled to one another via any suitable mechanism, such as fasteners or preferably adhesive. Together, the outer pole pieces 182, 183 and permanent magnet form a magnet block. The magnet block is configured to rigidly couple against a complementary cavity or part 189 of the body of the main base component 180 in situ. The magnet block preferably releasably couples the main base component 180 for maintenance. An adjustable coupling mechanism may be provided to adjust the position of the magnet block on the main base component 180 relative to the inner pole pieces 184, 185, 186. For instance, fastener channels 189a, 189b may be incorporate in the part 189 of the main base component for slidably adjusting the fastening position of the magnetic block and outer pole pieces 182, 183 relative to the inner pole pieces 184, 185, 186. A jig may be needed to help control this procedure, as there is a large force attracting the magnetic block to the inner pole pieces 184, 185, 186.

To assembly the transducer 100, it is preferred that the diaphragm assembly 101 is first coupled to the main base component 180 and inner pole pieces 184-186. The magnetic block 181 and outer pole pieces 182, 183 are then slid onto the main base component 180 and moved to the appropriate position relative to the inner pole pieces 184, 185, 186, until three rigidizers 128a-c locate within the three corresponding cavities 142-144 in the diaphragm base structure 130. The rigidizers 128a-c are then adhered or otherwise fixedly coupled to the inner pole pieces 182-186.

Fasteners can be used to securely fasten the magnetic block 181 and outer pole pieces 182, 183 in the appropriate relative position on the main base component 180.

The main base component further comprises a hooked end 188 that opposes the magnet block in situ. The interior 188a of the hooked end 188 comprises a cavity that is configured to receive and rigidly couple a corresponding end of each inner pole piece 184, 185, 186, in situ. In this manner, the inner pole pieces 184-186 extend from the interior 188a of the hooked end 188 of the main base component toward the permanent magnet 181 and outer pole pieces 182,183, in situ. The inner pole pieces 184-186 may be rigidly coupled to the main base component 180 via any suitable mechanism, such as via fasteners, welding or other coupling means well known in the art. An adjustable coupling mechanism may be provided to the inner pole pieces 184-186 also. The inner pole pieces 184-186 are preferably releasably coupled for maintenance.

Extending from a terminal edge 190 of the hooked end 188 of the main base component 180 are a plurality of contact members 191-194, which form parts of the hinge joints 123-126 of the hinge system 103 described in further detail in section 1.4. There are preferably at least two contact members, one on either side of the main base component 102. In this embodiment there are four contact members 191-194, two on either side of the main base component 102. It will be appreciated that any number of two or more contact members may be utilised depending on the application. The four contact members 191-194 have substantially convexly curved exterior surfaces 191a-194a. The surfaces 191a-194a all face in substantially the same direction and are substantially axially aligned to form the hinging axis of the hinge system, about which the diaphragm 110 rotates during operation. The contact members 191-194 are configured to operatively couple the hinge elements associated with hinge bars 150, 151 as will be described in further detail in section 1.4. The contact surfaces 191a-194a are all convexly curved in at least a region of contact with the hinge elements 161-164, and about an axis that is substantially parallel to the hinging axis 199 (i.e. in at least a cross-sectional plane that is perpendicular to the hinging axis).

A fifth central contact member 195 also extends from the hooked end 188 of the main base component, in the assembled state. The central contact member 195 is a hooked member that extends from a contact block 196 of the transducer base structure. The contact block 196 may be integral with the main base component or as in this embodiment, it may be a separate component that rigidly couples within a central recess 197 of the hooked end of the main base component 188, in situ. Any suitable method of coupling, such as via fasteners or adhesive, may be utilised. The contact member 195 also consists of a substantially convexly contact surface 195a that is substantially axially aligned with the contact surfaces 191a-194a of the remaining contact members 191-194, forming part of the hinging axis 199 of the hinge system 103. However, the contact surface 195a faces in a different direction to the remaining surfaces. In particular, the contact surface 195a is oriented at an angle, relative to surfaces 191a-194a. In this example the contact surface 195a substantially opposes contact surfaces 191a-194a, or in other words it is angled at approximately 180 degrees relative to the contact surfaces 191a-194a. In this manner, the contact surfaces 191a-194a face (approximately) away from the transducer base structure 102 and toward the diaphragm 110 in situ, and the contact surface 195a faces away from the diaphragm 110 and toward the transducer base structure 102. The directions of these contact surfaces 191a-195a will be explained in further detail in section 1.4.

The contact member 195 is configured to operatively couple the resilient member 170 via a corresponding hinge element as will be described in further detail in section 1.4. The contact surface 195a of the contact member 195 is preferably convexly curved in at least a region of contact with the corresponding hinge element 165 about an axis that is substantially parallel to the hinging axis 199 (i.e. in at least a cross-sectional plane that is perpendicular to the hinging axis).

The contact member 195 is preferably centrally located between the other contact members 191-194. However, it may be located elsewhere in alternative embodiments. Furthermore, there may be two or more contact members 195 facing in an opposing direction to contact members 191-194. These may all be centrally located or they may be spaced in any manner along the hinging axis 199, such as alternately with contact members 191-194, for example.

Parts of the transducer base structure may be formed from multiple components that are rigidly coupled to one another or a single integral component. For example, the contact members 191-194 may be separate and rigidly coupled to a corresponding central recess or cavity at the terminal edge 190 of the hooked end of the main base component 180 or they may be integrally formed therewith. Similarly the contact member 195 may be integrally formed with the base component 180 or alternatively separately formed and rigidly coupled thereto.

The main base component 180 is preferably formed from a substantially rigid and non-magnetic material. The main base component 180 may be formed from a non-magnetic metal, such as a non-magnetic stainless steel for example. The contact members 191-195 are preferably formed from a substantially rigid material and non-magnetic material, having substantially rigid contact surfaces 191a-195a. The contact members 191-195 may be formed from tungsten carbide or non-magnetic stainless steel, for example. The contact members 191-194 may be formed from tungsten carbide and the hooked contact member 195 may be formed from non-magnetic stainless steel in some embodiments.

The transducer base structure may further comprise outer caps 197, 198 configured to couple the sides of the base component 180 and lock the magnet 181 and pole pieces 182-186 in position relative to the base component. These caps also act as centring blocks of the centring mechanism described in further detail in section 1.5. One or more axles or pins may extend through corresponding apertures in the base component 180 and corresponding apertures in the outer caps 197, 198 to couple the caps to either side of the base component 180. Any other fixing mechanism may be used in alternative configurations.

It is also preferable that, so far as is possible, the transducer base structure assembly 102 does not obstruct the air flow on either side of the diaphragm 110 and does not contribute to containment of an air volume which may in turn result in an air resonance mode.

The transducer base structure 102 preferably also has a high mass compared to the diaphragm assembly 101, so that diaphragm displacement is large compared to that of the transducer base structure. Preferably, the mass of the transducer base structure is greater than 10 times, or more preferably greater than 20 times the mass of the diaphragm assembly 101.

Preferably, at least one key structural component of the transducer base structure 102, other than any magnets, is made from a material having high specific modulus, for example from a metal such as, but not limited to, aluminium or magnesium, or from a ceramic such as glass, in order to minimise susceptibility to resonance. In this embodiment, preferably the main base component 180 is formed from such materials.

Some preferred methods of connection for assembling the transducer base structure 102 have been described above, but it will be appreciated that the components of which the transducer base structure 102 is comprised may be connected together by any other suitable methods well known in the art. For example, components may be rigidly coupled via an adhering agent such as epoxy, or by welding, or by clamping using fasteners, or by a number of other methods. Welding and soldering provide strong and rigid connections over a wide area and hence are preferred, particularly if the geometries are more slender and therefore prone to resonance.

The transducer base structure 102 is designed to be rigid so that any resonant modes that it has occur outside of the transducer's frequency range of operation. The thickset, squat, heavy and/or compact geometry of the transducer base structure provides this embodiment with an advantage over conventional transducers having a transducer base structure consisting of a basket attached to a magnet and pole pieces. In this embodiment, to achieve a relatively high diaphragm excursion, a substantially large channel 187 is required. This channel increases the overall flexibility of the transducer base structure. As such, it is preferred that one or more rigidizers 128*a-c* are coupled across the channel to enhance the overall rigidity of the base structure 102. The rigidizers 128*a-c* may rigidly couple between the magnet 181 and one or more of the adjacent inner pole pieces 184-186. There may be a rigidizer 128*a-c* b coupled between the permanent magnet and each respective inner pole piece 184-186. Each rigidizer may be formed from a non-magnetic, rigid material.

The relatively large channel 187 may also introduce unwanted air resonance modes in some cases. As such, in some embodiments an air blocking member 129 (shown in FIG. 1) may be incorporated at or adjacent the open end 187*a* of the channel 187 to substantially seal the opening 187*a* (without affecting excursion). This is optional but preferred in this embodiment. The member 129 may be formed from a closed cell foam, such as Rohacell foam, or other gases impermeable material such as aluminium. This member 187 may also act as a heat sink.

It will be appreciated that in alternative embodiments, other excitation mechanisms including other force transferring components may be used, depending upon the application. For example, a piezoelectric or a magnetostrictive transducing mechanism could alternatively be incorporated in any one of the embodiments of the present invention, having piezoelectric or magnetically operable force transferring components, for example. Piezoelectric motors can be effective when used in combination with pure hinge systems and/or rigid diaphragm features according to the present invention, for example. In rotational action transducers, such transducing mechanisms can be located close to the axis of rotation where the usual low excursion disadvantage of piezoelectric devices is mitigated by the fact that a small excursion near the base causes a large excursion towards the diaphragm distal periphery or tip. Additionally, piezoelectric motors may be inherently resonance-free to a high degree, and lightweight, which means that there is reduced load on the diaphragm which might otherwise accentuate diaphragm resonance modes.

1.4 Hinge System

Referring to FIGS. 15A-15B, the hinge system 103 of the first preferred embodiment is a contact hinge system designed partially in accordance with the principles outlined in section 3.2 of PCT/IB2016/055472, which are hereby incorporated by reference.

The hinge system 103 may comprise a system of two or more interoperable sub-systems, an assembly of two or more interoperable components or structures, a structure having two or more interoperable components, or it may even comprise a single component or device. The term system, used in this context, is therefore not intended to be limited to multiple interoperable parts or systems. Furthermore, the hinge system 103 herein described may also be utilised in other applications as described in further detail under section 8, and unless otherwise stated, the invention in relation to the hinge system is not intended to be limited to the application of an audio transducer, as in this embodiment.

The hinge system 103 is coupled between the transducer base structure 102 and the diaphragm assembly 101. The hinge system 103 may form part of one or both of the transducer base structure 102 and the diaphragm assembly 101. It may be formed separately from one or both of these, or otherwise may comprise one or more parts that are formed integrally with one or both of these components. In this preferred embodiment, the hinge system forms a part of both the transducer base structure 102 and the diaphragm assembly 101 as described in sections 1.2 and 1.3 above.

Referring to FIGS. 15A and 15B, the hinge system 103 comprises a hinge assembly having multiple hinge joints 123-127 that are distributed along the width of the diaphragm 110 at or adjacent the base region 110*a*. There are preferably at least three hinge joints distributed along the hinge axis 199, and in this embodiment there are five hinge joints 123-127. Preferably the hinge joints 123-127 are distributed along a substantial or entire portion of the width of the diaphragm 110 at the base region 110*a*. The hinge joints 123-127 are substantially axially aligned and share a common hinging axis 199 (herein also referred to as axis of rotation 199 of the hinge system 103).

In this embodiment, there are four hinge joints 123-126 having convex contact member surfaces 191*a*-194*a* with normal vectors facing in a first, common direction and a fifth hinge joint 127 having convex contact member surfaces 195*a* with normal vectors facing in a second direction that is different and angled relative to the first direction. It will be appreciated that in alternative embodiments there may be any number of two or more hinge joints with convex contact member surfaces facing in the first direction and any number of one or more hinge joints with convex contact member surfaces facing in a second direction, without departing from the scope of the invention.

The hinge joints 123-126 with contact surface 191*a*-194*a* normal vectors facing the first direction 'A' (shown in FIG. 14C) are distributed in pairs on either side of a centre hinge joint 127, such that there are two outer hinge joints 123, 126 (left and right respectively) and two inner hinge joints 124, 125 (left and right respectively). The hinge joints 123-126 are preferably sufficiently spaced along the hinging axis 199 and/or width of the diaphragm 110 to cover a substantial portion of the width of the diaphragm 110 at the base region 110*a*. For instance, it is preferred that the hinge joints are spaced by a distance of at least approximately ¹⁄₁₀th, or more preferably at least approximately ⅙th, or most preferably at least approximately ¼ of the width of the diaphragm 110 in a direction substantially parallel to the hinging axis 199. It will be appreciated that the spacing and span of the hinge joints is dependent on the number of hinge joints and the width of the diaphragm 110 at base region 110a. Having multiple rigid hinge joints 123-126 facing in the same direction 'A' and covering a substantial portion of the width of the diaphragm 110 improves support of the diaphragm 110 and reduces the possibility of unwanted resonance modes arising during operation due to bending of the diaphragm along the hinging axis 199. The hinge joints 123-126 are preferably accurately axially aligned along the hinging axis 199 to maintain even contact and substantially unrestricted diaphragm rotation during operation.

Each hinge joint 123-127 comprises a contact member 191-195 having a contact surface 191a-195a and an associated hinge element 161-165 having a contact surface 161a-165a. In this embodiment, the hinge elements 161-165 are connected to the diaphragm 110 and the contact members 191-195 are connected to the transducer base structure 102. In alternative embodiments, one or more hinge joints 123-127 may have at least one contact member 191-195 coupled to the diaphragm 110 and the associated hinge element 161-165 coupled to the transducer base structure 102. It is preferred, however, that at least one hinge joint comprises a contact member that is rigidly coupled to the transducer base structure and more preferably multiple hinge joints comprise contact members that are rigidly coupled to the transducer base structure, as in this embodiment. The benefits of this will be described in further detail below.

The hinge elements 161-165 and contact members 191-195 may be connected to the diaphragm 101 and transducer base structure 102, either integrally, directly or via one or more other components. Preferably the hinge elements 161-164 are rigidly connected to the diaphragm 110 via the diaphragm base structure 130 and the hinge element 165 is connected to the diaphragm 110 via a resilient member 170 mounted to the diaphragm base structure 130. The hinge elements 161, 162 may be formed from a single component or part as shown in the figures, or they may be separate components. Similarly, the hinge elements 163, 164 may be formed as a single component or part or they may be separate components.

In the assembled state of the transducer 100, the contact surfaces 191a-195a and 161a-165a are held in abutment against one another and permitted to move relative to one another to rotate the diaphragm 110 during operation. To achieve this, at least one of the hinge element contact surfaces 161a-165a or one of the contact member contact surfaces 191a-195a of each hinge joint 123-127, comprises of a substantially convexly curved surface, in at least a cross-sectional plane perpendicular to the hinging axis 199, and in at least the region of contact between the respective contact surfaces. The other contact surface of each hinge joint 123-127 is preferably substantially planar, at least in the region of contact, to allow the associated convexly curved contact surface to roll thereagainst during operation. Alternatively one or more of the other contact surfaces may be concavely curved, in at least a cross-sectional plane perpendicular to the hinging axis 199. In yet another alternative, one or more of the other contact surfaces may be also convexly curved, in at least a cross-sectional plane perpendicular to the hinging axis, but with a radius of curvature that is relatively larger than the associated contact surface of the respective hinge joint.

The contact surfaces 161a-165a of the hinge elements 161-165 and the contact surfaces 191a-195a of the contact members are preferably also substantially rigid such that they do not flex or deform upon contact and during operation. The radius of curvature of the convexly curved contact surface 191a-195a of each hinge joint 123-127 is preferably sufficiently small to reduce rolling resistances, but sufficiently large to avoid undue flexing during operation. Also, any contact surface that is curved in at least the region of contact preferably comprises a substantially smooth curvature profile to enable smooth and even rolling action during operation. The contact surface that is curved is preferably also substantially linear along the hinging axis 199, but may alternatively be curved about any other axis or axes, such as one or more other axis or axes that is(are) substantially orthogonal to the hinging axis 199—thereby forming a ball-like contact surface or similar.

In this embodiment, the contact member contact surfaces 191a-195a are substantially convexly curved, about an axis that is substantially parallel to the axis of rotation 199 (i.e. curved in the cross-sectional plane that is perpendicular to the hinging axis 199). The curved contact surfaces 191a-195a also extend substantially longitudinally and are substantially axially aligned such that they are substantially collinear and share a common line of contact with their respective hinge element contact surfaces 161a-165a. The substantially common line of contact forms the hinging axis 199. In this embodiment, the hinge element contact surfaces 161a-165a are each substantially planar, in at least the region of contact and the contact surfaces 161a-165a are substantially coplanar.

As previously mentioned, the four inner and outer hinge joints 123-126 having contact member contact surfaces 191a-194a with normal vectors facing a first direction and the fifth central hinge joint 127 has a contact member contact surface 195a facing in a different, second direction that is angled relative to the first direction. In this specification, a normal vector of a surface is intended to mean the vector that is substantially orthogonal to a tangential plane of the surface and that extends in the direction that the surface is facing. For example, vector 'A' of FIG. 14C shows a normal vector of contact surface 193a and vector 'B' shows a normal vector of contact surface 195a. In this specification, unless otherwise specified, reference to the direction that a contact surface faces, is intended to mean the direction of the normal vector of that surface.

In this embodiment, the convexly curved contact surfaces 191a-194a of the hinge joint 123-126 comprises normal vectors facing in a first, common direction that is substantially parallel to the normal vector A of contact surface 193a (shown in FIG. 14C). The convexly curved contact surface 195a of the hinge joint 127 comprises a normal vector B facing in a second direction (as shown in FIG. 14C, for example). In this embodiment, the directions of normal vectors A and B also represent the directions of the reaction force vectors imparted by the transducer base structure 102 on the diaphragm assembly at the regions of contact of the respective hinge joints 123-126, due to the biasing mechanism 170 of the hinge system 103 (explained in further detail below).

In some embodiments there may be only one contact member contact surface facing in the first direction, and/or multiple contact member contact surfaces facing in the second direction, and/or one or more other contact member contact surfaces facing in one or more other directions that are different to the first and second directions.

Examples of some of these variations are provided in the various embodiments in this specification, however, it will be appreciated that the invention is not intended to be limited to these particular examples. However, for each hinge system embodiment, it is preferred that the common direction of the contact member contact surface(s) of at least one set of hinge joint(s) is different to a common direction of the contact member contact surface(s) of at least one other set of hinge joint(s).

In this embodiment, the first and second directions of normal vectors A and B, respectively substantially oppose one another in a neutral state and during operation of the transducer 100. In other words, the normal vectors A and B are angled at approximately 180 degrees relative to one another. In some embodiments this angle may alternatively be between approximately 135 degrees and 225 degrees. Such an arrangement enhances the rigidity of the hinge 103 against translational motion in directions that are orthogonal to the hinging axis 199. In this manner the contact member 195 has a contact surface that faces generally toward the transducer base structure 102, while the contact members 191-194 have contact surfaces that face generally toward the diaphragm 110. Having at least one contact member 195 with a normal vector B facing in a substantially opposing direction to the remaining contact members 191-194 is advantageous because it provides a reaction force against the contact members 191-194, helping to clamp the diaphragm 110 in position relative to the hinge assembly 103. This reaction force maintains close and substantially consistent physical contact between the contact members 191-194 and their respective hinge elements 161-164 during operation. In this embodiment, the reaction force imparted by the transducer base structure 102 and exhibited at the hinge joint 127 is equal to the opposite of the sum of all reaction forces exhibited at the remaining hinge joints 123-126, meaning the hinge is balanced in situ.

As previously mentioned and as shown in FIGS. 12-14C, it is preferred that at least one, but preferably all contact member contact surfaces 191a-195a are substantially rigid. Furthermore, it is preferred that at least one, but preferably all contact members 191-195 themselves are substantially rigid. Also, as previously mentioned, at least one contact member 191-195 is preferably rigidly coupled to the transducer base structure and more preferably at least two contact members are rigidly coupled to the transducer base structure 102. In this embodiment, all contact members 191-195 are substantially rigidly coupled to the transducer base structure 102. This enables the associated convexly curved contact surfaces 191a-195a to be formed with high accuracy. It also enables the alignment of the contact surfaces 191a-195a to be substantially maintained during assembly and operation, as the rigidity of the transducer base structure 102 holds its shape and the relative positions of these components across its width well. The contact surfaces 191a-195a may be formed on the transducer base structure 102 via any suitable method such as machining, cutting, welding, attaching, lapping, moulding and the like.

Figure 12:
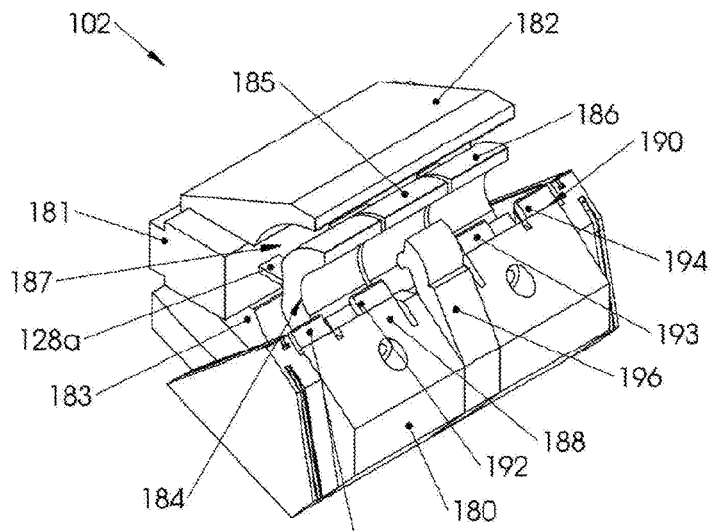
FIG. 12 shows a three dimensional isometric view of the driver base structure of the audio transducer of FIG. 1.
Figure 13:
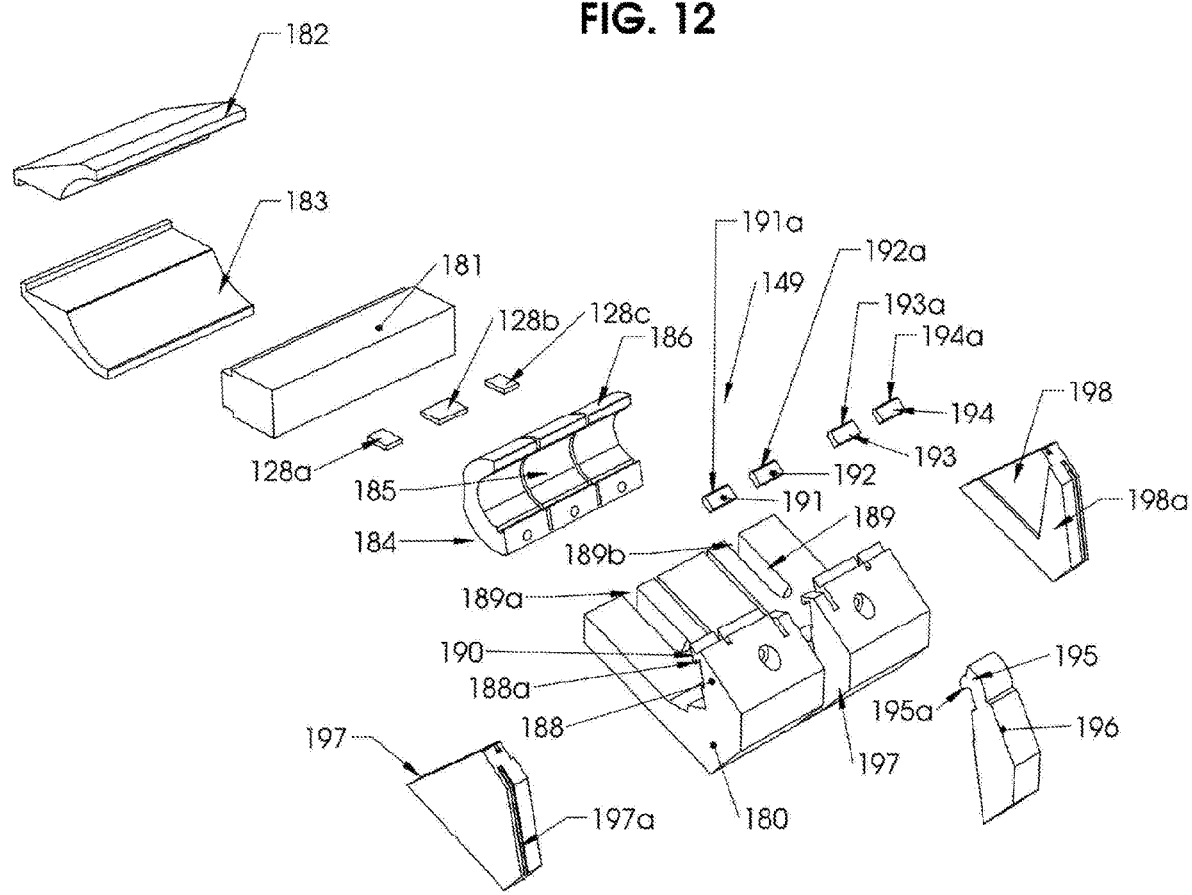
FIG. 13 shows an expanded view of the driver base structure of the audio transducer of in FIG. 1.

As shown in FIGS. 12 and 13, in this embodiment, the contact members 191-194 are rigidly coupled to corresponding cavities or recesses at the hooked end 188 of the main base component 180 of the transducer base structure 102. The contact members 191-194 may be adhered, welded, fastened or other rigidly fixed to the cavities using any suitable mechanism. Alternatively they may be integrally formed with the hooked end 188. In situ, the contact surfaces 191a-194a form a convex, axial terminal edge 190 of the main base component 180. As previously described, the contact member 195 is a terminal hooked end of a central contact block 196. The contact block 196 may be rigidly coupled to the main base component 180 via adhesive, welding, fastening or any other suitable mechanism. Otherwise, the contact block 196 may be integrally formed with the main base component 180.

As previously mentioned and as shown in FIGS. 10 and 15A-B, it is preferred that at least one, but preferably all hinge element contact surfaces 161a-165a are substantially rigid. Furthermore, it is preferred that at least one, but preferably all hinge elements 161-165 themselves are substantially rigid. Also, as previously mentioned, at least one hinge element 161-165 is preferably rigidly coupled to the diaphragm 110 and more preferably at least two hinge elements are rigidly coupled to the diaphragm 110. Also, preferably at least one hinge element 161-165 is flexibly coupled to the diaphragm 110 or transducer base structure 102. In this embodiment, hinge elements 161-164 are substantially rigidly coupled to the diaphragm 110 and central hinge element 165 is flexibly coupled to the diaphragm 110. The hinge elements 161, 162 are rigidly coupled to an exterior surface of the first hinge bar 151. Preferably the elements 161, 162 are coupled to an opposing side of the hinge bar 151 to the channel 151d. The hinge elements 163, 164 are rigidly coupled to an exterior surface of the second hinge bar 150. Preferably the elements 163, 164 are coupled to an opposing side of the hinge bar 150 to the channel 150d. The hinge elements 161-164 are preferably welded to the respective hinge bars 150, 151, but may be adhered, fastened, or otherwise rigidly fixed or integrally formed in any suitable manner. In this manner, the hinge elements 161-164 are rigidly connected and closely associated with the diaphragm 110 via the respective hinge bars 150, 151 and diaphragm base frame 131. In this embodiment, the hinge element 165 is flexibly coupled to the diaphragm 110 via a resilient member 170 of the diaphragm base structure 130.

The above preferred arrangement of this embodiment results in a central hinge joint 127, a first pair of inner hinge joints 124, 125 on either side of the central hinge joint 127, and a second pair of outer hinge joints 123, 126 on either side of the inner hinge joints 124, 125.

Referring now also to FIGS. 15C-F, the hinge system 103 further comprises a flexible and resilient member 170 which also acts as a biasing mechanism of the hinge system 103. The biasing mechanism is configured to compliantly bias the contact surface 161a-165a of the hinge element 161-165 of each hinge joint 123-127 towards the contact surface 191a-195a of the associated contact member 191-195, to maintain substantially consistent physical contact between the contact surface 161a-165a of the hinge element 161-165 and the contact surface 191a-195a of the associated contact member 191-195 during operation. Preferably the biasing mechanism is substantially compliant. It is preferred that this biasing mechanism is substantially compliant in directions that are substantially parallel to the normal vectors of the contact surfaces of the hinge joints 123-127. It is also preferred that the biasing mechanism is in the form of a flexible and resilient member which may be formed from a relatively soft material such as an elastomer (e.g. Silicone rubber), a thermoplastic elastomer, a natural rubber, a thermoset polyether-based polyurethane or a polyurethane based material, or alternatively a relatively rigid material with geometry that exhibits resilience and/or flexibility, such as a metal spring. In some cases, the resilient member may form part of a hinge element or contact member. Preferably the resilient member is configured to resiliently flex and/or deform in directions that are substantially orthogonal to the hinging axis 199 of the hinge assembly 103. The resilient member may additionally be configured to resiliently flex and/or deform in any direction that are angled relative to a longitudinal axis of the diaphragm 110.

It is preferred that the resilient member 170 applies a biasing force in a direction with an angle of less than 25 degrees, or less than 10 degrees, or less than 5 degrees to normal vector of the contact member contact surface of each hinge joint 123-127. In this embodiment, the resilient member 170 applies a biasing force in the direction of the normal vector of the hinge element contact surfaces 165*a* and this force is transmitted to all hinge joints 123-127 at the region of contact between each hinge element and the associated contact member, in situ and during operation. The resilient member 170 is thus substantially compliant in terms of that it applies a biasing force (as opposed to a biasing displacement) in a direction substantially parallel to the normal vectors of the contact surfaces of the associated hinge joint 127, in situ and during operation. It is also preferable that the resilient member 170 is substantially compliant in terms of that the biasing force does not change greatly if, in use, the hinge element 165 of the associated hinge joint 127 shifts slightly a direction substantially parallel to the normal vector of the contact surface 165*a* of the associated hinge element 165, in situ and during operation.

In this embodiment, the resilient member 170 comprises of a main body having a central section 171 and a pair of legs 172, 173 extending axially from either side of the central section 171. The central section 171 is preferably bent or u-shaped to form a cavity 176 for receiving and retaining the hinge element 165. The floor 176*a* of the cavity is preferably stepped 178 and connects on either side with substantially upright side walls 177. The floor 176*a* may be substantially inwardly curved at each level on either side of the cavity 176. The outer wall 166 on each side of resilient member 165 may comprise a radius at each level that is complementary to the curvature of the corresponding level of the cavity floor 176*a*. This arrangement allows the hinge element 165 to accurately align the respective contact member contact surface 195*a* during assembly and even during operation. If the contact member 195 is out of alignment, this will cause hinge element 165 to slide within the corresponding cavity 176. The complementary curved walls of hinge element 165 and cavity 176 respectively will force the hinge element 165 back into the appropriate position. In turn the corresponding contact member contact surface 195*a* will be forced into the appropriate position, in alignment with the hinging axis 199. Other alignment mechanisms may be used in alternative embodiments. The hinge element 165 is preferably removably coupled to the recess also for maintenance, but it may otherwise be fixedly coupled in some embodiments. The exposed upper surface of the hinge element 165 forms the contact surface 165*a* of the hinge element 165, against which the contact surface 195*a* of the associated contact member 195 bears in situ.

The resilient member 170 may be formed from a suitably rigid material, such as metal, but shaped to have resilience. The hinge element 165 is preferably sufficiently stiff to withstand deformation/flex under loads of approximately 10 kg-50 kg for example. In the preferred embodiment the hinge element 165 is formed from a tungsten carbide or titanium.

The pair of legs 172, 173 are preferably axially aligned. Each leg 172, 173 terminates in a respective foot 174, 175 extending laterally from the leg in the direction of the bend of the central section 171. Each foot 174, 175 may be coupled to the respective leg 172, 173 via a relatively thin and/or flexible tendon 179. Each foot 174, 175 is configured to rigidly connect to the diaphragm 110 via a respective hinge bar 150, 151. Each foot may consist of a body 174*a*, 175*a* having one or more protrusions 174*b*, 175*b* extending laterally thereform which may be fixed to the channel 150*d*, 151*d* of the respective hinge bar 150, 151. Preferably, there is a ridge or protrusion on either side of each foot. The protrusion are received within the complementary channels 150*d*, 151*d* in situ and retained securely therewithin in the assembled state of the hinge system 103. In other words, the contact force imparted on the resilient member by the contact members clamps the resilient member securely against the respective hinge bars 150, 151.

The tendon 179 acts like a pivot in order to provide an even distribution of force to the pair of protrusion at each foot. The spacing between the protrusions 174*b* and 175*b* of each foot 174, 175, as well as the substantially even force applied to each via the respective tendons 179, allows the feet 174, 175 to resist slippage. For example, if the centre hinge element 165 translates in a direction perpendicular to the hinging axis 199 and parallel to the coronal plane of the diaphragm 110 during operation, this may create a torque in the tendons 179 that is parallel to the axis tendon 179. If there was a single contact with the diaphragm assembly 102 underneath each tendon 179 this may slip/twist under the action of the generated torque. This would in turn be amplified by the lightweight diaphragm 110. However, in this embodiment, the spaced protrusions 174*b* and 175*b* at either side of the foot 174, 175 respectively resist such a torque. The tendon 179 provides a further advantage in that it is capable of absorbing some of the torque via twisting.

Preferably at least the legs 172, 173 of the member 170 are resilient. The central section 171 is preferably less resilient/stiffer relative to the legs 172 and 173. It may be thicker in this region or comprise of a stiffening material or component for example.

In the assembled state, the resilient member 170 biases the contact member contact surface 195*a* away from the diaphragm 110. In other words it applies a force to the contact surface 195*a* in a direction opposing the normal vector B associated with contact surface 195*a*. The resilient member 170 acts to mitigate unwanted flexing of the diaphragm body 111 that would otherwise occur due to the existence of hinge joints with contact member surfaces facing in two substantially opposing directions.

This problem can arise due to the rolling action of contact hinge assemblies of this type. As the convex contact surfaces 191*a*-195*a* roll over the respective hinge element contact surfaces 161*a*-165*a*, a force is imparted on each hinge element contact surface 161*a*-165*a* in the direction of rolling. This force may be mechanically transmitted through to the diaphragm body 111 via the rigid components of the diaphragm assembly 101. Having at least two hinge joint with contact member contact surfaces facing in opposing directions means that during operation their respective convex contact surfaces will roll in opposing directions. This means the respective hinge elements experience opposing linear forces. These opposing linear forces may be mechanically transmitted to the diaphragm body 111 via the rigid diaphragm base structure 130 which in turn may lead to unwanted flexing of the diaphragm body 111 during operation. Such unwanted flexing can lead to unwanted resonance and noise. It may also place undue stress on other rigid components of the diaphragm 110 such as the reinforcement. If the diaphragm body 111 was formed to have relatively higher rigidity, this may mitigate flexing but could cause the rolling contact surface 195*a* to slip during operation due to the increased rigidity of the structure. Coupling the resilient member 170 between the central hinge element contact surface 165*a* and the diaphragm body 111 acts to absorb any linear forces generated by rolling of the respective convex contact surface 195*a* over the hinge element 165. The absorbed forces are therefore not transmitted to the diaphragm body 111 which in turn minimised unwanted flexing of the body 111 during operation.

In some forms one of the hinge element 161-165 or the contact member 191-195 of one or more hinge joints 123-127 comprises a contact surface having one or more raised portions or projections, such as a limit, stop or abutment, configured to prevent the other of the hinge element 161-165 or contact member 191-195 from moving beyond the raised portion or projection when an external force is exhibited or applied to the audio transducer.

Depending upon the application it may also be useful to provide stoppers that prevent impacts to potentially fragile components such as the motor coil. These may be independent from stoppers acting on the contact surfaces of the hinge joints 123-127.

Referring to FIGS. 3B and 3C, in the assembled state of the transducer 100, a relatively small air cavity 105 may be provided between the contact block 196 and the end face 114 of the diaphragm body 111. This small air cavity 105 helps seal air between the upper major face 112*a* of the diaphragm body 111 and the lower major face 112*b* of the diaphragm body 111 during operation, to generate the necessary positive and negative sound pressures for transducing sound.

1.4.1 Advantages of Hinge System

Several advantages are observed by the above-described hinge system 103. First, as previously described, having multiple hinge joints 123-126 with contact member contact surfaces 191*a*-194*a* facing in a first common direction and distributed along the hinging axis 199 across a substantial or entire portion of the width of the diaphragm 110 increases the support to the diaphragm 110 to minimise unwanted resonance modes due to diaphragm flexing, without unduly affecting the overall weight of the transducer 100.

Second, forming the convexly curved contact surfaces 191*a*-195*a* on the contact members 191-195 of the transducer base structure 102 means that these surfaces can be shaped and aligned with relatively high accuracy in terms of profile and alignment. In contrast, forming all or the majority of convex surfaces 191*a*-195*a* as part of the diaphragm assembly 101 could increase manufacturing complexity and compromise accuracy. This is because the diaphragm assembly 101 is relatively lightweight compared to the transducer base structure 102 and consists of multiple, relatively delicate components that must be accurately joined together during manufacture. For instance, if convex surfaces were to be formed prior to joining of the components during manufacture, then this could result in deformation of other parts of the diaphragm assembly 101 which could then make the joining process difficult or inaccurate. Deformation may occur due to heating and cooling from welding for instance. Deformation could also compromise the accuracy of shape and alignment of the convex surfaces. Otherwise, if the convex surfaces are to be formed after joining of the diaphragm assembly 101 components then the assembly may be at risk of damage or of the introduction of foreign matter, such as dirt. Also, access to necessary parts for forming the convex surfaces may be difficult after the components of the assembly have been joined. Finally, even if the convex surfaces were accurately formed on the diaphragm assembly 101, the diaphragm 110 may still be at risk of deformation during operation due to the softness of the body 111 relative to the rigid hinge components. For these reasons it may be difficult to form accurately aligned three-dimensional surfaces, such as convex surfaces, on the diaphragm assembly side of the hinge 103. On the other hand, the transducer base structure 102 is a relatively more rigid and heavy structure. As such, it is simpler to accurately form aligned three-dimensional (substantially non-planar) surfaces, such as convex contact surfaces 191*a*-195*a* (e.g. via machining, cutting, lapping, moulding, attaching, welding etc.). Access is also better and risk of subsequent deformation of transducer base structure parts is reduced, during and after manufacture.

Additionally, having the majority of convex contact surfaces 191*a*-194*a* facing in the first common direction simplifies the forming process and improves accuracy. For instance the surfaces 191*a*-194*a* may all be formed in a single pass during a cutting or lapping process, and/or measurements may be more accurate.

Furthermore, as described above, the resilient member 170 acts to absorb linear forces at the fifth hinge joint 127 that may otherwise be transmitted to the diaphragm body 111 via the diaphragm base structure 130. This, in turn reduces unwanted flexing of the relatively less rigid diaphragm body 111 during operation. Also, having multiple hinge joints 123-126 having contact member contact surfaces 191*a*-194*a* facing in the same direction means linear forces that may be transmitted to the diaphragm body 111 during operation, due to the rolling of respective contact surfaces 191*a*-194*a*, are all in the same direction which reduces the possibility of flexing of the diaphragm body 111.

The provision of a resilient member 170 also means that any unwanted forces generated because of inaccuracies in the profile and/or location of the opposing contact member contact surface 195*a*, are also absorbed and substantially mitigated, or at least alleviated, by the resilient member 170. As such, the resilient member 170 may allow for reduced manufacturing tolerances.

1.5 Centring Mechanism

Referring to FIGS. 4C-E, 7B-E, 10 and 13, in this embodiment, the transducer 100 further comprises a centring mechanism for holding the diaphragm 110 in the correct position relative to the transducer base structure 102, especially in the case of an impact or other unexpected event imparting a force on the transducer 100, for example. The centring mechanism permits rotation of the diaphragm 110 relative to the transducer base structure for normal operation. It also facilitates in maintaining alignment of the hinge elements and contact members of the hinge system 103 by minimising or substantially prohibiting relative linear movement between the diaphragm 110 and transducer base structure 102.

The centring mechanism utilises ligaments 155 connected at one end to the diaphragm assembly 101 and at the other end to the transducer base structure 102. The ligaments are substantially stiff in tension direction to help prevent relative linear movement between the diaphragm 110 and transducer base structure 102, but are substantially flexible/bendable along their length to permit rotational movement between the diaphragm 110 and transducer base structure 102 in situ. They are designed such that they do not greatly influence rotation. The ligaments 155 also have one end fixed, either directly or indirectly, to the hinge elements 161-165 of the hinge system 103, and then another end coupled to the contact members 191-195 to help maintain relative alignment of these parts of the hinge system 103.

The centring mechanism comprises a pair of centring blocks 153, 197 and 154, 198 on either side of the transducer 100. In some embodiments, a single pair of centring blocks may be provided only on one side of the transducer 100. In this embodiment each pair of centring blocks comprises a first, diaphragm-side centring block 153, 154 rigidly coupled to the diaphragm 110 and a second base-structure-side centring block 197, 198 rigidly coupled to the transducer base structure 102. The centring blocks of each pair, 153, 197 and 154, 198, are located adjacent one another in situ. Each of the first centring blocks 153, 154 comprises a body having a pair of ligament pins 153a, 153c and 154a, 154c protruding therefrom and one or more ligament channels 153b, 154b traversing therethrough. Each associated second centring block 197, 198 comprises of a body having one or more ligament channels 197a, 198a. In the assembled state of the centring mechanism, two ligaments 155 are wound about the ligament pin 153a, 153c, 154a, 154c on each side of the transducer, pulled tight through the respective channels 153b, 197a and 154b, 198a and adhered to the interior walls of the channels to substantially rigidly secure the respective first and second centring blocks 153, 197 and 154, 198 in close association with one another. During assembly, all ligaments 155 may be placed under a small tensile load, for instance approximately 80 g, to pull them tight through the respective channels before adhesive agent is applied to the regions to be adhered. This helps to minimise slack that could otherwise result in inaccurate positioning.

Each channel 153b, 154b, 197a, 198a is preferably open at both ends and may extend along one, two or three Cartesian axes, as required by the particular transducer, to achieve the desired level of hold between the associated first and second centring blocks. In the preferred embodiment, each side of the transducer comprises two ligaments 155B-C. Referring to FIG. 7C, a first ligament 155B on each side is coupled to the respective pin 153a, 154a at one end and has one or more sections extending through a first set of channels along a first axis in a first direction. The first axis is substantially orthogonal to a plane that is tangential to the contact surfaces of the hinge system 103 at the regions of contact of the respective hinge joints 123-127. Referring to FIG. 7E, a second ligament 155C on each side is coupled to a respective pin 153c, 154c at one end and has one or more sections extending through a second set of channels 153d, 154d along the first axis in a second direction that substantially opposes the first direction of the first ligament 155B. The first and second ligaments may extend between a region of contact between their respective centring block pairs 153, 197 or 154, 198 as shown in FIGS. 7C and 7E. The first and second ligaments may extend over an air gap preceding the region of contact between their respective centring block pairs 153, 197 or 154, 198.

Each ligament 155B-C is preferably formed form a material and structure that is too fine and compliant to contribute significantly to resisting translational displacement for the purpose of minimising diaphragm break-up resonances, and it primarily serves to hold the diaphragm roughly in position. Each ligament 155B-C is preferably a string that is substantially resistant to fatigue or wear from bending. The ligaments are preferably comprised of multiple strands to facilitate having a: greater bending compliance resulting in a reduced fundamental diaphragm resonance frequency; high tensile modulus, e.g. higher than 10 GPa or more preferably higher than 20 GPa, or more preferably higher than 30 GPa, or most preferably 50 GPa; low tendency to creep over time, since this can result in a change in diaphragm positioning away from an ideal location; a high resistance to abrasion to help prevent wear. For example, an aromatic polyester fiber such as Vectran™ fiber or an ultra-high molecular weight polyethylene fibre such as Spectra™ may be suitable. Alternative materials include very thin strands of metal with relatively high flexibility (e.g. thin sheet of steel or titanium) or a polyurethane for example.

The centring mechanism improves the accuracy of the location of the diaphragm 110 relative to the transducer base structure 102. This may in turn facilitate smaller air gaps between the periphery of the diaphragm 110 and surrounding structures to improve operation.

In an alternative embodiment the centring mechanism may comprise a modification to one or more of the hinge elements 161-165 where the hinge element comprises a shallow hollow within which the respective contact member 191-195. The hollow preferably comprises a radius that is relatively larger than the radius of the associated contact member. The hollow acts to bias the contact member into the neutral position at the trough of the hollow. If the contact member moves out of this neutral position, the shape of the hollow forces the contact member back toward the trough, which in turn acts to re-centre the hinge system and diaphragm relative to the transducer base structure.

Referring in particular to FIGS. 3F and 4C-E, the centring mechanism further comprises a torsion bar 149 configured to bias the diaphragm 110 toward a desired position relative to the hinging axis. In the preferred form the torsion bar 149 acts to bias the diaphragm in a desired position along the hinging axis 199 and/or biases the diaphragm toward the hinging axis 199 in directions substantially perpendicular to the hinging axis. In this preferred embodiment, the torsion bar 149 also acts to provide a rotational, restoring force to bias the diaphragm 110 toward a desired rotational position, e.g. the neutral rotational position. The torsion bar 149 has a first longitudinal, torsional section 149a that extends substantially parallel and proximal to the hinging axis 199, in situ. The section 149a comprises cross-sectional area, in a plane perpendicular to the hinging axis 199 that is relatively small to allow for a low fundamental frequency of the driver. An end 149d of the first torsional section 149a is fixedly coupled to contact member 162 of the diaphragm assembly 101. In situ and during operation, the section 149a flexes provides a restoring/biasing force to bias the diaphragm toward the neutral, rotational position. A second longitudinal section 149b extends substantially orthogonally from an end of the first section 149a that is distal to end 149d. An end 149c of the second torsional section 149b, that is distal to the first section 149a, is fixedly coupled to the base component 180 of the transducer base structure. In situ and during operation, this section 149b flexes to allow biased, translational movement of the diaphragm in directions that are substantially parallel to the hinging axis 199. It also biases the diaphragm toward a neutral position in terms of rotational motion about the longitudinal axis of the section 149b. In combination, sections 149a and 14b provide a restoring force to centre the diaphragm 110 back into a central position along the hinging axis when a shock impact or other unwanted external force moves the diaphragm out of position. The torsion bar 149 is preferably made from titanium, and is fixedly coupled to via welding or adhesive.

In another alternative embodiment, one or more resilient elements, such as silicone elements, preferably located at or adjacent the hinging axis 199, may act to bias the diaphragm 110 toward a desired position, along the hinging axis 199 and/or in directions perpendicular to the hinging axis. The resilient element(s) may also provide a rotational, restoring force to bias the diaphragm toward a neutral rotational position.

1.6 Preferred Methods of Hinge Alignment

Hinge Element Alignment

Referring to FIG. 52A, in a preferred method 900 for assembling the diaphragm assembly 101 is described in accordance with the following steps to achieve accurate alignment of the hinge elements 161-165.

First, the hinge elements 161-164 are formed or coupled (preferably rigidly as previously described) to the diaphragm base frame 131 such that they face in a first common direction (step 910). Second, the hinge element 165 is formed or coupled (preferably flexibly as previously described) to the diaphragm base frame 131 such that it faces in a second common direction (step 920), that is angled relative to the first direction (as previously described). Lastly, the contact surfaces 161a-164a of hinge elements 161-164 are axially aligned with the contact surface 165a of the hinge element 165 so that all contact surfaces 161a-165a share a substantially common tangential plane (step 930). Finally (step 940), the diaphragm 110 may be coupled to the diaphragm base frame 131.

Step 910 may comprise the step of coupling the hinge bars 150, 151 to the diaphragm base frame, for example. Step 920 may comprise the steps of first coupling the resilient member 170 rigidly to the diaphragm base frame 131 and then the insert 165 to the cavity of the resilient member 170. The hinge bars and the resilient member may be adhered, welded or otherwise fixed onto the diaphragm base frame 131 via any suitable manner known in the art. Optionally, the base frame side plates 133, 134 and the brace plates 136a,b and 137a,b are also coupled to the base frame 131 at this stage, or they may be coupled with the conductive coil(s) 140 at a later stage.

Step 930 may comprise locating the partly-assembled diaphragm base structure within a jig where the hinge elements 161-165 are connected to their respective surfaces and accurately aligned axially within a common plane using an adjustment mechanism. Referring to FIG. 52B, this may comprise the steps of:
 (v) positioning the diaphragm base frame 131 in a jig having an adjustment mechanism for adjusting the position of the first set of hinge elements 161-164 relative to the central hinge element 165 (step 931);
 (vi) adjusting the position of the first set of hinge elements 161-164 relative to the central hinge element 165 using the adjustment mechanism of the jig (step 932);
 (vii) repeating steps (i) and (ii), if necessary, until the contact surface(s) of the hinge elements 161-165 share a substantially common tangential plane (step 933); and
 (viii) fixing the position of the hinge elements 161-164 relative to the hinge element 165 when axial alignment is achieved (step 934).

The jig may model the contact members 191-195, for example. In alternative embodiments, the hinge elements 161-165 may be aligned along a common plane and longitudinal axis via an alternative method, such as via an optical based measuring system to provide feedback on hinge element positioning for adjustment. In yet another alternative, the hinge elements 161-165 may be aligned by clamping or otherwise coupling the partly-assembled diaphragm base structure to the transducer base structure 102, or a similar dummy transducer base structure, in the appropriate position such that the hinge elements 161-165 contact the respective contact members 191-195.

Without the rigidity of the conductive coil(s), and the reinforcements 116, 117, 115 of the diaphragm 110, the partly-assembled diaphragm base structure is capable of flexing into accurate alignment before additionally rigidity is added via coupling of the conductive coil(s) 140 and diaphragm 110. This enables adjustment at step 932. The conductive coil(s) 140 and diaphragm 110 are then coupled to the partly-assembled diaphragm base structure to form the diaphragm assembly 101 at step 934. Preferably, the diaphragm 110 is coupled in the neutral rotational position. This method enables appropriate alignment of the hinge elements 161-165 while minimising diaphragm body flex and/or residual stresses in the neutral position of the diaphragm that would otherwise occur if the entire assembly was manipulated to align the hinge elements 161-165. This also reduces required manufacturing tolerances for the diaphragm 110.

In another preferred method, the above step of aligning the hinge elements using a jig, measurement feedback, or coupling to a transducer base structure is first performed for the hinge elements 161-164 of the hinge joints 123-126 having contact surfaces facing in a common direction (e.g. at step 910). The hinge element 165 is then subsequently coupled into the recess 176 of the associated resilient element 170 (at step 920) and adjusted into accurate axial and coplanar alignment with the remaining hinge elements 161-164 by measuring the position of the hinge element contact surface 165a relative to the contact surfaces 161a-164a and/or relative to the associated contact member contact surface 195a (at step 930).

At steps 932 and 933, the position of the hinge element 165 may be iteratively adjusted using feedback from a measurement system that may detect relative position. Alternatively, at steps 932 and 933, the position of the hinge element 165 may be iteratively adjusted by coupling the diaphragm 110, or a model of diaphragm 110 to the partly-assembled diaphragm base structure, and coupling the resulting assembly 101 or model assembly to a transducer base structure 102, or model transducer base structure, and:
 operating the hinge to observe the resonant frequency of the coupled diaphragm until a predetermined low fundamental frequency is achieved; and/or
 measuring the angle of the hinge element contact surface 165a relative to the diaphragm 110 in a neutral state until a predetermined relative angle is achieved.

Contact Member Alignment

Manufacturing a transducer base structure having a number of contact members contact surfaces 191a-195a that are accurately axially aligned in a common plane may be difficult if conventional manufacturing methods are used, especially if these surfaces face in opposing directions.

Referring to FIG. 53A, a preferred method 950 of manufacturing the transducer base structure to achieve accurate alignment contact member contact surfaces 191a-195a is to:
 A. form or rigidly couple the contact member contact surfaces 191a-194a in the transducer base structure 102 or a base structure component (step 960);
 B. form or rigidly couple the opposite-facing contact member contact surface 195a in the transduce base structure 102 or a base structure component;
 C. axially aligning the contact surfaces 191a-194a with the contact surface 195a such that they share a common tangential plane (step 980); and
 D. Fixing the relative positions when the contact surfaces 191a-195a are aligned (step 990).

Step 960 may comprise coupling or forming the contact members 191-194 in a first base structure component, such as the main base component 180, and step 970 may comprise coupling or forming the contact member 195 in a second base structure component, such as the contact block 196. Referring to FIG. 53B, step 980 may then comprise the steps of:
 (i) (optionally) Positioning the second component in an approximately correct position relative to the first component;
 (ii) Measuring the axial alignment of the contact member contact surfaces 191a-195a (step 981);

(iii) Adjusting the position of second component relative to the first component until correct alignment is achieved (step 982);

(iv) repeating steps (ii) and (iii), if necessary, until the contact surface(s) of the first and second set of contact members share a substantially common tangential plane (step 983).

Step 981-983 may involve, for example, a system of motors or manual winders that translates the second component before it is attached (step 990). In this case the second component may be fixed/attached to the first component after correct/accurate alignment has been achieved. Adhesive may be applied to fix the components together prior to step 980 and then step 980 is performed before the adhesive sets (step 990).

Instead of step (i) above, step 970 may involve creating the contact member contact surface 195*a* in approximately the correct position. In such cases 982 may involve bending or another type of deformation of one or more of the components, in order to achieve correct/accurate alignment.

In some embodiments step 981 may involve installation of a test, prefabricated pseudo or model diaphragm to the contact members 191-195, then determining appropriate alignment at step 983 by determining if:

the pseudo-diaphragm is in a predetermined neutral position; and/or the fundamental resonance frequency of the diaphragm when operated is relatively at a predetermined desired frequency.

The pseudo-diaphragm may comprise a metal plate shaped at one edge to form pseudo-hinge-elements corresponding to hinge elements 161-165. For optimal operation, it may provide high rigidity in-plane and high compliance in terms of bending. It should provide sufficient contact force against the corresponding contact members 191-195 when fixed into position on the transducer base structure 102.

Assembling Transducer

Referring to FIG. 54, a method 1000 of manufacturing transducer 100 may therefore comprise:

D. constructing a diaphragm assembly 101 having plurality of hinge elements of a hinge as per method 900 (step 1001);

E. constructing a transducer base structure 102 having a plurality of contact members corresponding of a hinge corresponding to the hinge elements of the diaphragm as per method 950 (step 1002); and F. coupling the diaphragm assembly to the transducer base structure by engaging the hinge elements with the contact members (step 1003).

2. Second Audio Transducer Embodiment

Referring to FIGS. 16, 17A-B, 18A-J, 19A-E, 20A-B, 21A-D, 22A-B, 23A-D, 24A-G, 25A-D and 26A-F a second preferred embodiment of a rotational action audio transducer 200 of the invention is shown.

2.1 Brief Overview

The audio transducer 200 comprises a diaphragm assembly 201 having a diaphragm assembly 210 that is rotatably coupled to a transducer base structure 202 via a diaphragm suspension system 203. The diaphragm suspension system 203 comprises a hinge system (shown clearly in FIGS. 24A-G) and also a centring mechanism on both sides of the transducer (shown in FIGS. 25A-D and 26A-F). The transducer 200 is similar to the transducer 100 of the first embodiment. For the sake of conciseness, some features that are the same or similar to those of transducer 100, either physically or conceptually, will not be described in detail again. It will be appreciated, however, that such features and their potential variations/alternatives still apply to this embodiment as would be readily apparent to those skilled in the art.

The audio transducer 200 of this embodiment comprises a diaphragm assembly 201 that is rotatably coupled to a transducer base structure 202 via a substantially rigid, contact hinge system 203. The hinge system 203 herein described may alternatively be used in other applications as described in section 8. The transducer 200 also comprises an electromagnetic excitation/transducing mechanism.

The audio transducer 200 is preferably configured to be housed within a housing of an audio device configured to accommodate the transducer. The housing may be of any type necessary to construct a particular audio device depending on the application. Various applications includes stand-alone speakers, home theatre systems, headphones, earphones, hearing aids, headsets, microphones and the like. Various applications and housing types are described in PCT patent application PCT/IB2016/055472. The audio transducer 200 may be suspended within the housing using a transducer suspension system, for example via a decoupling mounting system as described in PCT patent application PCT/IB2016/055472.

Possible applications of the audio transducer 200 are outlined in sections 4 and 5 of this specification.

In this embodiment, the audio transducer base structure 202 and the diaphragm assembly 201 are oriented relative to one another such that they share a substantially common, general coronal plane. This enhances the overall symmetry of the transducer 200 which helps to cancel unwanted resonances that could otherwise occur due to transducer asymmetry.

2.2 Diaphragm Assembly

Referring to FIGS. 19A-E, 20A-B and 21A-D, the diaphragm assembly 201 comprises a rigid diaphragm 210 having diaphragm body 211 that is similar to diaphragm body 111, and a diaphragm base structure 230 that is rigidly coupled to the diaphragm body 211 at a base region 210*a* of the diaphragm 210. The diaphragm base structure 230 comprises part of the hinge system 203 and also conductive coil(s) 240 of the transducing mechanism, in the assembled state, as in the first embodiment.

2.2.1 Diaphragm

As shown in FIGS. 20A and 20B, the diaphragm 210 comprises of a substantially rigid structure including a diaphragm body 211 formed from a relatively soft core part or parts and relatively rigid outer and inner reinforcement 213 and 215 respectively. The diaphragm body 211 is substantially similar in form, thickness and material to that described for the diaphragm body 111 of the first embodiment transducer 100. The inner shear stress reinforcement 215 is also similar in form, material, thickness and connection type that described for inner shear stress reinforcement 115 of the first embodiment transducer 100. The outer normal stress reinforcement 213 is also similar in form, material, thickness and connection type as described for outer reinforcements 116, 117 of the first embodiment transducer 100. In this embodiment, additional reinforcement plates, as in plates 118 and 119*a,b* of the first embodiment, may not be utilised.

Figure 19A:
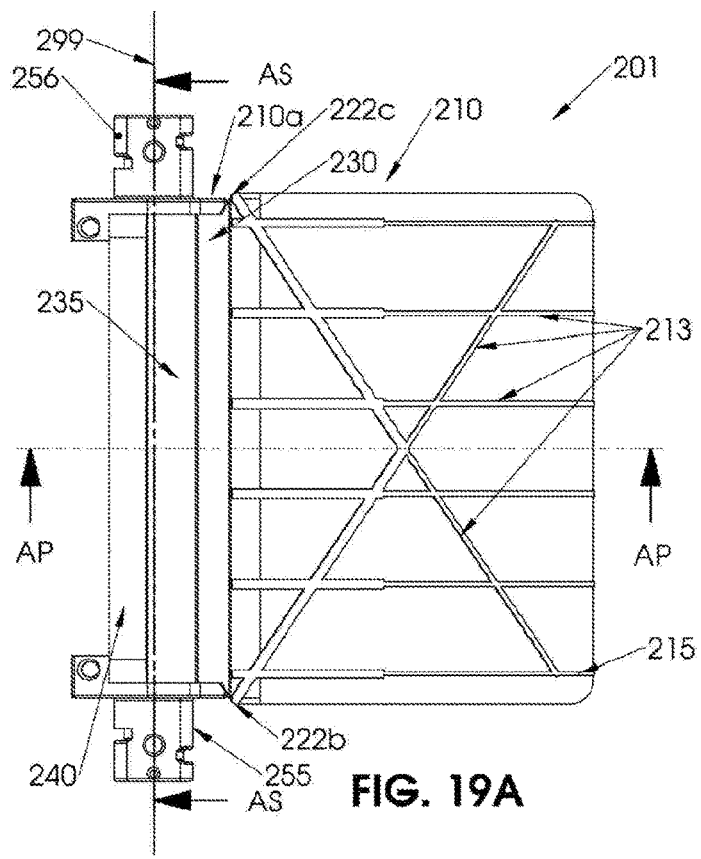
Figure 19D:
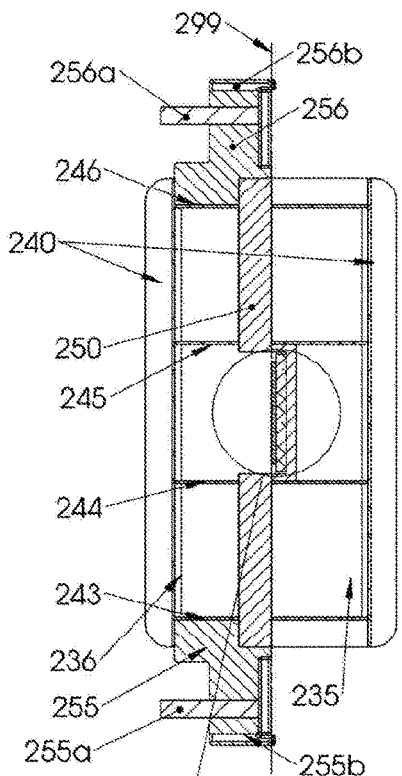
Figure 19B:
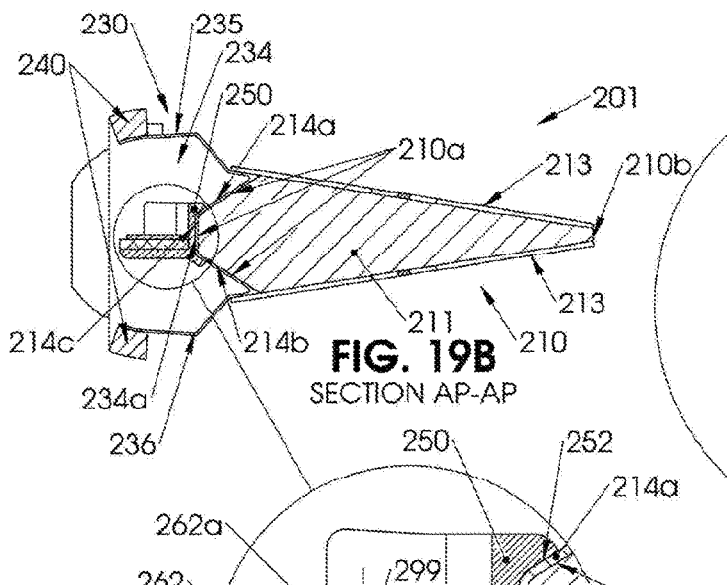
Figure 19E:
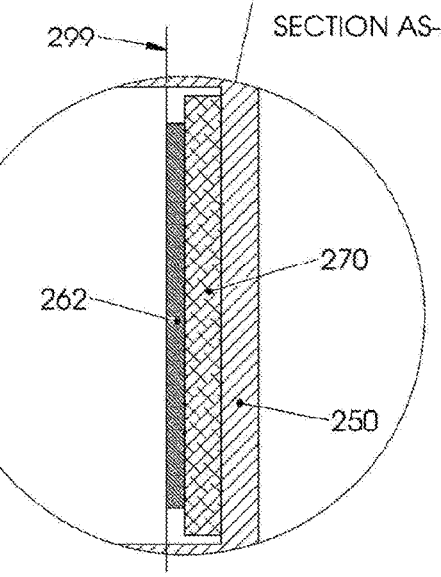
Figure 19C:
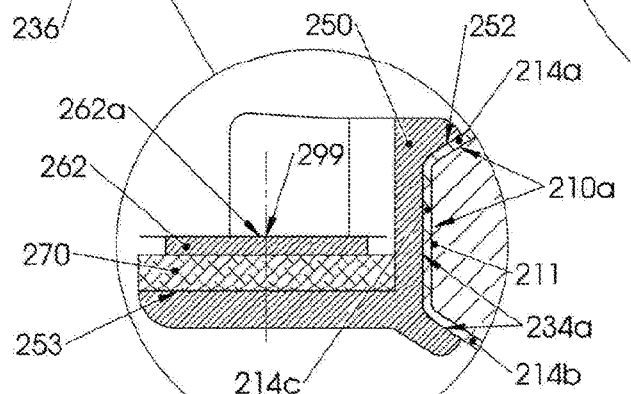
Figure 21A:
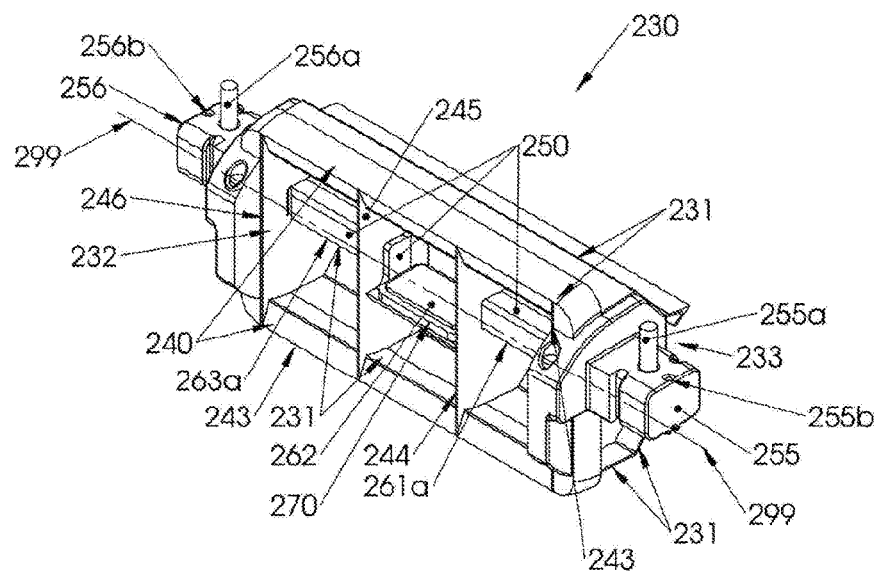
Figure 21B:
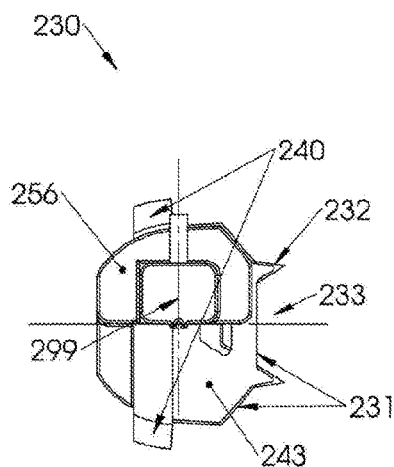
Figure 21C:
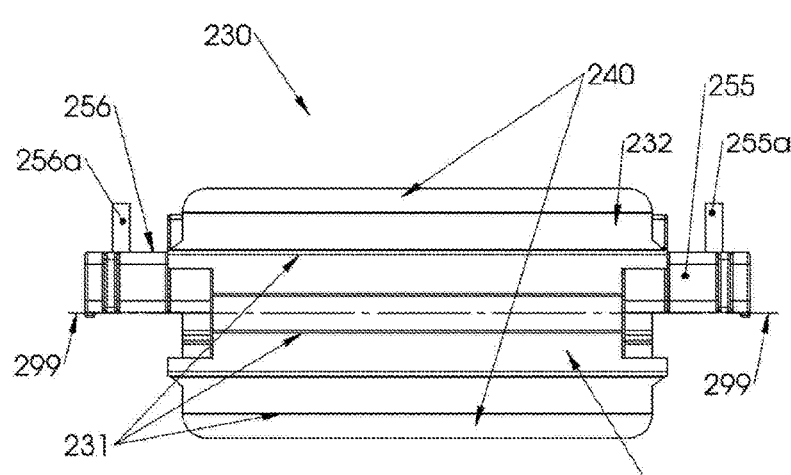
Figure 21D:
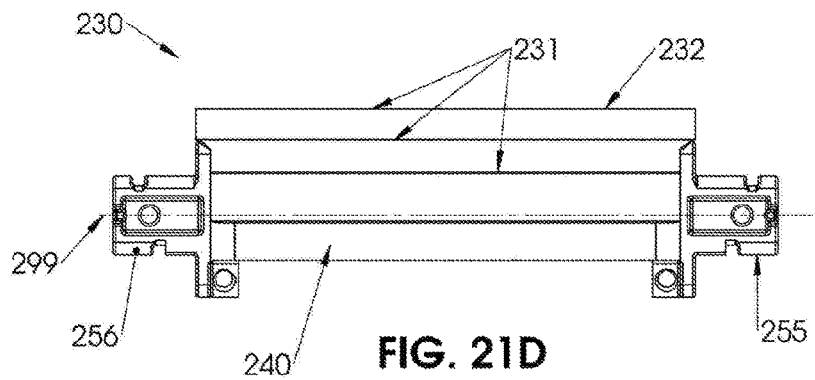
Figure 22A:
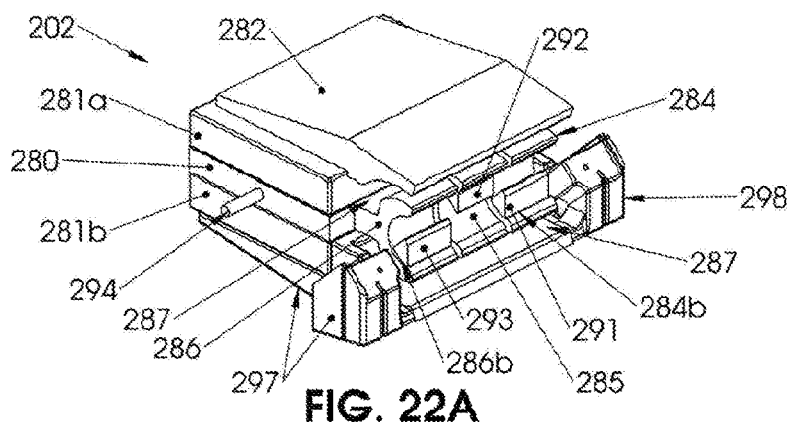
Figure 22B:
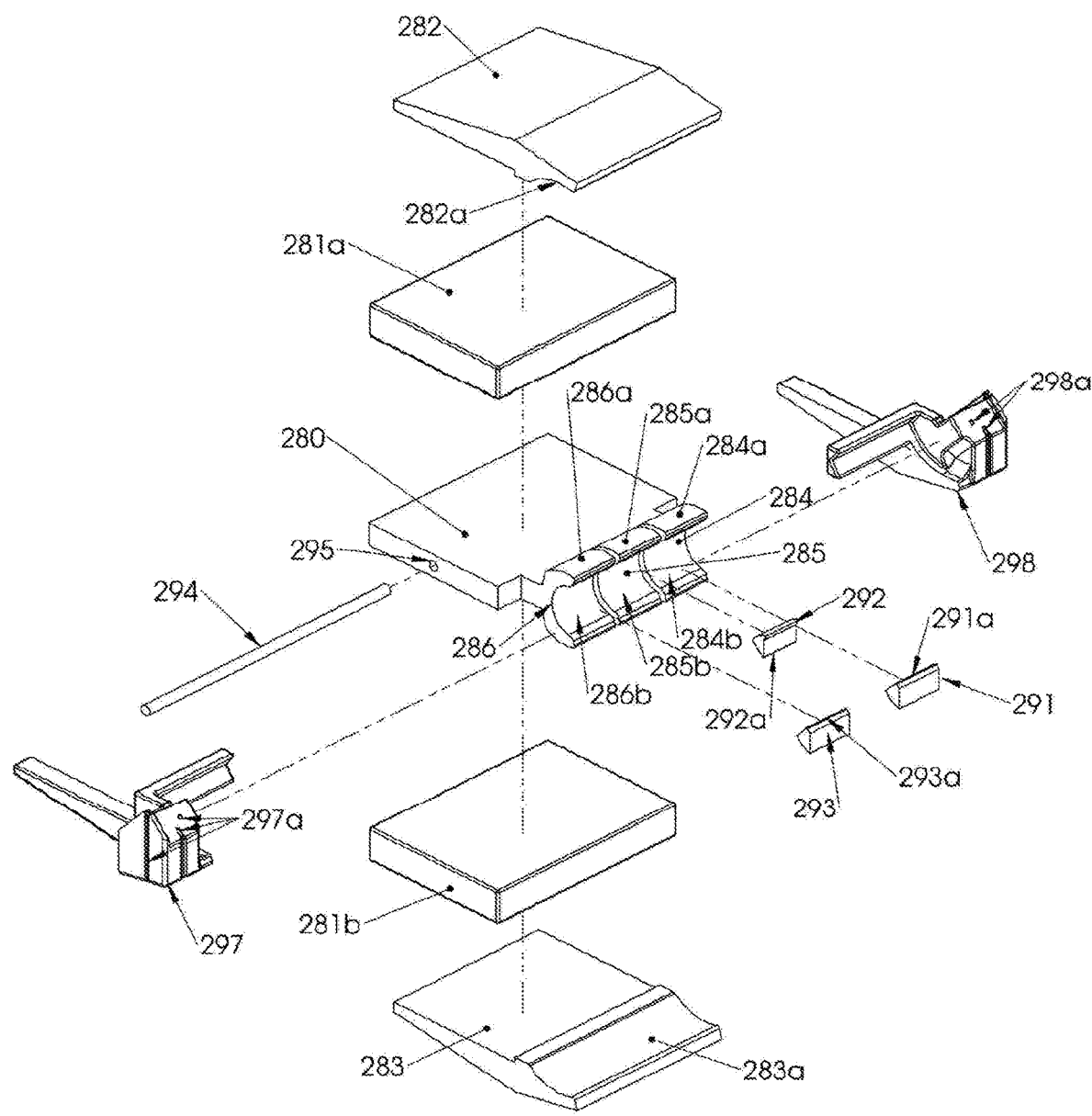
Figure 25A:
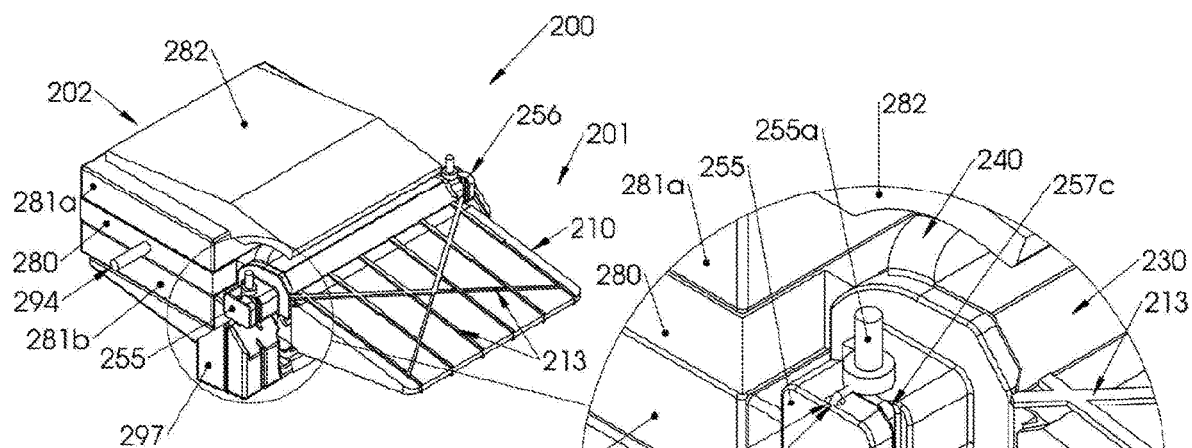
Figure 25B:
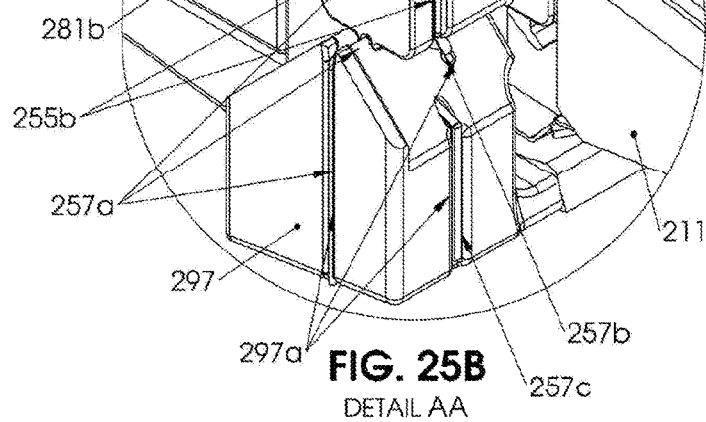
Figure 25C:
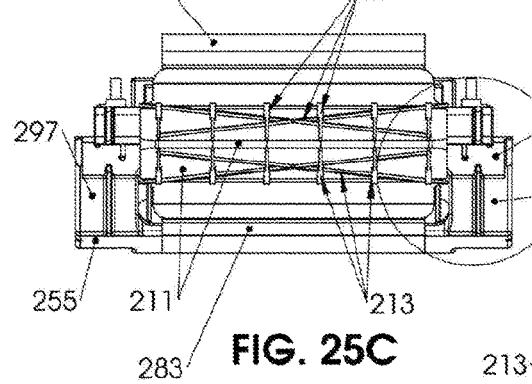
Figure 25D:
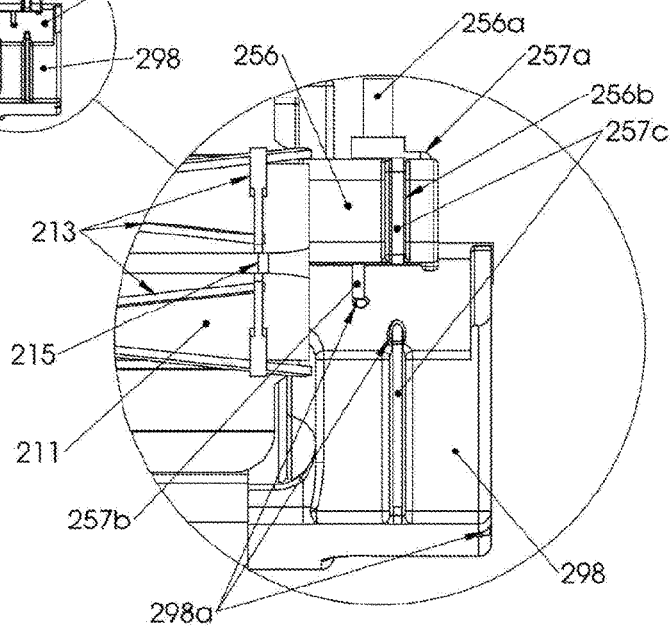
Figure 27:
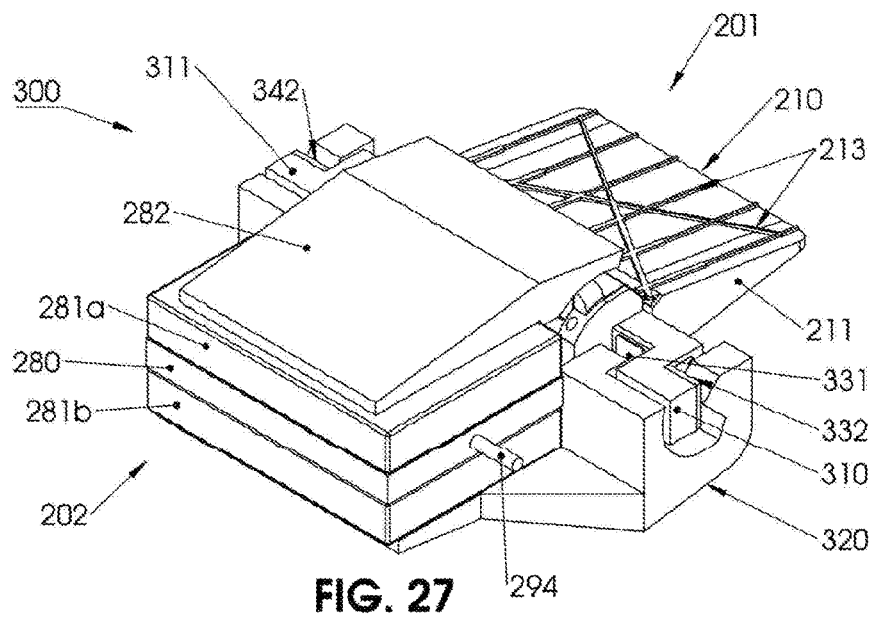
FIG. 27 shows a 3D isometric view of a third preferred embodiment of an audio transducer of the invention.
Figure 28A:
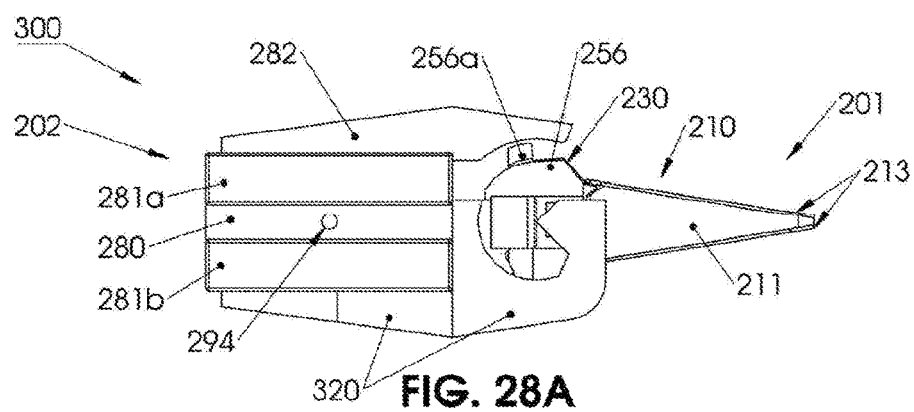
Figure 28B:
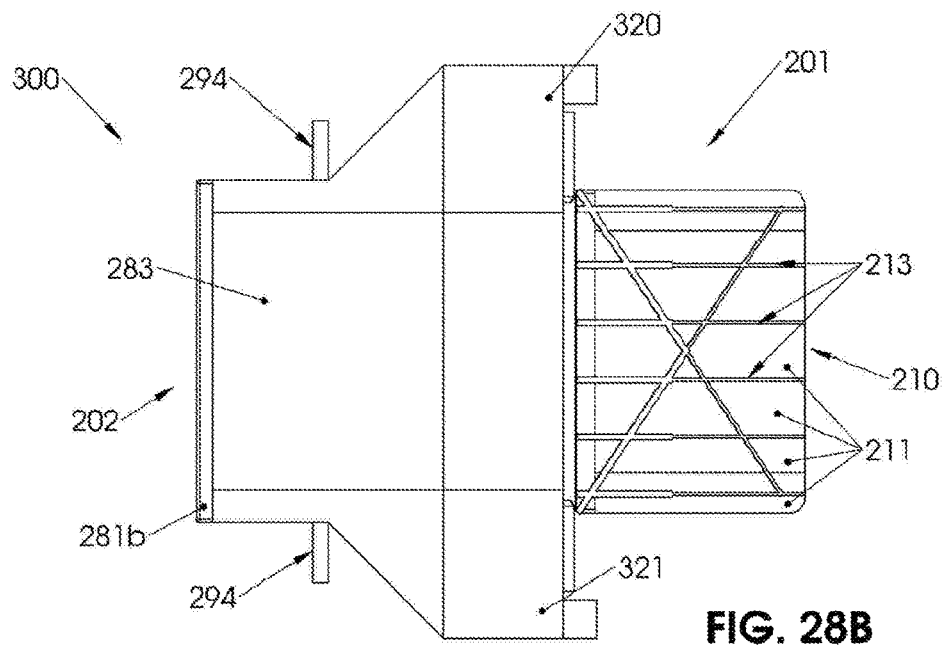
Figure 29A:
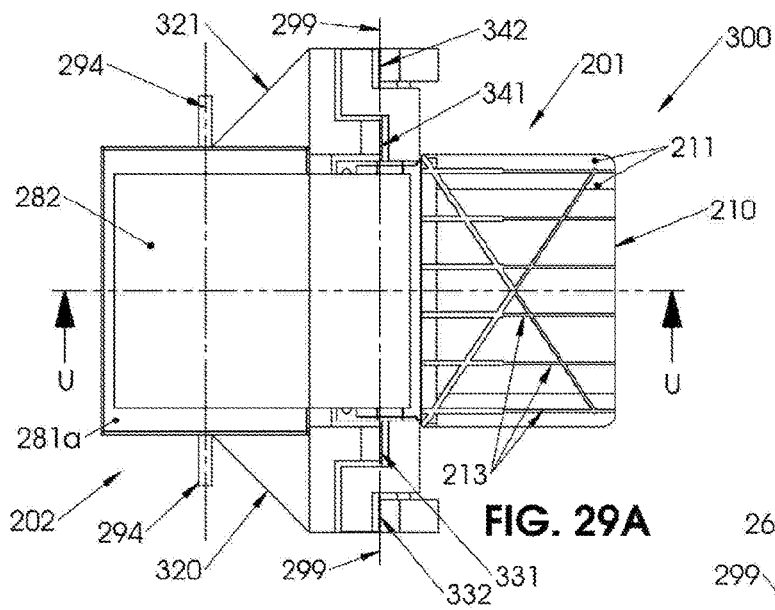
Figure 29C:
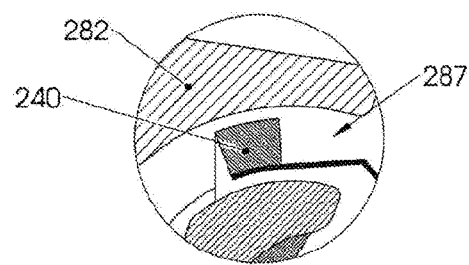
Figure 29B:
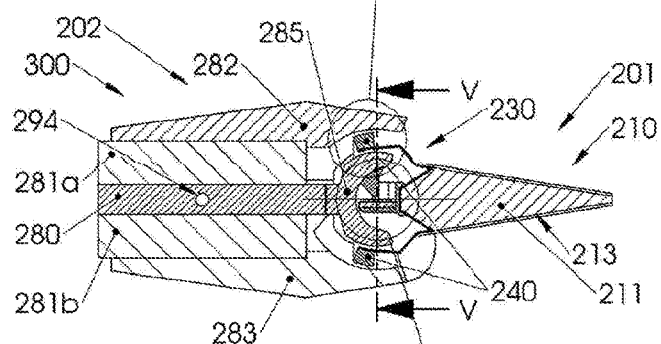
Figure 29F:
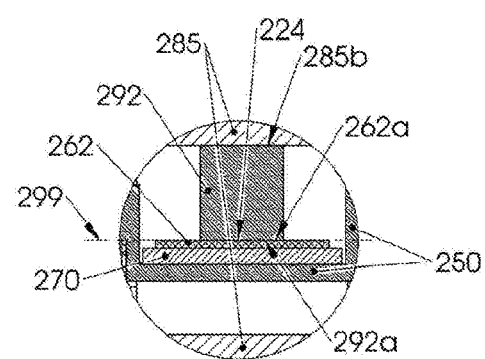
Figure 29E:
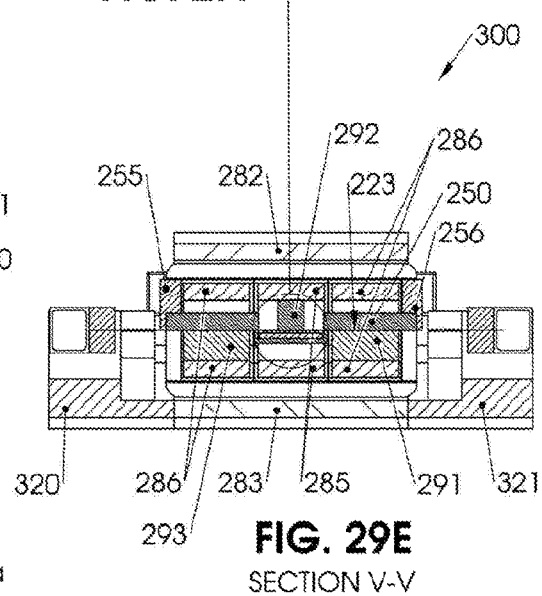
Figure 29D:
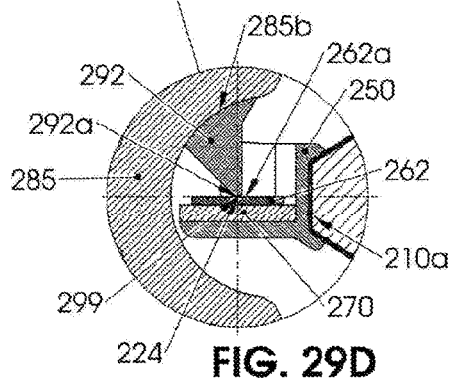
Figure 30A:
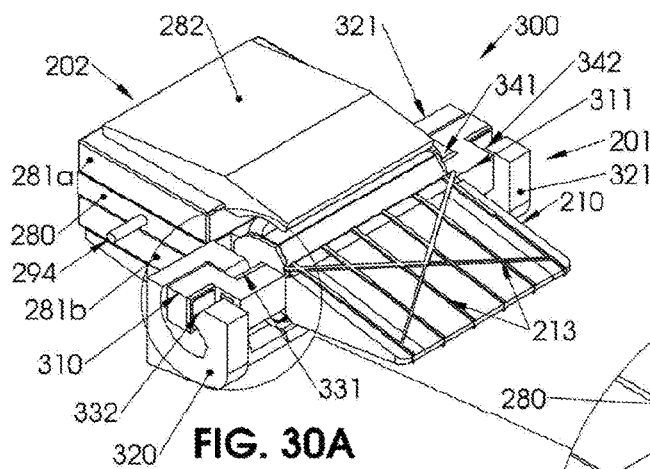
Figure 30B:
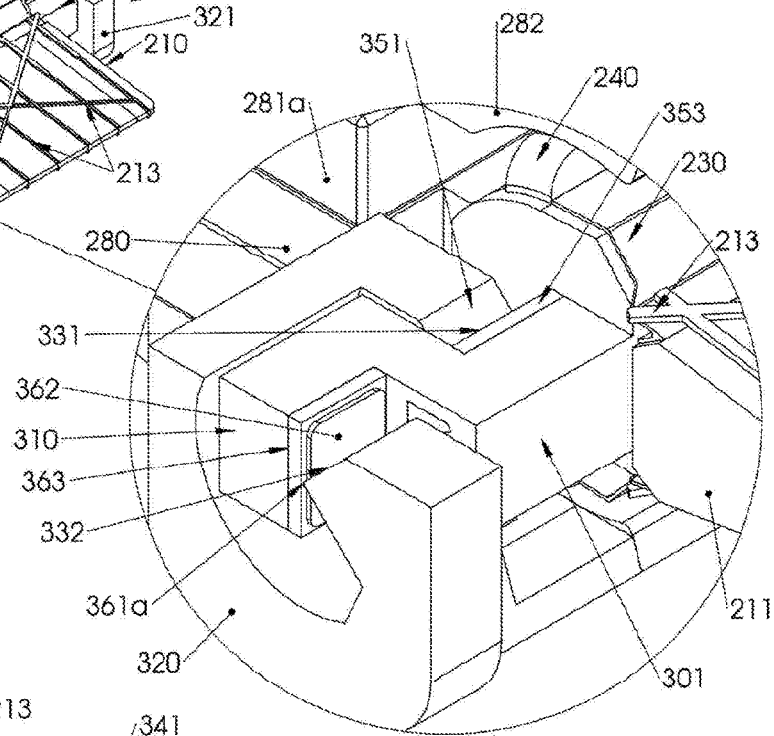
Figure 31A:
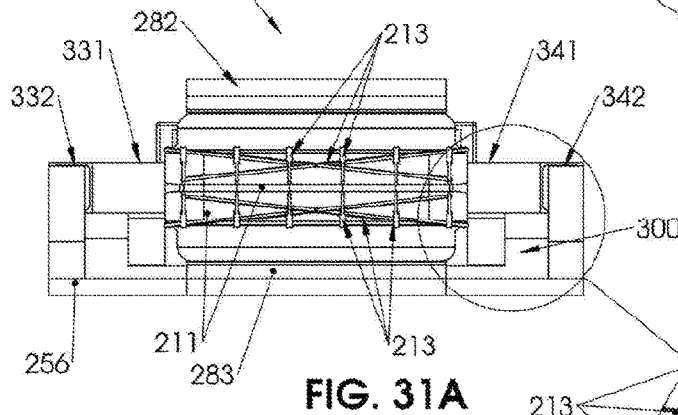
Figure 31B:
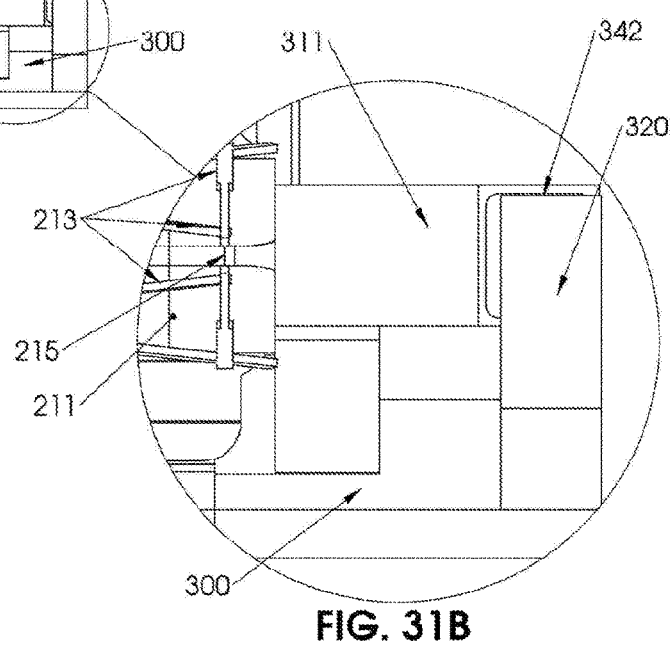
Figure 33A:
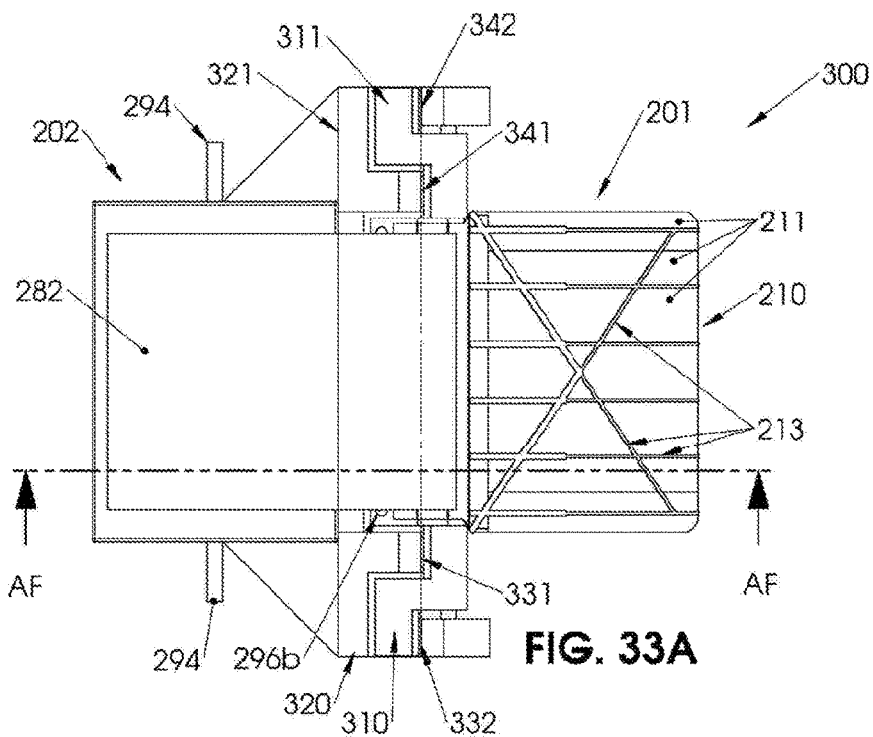
Figure 33B:
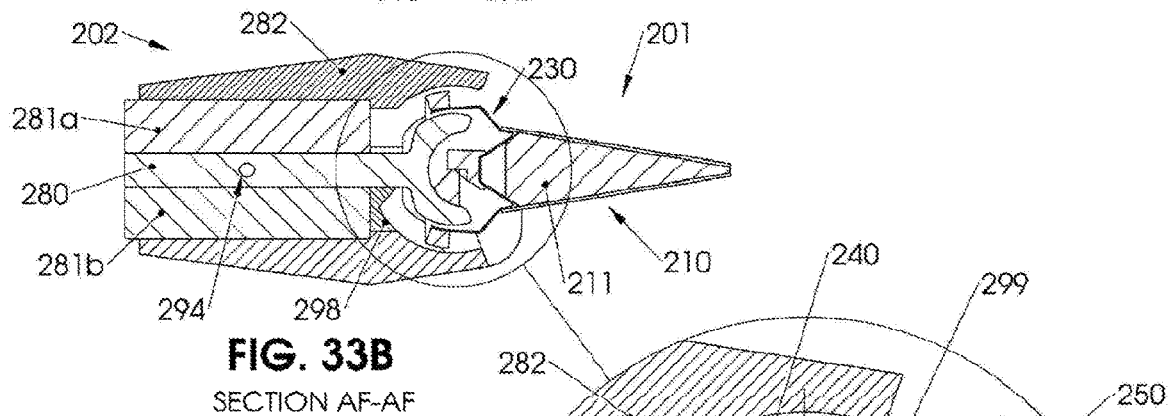
Figure 33C:
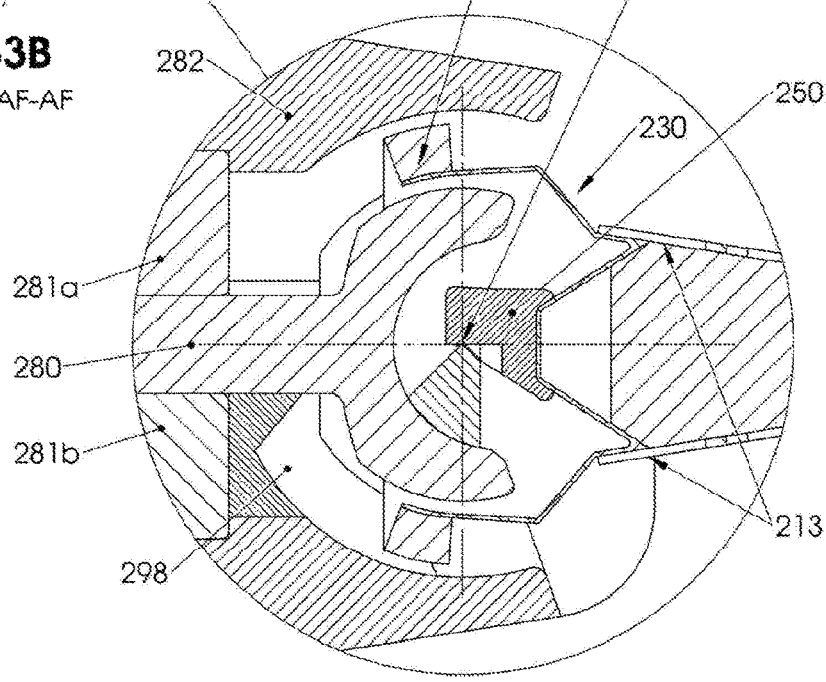
Figure 36A:
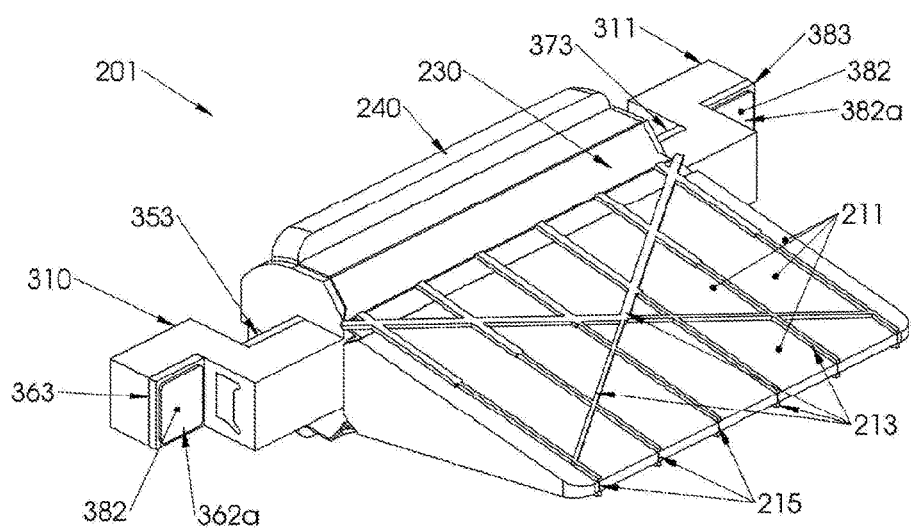
Figure 36B:
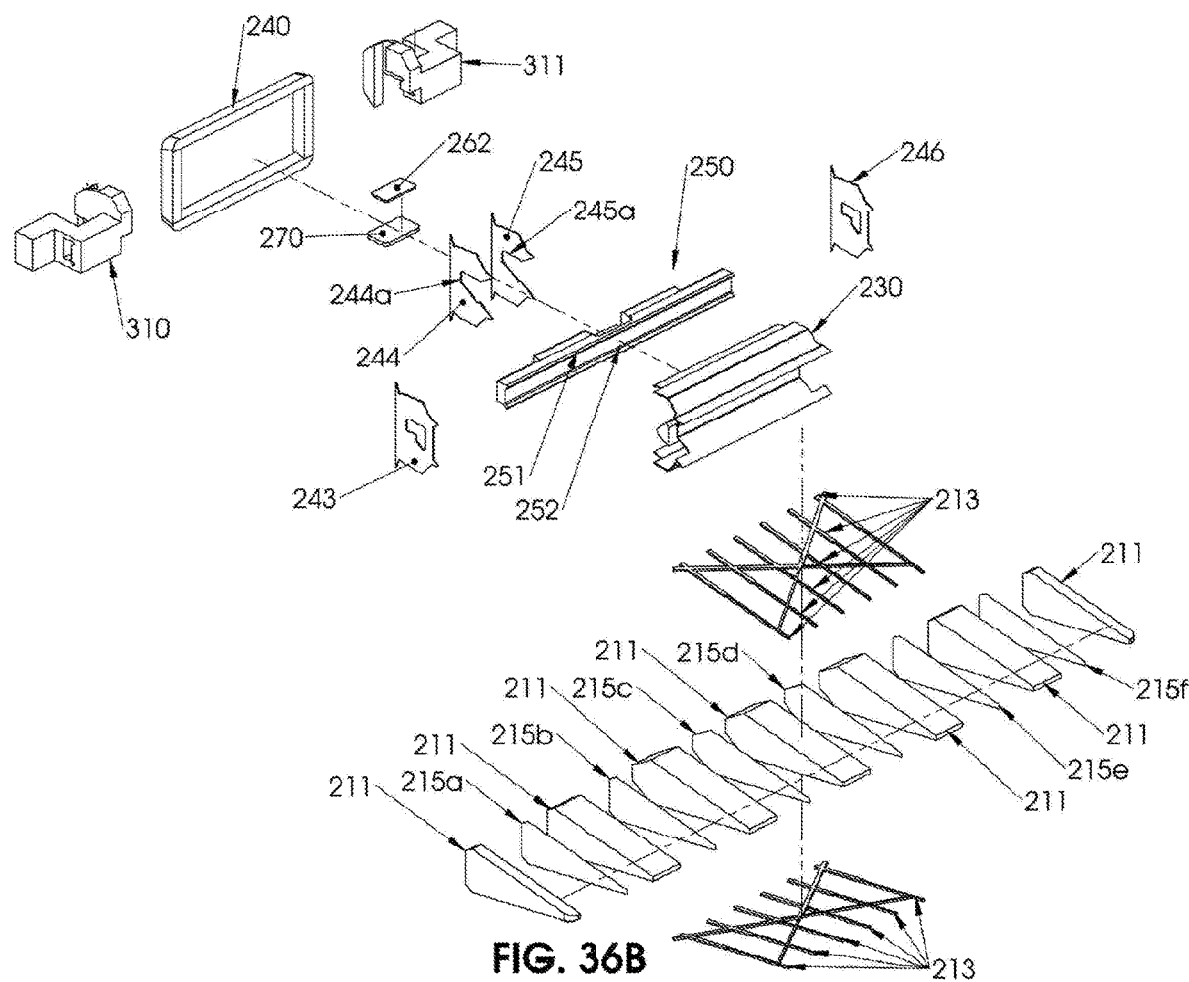
Figure 37A:
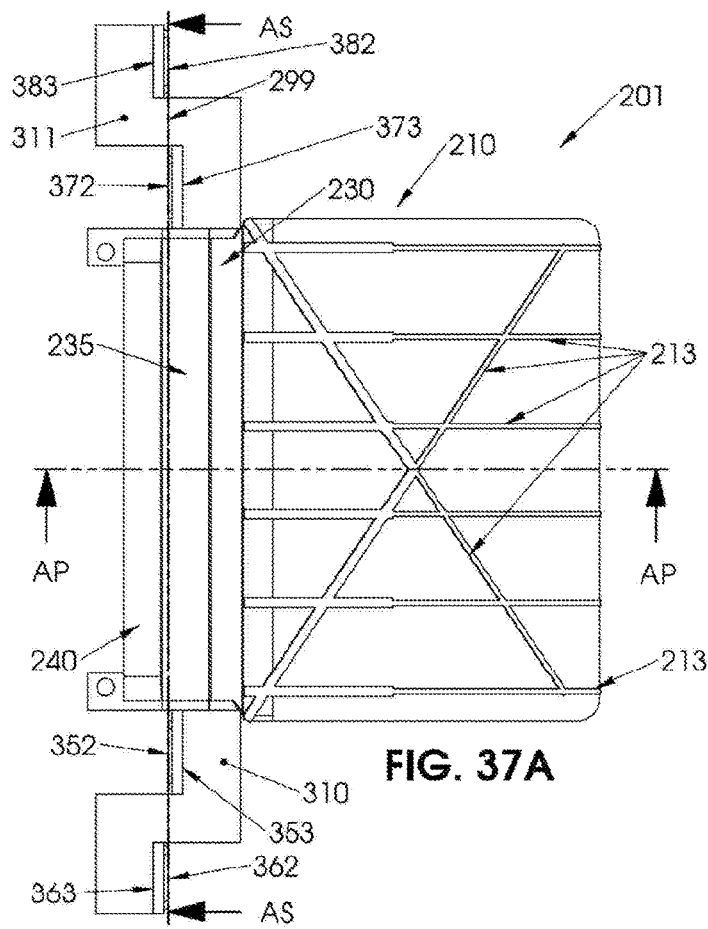
Figure 37B:
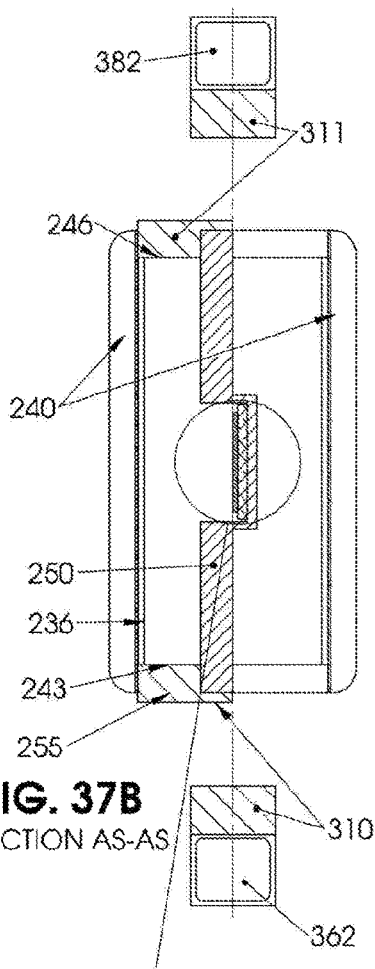
Figure 37D:
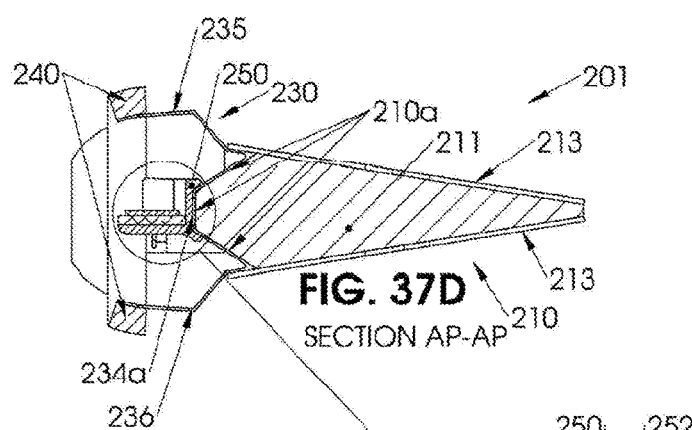
Figure 37C:
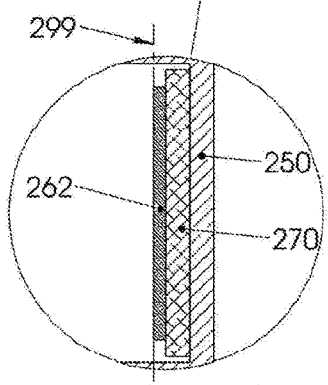
Figure 37E:
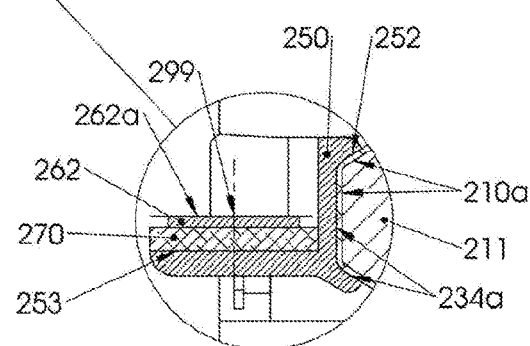

In this embodiment, a central section 222*a* of the diaphragm body 211 at the base region 210*a* is formed to have higher flexibility relative to the outer sides 222*b*, 222*c* of the diaphragm 211 at the base region, as described for diaphragm 111 under section 1.2.1. In this embodiment, the added flexibility is achieved by forming a cut-out or void in the central section 222*a*. As shown in FIGS. 19B and 20B, the cut-out or void may create an end face 214 with a pair of angled walls 214a, 214b extending laterally from the respective major faces 212a, 212 toward a common end face 214c opposing the terminal edge 210b. Preferably there are no outer or inner reinforcements along and between these walls 214a, 214b respectively. This has the advantages associated with added diaphragm flexibility discussed under section 1.2.1 of this specification.

2.2.2 Diaphragm Base Structure

Referring to FIGS. 20B and 21A-D, the diaphragm base structure 230 of this embodiment is similar to the base structure 130 of the first embodiment in that it comprises a substantially rigid diaphragm base frame 231 that rigidly couples the diaphragm 210 at the base region 210a, and that also couples the conductive coil(s) 240 of the transducing mechanism and the diaphragm side of the hinge system 203 (e.g. the hinge elements of the hinge system 203). In this manner, the diaphragm 210 is effectively rigidly connected to the hinge system 203 and the transducing mechanism in the assembled state of the diaphragm assembly 201.

The diaphragm base frame 231 comprises an elongate body 232 having a cavity 233 on one side for receiving a complementary end of the diaphragm body 211. The inner reinforcement member 215 may rigidly couple the inner wall of the base frame cavity 233 in situ. An opposing side of the base frame body 232 comprises another cavity 234 for receiving a hinge beam 250 of the base structure 230. The hinge beam 250 is configured to rigidly couple an interior wall of the cavity 234. A pair of opposing, longitudinal wall sections 235, 236 extend from the wall of the cavity 234 to form a frame including a pair of lateral supports 123, 235 about which the conductive coil(s) 240 is(are) rigidly coupled in situ. The conductive coil(s) 240 and complementary wall sections 235, 236 are substantially linear in this embodiment.

A plurality of brace plate members 243, 244, 245, 246 may couple the diaphragm base frame body 232 in a spaced manner along the length of the body. The brace plates 243-246 couple within or adjacent the cavity 234 to strengthen the cavity and prevent unwanted flexing of the base frame body 232. There may be any number of brace plates necessary for providing the desired level of support. Each brace plate 243-246 may be substantially planar with an outer profile that is substantially complementary to the inner profile of cavity 234 for effectively coupling the cavity 234. In this embodiment, two outer brace plates 243 and 246 couple either end of the base frame body 232, and two inner plates 244, 245 couple within a central region of the base frame body 232. The inner brace plates 244, 245 have recesses 244a, 245a for coupling over the hinge beam 250 in situ.

In this embodiment a single hinge beam 250 is provided which extends along a substantial or entire portion of the length of the diaphragm base frame 231 in situ. However, it will be appreciated that two or more hinge beams may be spaced along the length of the base frame 231 in alternative configurations. As shown in FIG. 20B, the hinge beam 250 comprises of an elongate body 251 having an open channel 252 on one side for coupling over a complementary protruding inner wall 234a of cavity 234 (shown in FIG. 19C). An opposing side of the hinge beam body 251 comprises a central hinge recess 253 configured to receive and retain a resilient member 270 and a hinge element 262 of the hinge system 203, in situ. In this embodiment, the recess consists of a substantially planar base and walls for receiving a substantially planar resilient member 270 and corresponding hinge element, in the form of a shim 262, although other profiles are also envisaged and not intended to be excluded from the scope of this embodiment. The inner brace plates 244, 245 couple over the hinge beam 250 on either side of the hinge recess 253.

The hinge beam body 251 comprises substantially planar walls sections forming the contact surfaces 261a, 263a of two other hinge elements 261, 262 of the hinge system 203, on either side of the central hinge recess 253. The planar contact surfaces 261a, 263a are preferably axially aligned and substantially coplanar with each other and with the exterior contact surface 262a of hinge element 262 when it is in situ within recess 253. The contact surfaces 261a, 263a on either side of the recess 253 face in an opposing direction to the exterior contact surface 262a of the central hinge element 262.

The diaphragm base structure 230 further comprises a pair of centring guide blocks 255, 256 configured to couple either side of the diaphragm base frame 231. The guide blocks 255, 256 may rigidly couple the outer brace plates 243, 246 respectively. Each guide block 255, 256 comprise a pin 255a, 256a and a series of internal channels 257b, 256b for securing and guiding ligaments 257 of the centring mechanism. The guide blocks 255, 256 are configured to cooperate with complementary transducer base structure guide blocks 297, 298 as will be described in detail in section 2.5.

One or more magnetic centring pins 296a and 296b may extend through one or more corresponding apertures in the centring guide blocks 255, 256 to magnetically attract to the magnetic structure including the central plate 280, the permanent magnets 281a,b and the outer pole pieces 282, 283. The force that this configuration applies to the diaphragm can be used to help centre the diaphragm in its at-rest, in situ position. It may also help raise the fundamental frequency to a more desirable value, as required for the audio application.

Unless stated otherwise, the materials and methods for forming the diaphragm base structure are the same or similar to those described for the transducer base structure 130 of transducer 100 described under section 1.2.2.

2.3 Transducer Base Structure and Transducing Mechanism

Referring to FIGS. 22A-B and 23A-D, the transducer base structure 202 comprises of the bulk of the audio transducer 200 in terms of mass and consists of parts for the electromagnetic excitation mechanism and parts of the hinge assembly 203. The transducer base structure 202 is configured to cooperatively couple the diaphragm base structure 230 of the diaphragm assembly 201 to complete the excitation mechanism and the hinge system 203.

As previously described, the preferred form excitation mechanism is an electromagnetic mechanism. The excitation mechanism comprises conductive coil(s) 240 and a magnetic structure configured to generate a magnetic field that interacts with the conductive coil(s) 240. The magnetic field is preferably provided by a permanent magnet arrangement of the transducer base structure 202.

The transducer base structure 202 comprises a substantially thick and squat geometry, and comprises: a central base plate 280, upper and lower permanent magnets 281a, 281b configured to couple on either side of the central base plate 280, upper and lower outer pole pieces 282 and 283 configured to couple on an exterior side of respective upper and lower permanent magnets 281a, 281b, and inner pole piece(s) 284, 285, 286 extending laterally from an end of the central base plate toward the diaphragm 210 in situ. In the assembled state, the upper and lower permanent magnets 281a, 281b are rigidly coupled to the central base plate 280, and the outer pole pieces 282 and 283 are rigidly coupled to either side of the permanent magnets 281*a*, 281*b* respectively. The inner pole pieces 284, 285, 286 are integral with the central base plate 280 but may otherwise be separately formed and rigidly coupled thereto. The outer pole pieces 282, 283 extend laterally over the inner pole pieces 284, 285, 286 and are spaced therefrom to create a magnetic field channel 287 therebetween. The channel 287 is preferably arcuate to correspond to the arcuate movement path of the conductive coil(s) 240 during operation. The arcuate channel is formed by curved (convex) outer walls 284*a*, 285*a*, 286*a* of the inner poles 284, 285, 286 and complementary curved (concave) inner walls 282*a*, 283*a* of the outer pole pieces. The arcuate channel 287 receives the conductive coil(s) 240 of the diaphragm base structure 230 when the transducer 200 is assembled. During operation, the hinge system 203 facilitates rotatable oscillation of the conductive coil(s) 240 within the channel 287.

The outer pole pieces 282, 283 and the inner pole pieces 284, 285, 286 are preferably formed from a strongly magnetic ferromagnetic material, so that they can assist in directing the field from the magnets with the goal of maximising the field strength in the channel 287.

The transducer base structure 202 is therefore a relatively heavier structure compared to the diaphragm assembly 201. The transducer base structure 202, including the parts 280-283 thereof are all substantially solid bodies. Preferably, the transducer base structure 201 is also firmly fixed in position in situ, relative to the diaphragm assembly 201. For example, it may be coupled to a housing or other support such that the diaphragm assembly 201 is fixed to the housing or other structure via the transducer base structure 202. The transducer base structure 202 may couple the housing or other support via a decoupling mounting system as described in PCT/IB2016/055472 or section 7 of this specification.

A plurality of substantially rigid contact members 291, 292, 293 are rigidly coupled to the transducer base structure 202. In this embodiment, the contact members 291, 292, 293 are rigidly coupled to interior surfaces 284*b* 285*b*, 286*b* of the inner poles 284, 285, 286 respectively. They may be adhered, welded, fastened or otherwise rigidly fixed via any suitable mechanism. The contact members 291, 292, 293 may be integrally formed with the respective inner poles 284, 285, 286 in some configurations. The contact members 291, 292, 293 are longitudinally spaced along the poles and configured to align with the corresponding hinge elements 261, 262, 263 of the diaphragm base structure 230 in the assembled state of the transducer 200. It will be appreciated that any number of two or more contact members may be utilised, more preferably three or more, depending on the requirements of the hinge system 203. The three contact members 291, 292, 293 are configured to protrude from the inner surfaces 284*b*, 285*b*, 286*b* of the poles 284, 285, 286 in situ. An external end of each contact member 291, 292, 293 preferably comprises a substantially convexly curved contact surface 291*a*, 292*a*, 293*a*. The surfaces 291*a*, 292*a*, 293*a* are substantially axially aligned in the same plane to form the hinging axis 299 of the hinge system 203, about which the diaphragm 210 rotates during operation. The contact members 291, 292, 293 are configured to operatively couple the hinge elements 261, 262, 263 associated with hinge beam 250 as will be described in further detail in section 2.4. The central contact surface 292*a* preferably faces in an opposing direction to the outer contact surfaces 291*a*, 293*a* to complement the respective hinge elements.

Each contact member 291-293 consists of a body that increases in thickness away from the associated contact surface 291*a*-293*a*. For instance, each contact member 291-293 is substantially wedge shaped or comprises a cross-sectional profile that is substantially triangular in a plane that is substantially orthogonal to the axis of rotation 299. In alternative embodiments at least one contact member comprises an increased thickness and/or is wedge shaped. Each contact member 291-293 also consists of a substantially solid body in this embodiment.

The contact members 291-293 extend from an external surface of the base plate 280 of the transducer base structure 202. They are all supported by the central base plate 280 such that they share a common support member. This enhances the rigidity of this side of the hinge system 203. In combination with rigidly coupled permanent magnets 281*a,b* and outer pole pieces 282*a,b*, this forms a thick and robust support for the contact members 291-293.

The transducer base structure components 280-283 are formed from substantially rigid material(s), preferably having a Young's modulus of at least approximately 8 GPa, or more preferably at least approximately 20 GPa, thereby enhancing rigidity of the contact member support structure. The transducer base structure components 280-283 also collectively consist of a geometry that is substantially rigid and inflexible to maintain rigidity along an axis that is substantially parallel to the axis of rotation.

Preferably the transducer base structure consists of a depth 202*d* and/or height 202*h* and/or width 202*w* (shown in FIG. 23B) that is significantly greater than the radius, 291*r*-293*r*, of the convex contact surface 291*a*-293*a* of the associated contact member 291-293 about an axis parallel to the axis of rotation 299 (hereinafter referred to as contact member radius 291*r*-293*r*—shown in FIGS. 24E and 24G, for example). In this embodiment the depth 202*d*, height 202*h* and width 202*w* of the transducer base structure is significantly greater than each contact member radius 291*r*-293*r* to enhance the stability and robustness of the support to each member. In some embodiments, each contact member 291-293 is directly supported in a support region of the transducer base structure (herein referred to as "contact member support region") and at least the contact member support regions are each substantially squat and/or thickset relative to the associated contact member radius 291-293. In other words the depth, height and width of at least the support regions of the transducer base structure are significantly greater than the associated contact member radii 291*r*-293*r* to enhance the stability and robustness of the support to each member. In this embodiment the contact member support region of each contact member is the associate inner pole piece, for example.

In this embodiment, an average cross-sectional area of the transducer base structure 202, in a plane substantially perpendicular to the axis of rotation 299 (e.g. the cross-sectional area of FIG. 23B) and averaged along a total length along the axis of rotation 299 between and including a pair of outermost hinge joints 221 and 223 of the hinge 203 (herein referred to as "total length of hinge 299*l*" as shown in FIG. 23D), is significantly greater than the contact member radius 291*r*-293*r* of at least one contact member 291-293 supported by the transducer base structure 202, and most preferably all contact members 291-293 supported by the transducer base structure 202.

In this embodiment, a square root value of the average cross-sectional area of the transducer base structure 202 mentioned above is significantly greater than the contact member radius 291*r*-293*r* of at least one contact member 291-293 supported by the transducer base structure 202. For example, it may be greater than approximately 20 times, or more preferably greater than approximately 30 times, and most preferably greater than approximately 40 times, greater than the contact member radius/radii 291*r*-293*r*. In some embodiments the average cross-sectional area of the contact member support regions may be greater than 20, 30 or 40 times the associated contact member radii 291*r*-293*r*.

In this embodiment, a mass of the transducer base structure 202 in grams is greater than approximately 0.0003 times the cube of the total length of the hinge 299*l*, in millimetres. More preferably the mass of the transducer base structure 202 in grams is greater than approximately 0.0005 times the cube of the total length of the hinge 299*l* in millimetres. Most preferably the mass of the transducer base structure 202 in grams is greater than approximately 0.0008 times the cube of the total length of the hinge 299*l* in millimetres.

In this embodiments a mass of the transducer base structure 202 in grams is greater than approximately 25,000 times the cube of at least one contact member radius 291*r*-293*r*, in mm, more preferably more than approximately 40,000 times and most preferably more than approximately 60,000 times. Preferably the mass is greater than 25,000 times the cube of each contact member radius 291*r*-293*r*, more preferably more than 40,000 times and most preferably more than 60,000 times.

In this embodiments a density of the transducer base structure 202 is greater than approximately 0.07 g/mm$^3$, more preferably greater than approximately 0.001 g/mm$^3$ and most preferably greater than approximately 0.0016 g/mm$^3$.

The abovementioned physical properties and/or geometries of the transducer base structure 202 each contribute to providing the following advantages:
- the complexity associated with forming and/or initially aligning the convex contact member surfaces 291*a*-293*a* during manufacture is reduced due to the robust and stable nature of the transduce base structure defined by one or more of these properties and/or geometries, and
- facilitates in maintaining linear alignment of the contact surfaces 291*a*-293*a* during assembly and/or operation by:
  - substantially avoiding deflection and misalignment when a force is applied to the contact surfaces by the other side of the hinge 203,
  - substantially avoiding deflection and misalignment when the directions of forces acting on the contact surfaces 291*a*-293*a* changes during operation, and
  - substantially avoiding deflection and misalignment when the magnitudes of forces acting on the contact surfaces 291*a*-293*a* changes during use, for example under loads, acceleration, with temperature changes and the like.

It will be appreciated that a combination of one or more of the above physical properties and/or geometries may be utilised as required by the particular application and the invention is not intended to be limited to any particular combination, although all properties and geometries are preferred.

The transducer base structure 202 may further comprise outer centring guide blocks 297, 298 configured to couple the sides of the magnetic structure including the base plate 280, the permanent magnets 281*a,b* and the outer pole pieces 282, 283, and lock these parts in position relative to one another. One or more axles or pins 294 may extend through a corresponding aperture or apertures 295 in the base plate 280. The protruding ends of the pins 294 may be used as locations to connect the driver to the audio device that it is mounted within, via a decoupling mounting system for example as described in PCT patent application PCT/IB2016/055472 or in section 7 of this specification.

Each guide block 297, 298 consists of one or more internal channels 297*a*, 298*a* for receiving and retaining centring ligaments therethrough as explained in further detail under section 2.5. In the assembled state of the transducer the guide blocks 297, 298 are positioned proximal to the corresponding guide blocks 255, 256 of the transducer base structure 230.

In this embodiment, the transducer bases structure 202 is oriented relative to the diaphragm assembly 201 such that they share a common coronal plane, enhancing the overall symmetry of the transducer as described above. Also, locating the contact members 291-293 on the inner poles and on an external surface of the transducer base structure 202 significantly reduces the overall complexity and size requirements of the transducer base structure 202 may reduce manufacturing costs.

2.4 Hinge System

Referring to FIGS. 24A-G, the hinge system 203 of the second preferred embodiment is also designed partially in accordance with the principles outlined in section 3.2 of PCT/IB2016/055472. The hinge system 203 rotatably couples the diaphragm 210 to the transducer base structure 202 so that the diaphragm may rotatably oscillate about the hinging axis 299 during operation.

The hinge system 203 comprises of three axially aligned hinge joints 223, 224 and 225 that are distributed along the width of the diaphragm 210 at or adjacent the base region 210*a*. They share the common hinging axis 299. It will be appreciated there may be four or more hinge joints in alternative configurations. As in the first embodiment, at least one hinge joint 224 comprises of a contact member contact surface 292*a* facing in a different direction relative to the contact member contact surfaces 291*a*, 293*a* of the other hinge joints 225, 223. In this embodiment, the outer hinge joints 225, located on an outer side of the central hinge joint 224 has a contact member 291 with normal vector C facing in a first direction. The hinge joint 223 has a contact member 293 with a normal vector facing in the same direction as vector C. The central hinge joint 224 has a contact member 292 with a normal vector D facing in a different direction that is at least angled relative to the first direction of vector C, as described for the first embodiment in relation to vectors A and B, for example. In this preferred embodiment, direction of vector C substantially opposes the direction of vector D. In other words, the normal vectors C and D are angled at approximately 180 degrees relative to one another. In some embodiments this angle may alternatively be between approximately 135 degrees and 225 degrees.

Each hinge joint 223, 224, 225 comprises a contact member 291, 292, 293 having a contact surface 291*a*, 292*a*, 293*a* and an associated hinge element 261, 262, 263 having a contact surface 261*a*, 262*a*, 263*a*. In this embodiment, the hinge elements 261, 262, 263 are connected to the diaphragm 210 and the contact members 291, 292, 293 are connected to the transducer base structure 202. The hinge elements and contact members may be connected to the respective diaphragm and transducer base structure respectively, either integrally, directly or via one or more other components. Preferably the hinge elements 261, 263 are rigidly connected to the diaphragm 210 and the hinge element 262 is connected to the diaphragm 210 via a resilient member 270.

In the assembled state of the transducer 200, the contact surfaces 291a, 292a, 293a and 261a, 262a, 263a are held in abutment against one another and permitted to move relative to one another to rotate the diaphragm 210 during operation. To achieve this, at least one of the hinge element contact surface 261a, 262a, 263a or the respective contact member contact surface 291a, 292a, 293a of each hinge joint 223, 224, 225, comprises of a substantially convexly curved surface, in at least a cross-sectional plane perpendicular to the hinging axis 299, and in at least the region of contact between the respective contact surfaces. The other contact surface of each hinge joint 223, 224, 225 is preferably substantially planar, at least in the region of contact, to allow the associated convexly curved contact surface to roll thereagainst during operation. Alternatively one or more of the other contact surfaces may be concavely curved, in at least a cross-sectional plane perpendicular to the hinging axis 299. In yet another alternative, one or more of the other contact surfaces may be also convexly curved, in at least a cross-sectional plane perpendicular to the hinging axis, but with a radius of curvature that is relatively larger than the associated contact surface of the respective hinge joint.

The contact surfaces 261a, 262a, 263a of the hinge elements 261, 262, 263 and the contact surfaces 291a, 292a, 293a of the contact members 291, 292, 293 are preferably also substantially rigid such that they do not flex or deform upon contact and during operation. The radius of curvature of the convexly curved contact surface of each hinge joint is preferably sufficiently small to reduce rolling resistances, but sufficiently large to avoid undue flexing during operation. Also, any contact surface that is curved in at least the region of contact preferably comprises a substantially smooth curvature profile to enable smooth and even rolling action during operation. In this embodiment, the contact member contact surfaces 291a, 292a, 293a are substantially convexly curved, in the cross-sectional plane that is perpendicular to the hinging axis 299. The contact surfaces 291a, 292a, 293a are also longitudinal and have axially aligned curved edges within a common plane such that they share a common line of contact with their respective hinge element contact surfaces 261a, 262a, 263a, forming the hinging axis 299. In this embodiment, the hinge element contact surfaces 261a, 262a, 263a are substantially planar, in at least the region of contact.

As previously mentioned, the outer hinge joints have contact members 291, 293 facing a first direction and the central hinge joint has a contact member 292 facing second direction that substantially differs from the first direction. In this embodiment the convexly curved contact surfaces 291a, 293a of the outer hinge joints 223, 225 faces in the first direction of vector C and the convexly curved contact surface 292a of the hinge joint 224 faces in the second direction of vector D. The first and second directions preferably oppose one another to a certain extent, and most preferably they substantially oppose one another. This is to create relatively high contact force between contact surfaces 261a, 262a, 263a of the hinge elements 261, 262, 263 and the contact surfaces 291a, 292a, 293a of the contact members 291, 292, 293, which provide translational rigidity (in order to resist unwanted high frequency resonances).

This higher force may enhance the translational rigidity (in order to resist unwanted high frequency resonances), in the contact regions, against translational motion in all directions. In this manner the contact member 292 has a contact surface that faces generally downward, while the contact members 291, 293 have contact surfaces that face generally upward. It will be appreciated that other variations are possible provided at least two hinge joints face in opposing directions (or at least directions that are angled relative to one another). Having at least one contact member that faces in a substantially opposing direction to the remaining contact members is advantageous because it provides a reaction force helping to clamp the diaphragm 210 in position relative to the hinge assembly 203. This reaction force maintains close and substantially consistent physical contact between the contact members and their respective hinge elements during operation.

It is preferred that the convexly curved surfaces 291a, 292a, 293a are formed in the contact members 291, 292, 293 associated with the base structure 202 as the base structure components are rigid and robust (as described in section 2.3). The contact surfaces 291a, 292a, 293a may be formed on the transducer base structure 202 via any suitable method such as machining, cutting, welding, attaching, lapping, moulding and the like.

In this embodiment, the contact members 291, 292, 293 are rigidly coupled to corresponding external surfaces 284b, 285b, 286b of the inner poles 284, 285, 286. The contact members may be adhered, welded, fastened or otherwise rigidly fixed to the cavities using any suitable mechanism. Alternatively they may be integrally formed.

In this embodiment, the hinge elements 261, 263 are provided by an under-surface on either side of the hinge beam body 251. In this manner the hinge elements 261, 263 are rigidly connected and closely associated with the diaphragm 210 via the respective hinge beam 250 and diaphragm base frame 231. The hinge element 262 is coupled to the hinge beam 250 via the resilient member 270.

The resilient member 270 is preferably a relatively soft, flexible and substantially compliant component. It may be soft relative to the substantially rigid, resilient member 170 of transducer 100, but is provided to provide a biasing mechanism as described for member 170 of transducer 100. The member 270 is preferably flexible and resilient in compression or in tension, or in shear or more preferably both or most preferably all three. The member 270 may be an elastomer, such as Silicone, a thermoplastic elastomer, a natural rubber, a thermoset polyether-based polyurethane, or a polyurethane material, for example. The member 270 preferably comprises a body configured to be received and retained within the recess 253 of the hinge beam 250. The member 270 is preferably also substantially planar to substantially uniformly engage the base of the recess 253 on one side and the hinge element 262 on the opposing side. The hinge element 262 is preferably also substantially planar but is relatively rigid to provide a substantially rigid contact surface 262a for engaging the corresponding contact member contact surface 292a.

In the assembled state, the member 270 biases the hinge element contact surface 262a toward the associated contact member contact surface 292a to force the two surfaces into engagement in situ. It also enables relative movement between the associated hinge element contact surface 262a and the hinge beam 250 in tension and/or compression directions. In alternative embodiments, the member 270 may consist of one or more springs or other resilient or flexible parts that connect between the hinge element contact surface 262a and the hinge beam 250 for biasing the hinge element toward the contact surface and for allowing movement of the hinge element contact surface relative to the hinge beam in tension and/or compression. In some embodiments the member 270 may be integrally formed with the hinge element 262. For example, the hinge element 262 may be stamped or otherwise formed into a shape having a substantially planar body with one or more resilient and substantially orthogonal extensions. The extension may be located centrally and/or about the perimeter of the body for instance and configured to resiliently compress and/or bend.

Similar to the resilient member 170 of the first embodiment, the member 270 of this embodiment acts to mitigate unwanted flexing of the diaphragm body 211 that would otherwise occur due to the existence of hinge joints with contact members facing in two substantially opposing directions. This problem can arise due to the rolling action of contact hinge assemblies of this type as described in relation to the first embodiment. Coupling the resilient member 270 between the inner central hinge element contact surface 262a and the diaphragm body 211 acts to absorb any linear forces generated by rolling of the respective convex contact surface 292a over the hinge element 262. The absorbed forces are therefore not transmitted to the diaphragm body which in turn minimises unwanted flexing of the body during operation. In comparison to resilient member 170, member 270 is more compact and less expensive to manufacture and install. The member 270 is less likely to suffer from resonance issues.

In situ, the member 270 acts as a biasing mechanism configured to compliantly bias the contact surface 261a-263a of the hinge element 261-263 of each hinge joint 223-225 towards the contact surface 291a-293a of the associated contact member 291-293, to maintain substantially consistent physical contact between the contact surface of the hinge element and the contact surface of the associated contact member during operation. Other properties of this biasing mechanism including the direction and magnitude of biasing forces applied may be as described for member 170 of transducer 100.

It is preferred that a rigid hinge element 262, such as a shim, is inserted between the contact member contact surface 292a and the resilient member 270. Direct contact between the contact surface 292a and the member 270 could cause the member to deform around the surface 292a during operation, affecting hinge operation, and/or could cause damage to the member 270. The rigid hinge element 262 serves to transfer a distributed load from the member 270 into a localised point or line on the contact surface 292a, which in turn helps to reduce the fundamental resonance frequency of the transducer and mitigates damage to the member 270.

In this embodiment the contact members 291-293 and the hinge elements 261-263 are formed from a substantially non-ferromagnetic material or materials, or materials that may exhibit only a low degree of ferromagnetism. This minimises the risk of magnetic dust particles accumulating between the contact members 291-293 and hinge elements 261-263. The contact members 291-293 are preferably formed from a rigid material that has relatively low ferromagnetism, such as a tungsten carbide or any other hard material having sufficient wear resistance and high rigidity, for example alumina or non-magnetic stainless steel. The hinge elements 161-163 may be formed from the same or similar materials. Metals may optionally be treated, for example using physical vapour deposition coating, to help to prevent fretting and other forms of corrosion. In this case the contact members are separately formed from the inner pole pieces and rigidly coupled thereto via any suitable mechanism, for example via brazing, laser welding, spot welding or adhesion.

In alternative embodiment the contact members 291-293 and/or the hinge elements 261-263 may be formed from a ferromagnetic material or materials, but with substantially non-ferromagnetic contact member contact surfaces 291a-293a and/or substantially non-ferromagnetic hinge element contact surfaces 261a-263a respectively. In this case, the risk of ferromagnetic dust particles accumulating between the contact surfaces may still be low. As an example, the contact members 291-293 may be integrally formed with associated inner pole pieces 284-286. The contact surfaces 291a-293a may be coated using physical vapour deposition (or other suitable method) with a non-ferromagnetic and wear-resistant layer or coating. This implementation may be sufficient for applications where relatively high sound pressure levels are not required, such as in a headphone driver. In such applications, the force at the hinge elements 261-263 may be relatively low, and wear/deformation may be correspondingly low, and therefore it may not be a requirement that the base material under the coating layer is significantly harder than the pole pieces (e.g. stainless steel may be suitable).

In some embodiments the contact members 291-293 and corresponding inner pole pieces 284-286 may be manufactured integrally as a single component. The material is preferably a substantially rigid, ferromagnetic material, such as stainless steel. Shaping to form the contact member and inner pole piece structure may comprise, for example, computer numerical control machining or grinding or metal injection moulding, for example. Finishing processes such as lapping and physical vapour deposition coating, for example, may be applied to the contact member contact surfaces 291a-293 as described above.

In this embodiment, the hinge system 203 is oriented such that each hinge joint 223-225 consists of a hinge element 261-263 having a tangential plane, at the region of contact with the respective contact member 291-293, that is substantially parallel with the coronal plane of the diaphragm 110. In other words, the direction of normal vectors C and D which the contact surfaces 291a-291c face, are substantially orthogonal to the coronal plane of the diaphragm 210. This arrangement of the hinge system has the following advantages. The rigid hinge system 203 resists translation of the diaphragm 110 in directions perpendicular to the coronal plane due to external forces, such as an impact event, to protect the diaphragm from damage. In some applications, such as in a headphone application, this may be particularly advantageous when combined with other features. For instance, in a headphone application, the headband may act to absorb any external translation forces in directions that are parallel to the diaphragm coronal plane. This would protect the diaphragm 210 from damage that would be caused due to movement in directions parallel to the coronal plane. In combination with the hinge system orientation, this creates an assembly that substantially resists diaphragm translation along all three Cartesian axes. In addition, in a headphone implementation, a hard rubber or other compliant material may be incorporated between the transducer surround and the headphone ring of each cup to further absorb translations that could otherwise damage the device.

In an alternative embodiment, the directions of normal vectors C and D associated with the contact surfaces 291a-291c may be substantially parallel to the coronal plane of the diaphragm 210. This hinge system configuration would mean the rigid hinge system 203 acts to substantially resist translation of the diaphragm 110 in directions parallel to the coronal plane due to external forces, such as an impact event, to protect the diaphragm from damage. This means the size of the protective air gap, between the diaphragm peripheral edge 210b and a surrounding structure (that is provided to allow for minor diaphragm displacements), can be minimised.

2.5 Centring Mechanism

Referring to FIGS. 25A-D and 26A-F, in this embodiment, the transducer 200 further comprises a centring mechanism for holding the diaphragm 210 in the correct position relative to the transducer base structure, especially in the case of an impact or other unexpected event imparting a force on the transducer 200, for example. The centring mechanism permits rotation of the diaphragm relative to the transducer base structure for normal operation. It also facilitates in maintaining alignment of the hinge elements 261-263 and contact members 291-293 of the hinge system 203 by prohibiting relative linear movement between the diaphragm and transducer base structure.

The centring mechanism utilises ligaments 257 connected at one end to the diaphragm assembly 201 and at the other end to the transducer base structure 202. The ligaments are substantially stiff in tension and compression directions to help prevent relative linear movement between the diaphragm and transducer base structure, but are substantially flexible/bendable along their length to permit rotational movement between the diaphragm and transducer base structure in situ. They are thus designed such that they do not greatly influence rotation. The ligaments 257 also have one end fixed, either directly or indirectly, to the hinge elements of the hinge system 203, and then another end coupled to the contact members to help maintain relative alignment of these parts of the hinge system.

The centring mechanism comprises a pair of centring blocks 255, 297 and 256, 298 on either side of the transducer 200. In some embodiments, a single pair of centring blocks may be provided only on one side of the transducer 200. In this embodiment each pair of centring blocks comprises a first, diaphragm-side centring block 255, 256 rigidly coupled to the diaphragm 210 and a second base-structure-side centring block 297, 298 rigidly coupled to the transducer base structure 202. The pair of first and second centring blocks on each side 255, 297 and 256, 298 are located adjacent one another in situ. Each of the first centring blocks 255, 256 comprises a body having a ligament pin 255a, 256a protruding therefrom and one or more ligament channels 255b, 256b traversing therethrough. Each associated second centring block 297, 298 comprises of a body having one or more ligament channels 297a, 298a. In the assembled state of the centring mechanism, a ligament 257 is wound about the ligament pin 255a, 256a on each side of the transducer, pulled tight through the respective channels 255b, 297a and 256b, 298a and adhered to the interior walls of the channels to substantially rigidly secure the respective first and second centring blocks 255, 297 and 256, 298 in close association with one another. During assembly, all ligaments 257 may be placed under a small tensile load, for instance approximately 80 g, to pull them tight through the respective channels before adhesive agent is applied to the regions to be adhered. This helps to minimise slack that could otherwise result in inaccurate positioning.

The channels 255b, 256b, 297a, 298a are preferably each open at both ends and may extend in across one, two or three orthogonal planes, as required by the particular transducer, to achieve the desired level of hold between the associated first and second centring blocks. There are preferably three ligaments per side, as shown in FIGS. 18G, 25B, 25D, 26C, 26E and 26F, for example. A first ligament 257a on each side is coupled to the respective pin 255a, 256a at one end and has one or more major sections extending through a first set of channels along an axis that is substantially longitudinally aligned with the hinging axis 299 of the hinge system 203, as shown in FIG. 18G. The two first ligaments, in combination, contribute significantly to the alignment of the diaphragm assembly 201 relative to the transducer base structure 202, in the direction of the axis of rotation 299. A second ligament 257b on each side is coupled to the respective pin 255a, 256a at one end and has one or more sections extending through a second set of channels along a second axis in a first direction. The second axis is substantially collinear to a plane that is tangential to the contact surfaces of the hinge system at the regions of contact, as shown in FIG. 26F.

A third ligament 257c on each side is coupled to the respective pin 255a, 256a at one end and has one or more sections extending through a third set of channels along the second axis in a second direction that substantially opposes the first direction of the second ligament. The second and third ligaments may extend between a region of contact between their respective centring block pairs 255, 297 or 256, 298. The second and third ligaments may extend over an air gap preceding the region of contact between their respective centring block pairs 255, 297 or 256, 298. The two second ligaments and two third ligaments contribute, in combination, significantly to the alignment of the diaphragm assembly relative to the transducer base structure in translational directions both perpendicular to the axis of rotation and collinear to a plane that is tangential to the contact surfaces of the hinge system at the regions of contact. They also contribute to alignment in a rotational direction that is about an axis orthogonal to the abovementioned tangential planes.

As described for the ligaments 155 of transducer 100, each ligament 257 is preferably formed form a material and structure that is too fine and compliant to contribute significantly to resisting translational displacement for the purpose of minimising diaphragm break-up resonances, and it primarily serve to hold the diaphragm roughly in position. Each ligament 257 is preferably a string that is substantially resistant to fatigue or wear from bending. The ligaments preferably comprise of multiple strands to facilitate having a: greater bending compliance resulting in a reduced fundamental diaphragm resonance frequency; high tensile modulus, e.g. higher than 10 GPa or more preferably higher than 20 GPa, or more preferably higher than 30 GPa, or most preferably 50 GPa; low tendency to creep over time, since this can result in a change in diaphragm positioning away from an ideal location; a high resistance to abrasion to help prevent wear. For example, an aromatic polyester fiber such as Vectran™ fiber or an ultra-high molecular weight polyethylene fibre such as Spectra™ may be suitable.

2.6 Methods of Hinge Alignment

In assembling the transducer 200, similar methods for hinge element alignment and contact member alignment may be utilised as described under section 1.6 for audio transducer 100.

In this embodiment, a possible method for forming the contact members 291-293 on the inner pole pieces 284-286 of the transducer base structure 202, includes:

1) Brazing, or otherwise coupling, the contact members 291-293 to the respective inner pole pieces 284-286;
2) Cutting, via any suitable method, the free ends of the contact members 291-293 to form the contact member contact surfaces 291a-293a. For example wire electrical discharge machining may be used, followed by lapping in a channel shaped to match the profile of the desired contact member contact surfaces. This may be done separately for the outer contact members 291, 293 facing direction 'C' and the inner contact member 292 facing direction 'D';

3) Positioning the pole pieces 284-285 in a jig in approximately the correct position. The jig having an adjustment mechanism, such as screw adjustors, for adjusting the position of the central contact member 292 relative to the outer contact member 291, 293;

4) Clipping in a metal plate over the contact surfaces of the contact member 291-293. The plate is preferably pre-shaped at one edge to match the correct shapes and alignment of the desired contact members. The plate may provide high rigidity in-plane and high compliance in terms of bending. The plate preferably also provides sufficient contact force against the contact members 291-293 when clipped into position. The plate may exhibits high rigidity in-plane and high compliance in terms of bending such that contact force remains substantially constant regardless of adjustment;

5) Adjusting the position of the central contact member 292, using the jig adjustment mechanism, until the metal plate's equilibrium position is central (allowing for the effect of gravity in the case that this is significant) and/or the fundamental resonance frequency is at the desired level as described for methods in section 1.6 of this specification; and 6) Fixing central contact member 292 to the corresponding inner pole piece 285 in place using adhesive, when the desired position is achieved.

3. Third Audio Transducer Embodiment

Referring to FIGS. 27, 28A-B, 29A-E, 30A-B, 31A-B, 32A-F, 33A-C, 34A-B, 35A-D, 36A-B, 37A-E, 38A-D and 39A-G, a third preferred embodiment of a rotational action audio transducer 300 of the invention is shown.

3.1 Brief Overview

The audio transducer 300 is very similar to the transducer 200 of the second preferred embodiment. In this embodiment, the centring mechanism is different to that described for transducer 200. All other features, including those of the diaphragm assembly 201, the transducer base structure 202 and the hinge system 203 are the same or similar to those described for transducer 200. As such, like features and components have been given the same reference numerals and will not be described in detail again for the sake of conciseness. Reference is made to section 2 of this specification for a description of these features. Only the centring mechanism of transducer 300 will be described in further detail below.

3.2 Centring Mechanism

Referring to FIGS. 27, 30A-B, 34A-B and 36A-B, in this embodiment the centring mechanism comprises a centring members 310, 311 rigidly connected on each side of the diaphragm assembly 201 and an associated centring member 320, 321 rigidly connected on each side of the transducer base structure 202. The centring members 310, 311 extend laterally from the respective sides of the diaphragm base structure 230, whereas the centring members 320, 321 extend laterally from the respective sides of magnetic structure of the transducer base structure 202. This forms a pair of adjacent centring members 310, 320 and 311, 321 cooperatively coupled on either side of the transducer 300. The centring members of each pair 310, 320 and 311, 321 are cooperatively coupled such that they substantially permit relative rotational motion about the hinging axis 299, and substantially restrict relative translational motion along the hinging axis 299 and along one or more axes substantially orthogonal to the hinging axis 299. Preferably translational motion is restricted at least along an axis that is substantially parallel to the coronal plane of the diaphragm 210 and/or the coronal plane of the transducer 300. In this manner, the diaphragm 210 can maintain a centred position relative to the transducer base structure 202 and the contact members 291-293 of the hinge joints 223-225 can maintain appropriate alignment with each other and with the associated hinge element 261-263, particularly when an external force is exhibited by the transducer 300.

In this embodiment each pair of centring members 310, 320 and 311, 321 forms at least one hinge joint in situ. Each hinge joint comprises a pair of hinge elements and each hinge element comprises a contact surface. In this embodiment, the centring members 310, 320 form two rotational hinge joints 331 and 332 on one side of the transducer 300 and the centring members 311, 321 form two similar rotational hinge joints 341, 342 on an opposing side of the transducer 300. It will be appreciated that any number of one or more hinge joints may be provided on one or both sides of the transducer in alternative embodiments.

As mentioned, each centring hinge joint 331, 332, 341, 342 comprises of a pair of hinge elements, each having a respective contact surface. For instance, the first hinge joint 331 has a pair of hinge elements 351, 352 with contact surfaces 351a, 352a respectively. The second hinge joint 332 has a pair of hinge elements 361, 362 with contact surfaces 361a, 362a respectively. The third hinge joint 341 has a pair of hinge elements 371, 372 with contact surfaces 371a, 372a respectively. The fourth hinge joint 342 has a pair of hinge elements 381, 382 with contact surfaces 381a, 382a respectively. Each contact surface is preferably substantially rigid. For each hinge joint, one of the hinge elements comprises of a substantially convexly curved contact surface, in at least a cross-sectional plane perpendicular to the hinging axis 299, and in at least the region of contact between the associated contact surfaces. The other contact surface of each hinge joint is preferably substantially planar, at least in the region of contact, to allow the associated convexly curved contact surface to roll/pivot thereagainst during operation. Alternatively the other contact surface may be concavely curved, in at least a cross-sectional plane perpendicular to the hinging axis 299. In yet another alternative, the other contact surface may be also convexly curved, in at least a cross-sectional plane perpendicular to the hinging axis, but with a radius of curvature that is relatively larger than the associated contact surface of the respective hinge joint.

In this embodiment, the hinge elements 351, 361, 371 and 381 of the centring member extending from the transducer base structure 202, comprise contact surfaces 351a, 361a 371a and 381a that are convexly curved. The surfaces 351a, 361a, 371a and 381a are also axial and substantially aligned with the hinging axis 299 in situ. The contact surfaces 352a, 362a, 372a and 382a of the associated hinge elements 352, 362, 372 and 382 are preferably substantially planar (e.g. they may be plates). The contact surfaces 351a and 361a preferably face in opposing directions and the contact surfaces 371a and 381a preferably face in opposing directions. Similarly, the contact surfaces 352a and 362a preferably face in opposing directions and the contact surfaces 372a and 382a preferably face in opposing directions. In this manner, the hinge joints 331, 332, 341 and 342 are locked against translational motion in directions parallel to the general longitudinal axis of the transducer 300.

The centring members 320, 321 extending from the transducer base structure 202 preferably comprise a serpentine-like body. Similarly the centring members 310, 311 extending from the diaphragm assembly 201 comprise a serpentine-like body that opposes and interlocks with the body of the associated transducer-base-structure centring member 320, 321. In this manner, each pair of centring members are interlocked and substantially restricted from relative axial motion along an axis that is parallel to the hinging axis 299.

The bodies of the centring members 310, 311, 320, 321 are preferably formed from a substantially rigid material, such as a metal or hard plastics material. The convex hinge elements 351, 361, 371, 381 are preferably integrally formed with the respective centring member bodies 320, 321, but may be separately formed and rigidly coupled thereto. The planar hinge elements 352, 362, 372, 382 are preferably formed from a substantially rigid material, such as a metal or hard plastics material.

Preferably a substantially soft and resilient pad 353, 363, 373, 383 is inserted between the body and hinge element 352, 362, 372, 382 of the centring blocks 310, 311. The pads may be a soft and resilient plastics material, such as a silicone, rubber or synthetic viscoelastic urethane polymer, for example. The pads allow for a small degree of translational movement between the hinge elements and contact members of the hinge system, but act to re-centre and re-align the hinge joints when a certain degree of movement is exceeded.

Any resonance modes involving movement of the hinge elements 352, 362, 372, 382 and/or associated pads 353, 363, 373, 383 that are excited may not affect movement of the relatively lightweight diaphragm in this configuration. This is because contact between the hinge elements 352, 362, 372, 382 and the diaphragm 210 occurs substantially along a line that is parallel to and nearly coincident with the diaphragm hinging axis 299, and therefore the amount of torque, about the diaphragm hinging axis 299, that may be transmitted from the plate to the diaphragm is relatively small.

In alternative embodiments, the hinge elements 352, 362, 372, 382 may comprise convex contact surfaces 352a, 362a, 372a, 382a and hinge elements 351, 361, 371 and 381 may comprise planar contact surfaces 351a, 361a, 371a and 381a with a soft and flexible pad under-layer. In such an embodiment, resonances may be reduced as the compliant pad is rigidly coupled to the transducer base structure instead of the diaphragm assembly. As the transducer base structure is relatively stationary compared to the diaphragm assembly, the compliant pad is less likely to be excited during operation in such a configuration.

In a further alternative embodiment, the centring hinge joints at either side of the transducer may each comprises a pin which is rigidly fixed to the diaphragm assembly at either end of the hinging axis. Each pin may be located and retained within a cylindrical compliant bush made from a soft plastics material, such as silicone or rubber for example. Each bush may also be located and retained within a cylindrical cavity that is rigidly coupled to the transducer base structure. In situ, the compliant bush may permit a degree of rotation about the hinging axis, and would also permits a small degree of translation to enable the hinging axis to shift slightly as the diaphragm moves, due to the rolling action between the hinge elements and contact members. If the contact members displace too far relative to the hinge elements, the pins/bushes system would cause re-centring of the hinge system.

In this embodiment the centring hinge joints 331, 332, 341 and 342 form part of the hinge system 203, including central hinge joint 224 and inner hinge joints 223 and 225 (previously described in detail for transducer 200). In this manner, the hinge assembly 203 of this embodiment comprises of an outermost hinge joint 342, 332 on an external side of each hinge joint of a another set of outer hinge joints 331, 341 that are located on either side of hinge joints 223-225.

In assembling the transducer 300, similar methods for hinge element alignment and contact member alignment may be utilised as described under section 1.6 for audio transducer 100.

4. Fourth Audio Transducer Embodiment

Referring to FIGS. 40, 41A-B, 42A-J, 43A-B, 44A-B, 45 and 46A-46C, a fourth preferred embodiment of a rotational action audio transducer 400 of the invention is shown.

4.1 Brief Overview

The audio transducer 400 is very similar to the transducers 200 and 300 of the second and third preferred embodiments. In this embodiment, the hinge system 403 and centring mechanism have been modified. The diaphragm assembly 401 of this embodiment is largely the same or similar to that described for transducer 200 under section 2.2 and therefore will not be described again in detail for the sake of conciseness. Some features of the diaphragm assembly 401 that relate to the hinge system 403 and centring mechanism have been modified and these will be described in further detail below. All other features are given like references to those of diaphragm assembly 201 and are described under section 2.2. Similarly, the transducer base structure 402 and transducing mechanism of this embodiment are largely the same or similar to that described for transducer 200 under section 2.3 and therefore will not be described again in detail for the sake of conciseness. Some features of the transducer base structure 402 that relate to the hinge system 403 and centring mechanism have been modified and these will be described in further detail below. All other features are given like references to those of transducer base structure 202 and related transducing mechanism and are described under section 2.3.

4.2 Hinge System

Referring to FIGS. 41A-B, 42A-3 and 43A-B, the hinge system 403 of the fourth preferred embodiment is also designed partially in accordance with the principles outlined in section 3.2 of PCT/IB2016/055472. For example, one or more of the following principles are preferably utilised:

The hinge system 403 comprises one or more parts configured to facilitate movement of the diaphragm 210 and which contribute significantly to resisting translational displacement of the diaphragm with respect to the transducer base structure 402, and which has a Young's modulus of greater than approximately 8 GPa, or more preferably higher than approximately 20 GPa.

Preferably, all parts of the hinge system 403, apart from the biasing mechanism, that operatively support the diaphragm 210 in use have a Young's modulus greater than approximately 8 GPa, or more preferably higher than approximately 20 GPa.

The hinge elements and the contact members are preferably made from a material having a Young's modulus higher than 8 GPa, or even more preferably higher than 20 GPa, for example, but not limited to aluminum, steel, titanium, tungsten, ceramic and so on.

The hinge element and/or the contact member of each hinge joint may comprise a thin corrosion-resistant coating, for example a ceramic coating or an anodized coating, at the respective contact surface.

One or more hinge joints may be rigidly coupled to the first body or the second body, either directly or via at least one intermediary components.

The intermediary components (such as the diaphragm base frame) are preferably made from a material with a Young's modulus greater than approximately 8 GPa, or more preferably higher than approximately 20 GPa.

Preferably the intermediary component(s) (such as the diaphragm base frame) incorporate a substantially planar section oriented at an angle greater than approximately 30 degrees to a coronal plane of the first body and substantially parallel to an axis of rotation of the hinge to transfer load with minimal compliance.

The diaphragm 210 is preferably closely associated with each hinge joint of the hinge system 403. For example, a distance from the diaphragm 210 to each hinge joint, is less than half the maximum distance from the axis of rotation 299 to a most distal periphery 210b of the diaphragm 210, or more preferably less than ⅓ the maximum distance, or more preferably less than ¼ the maximum distance, or more preferably less than ⅛ the maximum distance, or most preferably less than 1/16 the maximum distance.

The diaphragm or the transducer base structure is effectively rigidly connected to at least a part of the hinge element of each hinge joint in the immediate vicinity of the contact region, and the other of the diaphragm or the transducer base structure is effectively rigidly connected to at least a part of the contact member of each hinge joint in the immediate vicinity of the contact region.

Whichever of the contact member or hinge element of each hinge joint that comprises a smaller contact surface radius, about an axis substantially parallel to the axis of rotation, may be less than 30%, more preferably less than 20%, and most preferably less than 10% of a greatest length from the contact region, in a direction perpendicular to the axis of rotation, across all components effectively rigidly connected to a localised part of the component which is immediately adjacent to the contact region.

Whichever of the contact member or hinge element of each hinge joint that comprises a smaller contact surface radius, about an axis substantially parallel to the axis of rotation, may be less than 30%, more preferably less than 20%, and most preferably less than 10% of a distance, in a direction perpendicular to the axis of rotation, across the smaller out of: the maximum dimension across all components effectively rigidly connected to the part of the contact member immediately adjacent to the point of contact with the hinge; and the maximum dimension across all components effectively rigidly connected to the part of the hinge element immediately adjacent to the point of contact with the contact member.

The contact member of each hinge joint may comprise a radius at the contact surface that is less than 30%, more preferably less than 20%, and most preferably less than 10% of: a length from the contact region, in a direction perpendicular to the axis of rotation to a terminal end of the transducer base structure, and/or a longitudinal depth of the transducer base structure.

Each hinge joint is configured to allow the contact member to move in a substantially rotational manner relative to the hinge element.

The contact member of each hinge joint is preferably configured to roll against the hinge element, and/or rub and/or twist with insignificant, and preferably no, sliding during operation.

It will be appreciated that any one of the hinge systems herein described may utilise one or more of the abovementioned principles of construction as would be readily apparent to the skilled artisan.

The hinge system 403 operatively couples the diaphragm 210 to the transducer base structure 402 so that the diaphragm may move, and preferably rotatably oscillate about the hinging axis 299 during operation. The hinge system 403 may also be used in other applications as described in section 8 without departing from the scope of the invention.

The hinge system 403 of this embodiment comprises of five axially aligned hinge joints 423, 424, 425, 410 and 411 that are distributed along the width of the diaphragm 210 at or adjacent the base region 210a. The three axially aligned hinge joints 423, 424 and 425 are similar to the three hinge joints described in the second and third embodiments. All hinge joints share an approximately common hinging axis 299. It will be appreciated there may be other quantities of hinge joints in alternative configurations. As in the second embodiment, at least one hinge joint has contact members facing in a different direction relative to the contact members of other hinge joints. In this embodiment, hinge joints 423, 425, located on either side of the central hinge joint 424, have contact member contact surfaces 491a, 493 with normal vectors facing in a first direction. For these hinge joints 423, 424 the normal vectors are also in the same direction as a reaction force E imparted by the transducer base structure on the hinge elements 461, 463 of the hinge joints 423, 425 (shown for hinge joint 423 in FIG. 42F). The central hinge joint 424 has a contact member contact surface 492a with a normal vector facing in a second direction. For this hinge joint 424, the normal vector faces in the same direction to a reaction force F imparted by the transducer base structure on the hinge element 462 at the hinge joint 424. The first direction is preferably at least angled relative to the second direction. For example, a relative angle between the first direction and the second direction may be between approximately 95 and approximately 175 degrees, more preferably between approximately 100 degrees and approximately 170 degrees or most preferably between approximately 100 degrees and 160 degrees. In this embodiment, the relative angle between the normal vectors of the central hinge joint 424 and the two inner hinge joints 423, 425 on either side of the central hinge joint 424 have been modified to minimise the overall complexity of the centring mechanism designed.

The outermost hinge joints 410 and 411 on either side of the inner hinge joints 422, 425 and that locate on either side of the sagittal plane of the transducer 400 also have a hinging axis that is substantially aligned with the hinging axis 299 of the hinge system 403. Hinge joints 410 and 411 have contact member contact surfaces 412a, 414a with normal vectors facing in a third direction. For these hinge joints 410, 411 a reaction force G is imparted by the transducer base structure 402 on the respective contact members 412, 414 (shown for hinge joint 410 in FIG. 42I). The reaction force G substantially opposes the direction of the normal vectors of contact member contact surfaces 412a, 414a. The third direction of the contact members 412, 414 of the outermost hinge joints is angled relative to the first and second directions. For instance a relative angle between the first direction and the third direction is between approximately 200 degrees and 300 degrees, more preferably between approximately 220 degrees and 280 degrees, and most preferably between approximately 240 degrees and 270 degrees.

The arrangement above results in reaction forces G of hinge joints 410, 411, summing with the reaction forces E of the hinge joints 423 and 425 to substantially equalise reaction force F of the central hinge joint 424. This places the device in a centred equilibrium in at least the neutral diaphragm state and minimises translation that is orthogonal to the hinging axis 299.

Each hinge joint 423, 424, 425, 410 and 411 comprises a contact member 491, 492, 493, 412, 414 having a contact surface 491a, 492a, 493a, 412a, 414a and an associated hinge element 461, 462, 463, 413, 415 having a contact surface 461a, 462a, 463a, 413a, 415a. The hinge elements 461, 462, 463 are connected to the diaphragm 210 and the contact members 491, 492, 493 are connected to the transducer bases structure 402. Conversely, the hinge elements 413, 415 are connected to the transducer base structure 402 and the contact members 412, 414 are connected to the diaphragm 210. The hinge elements 461, 462, 463, 413, 415 and contact members 491, 492, 493, 412, 414 may be connected to the respective diaphragm 210 or transducer base structure 403, either integrally, directly or via one or more other components. Preferably the hinge elements 461, 463 and contact members 412, 414 are rigidly connected to the diaphragm 210 and the hinge element 462 is flexibly connected to the diaphragm 210 via a resilient member 470. Preferably the hinge elements 413, 415 are flexibly connected to the transducer base structure 402 via resilient members 416, 417 respectively.

As described for the second embodiment, in the assembled state of the transducer 400, the contact surfaces 491a, 492a, 493a, 412a, 414a and 461a, 462a, 463a, 413a, 415a are respectively held in abutment against one another and permitted to move relative to one another to rotate the diaphragm 210 during operation. The contact member contact surfaces 491a, 492a, 493a, 412a, 414a are substantially convexly curved about an axis substantially parallel to the hinging axis 299 (shown in FIG. 41A) (i.e. in the cross-sectional plane that is perpendicular to the hinging axis 299). The contact surfaces 491a, 492a, 493a, 412a, 414a are also longitudinal and have axially aligned curved edges within a common plane such that they are substantially collinear. In some variations the contact member contact surfaces 491a, 492a, 493a, 412a and 414a may be convexly curved also about an axis that is orthogonal to the axis of rotation. In this embodiment, the collinear surfaces 491a, 492a, 493a, 412a and 414a form the hinging axis 299 at the region of contact with their respective hinge element contact surfaces 461a, 462a, 463a, 413a, 415a. In this embodiment, the hinge element contact surfaces 461a, 462a, 463a, 413a, 415a are substantially planar, in at least the region of contact, but they may be alternatively shaped as described in any one of the preceding embodiments.

Figure 42A:
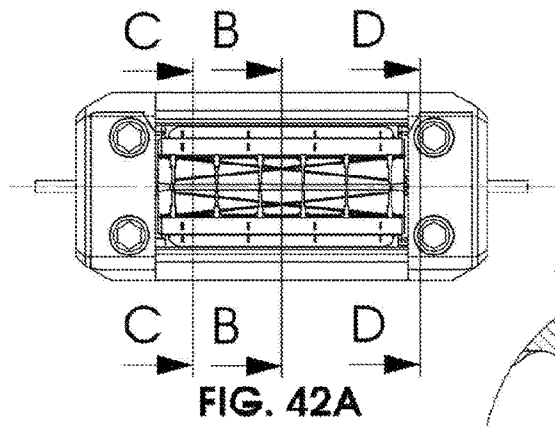
Figure 42D:
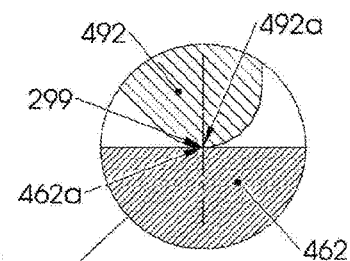
Figure 42C:
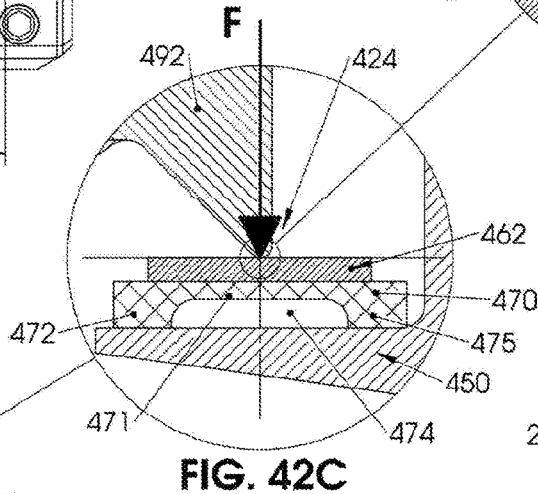
Figure 42B:
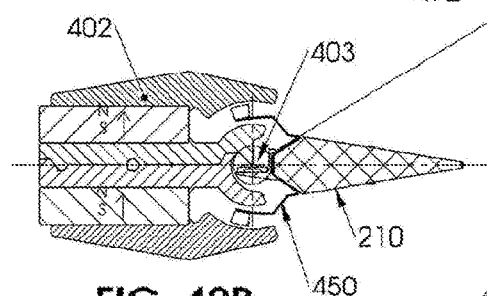
Figure 42G:
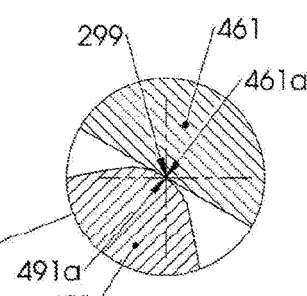
Figure 42E:
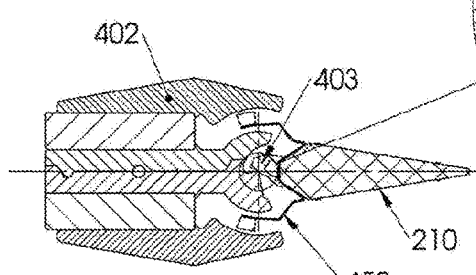
Figure 42F:
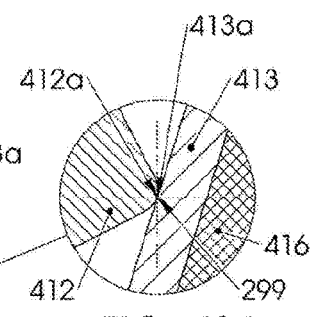
Figure 42H:
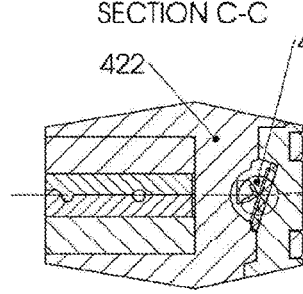
Figure 42I:
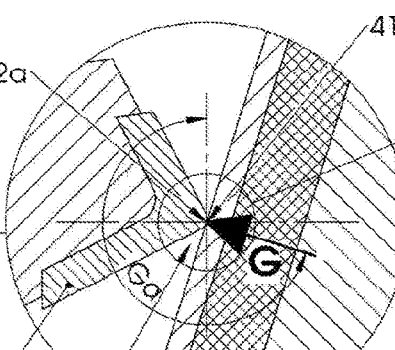
Figure 42J:

Referring to FIGS. 42A-J, the relative angles of the reaction forces exhibited by the hinge joints 423, 424, 425, 410 and 411 (which are a result of the relative angles of the normal vectors of the various contact surfaces) will now be described in detail. In this embodiment, the relative angles enable the simplification of the centring mechanism, relative to the mechanism of transducer 300, for example. Therefore, reference to the centring mechanism is made in describing the effect of these relative angles. A more detailed description of the centring mechanism is provided under section 4.3. As shown in FIG. 42F, the convexly curved contact surfaces 491a, 493a of the inner hinge joints 423, 425 have normal vectors facing in a common, first direction such that a reaction force E is imparted by the transducer base structure 402 on the respective hinge elements 461, 463 at the region of contact. As shown in FIG. 42C, the convexly curved contact surface 492a of the central hinge joint 424 faces in the second direction such that a reaction force F is imparted by the transducer base structure 402 on the respective hinge element 462 at the region of contact. The outermost hinge joints 410, 411 on either side of the hinge assembly 403 face in a third direction, however, these are coupled to the diaphragm assembly 401 instead of the transducer base structure 402, so the third direction opposes the reaction force G imparted by the transducer base structure 402 on the respective contact members 412, 414 in the region of contact, as shown in FIG. 42I.

The relative angles of the normal vectors facing the first, second and third directions are such that force vectors E, F and G are balanced, to substantially restrain the hinge against translational motion in directions that are at least orthogonal to the hinging axis 299. Force vector F (related to centre hinge joint 422) is approximately opposite to, so as to balance, the vector sum of: twice force vector E (related to the two hinge joints 421 and 423) and twice force vector G (related to the two outer hinge joints 410 and 411); F=−(2*E+2*G). In this embodiment, the central contact member 492 has a contact surface that faces relatively downward, while the contact members 491, 493 have contact surfaces 492a and 493a that face relatively upward and at an angle of between approximately 95 and approximately 175 degrees, more preferably between approximately 100 degrees and approximately 170 degrees or most preferably between approximately 100 degrees and 160 degrees relative to the direction that the contact surface 492a faces. For example, the angle of force vector E may be approximately 150 degrees relative to the force vector F as indicated by angle Ea in FIG. 42F. The hinge joints 410, 411 generate a force vector G that may be angled at approximately 200 degrees and 300 degrees, more preferably between approximately 220 degrees and 280 degrees, and most preferably between approximately 240 degrees and 270 degrees relative to the force vector F. For example, the relative angle between force vector G and force vector F may be approximately 253 degrees to aid in appropriately restraining the hinge system, as indicated by angle Ga in FIG. 42I. It will be appreciated that other relative directions and angles of the contact surfaces and related force vectors may be exhibited in alternative designs, provided that the hinge system is adequately restrained and that at least two sets of one or more hinge joints have contact member contact surfaces facing in different directions.

It is preferred that the convexly curved surfaces 491a, 492a, 493a are formed in the contact members 491, 492, 493 associated with the base structure 402 as the comparative rigidity of the base structure components, relative to the diaphragm, assembly, may help to facilitate accurate manufacturing. Additionally, because the base structure may be comparatively heavy, it is easier to make the geometry of supports underlying the convex surfaces to be rigid while also avoiding undue restriction of diaphragm excursion. The contact surfaces 491a, 492a, 493a may be formed on the transducer base structure 402 via any suitable method such as machining, cutting, welding, attaching, lapping, moulding and the like. In this embodiment, the contact members 491, 492, 493 are rigidly connected to corresponding inner walls of the inner poles 484, 485, 486. The contact members may be formed, adhered, welded, fastened or otherwise rigidly fixed to the cavities using any suitable mechanism. Alternatively they may be integrally formed.

As described in relation to transducer 200, in this embodiment each contact member 491-493 that couples to the transducer base structure 402 consists of a body that increases in thickness away from the associated contact surface 491a-493a. For instance, each contact member 491-493 is substantially wedge shaped or comprises a cross-sectional profile that is substantially triangular in a plane that is substantially orthogonal to the axis of rotation 299. In alternative embodiments at least one contact member comprises an increased thickness and/or is wedge shaped. At least one, but preferably each, of said contact members 491-493 consists of a body that is increasingly tapered in thickness, away from the associated contact surface 491a-493a, and that tapers for a length that is significantly greater than the radius of the associated contact surface 491a-493a. Each contact member 491-493 also consists of a substantially solid body in this embodiment.

The contact members 491-493 extend from an external surface of the base plates 481, 482 of the transducer base structure 202. In this manner, the contact members 491-493 cantilever from the transducer base structure. Contact members 491 and 493 cantilever is a common direction and contact member 492 cantilevers from a different direction that is angled to the common direction of contact members 491 and 493. The contact members 491-493 are all supported by the transducer base structure 402 such that they share a common support member. This enhances the rigidity of this side of the hinge system 203. The transducer base structure thereby forms a relatively thick and robust support for the contact members 491-493.

The body or structure supporting at least the majority of the contact members 491-493 should be substantially rigid and robust (e.g. the transducer base structure 402 in this embodiment). Having robust and rigid supporting bodies or structures for the contact members 491-493 help to facilitate accurate alignment of the contact members during manufacture and during operation. Maintaining accurate alignment of the contact members 491-493 of the hinge joints in-use enables the diaphragm to move freely and smoothly without compromising or altering the desired motion and/or without altering the equilibrium displacement of the diaphragm 210.

The transducer base structure components are formed from substantially rigid material(s), preferably having a Young's modulus of at least approximately 8 GPa, or more preferably at least approximately 20 GPa, thereby enhancing rigidity of the contact member support structure. The transducer base structure components also collectively consist of a geometry that is substantially rigid and inflexible to maintain rigidity along an axis that is substantially parallel to the axis of rotation 299.

Preferably the transducer base structure consists of a depth 402d and/or height 402h and/or width 402w (shown in FIG. 44A) that is significantly greater than the radius, 491r-493r, of the convex contact surface 491a-493a of the associated contact member 491-493 about an axis parallel to the axis of rotation 299 (hereinafter referred to as contact member radius 491r-493r—shown in FIGS. 42C and 42F, for example). In this embodiment the depth 402d, height 402h and width 402w of the transducer base structure 402 is significantly greater than each contact member radius 491r-493r to enhance the stability and robustness of the support to each member. In some embodiments, each contact member 491-493 is directly supported in a support region of the transducer base structure (herein referred to as "contact member support region") and at least the contact member support regions are each substantially squat and/or thickset relative to the associated contact member radius 491-493. In other words the depth, height and width of at least the support regions of the transducer base structure are significantly greater than the associated contact member radii 491r-493r to enhance the stability and robustness of the support to each member. In this embodiment the contact member support region of each contact member is the associated inner pole piece, for example.

In this embodiment, an average cross-sectional area of the transducer base structure 402, in a plane substantially perpendicular to the axis of rotation 299 (e.g. the cross-sectional area of FIG. 42B) and averaged along a total length along the axis of rotation 299 between and including a pair of outermost hinge joints 411 and 412 of the hinge 403 (herein referred to as "total length of hinge 499" shown in FIG. 41A), is significantly greater than the contact member radius 491r-493r of at least one contact member 491-493 supported by the transducer base structure 402, and most preferably all contact members 491-493 supported by the transducer base structure 402.

The cross-sectional area of the transducer base structure 402 is preferably significantly greater than the contact member radius, to maintain accurate alignment of the contact members during manufacture and in use. In this embodiment, a square root value of the average cross-sectional area of the transducer base structure 402 mentioned above is significantly greater than the contact member radius 491r-493r of at least one contact member 491-493, but preferably all, supported by the transducer base structure 202. For example, it may be greater than approximately 20 times, or more preferably greater than approximately 30 times, and most preferably greater than approximately 40 times, greater than the contact member radius/radii 491r-493r. In some embodiments the average cross-sectional area of the contact member support regions may be greater than 20, 30 or 40 times the associated contact member radii 491r-493r.

Preferably the transducer base structure 402 is sufficiently heavy such that it is capable of supporting the entire length of the hinge with minimal deflection in-use. As such, it is preferred that the mass of the transducer base structure 402 is a product of the total length of the hinge. In other words, it is preferred that a heavier base structure 402 is used for a longer hinge, to provide sufficient rigidity. In this embodiment, a mass of the transducer base structure 402 in grams is greater than approximately 0.0003 times the cube of the total length of the hinge 499, in millimetres. More preferably the mass of the transducer base structure 202 in grams is greater than approximately 0.0005 times the cube of the total length of the hinge 499 in millimetres. Most preferably the mass of the transducer base structure 202 in grams is greater than approximately 0.0008 times the cube of the total length of the hinge 299l in millimetres.

In this embodiments a mass of the transducer base structure 202 in grams is greater than approximately 25,000 times the cube of at least one contact member radius 491r-493r, in mm, more preferably more than approximately 40,000 times and most preferably more than approximately 60,000 times. Preferably the mass is greater than 25,000 times the cube of each contact member radius 491r-493r, more preferably more than 40,000 times and most preferably more than 60,000 times.

Preferably the geometry of the transducer base structure is compact and robust such that it is capable of being manufactured accurately without undue deformation, and is capable of resisting deformation of the contact members, relative to one-another, in-use. In this embodiments a density of the transducer base structure 402 is greater than approximately 0.07 g/mm$^3$, more preferably greater than approximately 0.001 g/mm$^3$ and most preferably greater than approximately 0.0016 g/mm$^3$. In this context density is calculated from the mass divided by the volume enclosed by major external surfaces, regardless of whether there are hollow portions contained within said major external surfaces.

In this embodiment the transducer base structure 402 comprises of a significant depth 402d extending from the region of connection between the transducer base structure 402 and at least one contact member 491-493, the depth 402d extending away from the axis of rotation 299, in a direction that is angled relative to the axis of rotation 299. This enhances the rigidity and robustness of support to the respective contact member 491-493. The transducer base structure 402 preferably comprises a significant depth 402 extending from all regions of connection with the contact members 491-493. Preferably the significant depth 402d extends from each connection region and away from the axis of rotation 299, in a direction that is substantially orthogonal to the axis of rotation 299.

In this embodiment the significant depth 402d is greater than approximately twice the associated contact member radius 491r-493r, more preferably the depth is greater than approximately four times the associated contact member radius 491r-493r, and most preferably the depth is greater than approximately six times the associated contact member radius 491r-493r.

In this embodiment, the transducer base structure consists of a squat and/or thickset geometry in the immediate vicinity or directly adjacent the regions of connection with the coupled contact members 491-493. In particular, at least a region that connects the contact members 491-493 is substantially robust/solid and squat/thickset to maintain axial alignment of the contact surfaces of these members 491-493, in use. For example, in this embodiment, the transducer base structure is substantially robust, squat, solid and/or thickset at the pole pieces 484-486 which directly support the contact member 491-493, thereby connecting the members with an overall robust structure. In addition, the transducer base structure is also substantially robust/solid and squat/thickset adjacent the pole pieces themselves, to provide additional robustness to the contact member supports.

The abovementioned physical properties and/or geometries of the transducer base structure 402 each contribute to providing the advantages listed for the hinge system 203 of the second transducer embodiment. It will be appreciated that a combination of one or more of the above physical properties and/or geometries may be utilised as required by the particular application and the invention is not intended to be limited to any particular combination, although all properties and geometries are preferred for this embodiment.

In this embodiment, the contact members 412, 414 of the outer hinge joint 410, 411 are on the diaphragm side of the transducer 400. The curved contact members 412, 414 each have a radii that is sufficient for the members to roll over the opposing hinge element contact surfaces 413a, 415a. Preferably the contact members 412, 414 are formed or otherwise rigidly coupled onto either side of the beam 450, extending longitudinally therefrom to align with the corresponding hinge elements 413, 415 on the transducer base structure side. The contact surfaces of the contact members 412, 414 on the diaphragm beam 450 face in an opposing direction to the hinge elements 461, 463 of the hinge joints 423, 425.

In this embodiment, the hinge elements 461, 463 are provided by an under-surface on either side of a hinge beam 450 of the diaphragm assembly 401. In this manner the hinge elements 461, 463 are rigidly connected and closely associated with the diaphragm 210 via the respective hinge beam 450 and diaphragm base frame 231. The hinge element 462 is coupled to a corresponding central recess 453 of the hinge beam 450 via the resilient member 470.

The resilient member 470 is preferably a relatively soft, flexible and substantially compliant component. The member 470 is preferably flexible and resilient in compression/tension and in shear. The member 470 may be an elastomer, such as Silicone, a thermoset, polyether-based, polyurethane material, a synthetic viscoelastic urethane polymer, or any other suitable material that would be readily apparent (such as those described for member 270 of transducer 200). The material preferably has relative high resistance to relaxation and creep, so that it is capable of exerting sufficient force between hinge elements 461, 463 and contact members 491, 493 over the lifetime of the transducer. The member 470 comprises a body configured to be received and retained within the recess 453 of the hinge beam 450. The member 470 is also substantially planar to substantially uniformly engage the hinge element 462 on the opposing side. The hinge element 462 is preferably also substantially planar but is relatively rigid to provide a substantially rigid contact surface 462a for engaging the corresponding contact member contact surface 492a and for preventing the relatively soft member 470 from wrapping around the curved contact surface 492a. For instance, the hinge element 462 may be made from a steel or alumina material. The relatively rigidity of hinge element 462 ensures a substantially consistent contact force location is maintained during operation, so that the hinge joint 422 contact region can maintain close proximity to the intended hinging axis 299. This minimises restoring forces on the diaphragm 210 during operation. The rigid hinge element 462 also serves to transfer a distributed load from the member 470 into a localised point or line on the contact surface 492a, which in turn helps to reduce the fundamental resonance frequency of the transducer and mitigates damage to the member 470.

The member 470 is similar to the member 270 of transducer 200. In the assembled state, the member 470 biases the hinge element contact surface 462a toward the associated contact member contact surface 492a to force the two surfaces into engagement in situ. Preferably, the member 470 is held slightly in compression (i.e. the member 470 is pre-loaded in compression when the diaphragm is at equilibrium) in the direction of the force vector to provide a sufficient contact force between the associated hinge joint contact surfaces. Note that hinge element 462 may have a degree of compliance in bending, and may therefore act in conjunction with member 470 to compliantly apply force to contact member 492.

The relatively soft member 470 also enables relative movement between the associated hinge element contact surface 462a and the hinge beam 450 in tension and compression. However, this member 470 is also configured to enable relative movement along the shear directions. As shown in detail in FIG. 42C, the member 470 comprises a main body having a relatively thin central section 471 and two relatively thick legs 472 and 473 on opposing sides of the central section. The legs 472 and 473 extend longitudinally in a direction that is substantially parallel to the hinging axis 299, in situ. This creates a central recess 474 in the member 470 which reduces the shear modulus of the member 470. In this manner, the member 470 is permitted to flex in the shear direction, i.e. along a plane that is substantially parallel to the planar surface of the central section 471. The legs 472 and 473 of member 470 are permitted to lean during operation which reduces resistance to shear deformation, thereby permitting hinge element 462 to translate in a direction parallel to its plane and orthogonal to the hinging axis. This minimises the potential occurrence of slippage between the contact surfaces 462a and 492a to maintain a substantially consistent region of contact that is aligned with the intended hinging axis 299, during operation. It also minimises the potential of slippage between the other contact members 491, 493 and associated hinge elements 461, 463, and minimises any potential raising of the fundamental resonance frequency of the diaphragm resulting from this. The geometry of member 470 means that support is concentrated at either side of the hinge element 462. This also helps to minimise instability/tilting of the hinge element 462 if/when the associated contact member contact surface 492a applies load away from the centre of the hinge element 462.

Other variations to the member 470 that facilitate shear deformation are possible as would be readily apparent to those skilled in the art. For instance, in some configurations the member 470 may comprise an anisotropic structure. For example, the member 470 may comprise two, thin parallel solid outer layers connected by a uniform distribution of micro-pillars oriented substantially normal to the plane of the sheets, with air surrounding the pillars. Other similar structures including air pockets may also be suitable. These types of structures may be relatively compliant in shear, by virtue of their geometry, yet relatively rigid in compression/tension to ensure sufficient contact forces are imparted on the joint.

Referring to FIGS. 43A and 43B, two other possible variations to the member 470 of this embodiment will be described. In FIG. 43A a hinge element 475 (which takes place of central hinge element 462 and member 470) is designed to have a body that can flex in tension/compression directions (permitting displacement substantially parallel to the force vector F) and in shear (permitting displacement along a plane substantially orthogonal to force vector F). The hinge element 475 comprises two curved legs on either side of a central platform 475a forming a pair of opposed springs 475b and 475c. The central platform is relatively thin and may be slightly curved, also acting as a spring. In this manner, the hinge element 475 provides a substantially rigid contact surface, but also enables flex in the compression/tension and shear directions. This means the hinge element contact surface of hinge element 475 can be translated in these directions to minimise slippage and other unwanted effects as described above for member 470. The springs 475b and 475c could be fixedly coupled to the beam 450 via any suitable method such as using adhesive, welding, soldering, being seated in a channel, friction or the like.

In FIG. 43B, a hinge element 476 (which takes place of hinge element 462) is mounted on a pair of rods 477 and 478 on either side of the element 476. The rods 477 and 478 extend longitudinally along axes that are substantially parallel to the hinging axis 299. The hinge element 476 may be similar to rigid hinge element 462 or more preferably is similar to the central platform 475a of hinge element 475. In other words, the hinge element 476 is sufficiently thin to permit some flex so as to allow the contact surface region of hinge element 476 to translate in directions parallel to the force vector 'F'. The hinge element 476 has a substantially rigid contact surface, however. The rods 477 and 478 are preferably mounted within recess 453 such that they can roll slightly (not majorly), permitting movement of the hinge element 476 in the shear directions. The rods may also be formed of a material or structure that allows them to compress. For instance, they may be formed from a similar material to member 470 and/or the rods may be substantially hollow. The rods are preferably adhered to both the beam 450 and hinge element 476. In yet another alternative configurations, two relatively, rigid longitudinal rods or rollers may be located in corresponding depressions in the beam 450, permitting a degree of rolling that allows movement of the related hinge element in the rolling directions. The depressions would be configured to restrict the degree of rolling to a predetermined amount. The hinge element of such a configuration may be similar to hinge element 476 to permit compliance in compression/tension directions.

Configurations of the member 470 and the abovementioned variations can be used in any one of the embodiments of this invention. They provide a reasonably high contact force to be applied to the outer hinge joints (facilitating a higher breakup frequency associated with flexing at these joints), while also facilitating a lower fundamental resonance frequency.

Similar to previous embodiments, the contact members 491-493 are preferably formed from a rigid material having relatively low ferromagnetism, such as a tungsten carbide or any other hard material having sufficient wear resistance and high rigidity, for example alumina or non-magnetic stainless steel. The hinge elements 461-463 may be formed from the same or similar materials. Metals may optionally be treated, for example using physical vapour deposition coating, to help prevent fretting and other forms of corrosion. In this case, the contact members 491-493 are separately formed from the inner pole pieces 484-486 and rigidly coupled thereto via any suitable mechanism, for example via brazing, laser welding, spot welding or adhesion. In alternative embodiments the contact members 491-493 and/or the hinge elements 261-263 may be formed from a ferromagnetic material or materials, but with substantially non-ferromagnetic contact member contact surfaces 491a-493a and/or substantially non-ferromagnetic hinge element contact surfaces 461a-463a, respectively.

In some embodiments the contact members 491-493 and corresponding inner pole pieces 484-486 may be manufactured integrally as a single component. The material is preferably a substantially rigid, ferromagnetic material, such as stainless steel. Shaping to form the contact member and inner pole piece structure may comprise, for example, computer numerical control machining or grinding or metal injection moulding, for example. Finishing processes such as polishing, lapping and physical vapour deposition coating, for example, may be applied to the contact member contact surfaces 491a-493 as described above.

In this embodiment, the planar hinge elements 413, 415 are preferably coupled to the transducer base structure via resilient members 416, 417. Similar to member 470, the members 416, 417 are preferably flexible and resilient in compression/tension and also in shear. Each member 416, 417 may be an elastomer, a thermoset, polyether-based, polyurethane material, or synthetic viscoelastic urethane polymer, for example. The material preferably has relative high resistance to relaxation or creep. The resilient members 416, 417 of the hinge joints 410, 411 are rigidly adhered or otherwise rigidly coupled to the transducer base structure 403.

Referring to FIGS. 44A-B the members 416 and 417 and associated hinge elements 413, 415 may be coupled to the parts 421a, 422a of outer caps 421, 422 of the transducer base structure 403 (also as shown in FIG. 46b for hinge joint 411, for example). In the assembled state of the diaphragm, these are initially pre-loaded with slight compression to provide a reaction force G to the corresponding hinge elements 412, 414 at the region of contact, as shown in FIG. 42I. The rigid hinge elements 412-415 may be formed from similar materials as the hinge elements and contact members of the hinge system 403 as described above.

In combination with resilient member 470, the members 416 and 417 form the biasing mechanism of the hinge system that compliantly biases the contact surface 461a, 462a, 463a, 413a, 415a of the hinge element 461, 462, 463, 413, 415 of each hinge joint 423, 424, 425, 411, 410 towards the contact surface 491a, 492a, 493a, 412a, 414a of the associated contact member 491, 492, 493, 412, 414, to maintain substantially consistent physical contact between the contact surface of the hinge element and the contact surface of the associated contact member during operation.

The hinge system 403 of this embodiment may be used in any one of the other embodiments described in this specification, or replace the hinge system of any one of the rotational action audio transducer embodiments described in PCT/IB2016/055472 or PCT/IB2017/051519, for example.

4.3 Centring Mechanism

Referring back to FIGS. 41B-D, 42A-3 and 46B in this embodiment, the transducer 400 further comprises a centring mechanism for assisting in centring of the hinge system 403 and holding the diaphragm 210 in the correct position relative to the transducer base structure. The centring mechanism permits rotation of the diaphragm relative to the transducer base structure for normal operation and also assists in maintaining alignment of the hinge elements and contact members of the hinge system 403 by restraining translational displacement of the diaphragm relative to the transducer base structure.

The configuration of the hinge joints 423, 424, 425, 410 and 411 of the hinge system 403 assists in the centring of the system and maintaining alignment of the relative parts of the system. This is achieved by virtue of the relative orientations leading to the substantially balanced reaction forces F, G and E as previously described. In addition, the centring mechanism further comprises blocks 418a, 419a on the outer sides of the outer hinge joints 410, 411 for coupling substantially flexible and resilient blocks 418b and 419b, which act to prevent or substantially mitigate unwanted displacement of the diaphragm 210 in at least directions that are substantially parallel to the axis of rotation 299, more preferably directions that are also orthogonal to the axis of rotation 299, and to help to prevent air leakage past the diaphragm 210. The flexible and resilient blocks 418b, 419b are preferably formed from an elastomer, such as silicone, and couple between the blocks 418a, 419a and the inner walls of the outer caps 421, 422 of the transducer base structure 402. The outer caps 421, 422 may each comprise an inner cavity 421b, 422b that corresponds to the shape of the respective silicone block 418b, 419b. The silicone blocks 418b, 419b each include a central, longitudinal section 418c, 419c that is flexible and resilient under loads of tension, compression, shear, torsion and bending, and two opposing coupling pads 418d, 419d on either side of the central longitudinal section 418c, 419c for coupling the respective inner blocks 418a, 419a and outer caps 421, 422. The silicone blocks may be adhered or otherwise fixedly coupled at either end to the inner blocks and outer caps via the coupling pads which preferably have an increased outer surface area for effective coupling. The longitudinal axis of the central section 418c, 419c of each silicone block is preferably substantially aligned with the hinging axis 299 of the hinge system 403, in situ. In this manner, any movement of the transducer base structure 402 relative to the diaphragm assembly 401, in the assembled state of the transducer, that causes loads of compression, tension, shear, bending and/or torsion on the silicone blocks 418b, 419b are corrected by resilience of the blocks 418b, 419b.

In this embodiment, the transducer base structure base plate 480 may comprise two parts 481 and 482 that couple to one another to form a base plate 480 with a central channel 485 extending therealong for a decoupling axle 294 to extend therethrough. The decoupling axis may form part of a decoupling mounting system as described under section 4 of PCT/IB2016/055472 or section 7 of this specification for example.

In assembling the transducer 400, similar methods for hinge element alignment and contact member alignment may be utilised as described under section 1.6 for audio transducer 100.

5. Transducer Housing

Any one of the above transducer embodiments 100-400 may be mounted within a housing of an audio device. Referring to FIGS. 45 and 46A-B, an exemplary housing 500 is shown, within which the transducer 400 is mounted. The transducer 400 may be mounted via a decoupling mounting system designed in accordance with the principles described in PCT/IB2016/055472, for example. The housing 500 may comprise two parts 501, 502 having opposing recesses that couple to form an internal cavity for the transducer 400. The cavity shape corresponds to the overall profile of the transducer 400 and air gaps between the inner walls of the housing and transducer 400 are preferably minimised to prevent air leakages on either side of the diaphragm. To assist with this, a soft material, such as a foam 503 material is provided between the transducer base structure 402 and the surrounding walls of the housing 500 to seal the air path between the two sides of the cavity divided by the transducer base structure. The foam 503 is preferably shaped to correspond to the periphery of the transducer base structure 402.

Any one of the transducers 100-400 may be mounted in a similar housing with a foam or other air sealing material disposed around the periphery of the transducer base structure to seal the air path connecting the air volumes within the housing on either side of the diaphragm 210.

6. Audio Transducer Applications

The audio transducer embodiments described in this specification may be configured for implementation in a large variety of audio devices.

Each of the audio transducer embodiments can be scaled to a size that performs the desired function. For example, the audio transducer embodiments of the invention may be incorporated in any one of the following audio devices, without departing from the scope of the invention:

Personal audio devices including headphones, earphones, hearing aids, mobile phones, personal digital assistants and the like;

Computing devices including personal desktop computers, laptop computers, tablets and the like;

Computer interface devices including computer monitors, speakers and the like,

Home audio devices, including floor-standing speakers, television speakers and the like;

Car audio systems;

Microphones;

Passive radiators; and

Other specialty audio devices.

Furthermore, the frequency range of the audio transducer can be manipulated in accordance with a given design to achieve the desired results. For example, an audio transducer of any one of the above embodiments may be used as a bass driver, a mid-range-treble driver, a tweeter or a full-range driver depending on the desired application.

7. Slim Electronic Devices

The following is a description of a preferred application for the audio transducer embodiments 100-400 herein described.

In recent times, there has been a growing need to develop compact audio transducers, such as speakers, for slim electronic devices such as cell phones, tablet computers, laptop computers, flat screen televisions, computer monitors and the like. In such devices, space for accommodating transducers is limited due to the aesthetic requirement of achieving minimal device thickness. This places a geometrical limitation on the design of transducers to be housed therein. Generally, in such devices the aim is to reduce the number of transducers and increase transducer diaphragm excursion.

It is desirable that the design of such transducers achieves: good volume excursion for louder bass; low fundamental diaphragm resonance frequency for extended bass at the lower end of the transducer's operating bandwidth; increased diaphragm excursion to minimise diaphragm and enclosure area; and an extended treble bandwidth with less resonance for clearer audio.

Referring to FIGS. 47A to 47G and FIGS. 48A-B, a preferred embodiment of an audio device 600 of the invention is shown comprising a housing 601 and an electroacoustic transducer 700 located within the housing 601. As shown in FIG. 48A, the housing comprises a main, substantially hollow base 601*a* configured to accommodate a plurality of electronic components and circuitry therein. The base 601*a* may consist of multiple cavities to compartmentalise the electronic circuitry. The housing 601 further comprises a cover 601*b* that is configured to rigidly couple over the base to substantially enclose the hollow interior of the base 601*a*. An electronic display screen 615, or other external user interface components, such as keyboards or other user input devices may be mounted onto the cover 601*b* of the housing in some embodiments. The housing 601 comprises at least one electroacoustic transducer cavity 602 having an electroacoustic transducer 700 accommodated therein. The cavity 602 may contain one or more electroacoustic transducers in some embodiments. In this embodiment the housing 601 comprises a pair of electroacoustic transducer cavities 602 on either side of the housing 601. There may be any number of cavities in alternative embodiments depending on the application. It is preferred that each electroacoustic transducer cavity 602 is located adjacent a periphery 604 of the housing 601 to enable direct transmission of sound to the surrounding environment. Each cavity may be located at or adjacent a corner section 608 of the housing. Each electroacoustic transducer 700 is preferably mounted within the respective cavity by any suitable transducer suspension system. A preferred transducer suspension system will be describe in further detail below.

The region 613 inside the audio device housing and outside of cavities 602 may comprise electronic components/circuitry, including for example computer processor(s), power supply, amplifier(s), circuit board(s), sockets, cooling system(s), hard drive(s), memory component(s) and the like, as is well known in the art. Each cavity 602 is preferably a separate cavity but may otherwise be formed by a space or volume between such components in some embodiments. The cavity may be separate to and sealed from internal region 613 or it may have an air passage to said region as will be explained in further detail below.

In this embodiment, the audio device 600 is an electronic device having a sufficiently thin or slim construction in which a depth dimension 614 of the housing 601 (shown in FIG. 47F), at least in the region of the electroacoustic transducer cavity 602, is significantly smaller than width 612 and/or length 611 dimensions of the housing (shown in FIG. 47D). The audio device may be, for example, a mobile phone a flat screen television, a laptop computer, a computer monitor, a tablet computer, or other well-known electronic device having an aesthetic and design requirement to reduce the depth of the device to as little as practicable. The depth dimension 614 of the housing may be less than approximately 0.2 times the width 612 and/or length 611 dimensions of the housing, or less than approximately 0.15 times the width and/or length dimensions, or less than 0.1 times the width and/or length dimensions, for example. It will be appreciated that these ratios are dependent on the type of electronic device and in practice dictated by other components to be incorporated in the device. As such, the ratios provided are not intended to be limiting. In general, this embodiment relates to any electronic device where there is a significant requirement to reduce the depth to as little as practicable, as mentioned above.

Although the housing 601 is shown rectangular in cross-section, it will be appreciated that in alternative embodiments the device 600 may consist of a housing 601 that is of any desired shape for the particular application. For example, the housing 601 may be circular or oval in shape. Reference to length 611 and/or width 612 dimensions in this context may therefore relate to the diameter(s) of the housing in one plane. The housing may have constant or varying width and/or length dimension. The depth dimension 614 is preferably substantially constant, however it may be variable across one or more dimensions of the housing. For example, the depth may reduce adjacent the edges of the housing and increase in a central region. The housing 601 may comprise a pair of opposing major faces 609 that are connected by one or more side faces 610. The major faces 609 preferably have a substantially larger surface area than the side faces. The major faces are preferably substantially orthogonal to the depth dimension 614 of the housing and to a depth dimension 617 of each cavity (shown in FIGS. 47F and 48B).

The depth 617 of each cavity 602 may be substantially the same or similar to the depth dimension 614 of the housing. In some embodiments, the depth of one or more cavities may differ from the depth of the housing. In some embodiments, the depth dimension 617 of one or more cavities, is greater than approximately 0.5 times the depth 614 of the housing, or greater than approximately 0.6 times the depth of the housing or greater than approximately 0.7 times the depth of the housing. In some embodiments the cavity depth dimension 617 of one or more cavities, at the location of the mounted transducer, is greater than approximately 0.5 times the depth of the housing, or greater than approximately 0.6 times the depth of the housing or greater than approximately 0.7 times the depth of the housing.

In some embodiments the depth 617 of one or more cavities 602 is significantly smaller than a width dimension 612 and/or length dimension 611 of the housing. Preferably the depth of one or more cavities 602 is significantly smaller than the width and the length dimensions of the housing. For example the depth dimension 617 of one or more cavities may be less than approximately 0.2 times the width 612 and/or length 611 dimensions of the housing, or less than approximately 0.15 times the width 612 and/or length 611 dimensions of the housing, or less than approximately 0.1 times the width 612 and/or length dimensions 611 of the housing.

Referring to FIG. 48B, in some embodiments the depth dimension 617 of one or more cavities 602 is smaller than a substantially orthogonal width dimension 622 and/or a substantially orthogonal length dimension 621 of the cavity. For example, the depth dimension may be less than approximately 0.8 times the width 622 and/or length 621 dimensions, or less than approximately 0.6 times the width 622 and/or length 621 dimensions. Preferably the depth dimension 617 of one or more cavities 602 is substantially smaller than a substantially orthogonal width dimension 622 of the cavity 602 and a substantially orthogonal length dimension 612 of the cavity.

The housing 601 further comprises one or more apertures adjacent each electroacoustic transducer cavity for sound to propagate therethrough from the associated electroacoustic transducer 700 to the surrounding environment external to the device 600. In the preferred embodiment, the housing 601 comprises a grille 603 or other mesh-type surface adjacent each electroacoustic transducer cavity 602. The grille 603 is located in a side of the housing that extends along the depth dimension 614. The grille 603 of each cavity 602, preferably extends along a substantial portion of the depth dimension 617 at or adjacent the cavity 602. In this manner the cavity is substantially open through a minor face 605 of the housing. This enables sound to propagate from/into the minor face 605 of the housing.

As shown in FIGS. 47D, 47E, 48A and 48B, the electroacoustic transducer 700 in each cavity 602 is a rotational action transducer having a transducer base structure 701 and a diaphragm 702 rotatably coupled to the base structure 701. The rotational action transducer of this embodiment may be the same or similar to any one of the transducers 100-400 previously described. Alternatively, the transducer of this embodiment, may be the same or similar to any one of the rotational action transducers described in PCT/IB2016/055472. In the preferred embodiment, the diaphragm 702 of each transducer 700 comprises of a single rotatable diaphragm body as shown in the figures. In some embodiments however, one or more transducers may comprise of a diaphragm having multiple radially spaced diaphragm bodies that are rotatable about a common axis of rotation of the diaphragm. Such a multiple body diaphragm construction is described in relation to embodiment D of PCT patent application PCT/IB2016/055472 for example, which is hereby incorporated by reference.

Each electroacoustic transducer cavity 602 may comprise an inner surround 606 that is shaped complementary to the electroacoustic transducer 700 for accommodating the transducer therein. The surround preferably comprises opposing grilles 603 and 607 that are aligned on either side of the diaphragm 702. The grilles 603 and 607 are preferably oriented to correspond to the orientation of the diaphragm when it moves to the corresponding maximum position/excursion during operation. The outer grille 603 forms part of the diaphragm housing and is preferably formed in a minor face 605 of the housing, as described above. The inner grille 607 is preferably located within the cavity 602. The cavity preferably comprises a hollow space or volume on the other side of the inner grille 607 to the transducer 700 which allows for the build-up of sound pressure during operation. Each cavity 602 is divided into two volumes by the diaphragm, being first volume 602a adjacent outer grille 603 and connecting to the surrounding air, and second volume 602b adjacent inner grille 607, and possibly extending past inner grille 607 to a larger internal volume within the audio device housing 101. It will be appreciated that, although in this embodiment each surround 606 is shown to accommodate only a portion of the internal volume of the respective cavity 602, in some embodiments the surround 606 may accommodate a substantial or entire portion of the internal volume of the associated cavity 602. In some embodiments the cavity may not comprise an internal surround 606.

In some embodiments the volume 602b within each cavity 602 may connect, via an opening, to a surrounding volume of air. In combination with cavity 602, such an opening may form a resonator which may boost the bass response of the transducer. The volume 602b of cavity 602, as well as the passage length and diameter and other attributes of such an opening, may be tuned to achieve a (Helmholtz) resonance frequency that is slightly below the fundamental resonance frequency of the diaphragm 702. In other embodiments however, the volume 602b of cavity 602 may be sufficiently large such that the air-spring effect on the transducer is sufficiently compliant, to facilitate increased low-frequency bandwidth. Cavity 602 may open to much or most or all of the remainder of the internal volume of the housing 601.

Each electroacoustic transducer 700 is mounted within the respective cavity 602 and surround 606 in an orientation such that the axis of rotation 703 of the diaphragm 702 is substantially parallel to the depth dimension 617 of the cavity 602. In other words, the direction of motion of the diaphragm 702 during operation is along a plane that is substantially orthogonal to the depth dimension 617 of the cavity. This orientation maximises diaphragm excursion/displacement for a given depth. In situ and during operation, the diaphragm 702 of each transducer 700 rotatably oscillates between two terminal positions on either side of a central or neutral diaphragm position. The angular displacement 618 between the neutral position (shown in FIG. 47F) and the first terminal position is preferably substantially the same or similar to the angular displacement 619 between the neutral position and the second terminal position. These may be different in some embodiments. For example both angular displacements 618 and 619 may be approximately 30 degrees. This means that the total angular displacement may be approximately 60 degrees for example. The invention is not intended to be limited to these exemplary values.

As mentioned, the orientation of each transducer 700 within the respective cavity 602 maximises diaphragm excursion/displacement for a given cavity depth. In preferred embodiments, for each transducer 700, a total overall linear displacement 620 of the terminal end 702b of the diaphragm 702 along a plane that is substantially orthogonal to the depth dimension 617 (and substantially orthogonal to the axis of rotation 703), as it moves from the first terminal position to the second terminal position (or vice versa), is preferably substantially the same or larger than the depth dimension 617 of the associated cavity 602. The abovementioned plane may be substantially parallel to the width and length dimensions 622 and 621 respectively, for example. More preferably, the total linear displacement 620 along the abovementioned plane is larger than the depth dimension 617 of the cavity or the depth dimension 614 of the housing, at least at the location of the diaphragm. For example, the transducer 700 may have a total overall linear displacement 620 of the diaphragm terminal end 702b of about 30 mm, the cavity may have a depth dimension 617 of about 20 mm and the housing may have a depth dimension 614 of about 24 mm. However, the invention is not intended to be limited to these exemplary values. The terminal end 702b may be an edge, face or apex of the diaphragm for example.

In some embodiments at least a component of the linear displacement 620 that is substantially orthogonal to the depth dimension 617 (for example a component that is substantially parallel to the width 622) in the abovementioned plane is the same or larger than the depth dimension 617 of the associated cavity.

In an embodiment where the diaphragm consists of multiple diaphragm bodies, the terminal end means the end of the diaphragm body that is most distal from the axis of rotation. If multiple bodies have ends that are most distal from the axis of rotation, then the terminal end of the diaphragm may be any one of these diaphragm body ends.

In some embodiments the diaphragm 702 of each transducer may be operative to achieve a total angular displacement between the first and second positions of more than approximately 40 degrees, or more than approximately 60 degrees. In some embodiments, the total linear displacement 620 of the terminal end 702b along the plane of motion and along an axis substantially orthogonal to the depth dimension 614 may be more than approximately 1.2 times, or more than approximately 1.5 times, the depth dimension 614 of the housing. It will be appreciated that these values are exemplary and not intended to be limiting.

In some embodiments a maximum diaphragm dimension 704 (such as a total width of the diaphragm as shown in FIG. 49C) along an axis substantially parallel to the axis of rotation in situ, is greater than approximately 0.5 times the depth dimension 614 of the housing, or greater than approximately 0.6 times the depth dimension of the housing, or greater than approximately 0.7 times the depth dimension 614 of the housing. In some embodiments a maximum diaphragm dimension 704 along an axis substantially parallel to the axis of rotation in situ, is greater than approximately 0.5 times the depth dimension of the housing at the location of the transducer, or greater than approximately 0.6 times the depth dimension of the housing at the location of the transducer, or greater than approximately 0.7 times the depth dimension of the housing at the location of the transducer.

Due to the reduced depth 614 of the device, the width of the diaphragm 704 of each transducer 700 is also reduced in this embodiment. Each transducer 700 instead makes use of the increased relative length 611 of the device to increase the length of the diaphragm relative to the width and optimise volume excursion capability. For example, referring briefly to FIG. 49B and FIG. 49C in this embodiment the diaphragm of each transducer may consist of a maximum length 705 from the axis of rotation 703 to a most distal peripheral edge 702b, that is more than approximately 1.5 times the width 704 of the diaphragm 702, or more than approximately 1.75 times the width 704 of the diaphragm 702.

As mentioned the orientation of each electroacoustic transducer 700 permits greater diaphragm excursion for a given housing depth 614 as the respective diaphragm. In addition, rotational action transducers also permit increased diaphragm excursion relative to linear action transducers for a given space. Rotational action transducers also increase excursion, whilst reducing fundamental resonance frequency without damaging the treble response as could be the case with linear action drivers. This means a higher level of excursion and improved electroacoustic transducer performance, whilst minimising overall transducer cavity volume requirements within the housing.

It will be appreciated that in some embodiments the device 600 may comprise any combination of rotational and linear action transducers within one or more cavities 602.

Each transducer 700 is preferably housed within the surround 606 of the respective cavity 602 and suspended therein using a transducer suspension system.

In situ, there is preferably a small air gap between the periphery of the diaphragm 702 and a peripheral wall of the corresponding cavity 602. Air gaps are required to be sufficiently small to prevent significant amounts of air from passing through due to the pressure differential that exists during normal operation.

The housing 601 may also incorporate stoppers 711 within each cavity 602 which do not connect with the transducer 700 except in the case of an unusual event such as a drop, or a bump as a means of preventing damage from occurring to more fragile parts of the diaphragm assembly. The stoppers preferably align with the diaphragm base frame or other relatively rigid part of the diaphragm to minimise damage to the diaphragm and increase the rigidity of the stoppers.

As mentioned, the diaphragm 702 comprises an outer periphery 702a, 702b that is free from physical connection with a surrounding structure such as the housing 601, cavity 602 and/or surround 606. The phrase "free from physical connection" as used in this context is intended to mean there is no direct or indirect physical connection between the associated free region of the diaphragm structure periphery and the housing. For example, the free or unconnected regions are preferably not connected to the housing either directly or via an intermediate solid component, such as a solid surround, a solid suspension or a solid sealing element, and are separated from the structure to which they are suspended or normally to be suspended by a gap. The gap is preferably a fluid gap, such as a gases or liquid gap.

Furthermore, the term housing in this context is also intended to cover any other surrounding structure that accommodates at least a substantial portion of the diaphragm structure therebetween or therewithin. For instance a baffle that may surround a portion of or an entire diaphragm structure, or even a wall extending from another part of the electroacoustic transducer and surrounding at least a portion of the diaphragm structure may constitute a housing or at least a surrounding structure in this context. The phrase free from physical connection can therefore be interpreted as free from physical association with another surrounding solid part in some cases. The transducer base structure may be considered as such a solid surrounding part. In the rotational action embodiments of the invention for example, parts of the base region of the diaphragm structure may be considered to be physically connected and suspended relative to the transducer base structure by the associated hinge assembly. The remainder of the diaphragm structure periphery, however, may be free from connection and therefore the diaphragm structure comprises at least a partially free periphery.

The phrase "at least partially free from physical connection" (or other similar phrases such as "at least partially free periphery" or sometimes abbreviated as "free periphery") used in relation to the outer periphery in this specification is intended to mean an outer periphery where either:

approximately the entire periphery is free from physical connection, or otherwise in the case where the periphery is physically connected to a surrounding structure/housing, at least one or more peripheral regions are free from physical connection such that these regions constitute a discontinuity in the connection about the perimeter between the periphery and the surrounding structure.

It is preferred for any electroacoustic transducer embodiment that the diaphragm periphery is at least partially and significantly free from physical connection. For example a significantly free periphery may comprise one or more free peripheral regions that constitute approximately at least 20 percent of a length or two dimensional perimeter of the outer periphery, or more preferably approximately at least 30 percent of the length or two dimensional perimeter of the outer periphery. The diaphragm structure is more preferably substantially free from physical connection, for example, with at least 50 percent of the length or two dimension perimeter of the outer periphery free from physical connection, or more preferably at least 80 percent of the length or two dimensional perimeter of the outer periphery. Most preferably the diaphragm structure is approximately entirely free from physical connection.

Preferably the width of the air gaps defined by the distance between the outer periphery of the diaphragm body of each transducer 700 and the housing/surround is less than $\frac{1}{10}$th, and more preferably less than $\frac{1}{20}$th of a diaphragm body length 705. For example, a width of each air gap 711 defined by the distance between the outer periphery of the diaphragm body and the surround is less than 1.5 mm, or more preferably is less than 1 mm, or even more preferably is less than 0.5 mm. These values are exemplary and other values outside this range may also be suitable.

A transducer having a substantially free periphery means the diaphragm may take up nearly the entire thickness of the device which increases the surface area of the major faces and optimises performance. In a rotational action transducer, a substantially free diaphragm periphery design as described above also allows for an increase in diaphragm excursion while reducing fundamental diaphragm resonance and mitigating unwanted diaphragm break up resonances at treble frequencies, further improving the performance of the device.

To help achieve a minimal gap between the diaphragm 702 and the surrounding structure, a preferred method of forming and assembling the diaphragm within the structure consists of first assembling an audio transducer with a diaphragm that is too large to fit into the surround. A diaphragm jig is then employed to trim the diaphragm periphery to the correct size. Preferably the jig locates the transducer for the trimming operation, preferably via the same mounts that would normally be used to locate the transducer in the surround. This method avoids some of the problems associated with the stacking of tolerances associated with manufacturing and assembly that would occur in the case that the diaphragm was cut to size before it was assembled to the transducer, and mounted to the surround. In the case of transducer 700, the EPS/aluminium foil laminate wedge used to form the diaphragm 702 could be made to be, for example, 1 mm too long and 2 mm too wide to fit into the surround 606. It will be appreciated these dimensions are only exemplary and not intended to be limiting to the scope of the invention. After assembling the transducer with the ill-fitting diaphragm, the transducer may then be mounted into a trimming jig that locates the transducer via transducer base structure 701. In the case of transducer 700, parts of the transducer base structure that are normally used to locate the transducer in the surround (i.e. the surfaces in and around the outside of the apertures 615 where the bushes 707 normally contact, and the surfaces 606*a* and 606*b* of the base component 706 where the decoupling pads 708 and 709 would normally contact). This helps avoid stacking of tolerances.

Once the transducer is accurately located, a thin rotary diamond disc may be guided via guide blocks rigidly attached to the above-mentioned supports, to trim the diaphragm periphery to the required dimensions.

Note that in the case that a trimming jig utilises the same mounts that would normally be used to locate the transducer in the surround, as described above, trimming of the diaphragm perimeter may cause tolerance stacking to tend to be minimised in a manner such that, once the transducer is mounted in the surround, the air gap between the diaphragm and the housing may be comparatively accurate during normal usage. In some embodiments the mounting system may include stopper surfaces on the transducer base structure which are designed to impact on the interior of the housing, so that, in a drop scenario, compliance of the decoupling mounting system does not result in undue transducer displacement and potential damage to the fragile diaphragm, through contact of the diaphragm with the housing, for example. It may therefore be desirable to subtly alter the trimming objective, for example it may be better to optimise trimming of the diaphragm perimeter based on a goal of avoidance of potential damage to the diaphragm in unusual drop or other shock scenarios when stopper surfaces are impacted. In this case it may be useful to make a trimming jig that positions the transducer via stopper surfaces.

Referring to FIGS. 47A-F and 48A-B, in this embodiment the electroacoustic transducer 700 is mounted within the surround 606 via a decoupling mounting system. The decoupling mounting system is configured to compliantly mount the electroacoustic transducer base structure 701 to the housing 601 within the surround 606, such that the components are capable of moving relative to one another along at least one translational axis, but preferably along three orthogonal translational axes during operation of the associated transducer. Alternatively, but more preferably in addition to this relative translational movement, the decoupling system compliantly mounts the two components such that they are capable of pivoting relative to one another about at least one rotational axis, but preferably about three orthogonal rotational axes during operation of the associated transducer. In this manner, the decoupling mounting system at least partially alleviates mechanical transmission of vibration between the diaphragm and the housing 601.

The mounting system comprises a decoupling aperture or channel 615 extending longitudinally within the transducer base structure. The decoupling aperture 615 is located such that its longitudinal axis substantially coincides with a location of a node axis of the transducer assembly. A node axis is the axis about which the transducer base structure rotates due to reaction forces and/or inertia as exhibited during diaphragm oscillation. In this embodiment the node axis 713 is located at or proximal to the base component 706 of the transducer base structure. The decoupling aperture 615 extends substantially orthogonal to a general longitudinal axis of the transducer assembly. A bush 707 is mounted within each decoupling aperture 615 end. A screw shaft or pin 616 is aligned and located within a central aperture of each bush 707, and rigidly couples the housing. For example, the screw shaft may threadably couple the housing. Any alternative method of rigid coupling may be used. It may couple onto the main base 601*a* at one end and the housing cover 601*b* at an opposing end for example. The ends of the bushes prevent the transducer base structure 701 from contacting the housing by filling the small gap 710 as seen in the detail view of FIG. 47G. Each bush 707 is located within the respective aperture 615 such that it is aligned with or in close proximity to the sides of the base structure 701 between the upper and lower major faces of the base structure 701. In this manner each bush 707 does not significantly protrude from the base structure to thereby maximise usage of the depth dimension 617 by the diaphragm. A washer may also be coupled between the bush and the associated side of the transducer base structure in some configurations. The bushes and washers are herein referred to as "node axis mounts". The node axis mounts are configured to couple corresponding internal recesses of the upper and lower major faces 609 of the housing 601 via any suitable method.

The decoupling mounting system further comprises one or more decoupling pads 708, 709 located on opposing faces of the transducer base structure 701. The pads 708, 709 provide an interface between the associate base structure face and a corresponding internal wall/face 606a, 606b of the surround 606, to help decouple the components. The decoupling pads are preferably located at a region of the transducer base structure that is distal from the node axis location. For example, they are located at or adjacent an edge, side or end of the base structure 701 that is distal from the diaphragm 702 in this embodiment as the node axis is located close to the diaphragm axis of rotation. Each pad may be longitudinal in shape. In the preferred form, each pad 708, 709 comprises a pyramid shaped body having a tapering width along the depth of the body. Preferably the apex of the pyramid is coupled to the associated face of the transducer base structure 701 and the opposing base of the pyramid is configured to couple the associated face of the transducer surround in situ. This orientation may be reversed in some implementations however. It will be appreciated that in alternative embodiments the decoupling mounting system may comprise multiple pads distributed about one or more of the faces of the transducer base structure. Such mounts are herein referred to as "distal mounts".

It will be appreciated that in alternative embodiments the decoupling mounting system may comprise multiple pads distributed about one or more of the faces of the transducer base structure. Such mounts are herein referred to as "distal mounts".

The node axis mounts and the distal mounts are sufficiently compliant in terms of relative movement between the two components to which they are each attached. For instance, the node axis mounts and the distal mounts may be sufficiently flexible to allow relative movement between the two components they are attached to. They may comprise flexible or resilient members or materials for achieving compliance. The mounts preferably comprise a low Young's modulus relative to at least one but preferably both components they are attached to (for example relative to the transducer base structure and housing of the audio device). The mounts are preferably also sufficiently damped. For instance, the node axis mounts may be made from a substantially flexible plastics material, such as a silicone rubber, and the pads may also be made from a substantially flexible material such as silicone rubber. The pads are preferably formed from a shock and vibration absorbing material, such as a silicone rubber or more preferably a viscoelastic urethane polymer for example.

Alternatively, the node axis mounts and/or the distal mounts may be formed from a flexible and/or resilient member such as metal decoupling springs. Other substantially compliant members, elements or mechanisms such as magnetic levitation that comprise a sufficient degree of compliance to movement, to suspend the transducer may also be used in alternative configurations.

In this embodiment, the decoupling system at the node axis mounts has a lower compliance (i.e. is stiffer or forms a stiffer connection between associated parts) relative to the decoupling system at the distal mounts. This may be achieved through the use of different materials, and/or in the case of this embodiment, this is achieved by altering the geometries (such as the shape, form and/or profile) of the node axis mounts relative to the distal mounts. This difference in geometry means that the node axis mounts comprise a larger contact surface area with the base structure and surround relative to the distal mounts, thereby reducing the compliance of the connection between these parts.

A narrow and substantially uniform gap/space 710 is formed between the transducer base structure 701 and the housing 601 when the transducer is assembled within the surround. In some embodiments the gap may not be uniform. This narrow gap 710 may extend about at least a substantial portion of the perimeter (and preferably the entire perimeter) of the base structure 701. A width of each air gap defined by the distance between the outer periphery of the transducer base structure 701 and the surround is less than 1.5 mm, or more preferably is less than 1 mm, or even more preferably is less than 0.5 mm. These values are exemplary and other values outside this range may also be suitable.

A narrow gap/space 712 exists between a portion or the entire perimeter of the diaphragm 702 and the surround 606.

The audio device further comprises diaphragm excursion stoppers 711 which are also connected to outer grille 603 and/or inner grille 607. There may be one or more such stoppers. In situ, there may be one or more (in this example three) stoppers 711 extending longitudinally and substantially uniformly spaced along each grille. These stoppers 711 have an angled surface that is positioned to contact the diaphragm in the case of any unusual event, such as if the device is dropped or if a very loud audio signal is presented, that may cause over-excursion of the diaphragm. The angled surface is configured to locate adjacent the diaphragm body in situ, to match the angle of the diaphragm body if the diaphragm is caused to inadvertently rotate to this point. The stoppers 711 are made from a substantially soft material, such as an expanded polystyrene foam or some resilient open or closed-cell foam, to avoid damaging the diaphragm. The material is preferably relatively softer than that of the diaphragm body for example (e.g. it may be of a relatively lighter density than the polystyrene of which the diaphragm body) to alleviate damage. The stoppers 711 have a large surface area so as to effectively decelerate the diaphragm, but not so large as to block too much air flow and/or create enclosed air cavities that are prone to resonance.

The device may further comprise a foam or other material located and coupled between the transducer base structure 701 and the inner wall of the surround 606, as described in relation to the embodiment of FIGS. 45 and 46A-B, for example.

It will be appreciated that in some embodiments, any one or more of the electroacoustic transducers 700 of the device 600 may be replaced with an acoustoelectric transducer having a similar construction and mounting configuration to transducer 700.

The electroacoustic transducers 700 described herein may be configured to operate with an audio tuning system associated with an audio device. In such an embodiment the audio device may comprise one or more output audio channels, each having one or more electroacoustic transducers associated therewith. The audio tuning system, which may be implemented in the audio device 100 or in a separate device, is configured to operatively couple the output audio channel(s) of the audio device and to optimise input audio signals for the output audio channel(s).

In some embodiments the audio tuning system may comprise an equaliser that is operable to adjust a frequency response of an output audio channel associated with the electroacoustic transducer. The equaliser may be configured to operate in a first mode of operation where the apparatus is intended for near-field use in close proximity to a user's head and a second mode of operation where the apparatus is intended for far-field use distal to a user's head for example. In the first mode of operation, the equaliser may be configured to adjust the frequency response of the output audio channel based on a diffuse field frequency response.

In some embodiments the equaliser may comprise a first equalisation frequency response associated with the first mode of operation that is based on a diffuse field frequency response. The first equalisation frequency response may comprise an increasing magnitude from approximately 400 Hz to approximately 2000 Hz. The first equalisation frequency response may comprise a higher average magnitude across a treble frequency range relative to mid-level and/or bass frequency ranges.

The diffuse field frequency response on which the equalisation frequency response is based may comprise:
  a substantially continuously increasing magnitude from approximately 0 dB at approximately 100 Hz to approximately 15 dB at approximately 2500 Hz; and
  a substantially uniform magnitude from approximately 2500 Hz to approximately 3200 Hz; and
  a substantially decreasing magnitude from approximately 15 db at approximately 3200 Hz to approximately 7 dB at approximately 10 kHz.

In some embodiments the equaliser may further comprise a bass boost component associated with the first equalisation frequency response. The bass boost component may result in an increased magnitude, of the frequency response of the audio device 600, over a bass frequency band of approximately 20 Hz to 200 Hz relative to a diffuse field frequency response magnitude over the bass frequency band.

In some embodiments the audio tuning system may further comprises a bass optimisation module. The bass optimisation module may be configured to receive an input audio signal and adjust a lower cut-off frequency of a frequency response of the apparatus based on one or more predetermined characteristics of the output audio channel of the device 600.

In some embodiments the operating characteristics alternatively or additional comprise maximum operational thresholds for the one or more output audio channels, including maximum operational voltage or current threshold of the electroacoustic transducer 700 of the output channel, or maximum diaphragm displacement threshold of the electroacoustic transducer 700 of the output channel, or maximum amplifier output for the output channel, or any combination thereof.

In some embodiments the bass optimisation module may be configured to compare a value or values of one or more operating parameters of the associated output audio channel with the corresponding operating parameter threshold or thresholds and adjust a lower cut-off frequency of the audio device frequency response accordingly.

8. Hinge Systems for Other Applications

It is envisaged that the hinge system embodiments 103, 203, 303 and 403 herein described in relation to audio transducers 100, 200, 300 and 400 respectively may be utilised in any one of a number of devices, other than audio transducer devices, requiring precise, accurate, low friction, low restoring force and/or low-resonance rotational action for effective operation. For example, the hinge systems 103, 203,303 and 403 described herein, or similar hinge systems may be implemented in any one or more of the following devices: a transducer, a microphone, an electromechanical device, a mechanical device, an actuator, a servo, a positioner, a four bar linkage mechanism, a pinion, scales/balances, general instrumentation, electronic instrumentation, a gauge, a meter, an indicator, a pointer, a watch, a clock, a timer, a potentiometer, a gyroscope, an aircraft instrument, an ohmmeter, a voltmeter, a compass, a control unit, a relay, a flow-meter, a water jet controller, an ink jet printing nozzle positioner, a laser or light positioner, a mirror positioner, a sensor positioner, a recording head positioner, an audio stylus, a seismic sensor, a strain meter, a creep meter, a tilt meter, a geophone, a thermometer and the like.

This list is not intended to be exhaustive or limiting. Other types of applications/devices may also benefit from the hinge systems described herein, as would be readily apparent to the skilled artisan. These other types of applications/devices are also intended to be included within the scope of this invention. In each of the abovementioned devices a rotatable element may be operatively supported on another body, assembly or structure, by a hinge, which could be any one of the hinge embodiments herein described.

In each device/application employing the hinge systems of this invention, it is preferred that there is a first, moveable body and a second, relatively stable body, as in the diaphragm and transducer base structure of the audio transducer embodiments. The second body is preferably heavier and/or firmly fixed in position in situ, relative to the first body. It is also preferred that the second body comprises of a squat geometry. Preferably the second body is substantially thick-set, particularly relative to the first body. This may help to facilitate accurate manufacture and/or consistent alignment of the contact members supported from the second body as described in relation to transducers 100, 200 and 400, for example.

If the apparatus further comprises a coupling or couplings for mounting the apparatus to another body, structure or device, then it is preferred the coupling or couplings are in or on the second body. For example a decoupling mounting system (as described in section 7) may be utilised flexibly mounting the second body to the other body, structure or device to at least partially alleviate mechanical transmission of vibration between the first body and the other body, structure or device.

An example of an electromechanical device utilising one of the hinge systems of this invention is described below and with reference to FIGS. 50A-B and 51A-D. In this embodiment, the electromechanical device 800 may be an accelerometer unit, for example, incorporating the hinge 403 of transducer 400. As described any other hinge system herein described may alternatively be used in this embodiment.

The electromechanical device 800 (hereinafter referred to as device 800) is configured to generate mechanical motion in response to electronic signals or generate electronic signals in response to mechanical motion. In the application of an accelerometer unit, for example, the device 800 is configured to generate electronic signals in response to acceleration forces exhibited by the device 800. The transducing mechanism used may be an electromagnetic mechanism as described with reference to the various audio transducer embodiments of this invention, or it may be any other suitable mechanism, including for example a piezoelectric, electrostatic, magnetostrictive or other known types. The type of mechanism used may be the one that is best suited for a particular application. For example, in the application of an accelerometer, a piezoelectric transducing mechanism may be employed instead of the electromagnetic mechanism herein described.

The device 800 comprises a first body 801 and a second body 802. The first body 801 is operatively supported on the second body 802 via the hinge system 403, described in section 4.2. Essentially, the first body 801 is a mass that moves relative to a stable, second body 802 via the hinge system 403. Components of the electromechanical device 800 other than the hinge system 403 are generalised in this specification so as to avoid obscuring the unique aspects of the invention. It will be readily apparent to the skilled artisan that other components that may be necessary to build a functional electromechanical device are not intended to be excluded by this generalisation and that the generalised first and second body structures may consist any combination of such components. Each of the first and second bodies may consist of one or more body parts.

As mentioned, it is preferred that the second body 802 is relatively heavier and/or squat relative to the first body 801 so that parts of the hinge system (i.e. contact members 491-493) may be accurately formed on a relatively robust body. The second body 802 may be a substantially rigid base structure of the device 800 or it may be a substantially rigid supporting structure or housing. The second body is firmly fixed in situ, relative to the first body 801. For example, it may be coupled to a housing or surround of the electromechanical device 800 or it may be coupled to another device, such as an engine when used as an accelerometer to measure engine vibrations. It is preferred that the density of the second body 802 is greater than approximately 0.07 g/mm$^3$, more preferably greater than approximately 0.001 g/mm$^3$ and most preferably greater than approximately 0.0016 g/mm$^3$. The body 802 preferably comprises the same mechanical properties and/or geometry as described for base structure 402 of transducer 400, particularly in relation to the associated contact members 291-293 of the hinge system 403.

The first body 801 is moveable relative to the second body 802, and is preferably rotatable relative thereto via the hinge 403. The hinge system 403 is configured to couple the first body 801, being a moveable mass, on one side and couple the second body 802 on an opposing side. The arrangement of contact members, hinge elements, biasing mechanism(s) and centring mechanism(s) of this hinge system 403 are as described for transducer 400 and will not be repeated herein for conciseness. Also, the configuration of the second body 802 is similar to the transducer base structure 402 and will also not be repeated herein for conciseness. Outer caps 804, 805 of the base structure assembly may be modified to enable the device 800 to be mounted on the required supporting structure as per the application. For instance, in this example, the outer caps 804, 805 have substantially planar exterior surfaces for enabling the device 800 to be mounted directly to another support—i.e. without a decoupling mounting system. It will be appreciated however that any type of mounting may be used and in some applications a decoupling mounting system may be preferred and utilised.

The moveable mass 801 may be in the form of a panel or any other substantially rigid body. Other shapes and forms of this body may be used depending on the application and the invention is not intended to be limited to this example. The elongate and substantially planar shape of the body 801 in this example helps to stiffen the rotating assembly. The first body 801 may be coupled to the hinge system 403 via a base frame 231 as described for the transducer 400. The first body 801 is preferably rigidly coupled to the base frame 231 via any suitable mechanism, such as adhesive, welding, mechanical fastening and the like.

The body 801 adds mass to the moving assembly of this device 800 that is offset from the axis of rotation 299. This offsets the centre of mass location 803 from the axis of rotation 299 to thereby generate rotational motion of the body 801 in response to movement of the device 800. For instance translational movement of the device along an axis having a component that is substantially orthogonal to the coronal plane of the second body 802, will generate rotational motion of the first body 801 which will in turn provide signal(s) via the transducing mechanism representative of the translational motion. Similarly rotational motion of the device 800 about an axis having a component that is substantially parallel to the axis of rotation will generate rotation of the first body 801 that will result in signal(s) representative of this rotational motion.

An exemplary implementation of the device 800 is as a single axis accelerometer unit. The unit may be mounted on an engine or other type of apparatus where measurement of movement is required. The single axis accelerometer may be mounted on its own where measurement of a single axis of translational or rotational motion is desired, only, or it may be mounted in combination with other accelerometer units oriented to measure the translational and/or rotational motion along other substantially orthogonal axes. In this manner a multiple axis accelerometer device may be constructed.

In another embodiment the centre of mass location 803 is approximately aligned with the axis of rotation 299 such that the device responds primarily to rotational, as opposed to translational, movements.

The foregoing description of the invention includes preferred embodiments audio transducer, audio device, hinge system and electronic device embodiments. The description also includes various embodiments, examples and principles of design and construction of other systems, assemblies, structures, devices, methods and mechanisms relating to the abovementioned preferred embodiments. Modifications to the embodiments and to the other related systems, assemblies, structures, devices, methods and mechanisms disclosed herein may be made, as would be apparent to those skilled in the relevant art, without departing from the spirit and scope of the invention, as defined by the accompanying claims.

The invention claimed is:

1. An electronic device comprising:
   a housing having a cavity for an electroacoustic transducer, the cavity having a depth dimension that is smaller than a substantially orthogonal length dimension and/or smaller than a substantially orthogonal width dimension of the cavity; and
   an electroacoustic transducer located within the cavity and having a diaphragm that is configured to rotate about an axis of rotation during operation, wherein the electroacoustic transducer is oriented within the cavity such that the axis of rotation is substantially parallel to the depth dimension of the cavity, and
   wherein the housing has a depth dimension that is substantially smaller than a width dimension and a length dimension of the housing,
   wherein the diaphragm is configured to rotatably oscillate about the axis of rotation between a first terminal position and second terminal position during operation, and comprises a length from the axis of rotation to a terminal edge distal from the axis of rotation that is more than approximately 1.75 times a width of the diaphragm along the axis of rotation, such that a total linear displacement of the terminal end of the diaphragm along a plane that is substantially orthogonal to the depth dimension is substantially the same or greater than the depth dimension of the cavity.

2. An electronic device as claimed in claim 1 wherein the housing depth dimension is less than approximately 0.2 times the width dimension and/or less than approximately 0.2 times the length dimension of the housing.

3. An electronic device as claimed in claim 1 wherein the housing depth dimension is less than approximately 0.2 times the width dimension and less than approximately 0.2 times the length dimension of the housing.

4. An electronic device as claimed in claim 1 wherein the total displacement of the terminal end is greater than the depth dimension.

5. An electronic device as claimed in claim 1 wherein the cavity depth dimension is greater than approximately 0.5 times a depth of the housing.

6. An electronic device as claimed in any claim 1 wherein the diaphragm comprises one or more peripheral regions that are free from physical connection with a peripheral wall of the cavity.

7. An electronic device as claimed in claim 6 wherein the one or more peripheral regions that are free from physical connection with the cavity wall constitute at least 20% of a length or perimeter of an outer periphery of the diaphragm.

8. An electronic device as claimed in claim 6 wherein the one or more peripheral regions of the diaphragm are separated from the cavity wall by a relatively small air gap.

9. An electronic device as claimed in claim 1 wherein the diaphragm comprises a body that is substantially thick.

10. An electronic device as claimed in claim 9 wherein the diaphragm body may comprise a maximum thickness that is at least about 11% of a maximum length dimension of the body.

11. An electronic device as claimed in claim 1 wherein the electroacoustic transducer comprises a hinge system for rotatably coupling the diaphragm of the transducer to a transducer base structure of the transducer.

12. An electronic device as claimed in claim 1 wherein the transducer is coupled to the housing via a decoupling mounting system configured to at least partially alleviate mechanical transmission of vibration between the diaphragm and the housing.

13. An electronic device as claimed in claim 1 wherein the device further comprises an audio tuning system having an equaliser that is operable to adjust a frequency response of an output audio channel associated with the electroacoustic transducer, and wherein the equaliser is configured to operate in a first mode of operation where the device is intended for near-field use in close proximity to a user's head and a second mode of operation where the device is intended for far-field use distal to a user's head, and wherein the in the first mode of operation the equaliser is configured to adjust the frequency response of the output audio channel based on a diffuse field frequency response.

14. An electronic device as claimed in claim 1 wherein the electronic device is a smart phone or a mobile phone.

15. An electronic device as claimed in claim 1 wherein the electronic device is a table computer.

16. An electronic device as claimed in claim 1 wherein the electronic device is a laptop computer.

17. An electronic device as claimed in claim 1 wherein the electronic device is a computer monitor.

18. An electronic device as claimed in any claim 1 wherein the electronic device is a television.

19. An electronic device as claimed in claim 1 wherein the transducer further comprises a transducing mechanism coupled to the diaphragm at or proximal to the axis of rotation.

20. An electronic device as claimed in claim 19 wherein the transducing mechanism comprises an electromagnetic mechanism including one or more force transferring components moveable using a magnetic field, and the force transferring component(s) is(are) coupled to the diaphragm at or proximal to the axis of rotation.

21. An electronic device as claimed in claim 1 wherein the diaphragm comprises a substantially rigid diaphragm base frame and a diaphragm body rigidly coupled to the diaphragm base frame at one end of the body.

22. An electronic device as claimed in claim 21 wherein the diaphragm comprises a plurality of diaphragm bodies rigidly coupled to and extending radially from the diaphragm base frame.

23. An electronic device as claimed in claim 21 wherein the transducer further comprises a transducing mechanism rigidly coupled to the diaphragm base frame.

24. An electronic device as claimed in claim 1 wherein the transducer is located wholly within the cavity.

25. An electronic device as claimed in claim 1 wherein the transducer comprises a maximum width that is substantially equal to or less than the depth dimension of the cavity.

26. An electronic device as claimed in claim 1 wherein the transducer further comprises a transducing mechanism coupled to the diaphragm and a hinge mechanism coupled to the diaphragm, and wherein the transducing mechanism and the hinge mechanism are accommodated wholly within the cavity.

* * * * *